US012109874B2

(12) United States Patent
Schmeichel et al.

(10) Patent No.: US 12,109,874 B2
(45) **Date of Patent: *Oct. 8, 2024**

(54) TONNEAU COVER HAVING SECURED FLEXIBLE HINGE

(71) Applicant: Agri-Cover, Inc., Jamestown, ND (US)

(72) Inventors: Charles M. Schmeichel, Jamestown, ND (US); Brendan T. Bohn, Jamestown, ND (US); Mark E. Beam, Jamestown, ND (US); John W. Simon, Burnsville, MN (US)

(73) Assignee: Agri-Cover, Inc., Jamestown, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,949

(22) Filed: Dec. 20, 2022

(65) Prior Publication Data

US 2023/0121434 A1 Apr. 20, 2023

Related U.S. Application Data

(63) Continuation of application No. 17/089,611, filed on Nov. 4, 2020, now Pat. No. 11,642,948, which is a (Continued)

(51) Int. Cl.
*B60J 7/19* (2006.01)
*B60J 7/14* (2006.01)
(Continued)

(52) U.S. Cl.
CPC ............... *B60J 7/198* (2013.01); *B60J 7/141* (2013.01); *B60J 7/041* (2013.01); *B60J 7/1621* (2013.01)

(58) Field of Classification Search
CPC ... B60J 7/141; B60J 7/198; B60J 7/041; B60J 7/1621
(Continued)

(56) References Cited

U.S. PATENT DOCUMENTS 5,427,428 A * 6/1995 Ericson .................... B60J 7/141 296/100.09
6,352,296 B1 * 3/2002 Kooiker ................... B60J 7/141 296/100.09

(Continued)

*Primary Examiner* — Amy R Weisberg
*Assistant Examiner* — Dana D Ivey
(74) *Attorney, Agent, or Firm* — Robert C. Freed; Dykema Gossett PLLC

(57) ABSTRACT

A tonneau cover apparatus for removable attachment to a cargo box of a pickup truck including a support frame assembly and a cover assembly. The cover assembly includes a plurality of pivotally interconnected rigid panels that can be folded up and secured to the cargo box such that respective upper surfaces of at least two of the plurality of rigid panels reside in an upright folded orientation. The tonneau cover apparatus further includes a mechanism for securing the at least two of the plurality of rigid panels in the upright folded orientation. A method of removably securing the tonneau cover apparatus to the pickup truck is also described, as is an alternate embodiment of the tonneau cover apparatus, wherein the cover assembly includes first and second pivotally interconnected rigid panels and a pair of hinge support mechanisms that generally restrict the way the second rigid panel pivots.

41 Claims, 127 Drawing Sheets

Related U.S. Application Data continuation-in-part of application No. 16/865,132, filed on May 1, 2020, now Pat. No. 11,292,324, which is a continuation-in-part of application No. 16/252,345, filed on Jan. 18, 2019, now Pat. No. 11,235,652, which is a continuation of application No. 15/794,549, filed on Oct. 26, 2017, now Pat. No. 10,189,340.

(60) Provisional application No. 62/845,086, filed on May 8, 2019, provisional application No. 62/843,357, filed on May 3, 2019, provisional application No. 62/414,591, filed on Oct. 28, 2016.

(51) Int. Cl.
*B60J 7/04* (2006.01)
*B60J 7/16* (2006.01)

(58) Field of Classification Search
USPC ........................................ 296/100.07, 100.09
See application file for complete search history.

(56) References Cited

U.S. PATENT DOCUMENTS

| | | | | |
|---|---|---|---|---|
| 8,690,224 | B2 * | 4/2014 | Maimin | B60P 7/02<br>296/100.09 |
| 11,235,652 | B2 * | 2/2022 | Schmeichel | B60J 7/198 |
| 11,642,948 | B2 * | 5/2023 | Schmeichel | B60J 7/141<br>296/100.07 |
| 2018/0093555 | A1 * | 4/2018 | Aubrey | B60P 7/06 |

* cited by examiner

TONNEAU COVER HAVING SECURED FLEXIBLE HINGE

RELATED APPLICATIONS

This application is a continuation of U.S. application Ser. No. 17/089,611, filed on Nov. 4, 2020, which is a continuation in-part of U.S. application Ser. No. 16/252,345, filed on Jan. 18, 2019, which is a continuation of U.S. application Ser. No. 15/794,549, filed on Oct. 26, 2017, now U.S. Pat. No. 10,189,340, which claims the benefit of U.S. Provisional Application No. 62/414,591, filed on Oct. 28, 2016; this application is also a continuation-in-part of U.S. application Ser. No. 16/865,132, filed on May 1, 2020, which claims the benefit of U.S. Provisional Application No. 62/845,086, filed on May 8, 2019, and U.S. Provisional Application No. 62/843,357, filed on May 3, 2019, which applications are incorporated herein by reference in their entirety.

FIELD OF THE INVENTION

A tonneau cover apparatus for covering an open bed or cargo box of a pickup truck. The tonneau cover apparatus preferably including a folding cover assembly having a plurality of rigid panels that are interconnected in series by a series of hinges in such a manner that the respective panels can pivot with respect to one another, so as to fold up while the cover assembly is secured to a support frame assembly, when the support frame assembly is secured to the cargo box of the pickup truck. In preferred embodiments a plurality of the rigid panels can be secured in an upright folded orientation when the cover assembly is detachably secured to the pickup truck. Alternately, a tonneau cover apparatus is provided that preferably includes two rigid panels, a cab panel that can be secured to a support frame assembly that is secured to a cargo box of a pickup truck and a lift-up panel that is pivotally interconnected in series with the cab panel when the cab panel is secured to the support frame assembly. The lift-up panel is interconnected to the cab panel by a hinge, preferably a flexible hinge, and the cover assembly includes two hinge support mechanism, each having opposing first and second hinge brackets secured to a lower surface of the cab panel and the lift-up panel, respectively, in such a manner that the respective panels can pivot with respect to one another with the guidance of the opposing guide brackets. Methods of covering a cargo box of a pickup truck are also provided.

DESCRIPTION OF THE RELATED ART

Numerous protective cover assemblies for preventing rain, debris and wind from damaging or disrupting the contents of a pickup truck bed or cargo box are currently available. Among these protective cover assemblies are tonneau covers. Some tonneau covers are made of a fabric material, often a fabric coated with a polymeric material, which is fastened to a rigid frame so as to enclose and protect the pickup truck cargo box. Various covering materials are used for such tonneau covers; some are flexible and/or stretchable, and others are more rigid, and they are secured to the pickup truck in various manners to cover the cargo box. Tonneau covers are opened in various manners to allow entry into the cargo box, such as by rolling the cover up, folding the cover up, lifting a hard cover upward or pivoting the cover upward, or disconnecting and removing the cover from the cargo box altogether, in some cases after the cover assembly is folded up.

Typical tonneau covers have support frames including a pair of elongated side rails that are secured to the sidewalls of the cargo box of the pickup truck. Known tonneau covers are often secured to the side rails using hook and loop strip fastener components secured to the side rail, typically within a horizontal channel (see, e.g., U.S. Pat. Nos. 4,036,521; 4,991,640; 6,752,449 and U.S. Patent Application Pub. No. 2004/0212212 A1). Some tonneau covers are secured to the side rails by latches (see. e.g., U.S. Pat. No. 7,104,586). Some tonneau covers include rigid panels which are folded up for cargo access (see e.g., U.S. Pat. No. 10,189,340). While there are many, many tonneau covers, too many to review them all in this space, the present inventions provide improvements that address limitations associated with the prior art.

SUMMARY OF THE INVENTION

The present invention preferably includes a tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position. The tonneau cover apparatus preferably includes a support frame assembly for attachment to the cargo box; and a cover assembly for attachment to the support frame assembly when the support frame assembly is attached to the cargo box; the cover assembly preferably including a plurality of rigid panels. In preferred embodiments the cover assembly includes a flexible hinge; wherein the plurality of rigid panels, including first and second rigid panels which are pivotally secured to one another by a hinge, preferably the flexible hinge.

In a preferred embodiment, the cover assembly includes a plurality of rigid panels that are foldably interconnected with one another in series; wherein each of the respective rigid panels have an upper surface and a lower surface; and wherein the plurality of rigid panels include first and second rigid panels foldably secured to one another such that the cover assembly can be folded up when the cover assembly is secured to the support frame such that respective upper surfaces of at least two of the plurality of rigid panels reside in an upright folded orientation in which the upper surfaces of the at least two of the plurality of rigid panels reside in a generally parallel orientation to one another. The tonneau cover apparatus preferably further includes a mechanism for securing the respective upper surfaces of the at least two of the plurality of rigid panels in the upright folded orientation; said mechanism for securing including a bracket secured to a portion of the pickup truck, preferably a cab positioned forward of the cargo box and a securing member attached to the cover assembly, wherein the securing member can engage the bracket so as to secure the cover assembly to the cab when the at least two of the plurality of rigid panels reside in the upright folded orientation. In preferred embodiments, the securing member and the bracket are magnetically attracted to one another and the bracket will preferably contain a magnet. In further preferred embodiments, the securing member is made of steel and is magnetically attracted to the magnet contained in the bracket and the bracket is adhesively secured to the cab. The securing member is preferably an elongated rigid member that has first and second ends and the elongated rigid member is bent in such a way that first and second upper surfaces of the respective first and second ends of the elongated rigid member are oriented at an angle to one another of from about 1 degree to about 16 degrees.

A method of removably securing the tonneau cover apparatus to the pickup truck is also provided. The method preferably including the steps of providing a support frame assembly for attachment to the cargo box; a cover assembly for attachment to the support frame assembly when the support frame assembly is attached to the cargo box; the cover assembly including a plurality of rigid panels that are foldably interconnected with one another in series; wherein each of the respective rigid panels have an upper surface and a lower surface; and wherein the plurality of rigid panels include first and second rigid panels foldably secured to one another such that the cover assembly can be folded up when the cover assembly is secured to the support frame such that respective upper surfaces of at least two of the plurality of rigid panels reside in an upright folded orientation in which the upper surfaces of the at least two of the plurality of rigid panels reside in a generally parallel orientation to one another; and 3) a mechanism for securing the respective upper surfaces of at least two of the plurality of rigid panels in the upright folded orientation; said mechanism for securing including a bracket secured to a portion of the cab and a securing member attached to the cover assembly, wherein the securing member can engage the bracket when the bracket is secured to the cab so as to secure the cover assembly to the cab when the at least two of the plurality of rigid panels reside in the upright folded orientation; wherein the securing member and the bracket are magnetically attracted to one another; and securing the support frame to the pickup truck; securing the cover assembly to the support frame and the bracket to the cab; positioning the cover assembly so that the cover assembly is folded up when the cover assembly is secured to the support frame, such that respective upper surfaces of at least two of the plurality of rigid panels reside in an upright folded orientation; and engaging the securing member to the bracket so as to secure the cover assembly to the cab when the at least two of the plurality of rigid panels reside in the upright folded orientation.

In a further embodiment of the present invention, a tonneau cover apparatus is provided for removable attachment about a top of a perimeter of a cargo box of a pickup truck, the perimeter of a cargo box including a forward end, two opposing sidewalls and a tailgate; the tailgate being positioned rearward of the forward end and having an open position and a closed position. The tonneau cover apparatus preferably includes a support frame assembly for attachment to the cargo box; and a cover assembly for attachment to the support frame assembly when the support frame assembly is attached to the cargo box. The cover assembly preferably having a plurality of rigid panels including first and second rigid panels that are pivotally interconnected with one another by a hinge; wherein each of the respective rigid panels have an upper surface and a lower surface; and wherein the first rigid panel can be secured to the support frame assembly when the support frame assembly is secured to the pickup truck; wherein the cover assembly further includes a pair of hinge support mechanisms that generally restrict the way in which the second rigid panel pivots with respect to the first rigid panel; wherein each of the hinge support mechanisms include opposing first and second hinge support brackets secured to the lower surfaces of the first and second rigid panels, respectively, proximate the hinge so that the opposing first and second hinge support brackets of each of the respective hinge support mechanisms are slideably engaged with one another when the first and second rigid panels pivot with respect to one another. In preferred embodiments, each of the respective opposing hinge support brackets include a guide pin and an arcuate guide slot; and wherein, when the support frame assembly is attached to the cargo box, the cover assembly is attached to the support frame assembly, and the second rigid panel pivots with respect to the first rigid panel, the respective guide pins of each of the opposing hinge support brackets slide within the respective arcuate slots of the opposing hinge support brackets.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described preferred embodiments of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include parts corresponding to the parts in the previously described embodiment;

FIG. 32I is an enlarged perspective bottom view of the portion of the folding tonneau cover apparatus encircled by the dashed line 32I of FIG. 32H, illustrating the spacer panel and adjacent hinges and showing a brace retained in a brace retainer;

FIG. 32J is an enlarged perspective bottom view of the portion of the folding tonneau cover apparatus encircled by the dashed line 32J of FIG. 32H, illustrating the cab panel and showing a rail clamp bracket and a hex clamp bolt;

FIG. 32K is an enlarged perspective bottom view similar to that of FIG. 32J but illustrating an alternative lever clamp bolt;

FIG. 33A is a rear perspective view a portion of the folding tonneau cover apparatus of FIG. 32;

FIG. 33B is a partial section view as seen from the line 33B-33B of FIG. 33A illustrating the engaging portion of one of the latches on the rear support bow or support member of the rear panel engaged with the lip of the side rail and the side rail clamped to the sidewall of the pickup truck with a portion of the truck sidewall and sidewall cap shown in phantom;

FIG. 34A is a rear perspective view of the folding tonneau cover apparatus of FIG. 32, with the release cord pulled to pull the latch against the bias of the spring to release the latch from the engagement with the side rail, with the two portions of the release cord pulled for illustration;

FIG. 34B is a partial section view as seen from the line 34B-34B of FIG. 34A similar to the view of FIG. 33B, but showing the arrangement with the engaging portion of the latch retracted from the closed position where the latch would be engaged with the lip of the side rail;

FIG. 35A is schematic illustration of a vertical cross section along a front-to-back plane as seen from the line 35A-35A of FIG. 32A of one of the hinges of the folding tonneau cover assembly of FIG. 32 showing the basic configuration with the hinge unfolded;

FIG. 35B is a schematic illustration similar to FIG. 35A of a transverse vertical cross section along a front-to-back plane showing an alternate embodiment of one of the hinges of the folding tonneau cover assembly of FIG. 32 showing the hinge unfolded;

FIG. 35C is a schematic illustration showing the hinge of FIG. 35B, but with the hinge folded at about 45 degrees from the unfolded orientation shown in FIG. 35B;

FIG. 35D is a schematic illustration showing the general steps and configurations of the folding tonneau cover assembly of FIG. 32 as it is folded up into a fully folded orientation;

FIG. 36A is a rear perspective view of a portion of the folding tonneau cover apparatus of FIG. 32 wherein the latches on the rear panel have been released as in FIG. 34B and the rear panel has been lifted up in a first step toward folding up the folding cover assembly;

Figure 32:
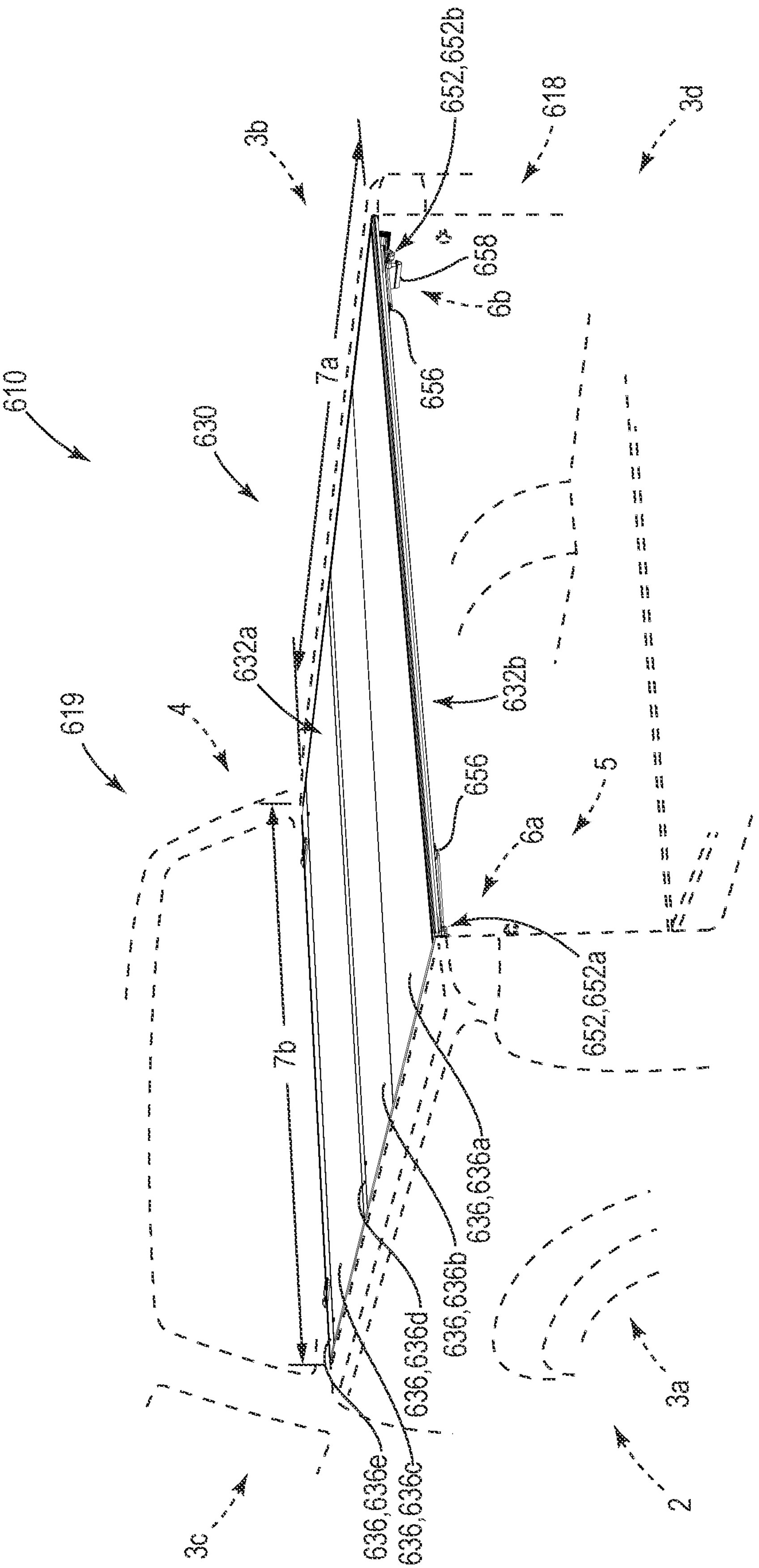
FIG. 32 is a rear perspective view of an alternate embodiment of folding tonneau cover apparatus according to the present invention, including a support frame assembly, a folded cover forward securing assembly, and a folding cover assembly incorporating a cab panel onto which rear, middle, spacer, and front panels can fold, with the folding tonneau cover apparatus attached to a pickup truck which is shown in phantom.
Figure 36A:
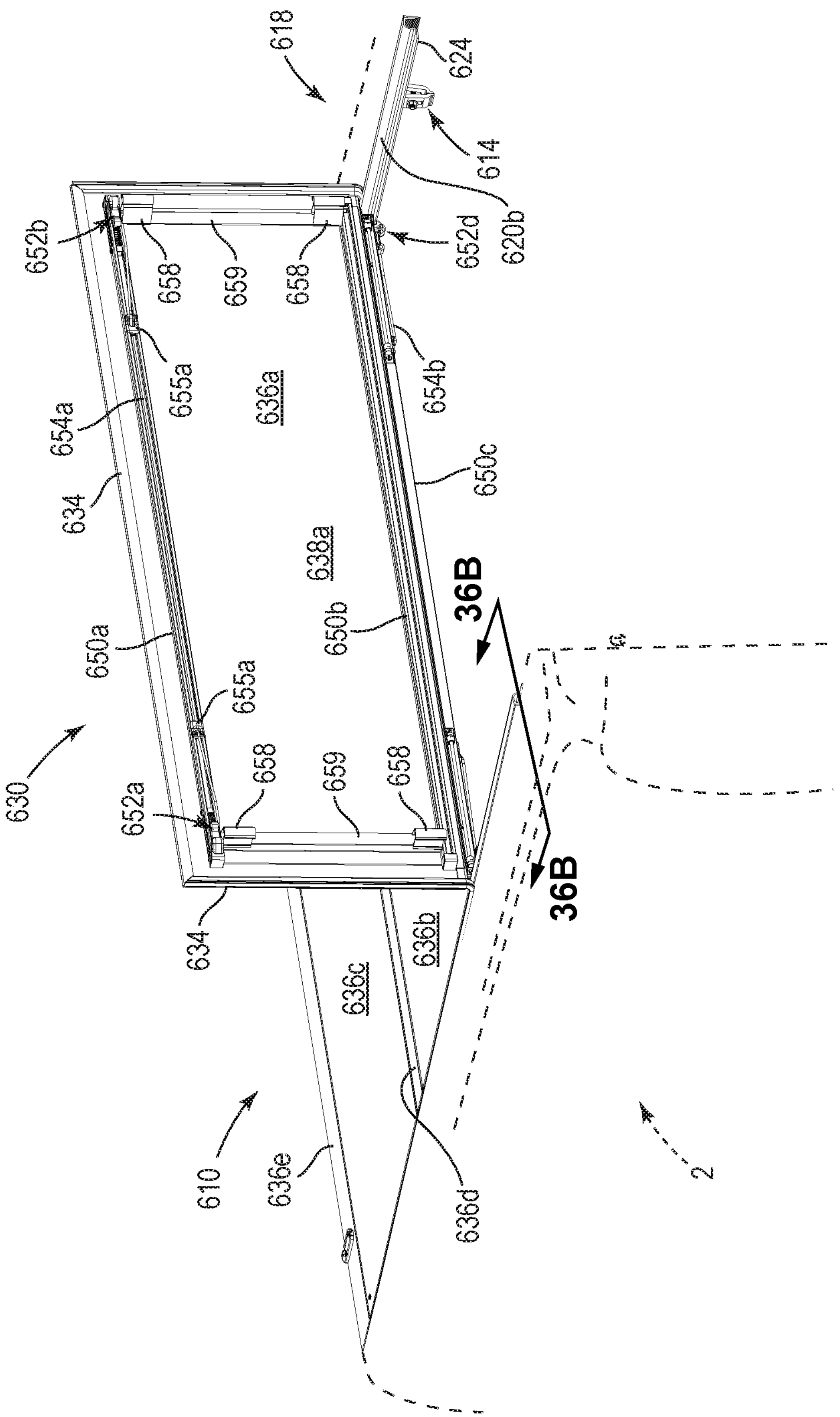
Figure 36B:
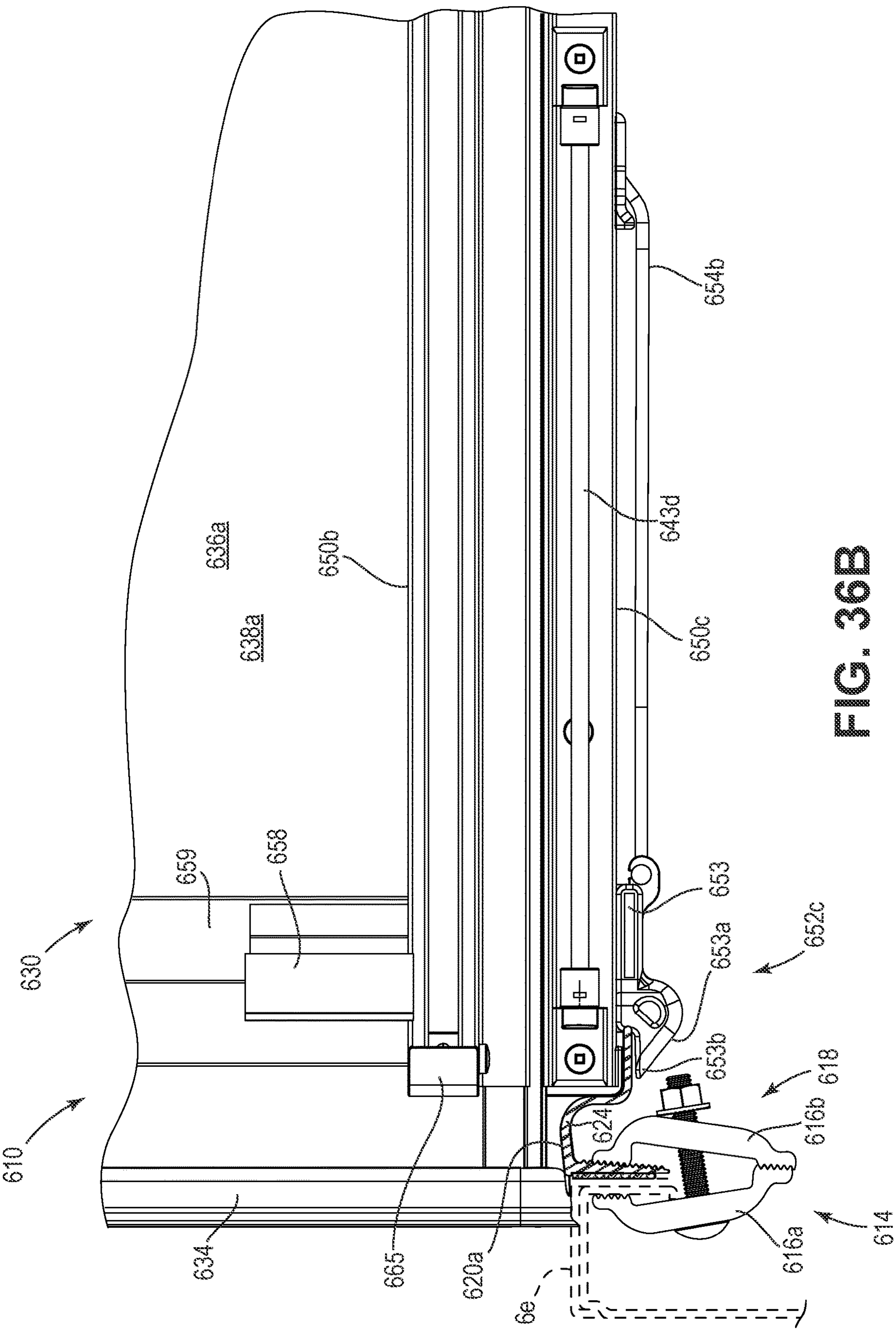
Figure 37A:
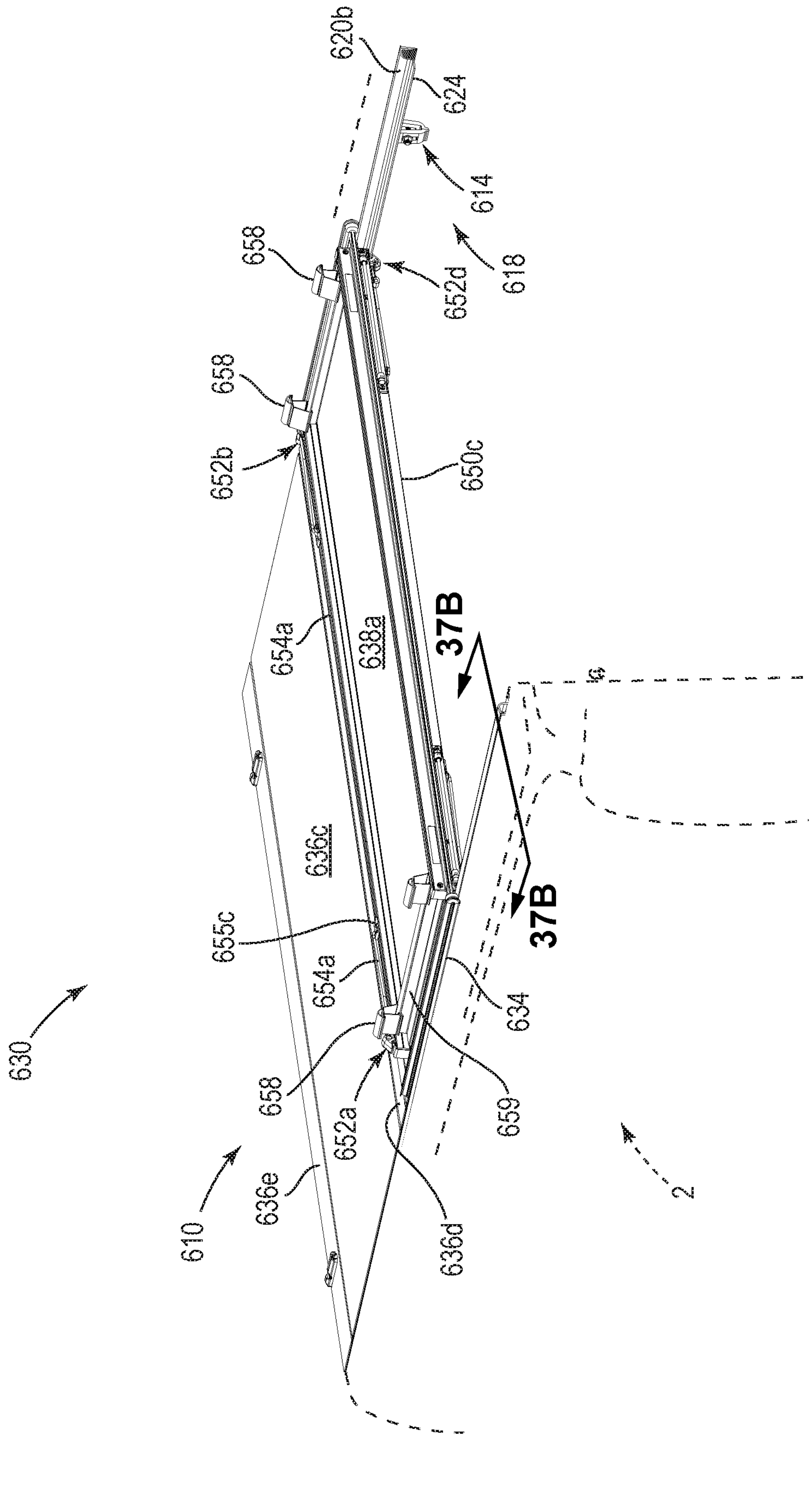
Figure 37B:
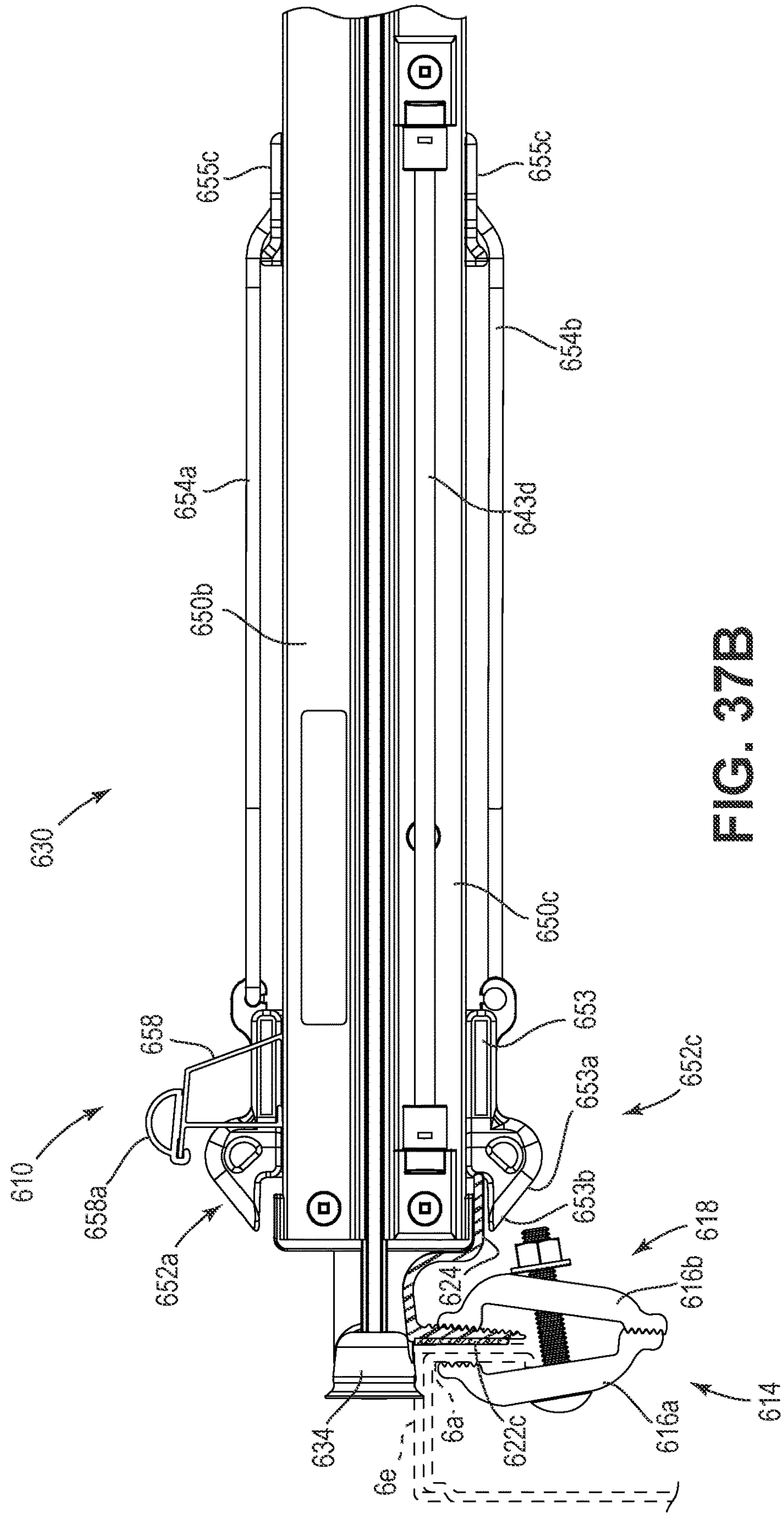
Figure 37C:
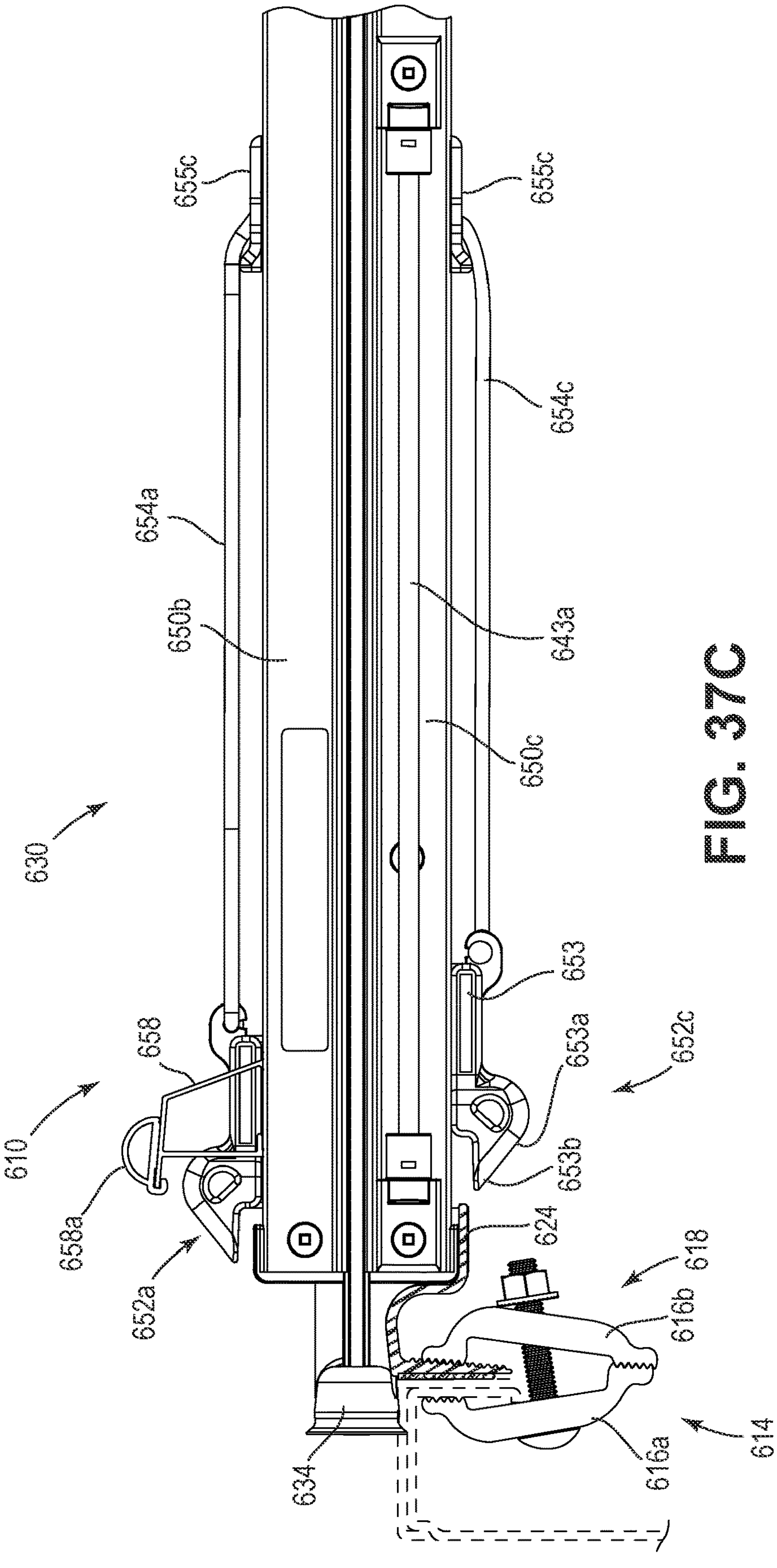
Figure 38A:
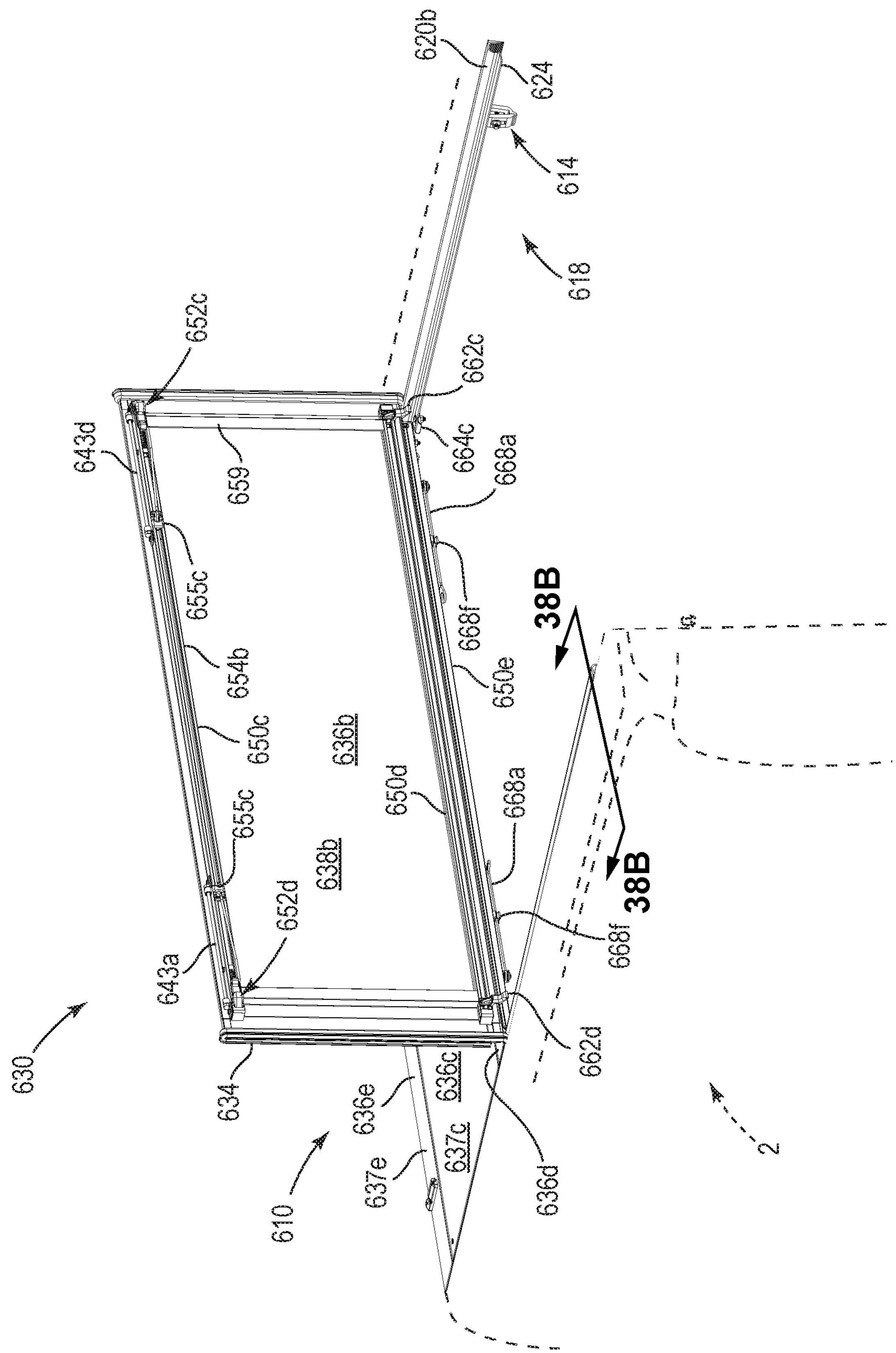
Figure 38B:
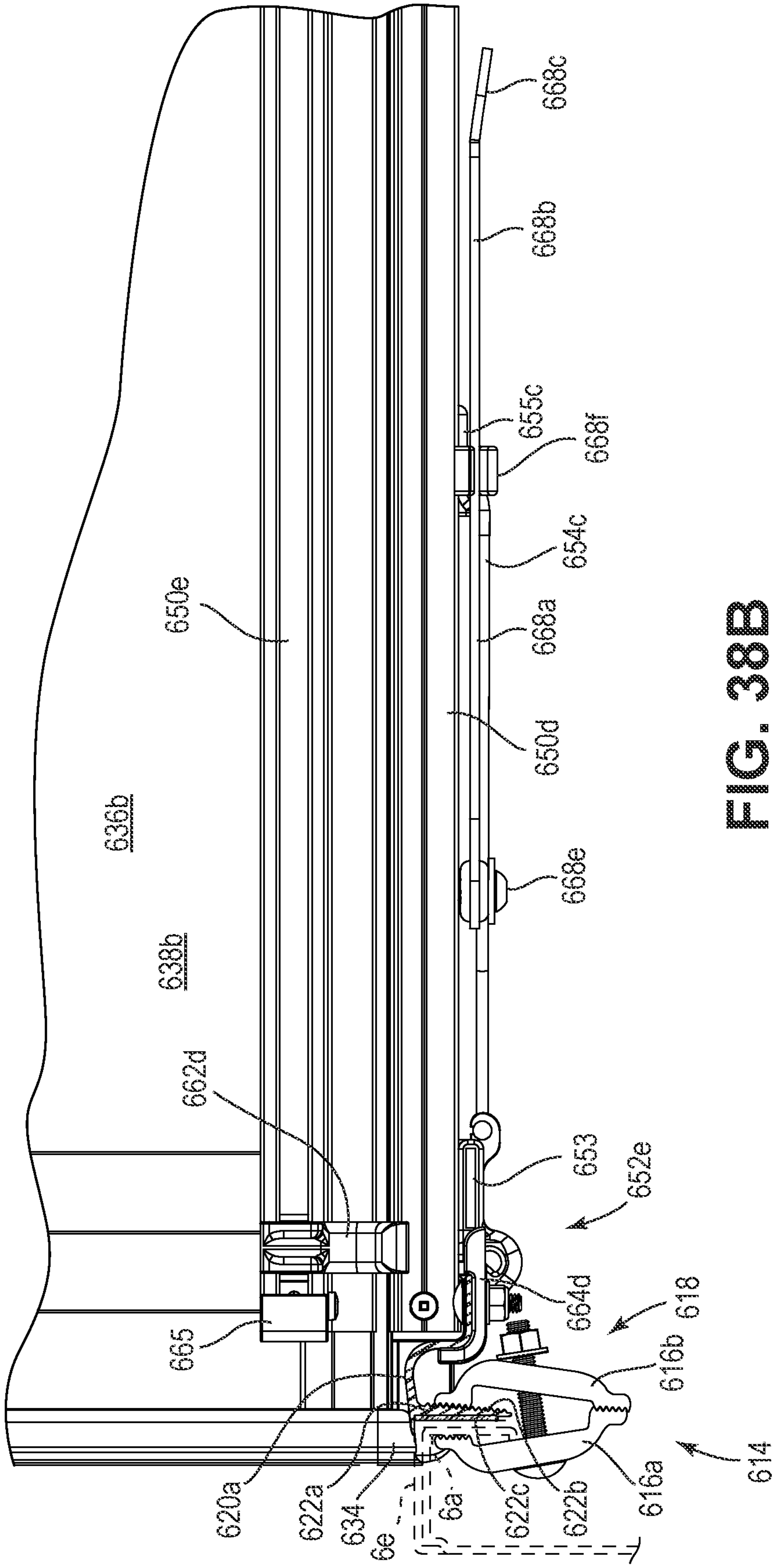

FIG. 36B is a partial section view as seen from line 36B-36B of FIG. 36A showing the latch near the driver's side end portion of the rear support bow of the middle panel engaged with the lip of the side rail;

FIG. 37A is a rear perspective view of a portion of the folding tonneau cover apparatus of FIG. 32 wherein the rear panel has been rotated forward onto the middle panel in a further step toward folding up the cover assembly;

FIG. 37B is a partial section view as seen from the line 37B-37B of FIG. 37A showing the latch near the driver's side end portion of the rear support bow of the middle panel engaged with the lip of the side rail;

FIG. 37C is a partial section view similar to the view of FIG. 37B, but showing the arrangement with the engaging portion of the latch retracted and disengaged from the lip of the side rail, allowing the middle panel to be lifted up;

FIG. 38A is a rear perspective view of a portion of the folding tonneau cover apparatus of FIG. 32, wherein the rear panel is folded over onto the middle panel and wherein both panels have been lifted up and pivoted forward generally about 90 degrees with respect to the front panel that is resting on the side rails and is generally in a horizontal plane with respect to the pickup truck shown in part in phantom;

FIG. 38B is a partial section view as seen from the line 38B-38B of FIG. 38A showing the swing latch 562*c* near the driver's-side end portion of the support bow of the spacer panel disengaged from the corresponding catch 564*c;*

Figure 39A:
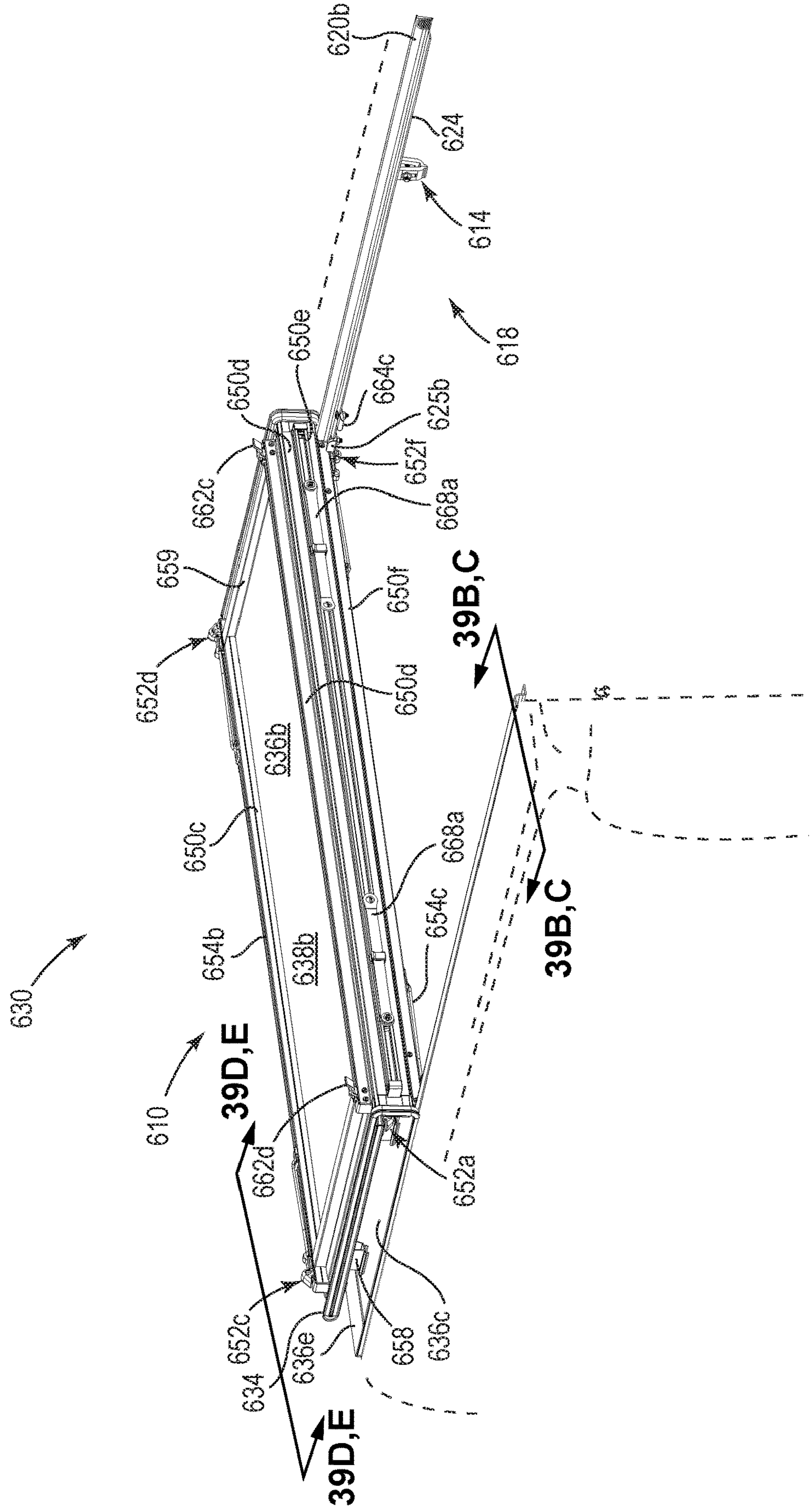
Figure 39B:
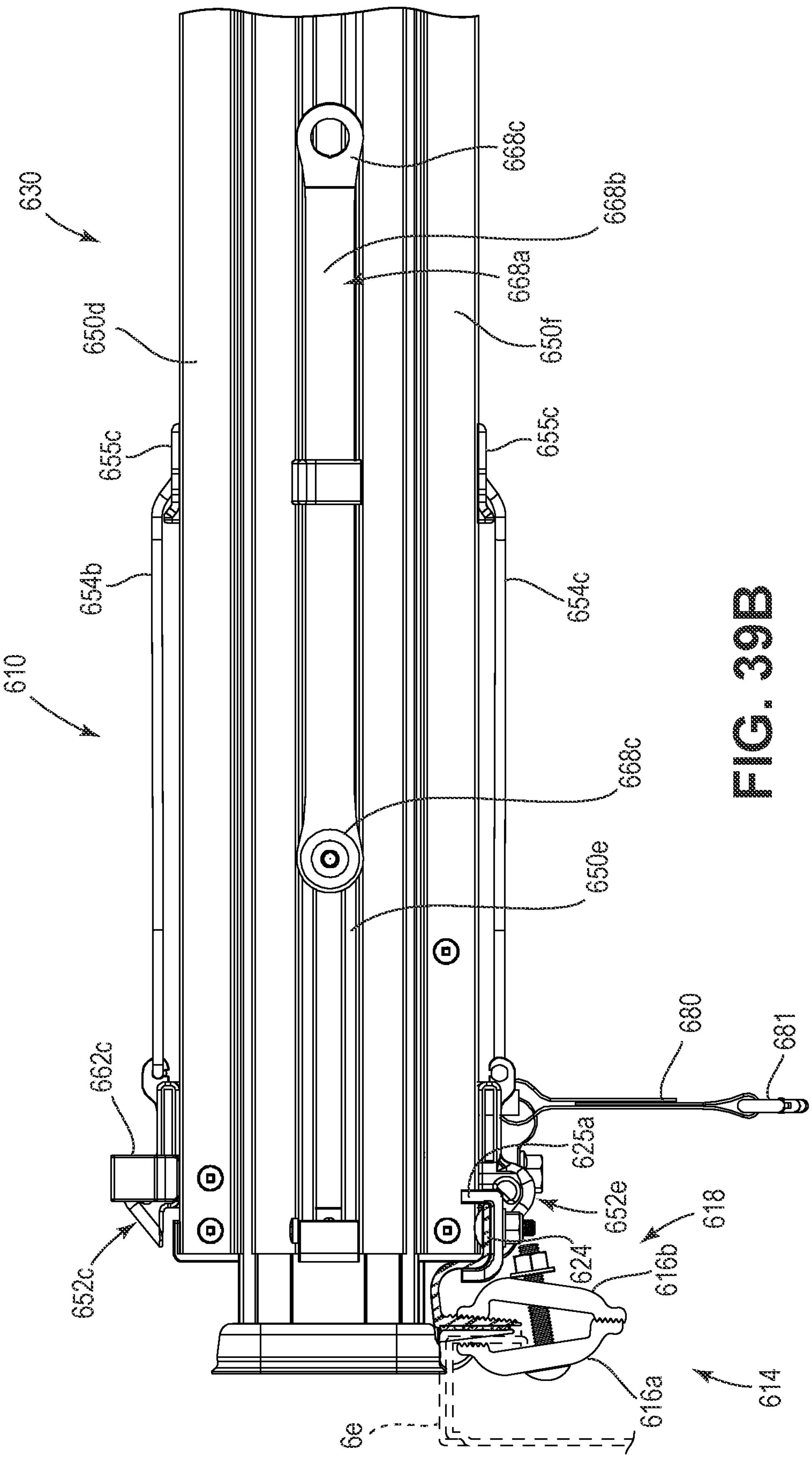
Figure 39C:
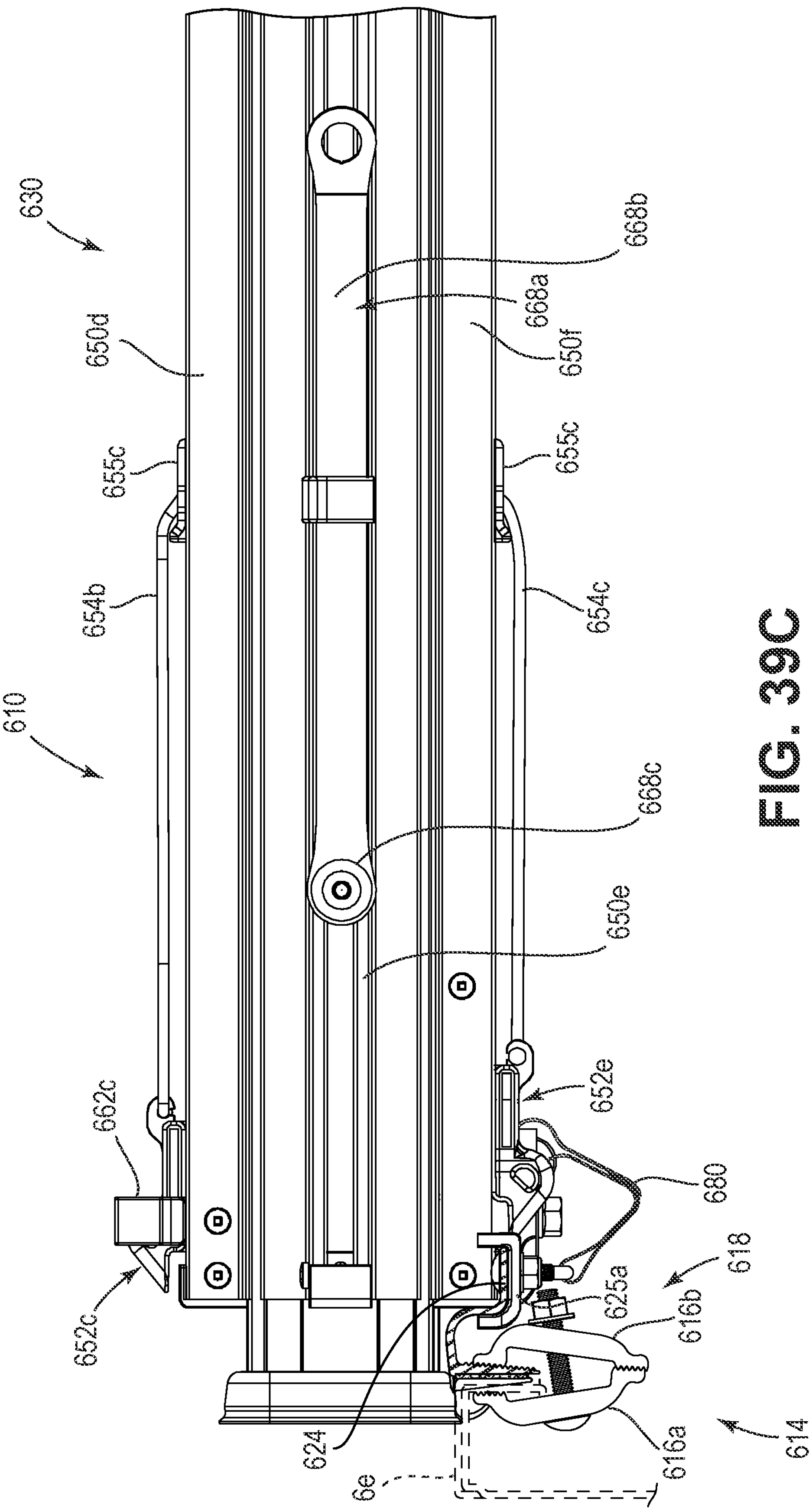
Figure 39D:
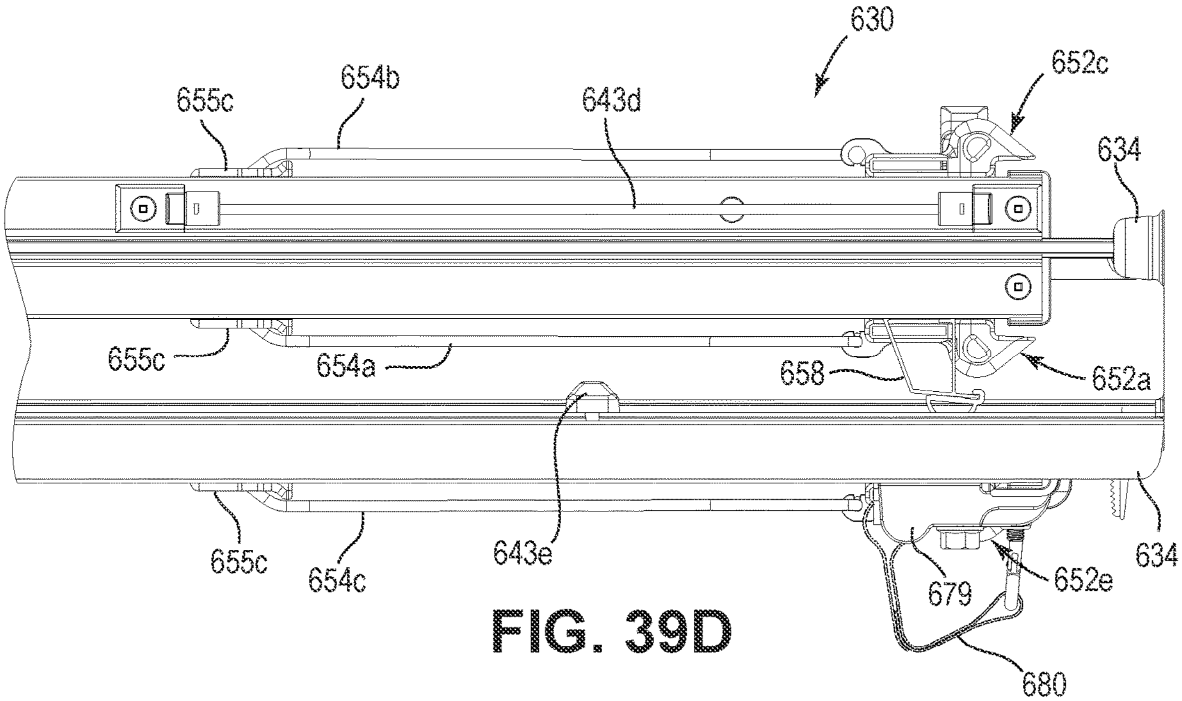
Figure 39E:
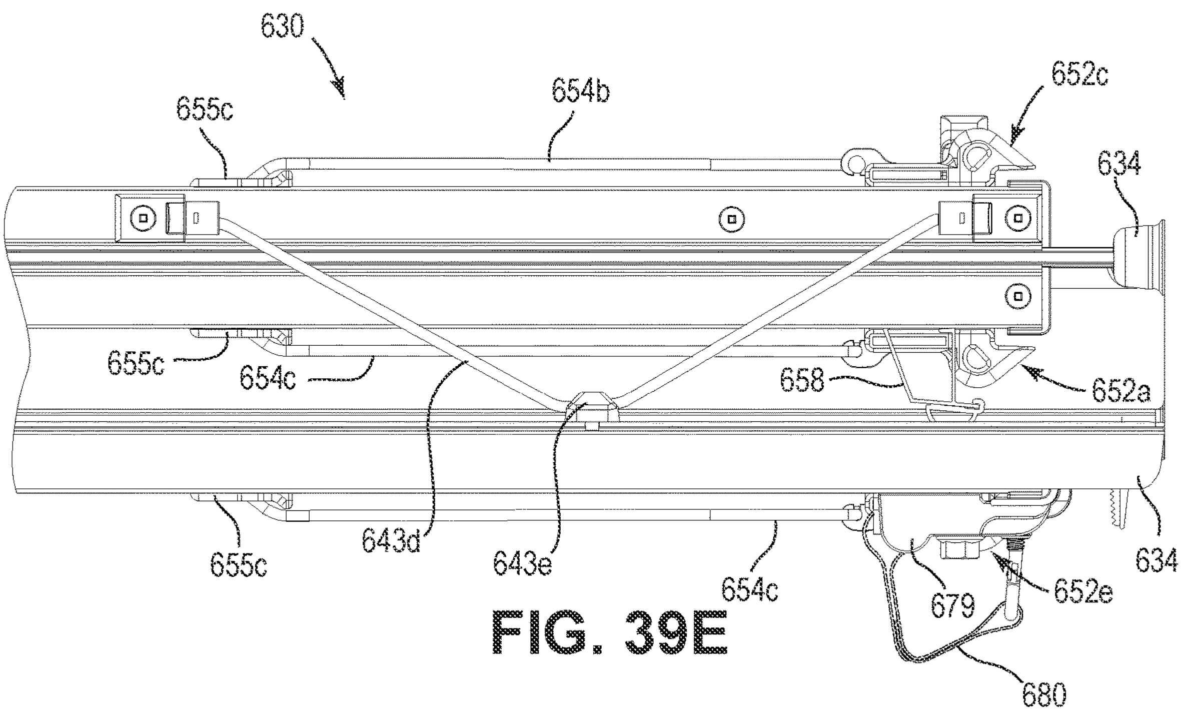
Figure 40:
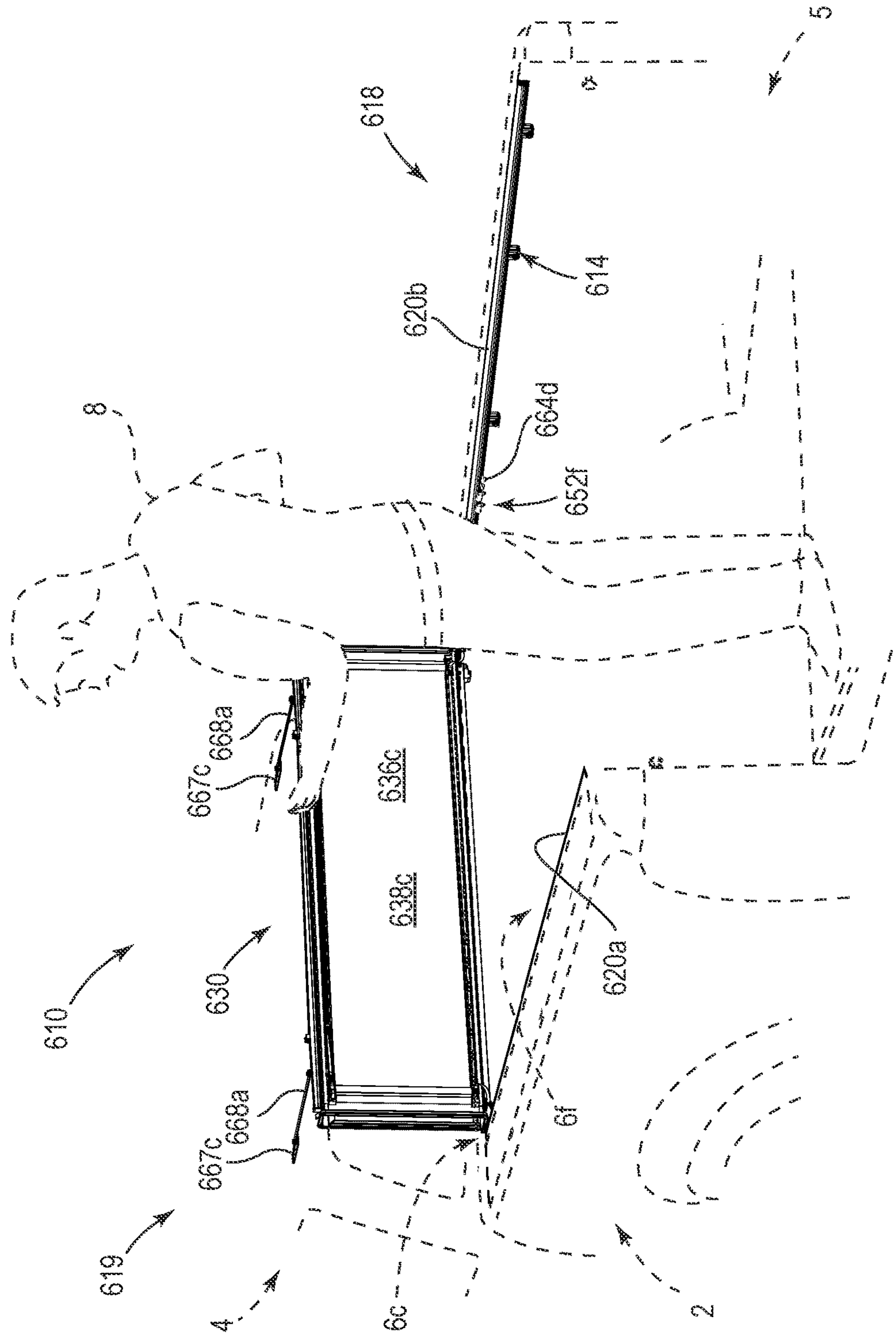
Figure 40A:
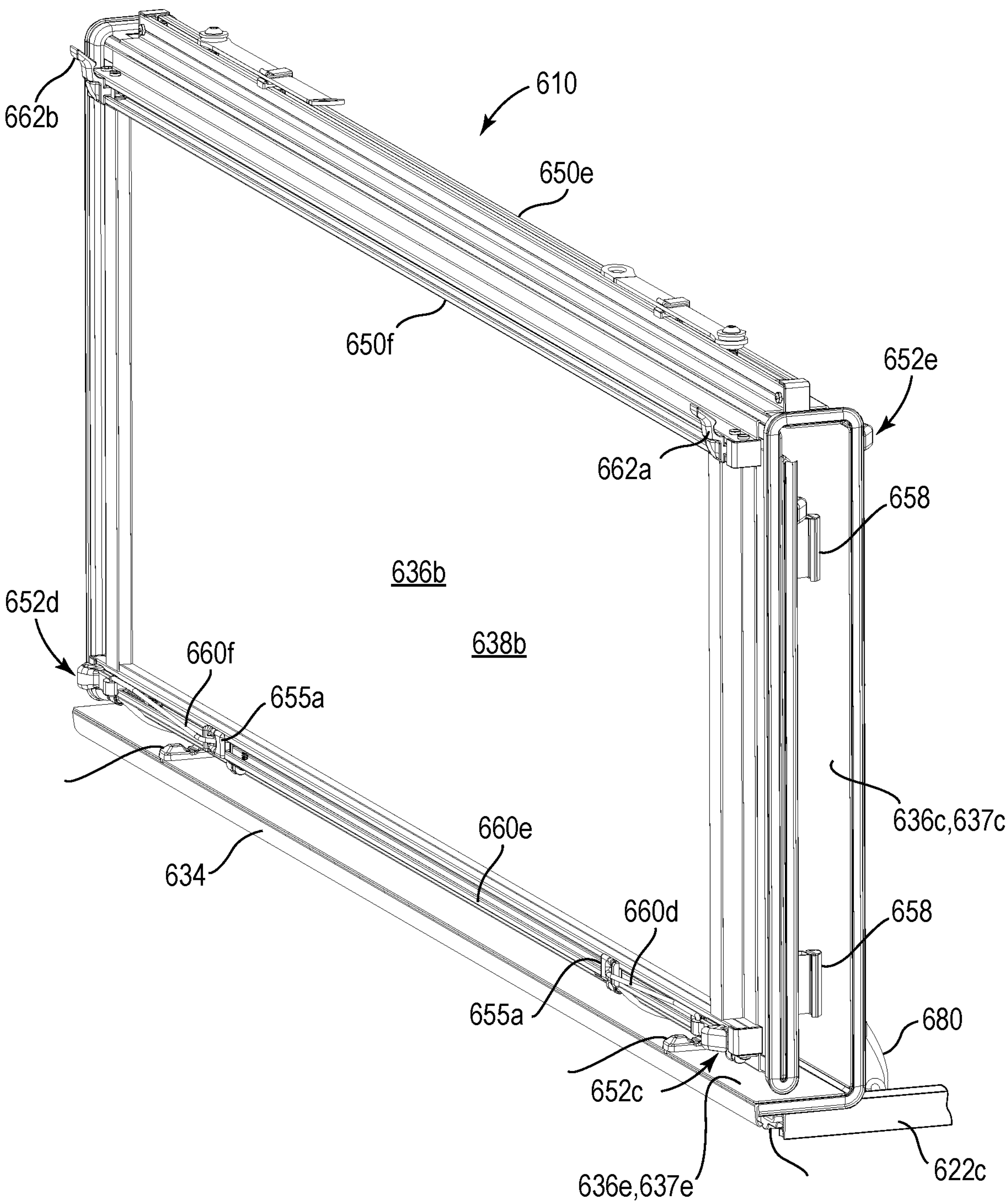
Figure 40B:
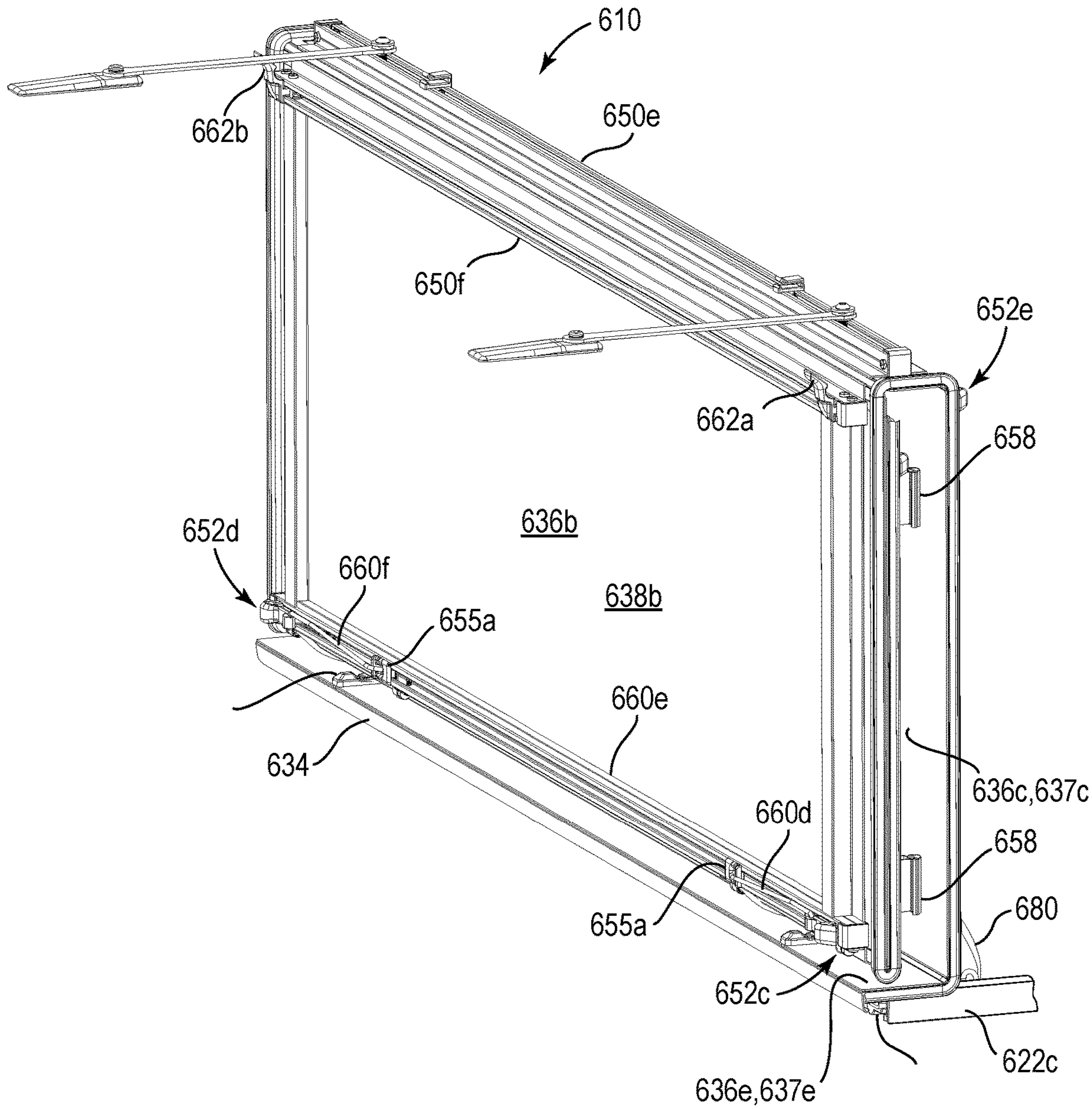
Figure 40C:
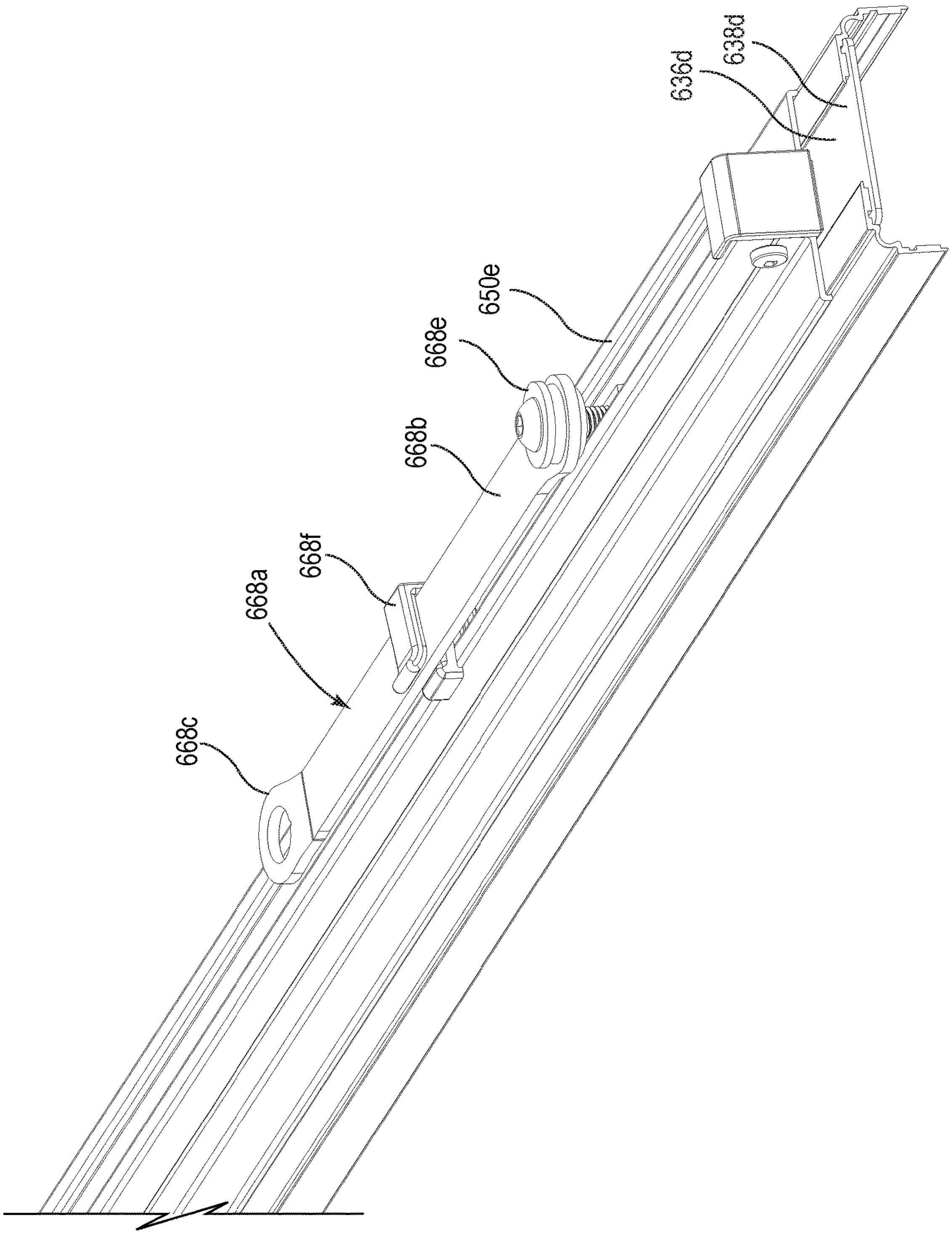
Figure 40D:
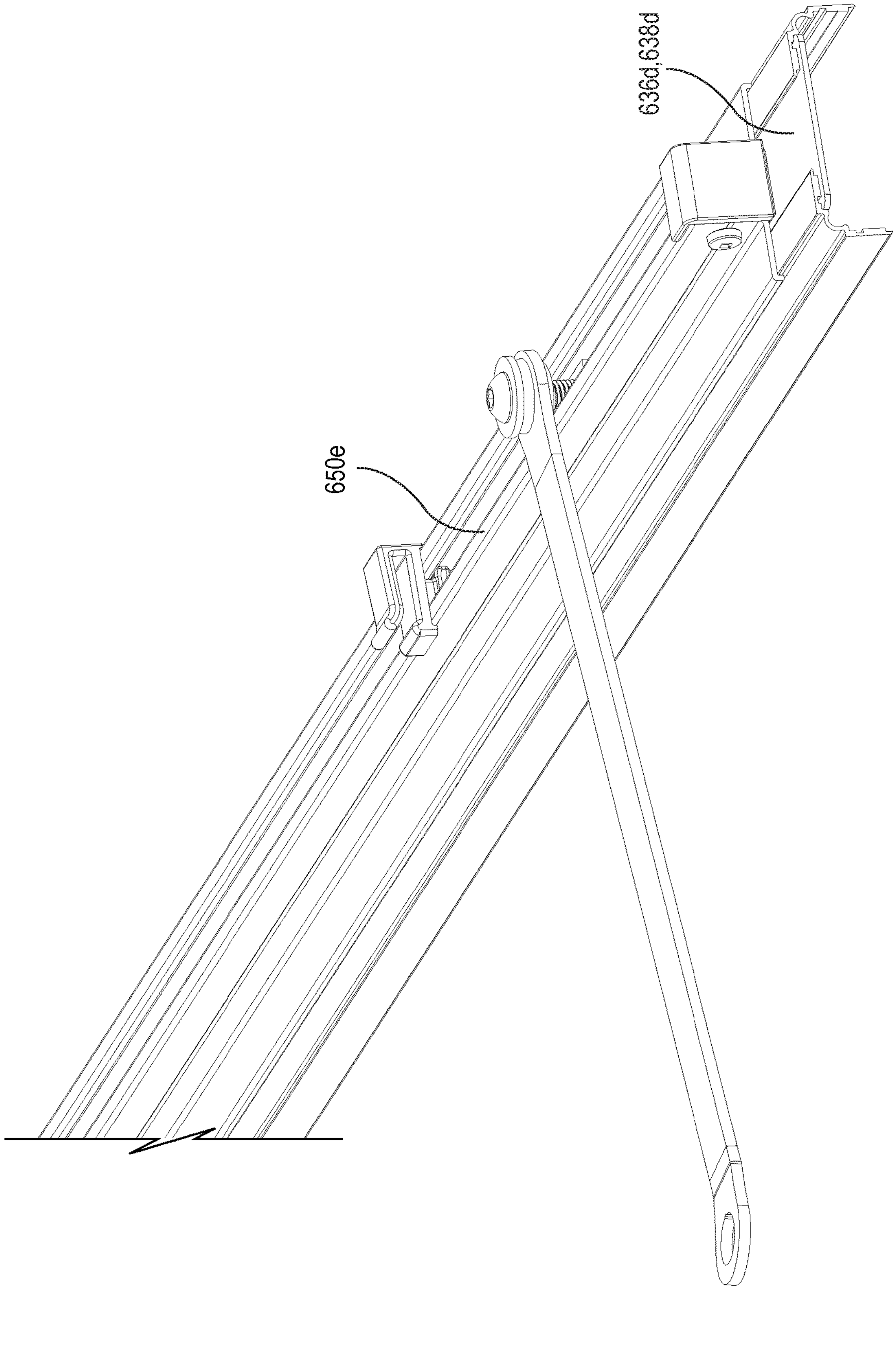
Figure 40E:
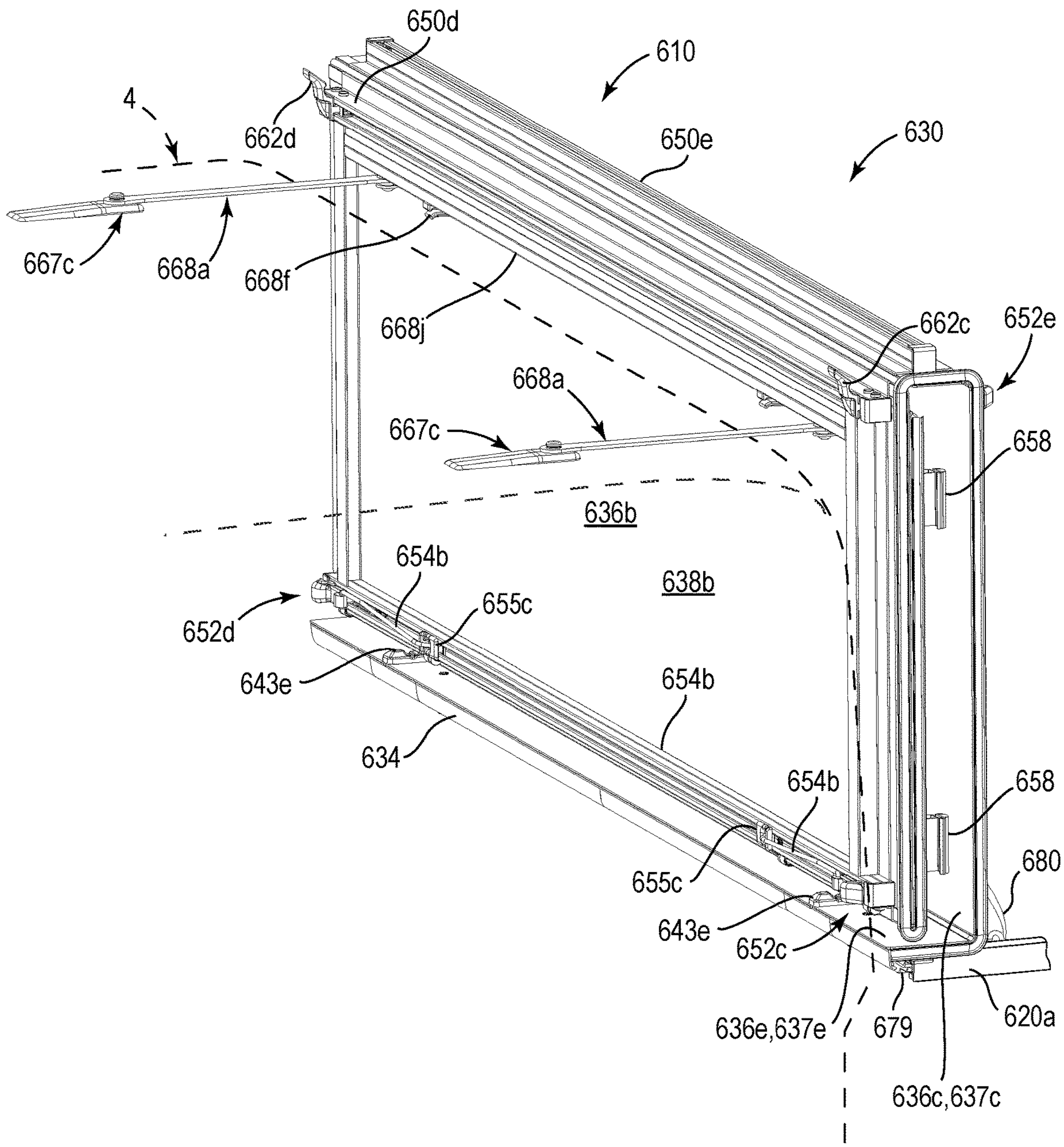
Figure 40F:
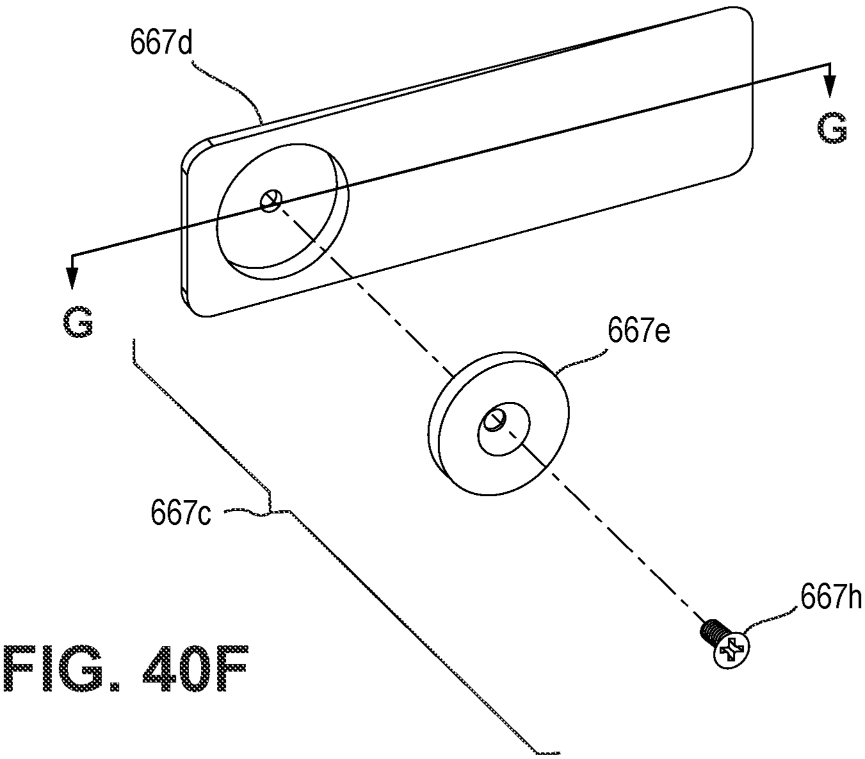
Figure 40G:
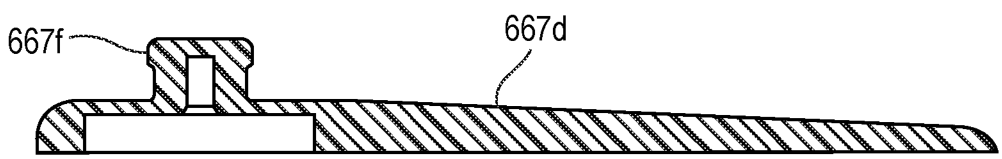
Figure 40H:
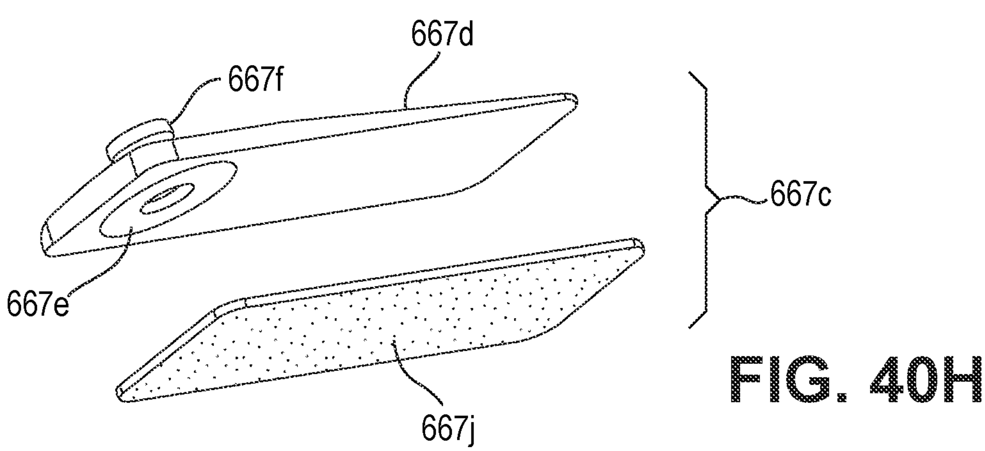
Figure 41:
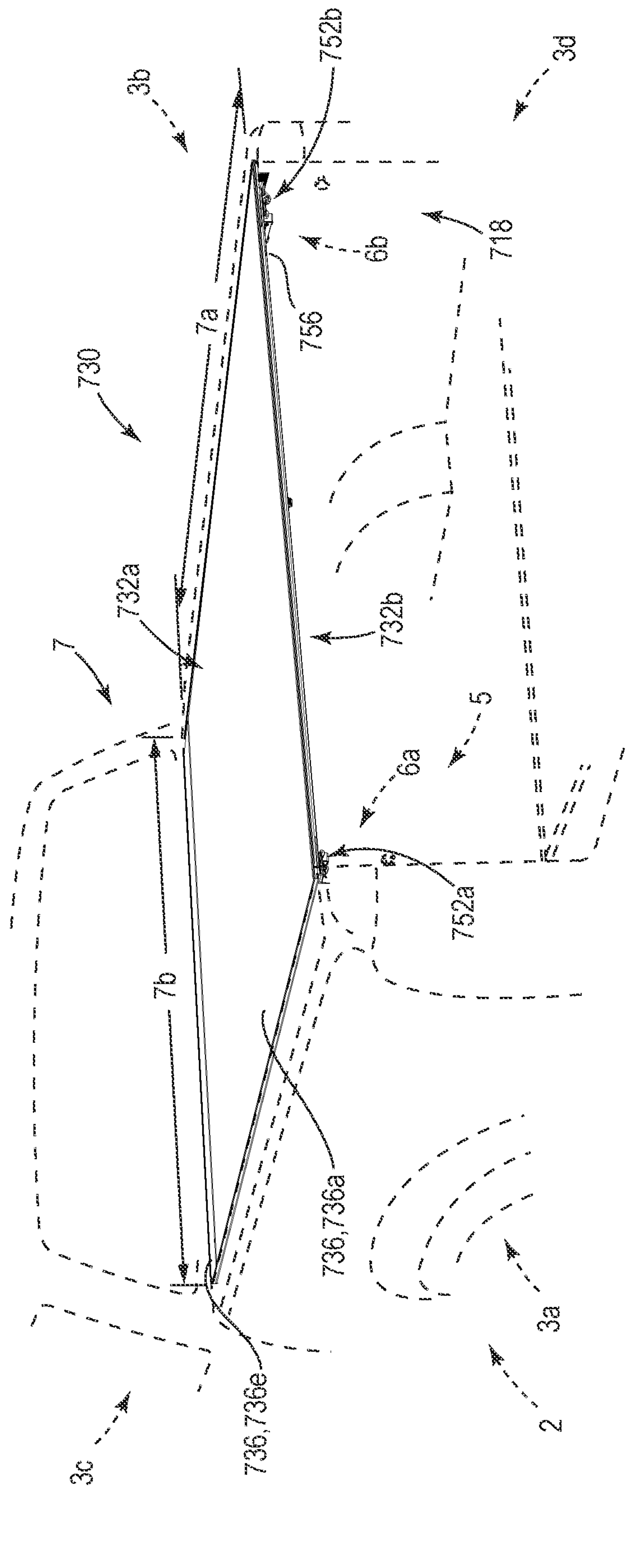
Figure 42A:
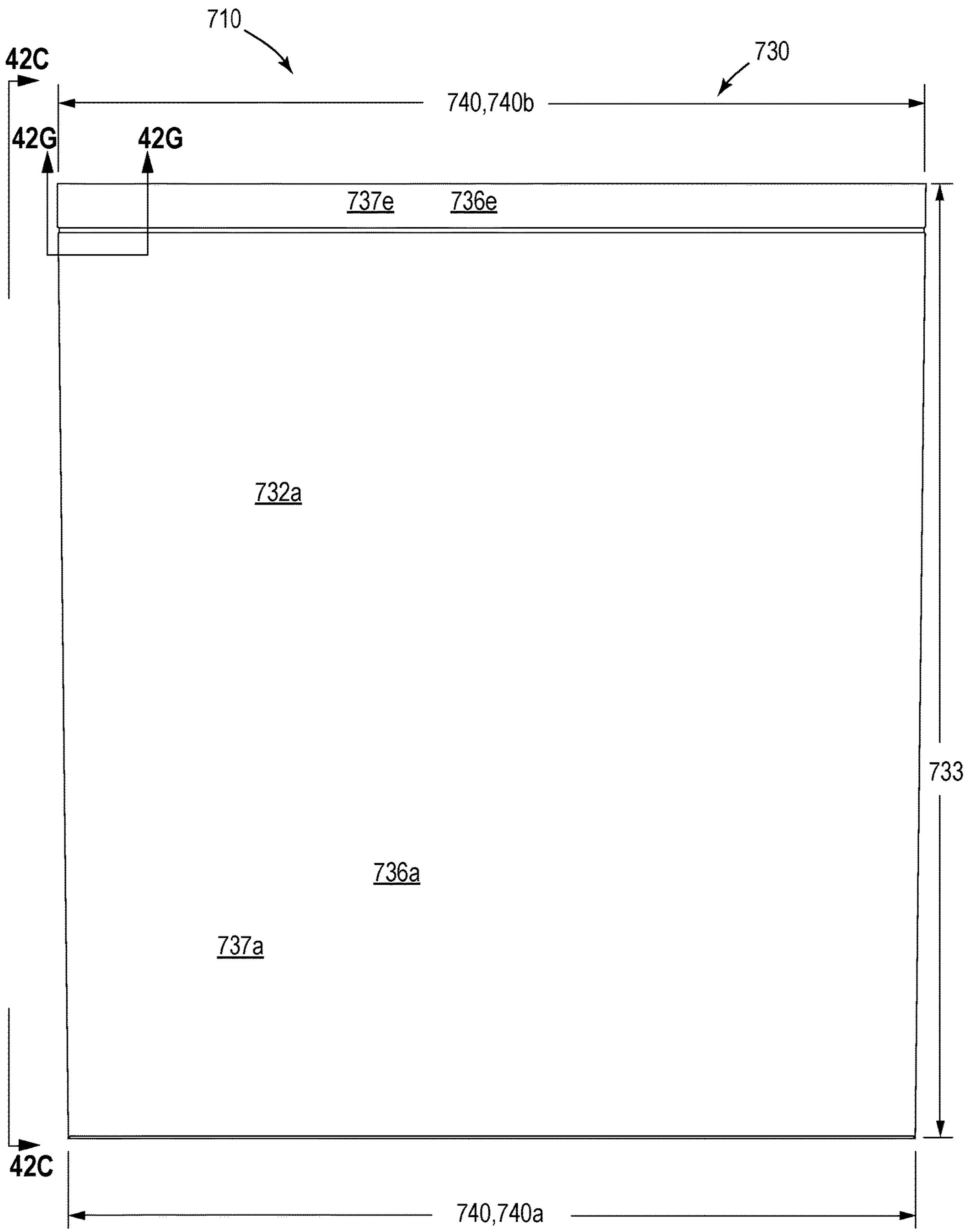
Figure 42B:
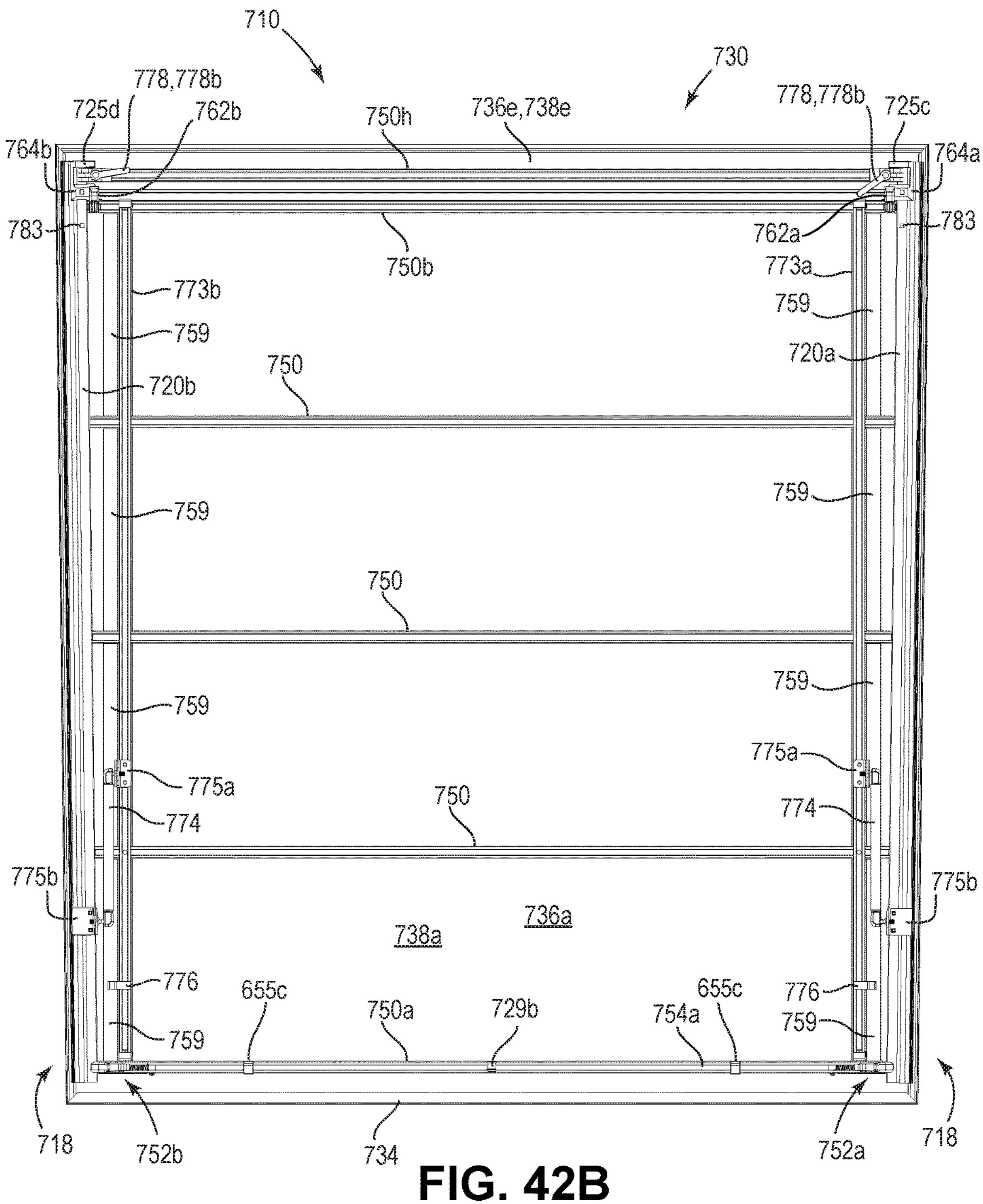
Figure 42C:
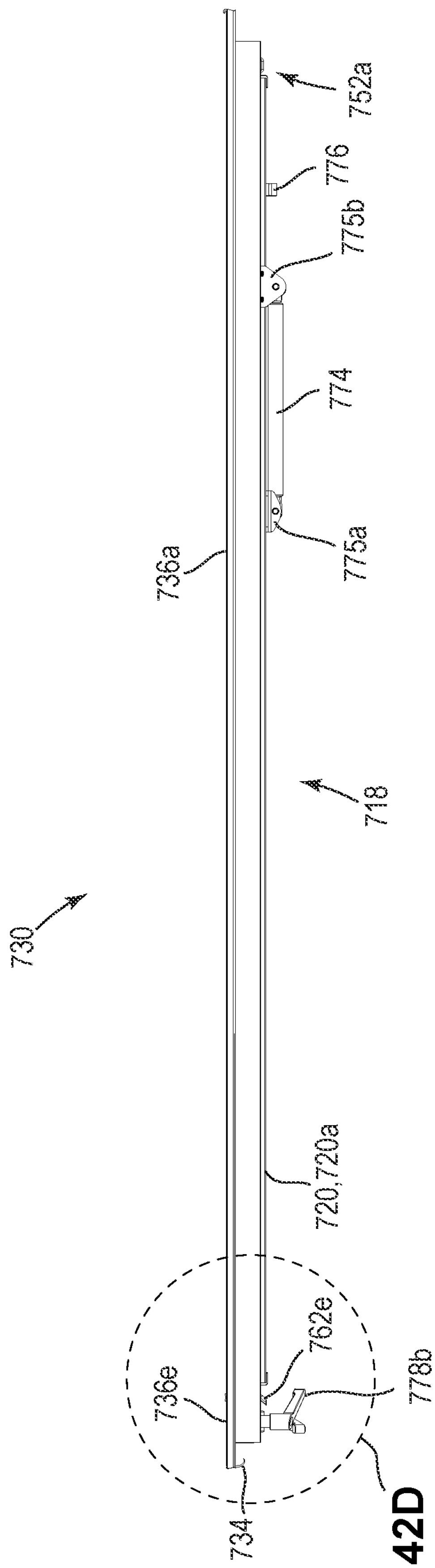
Figure 42D:
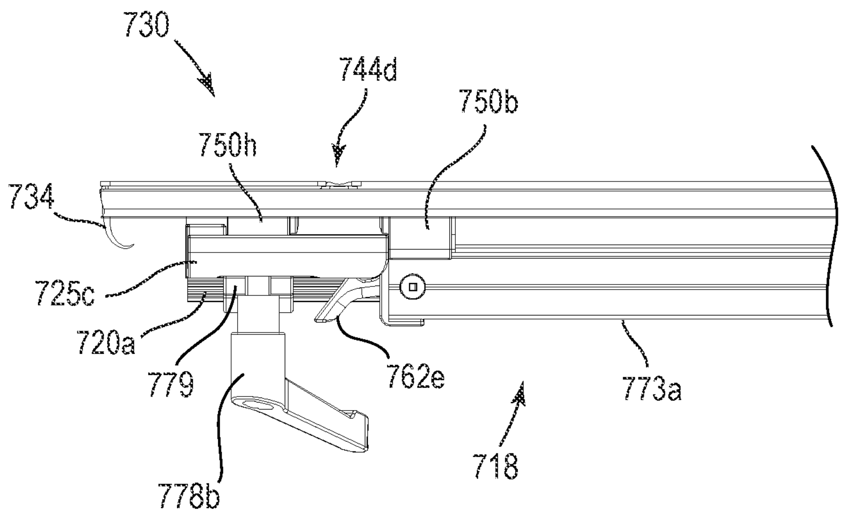
Figure 42E:
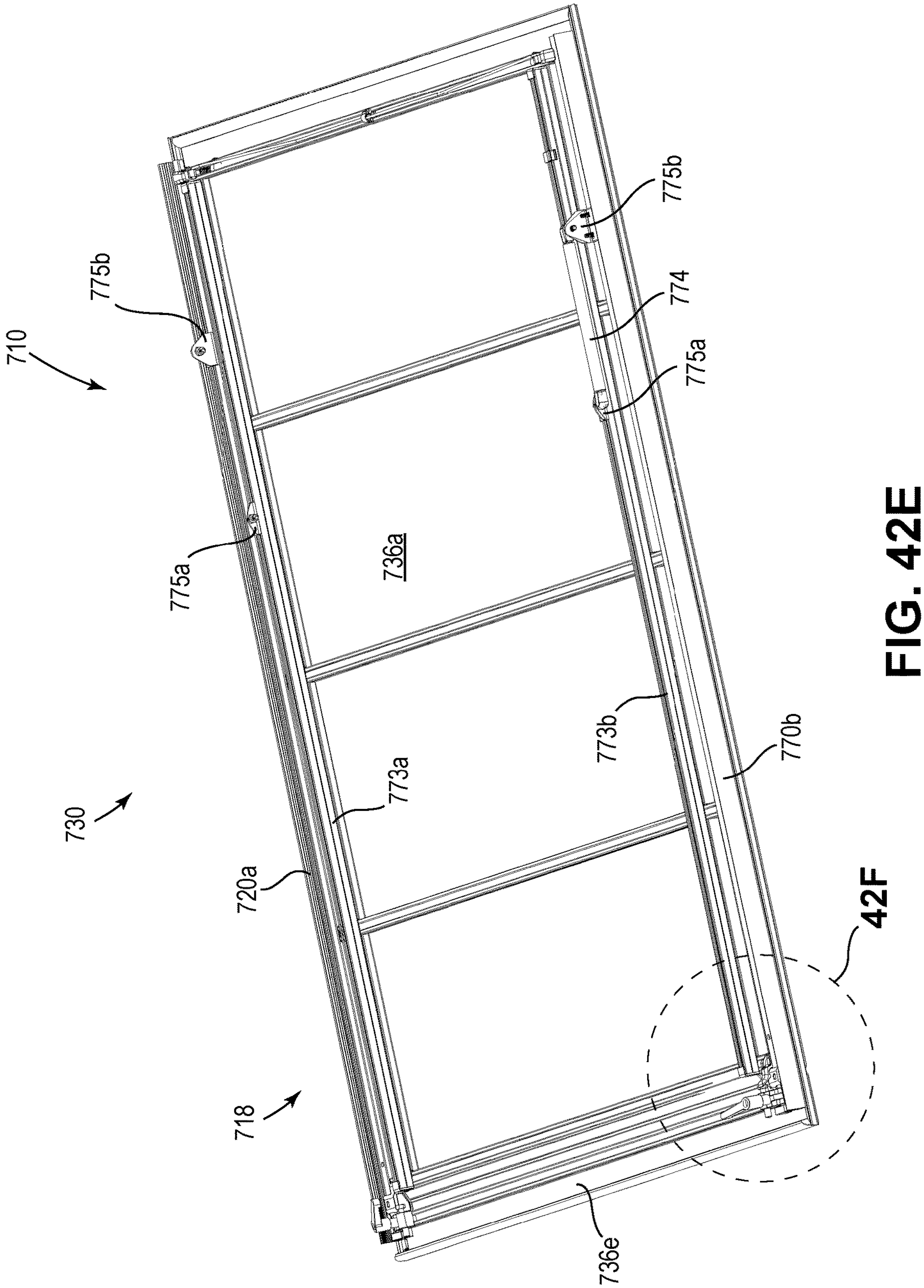
Figure 42F:
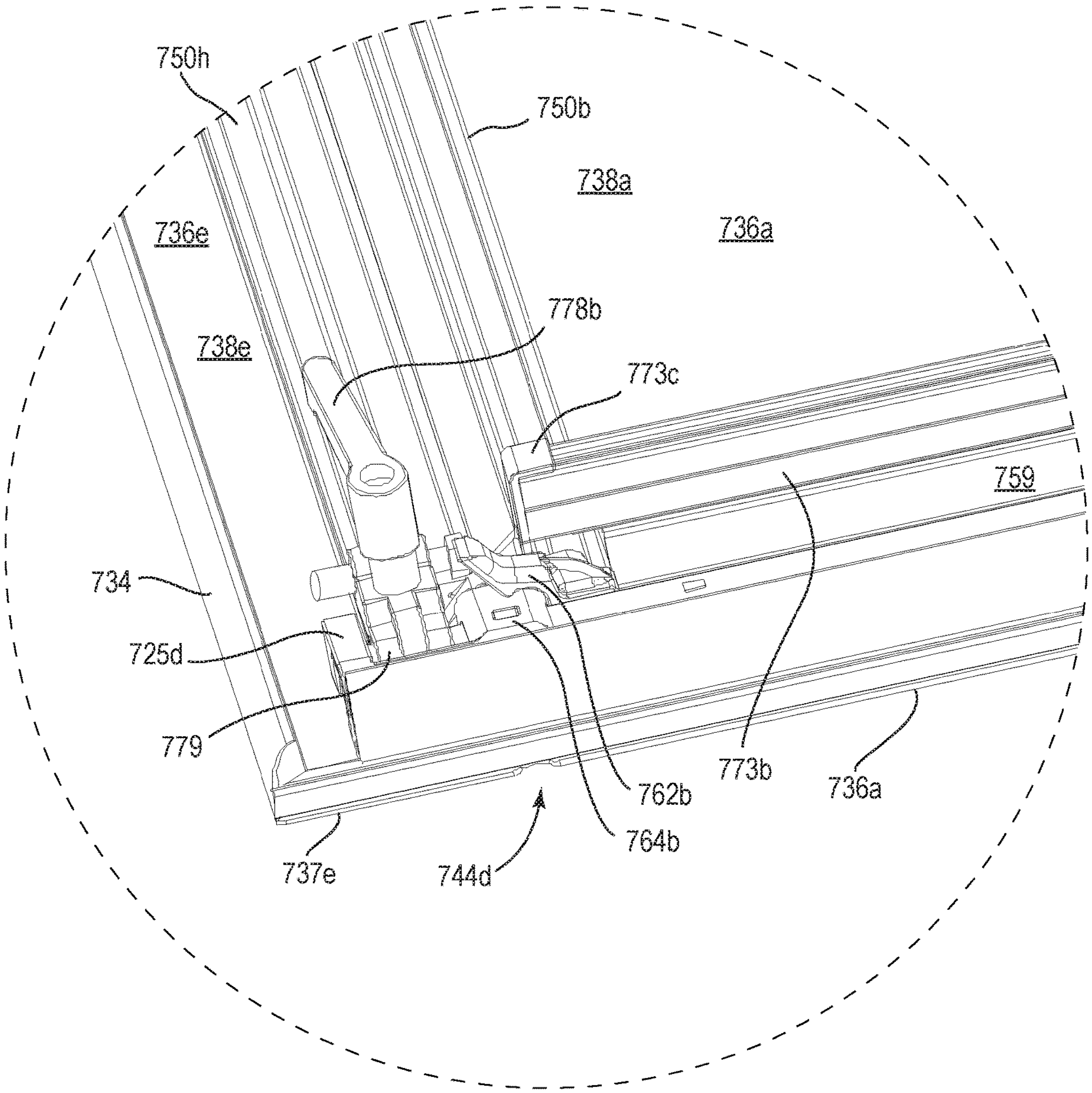
Figure 42G:
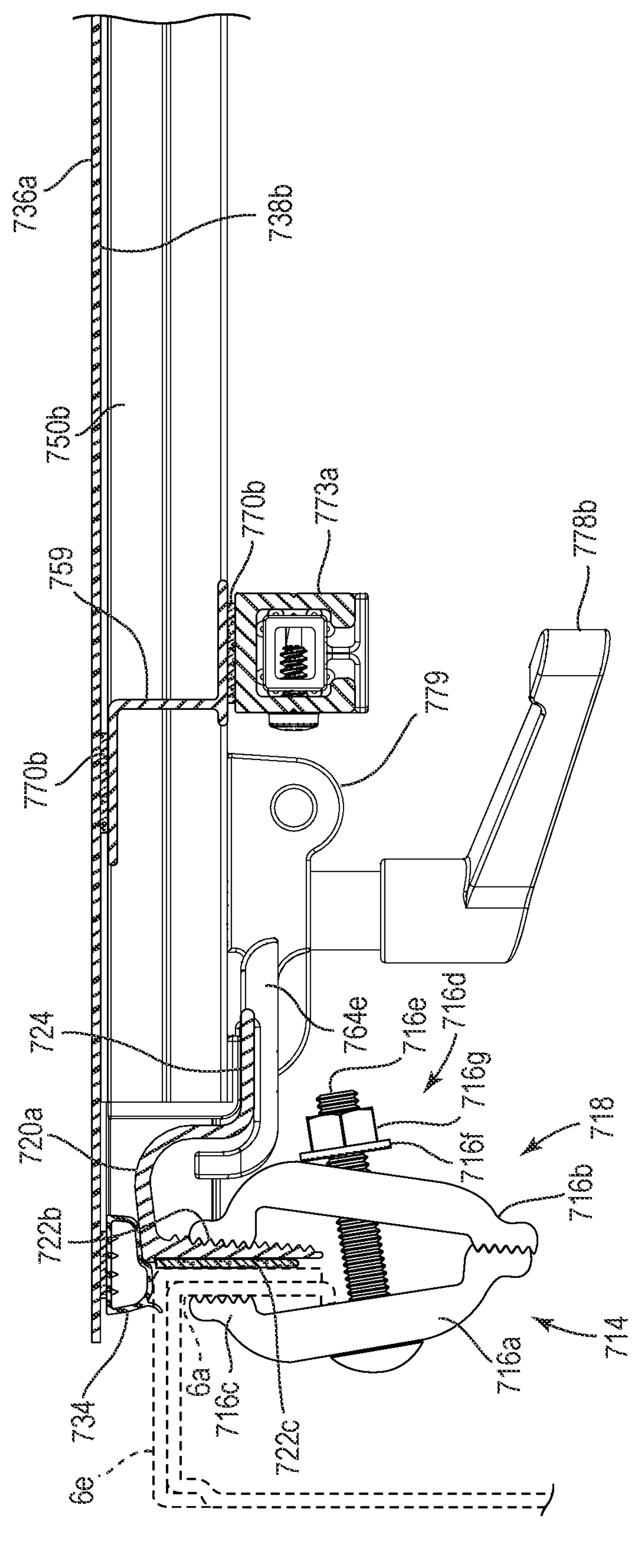
Figure 42H:
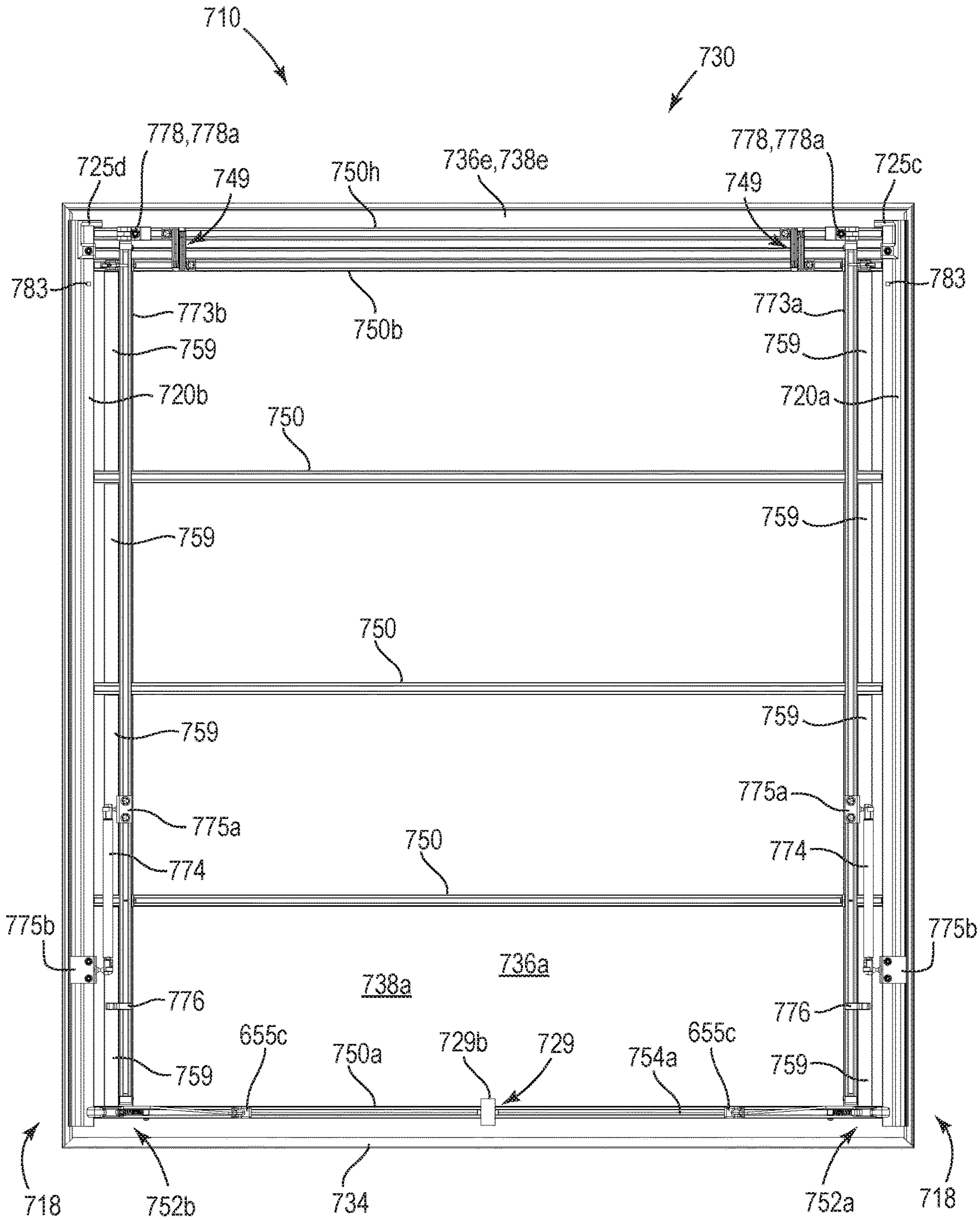
Figure 42I:
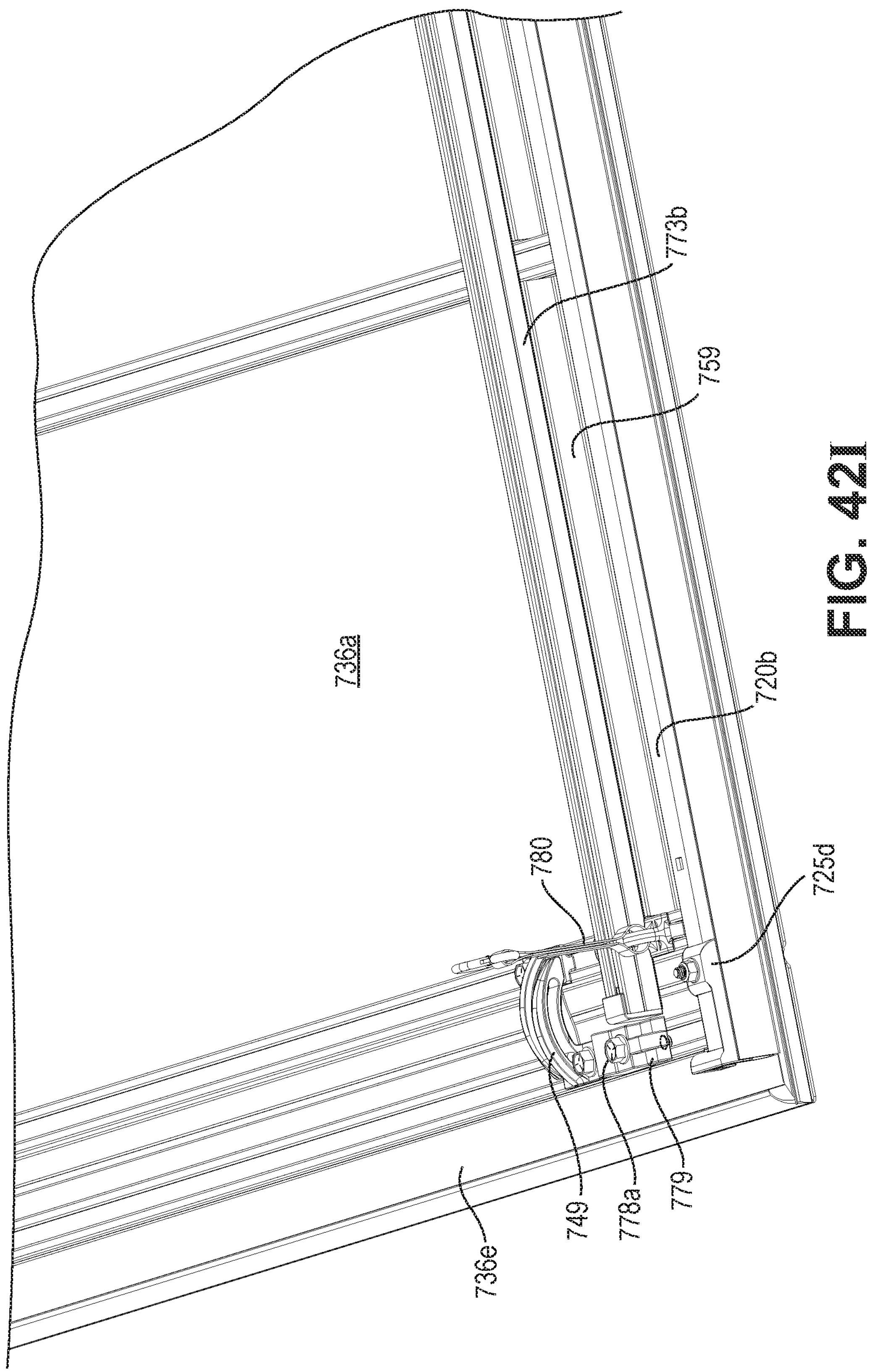
Figure 43A:
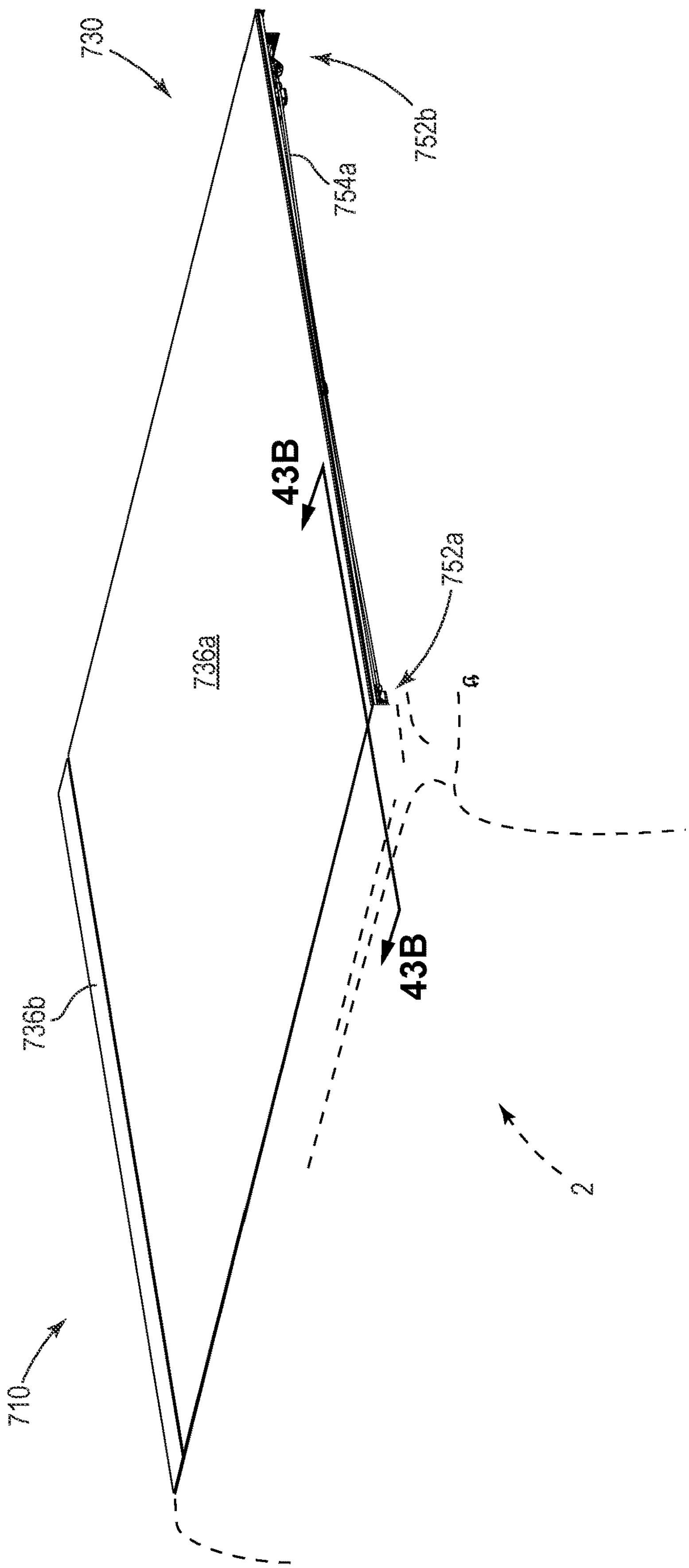
Figure 43B:
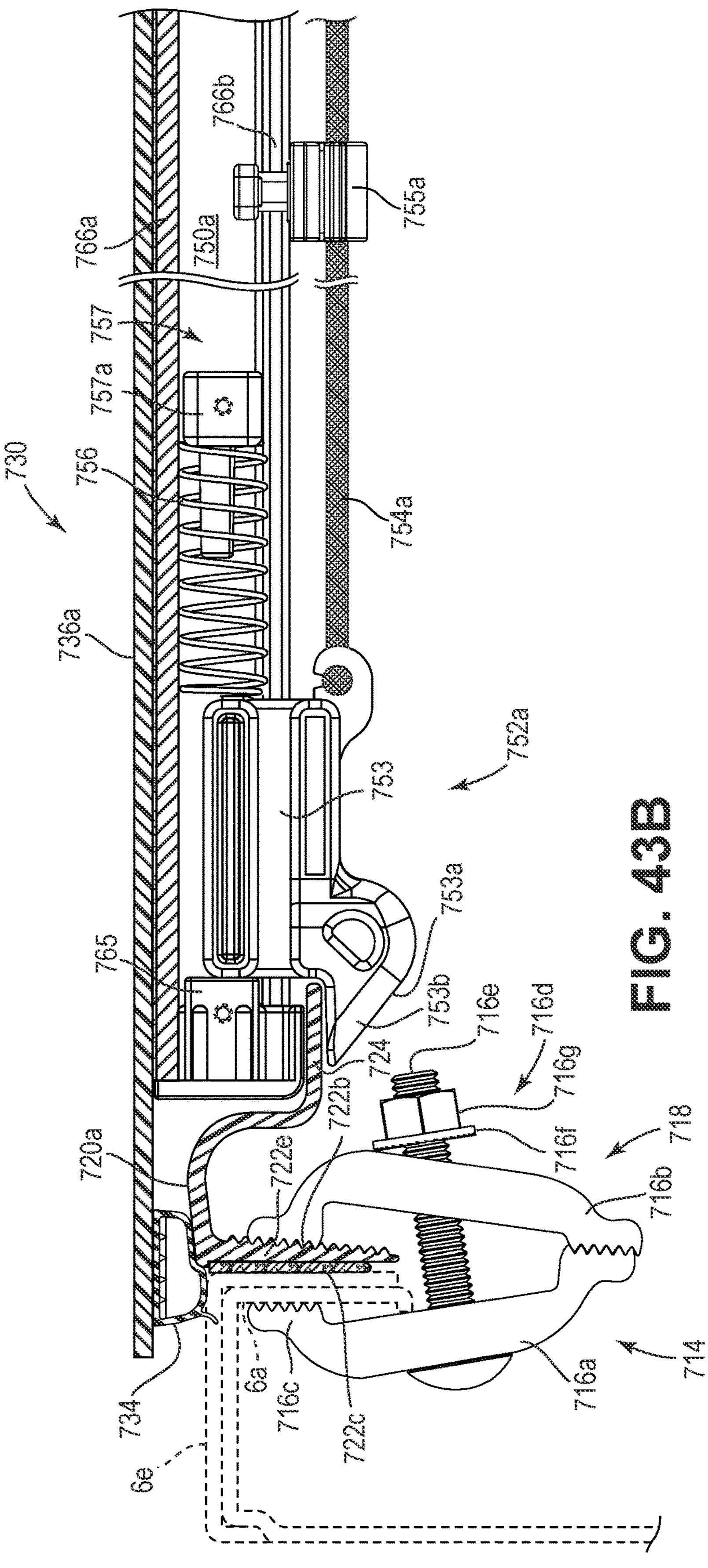
Figure 44A:
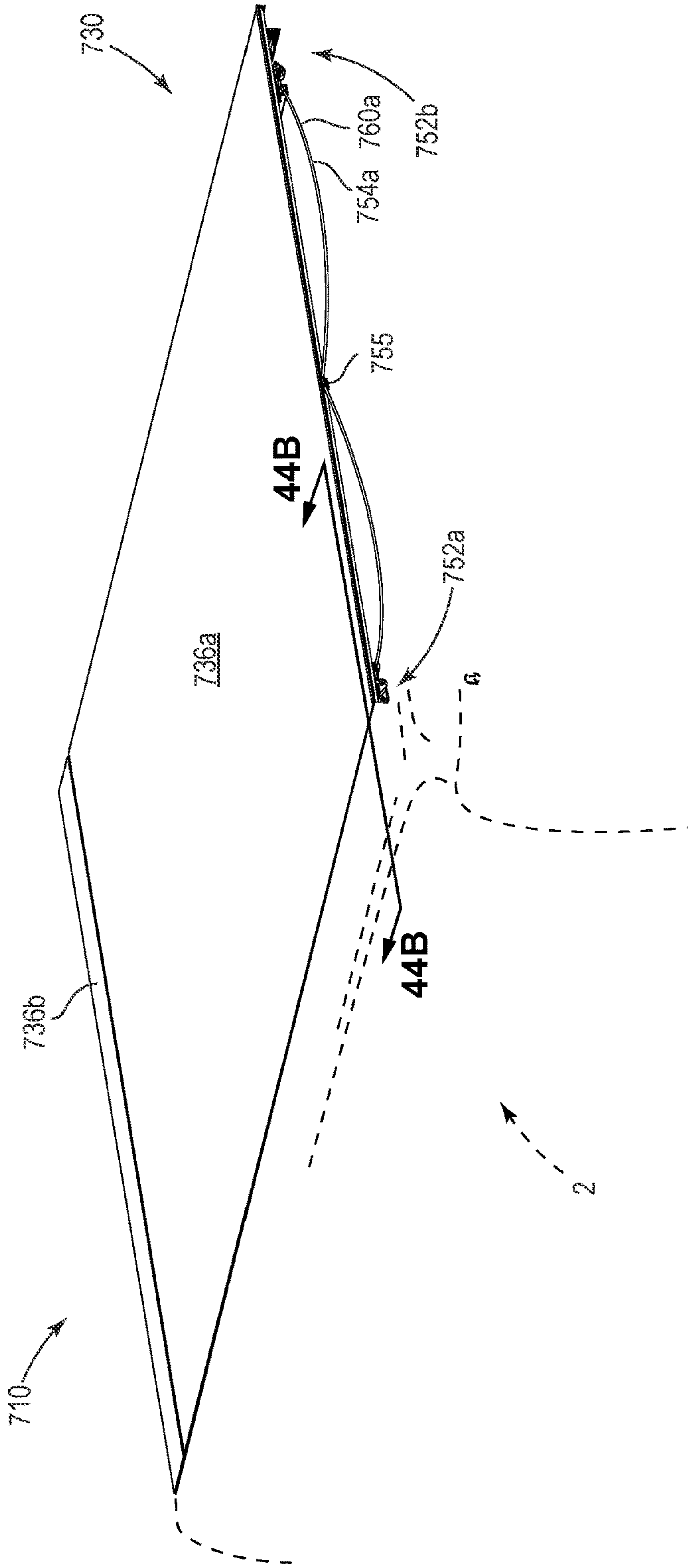
Figure 44B:
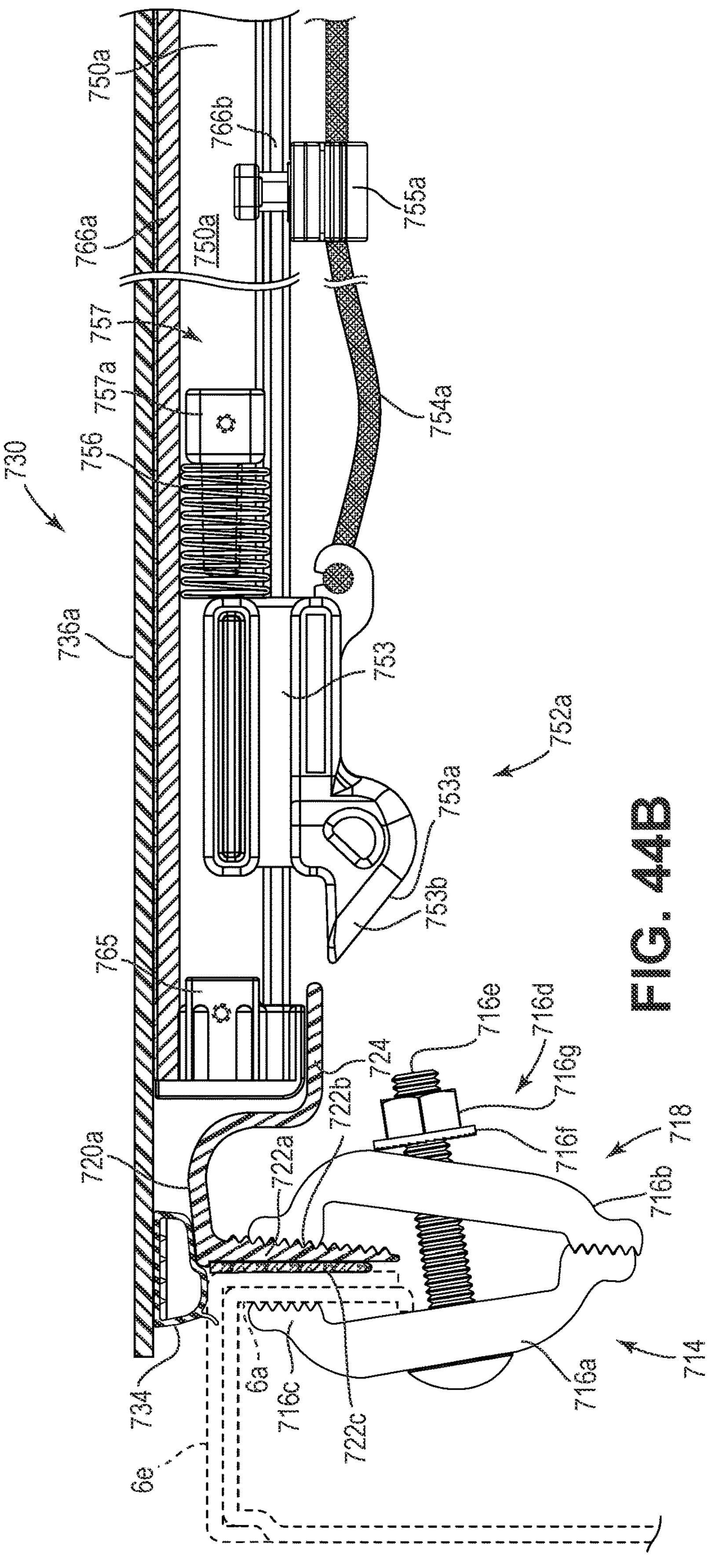
Figure 45:
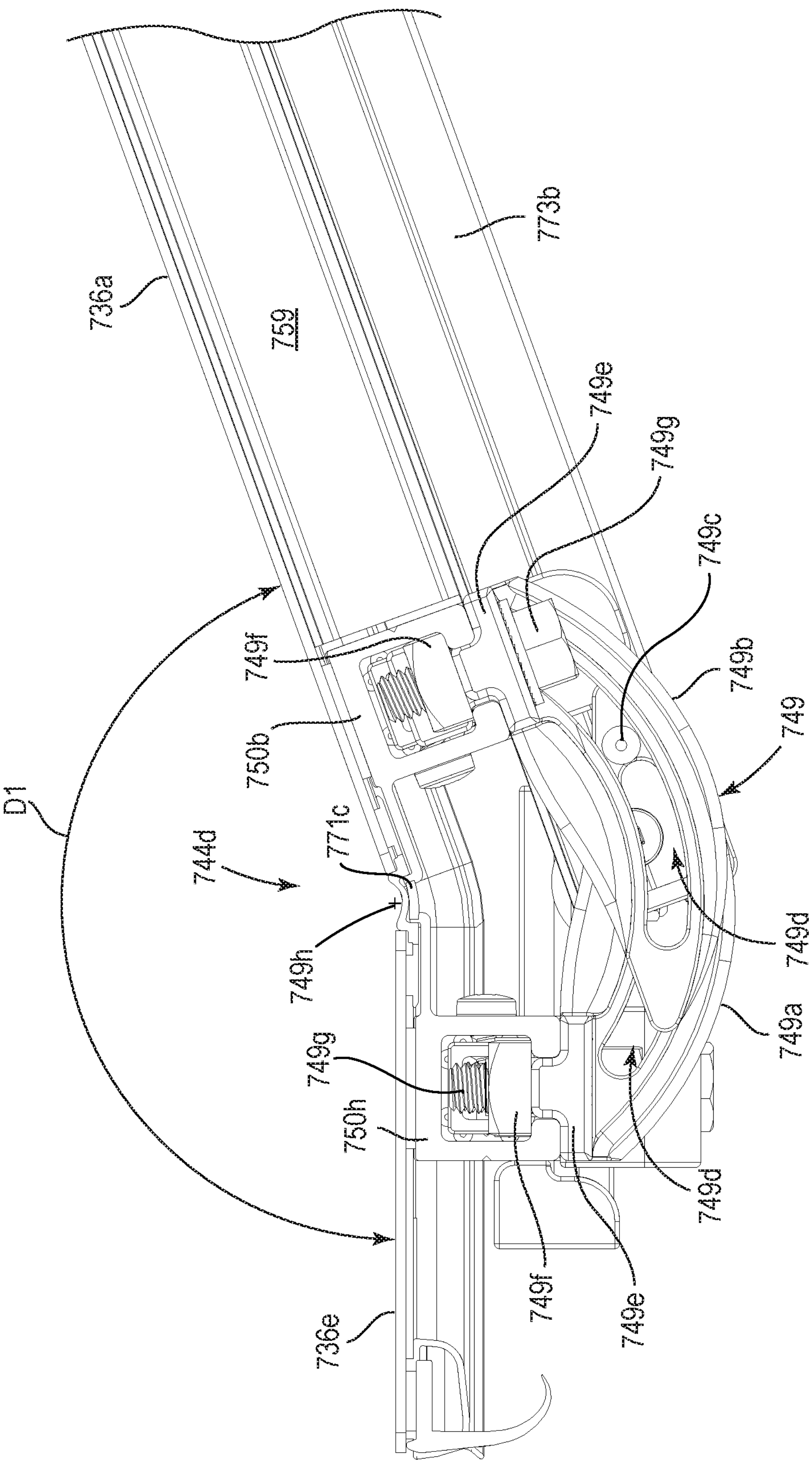
Figure 46:
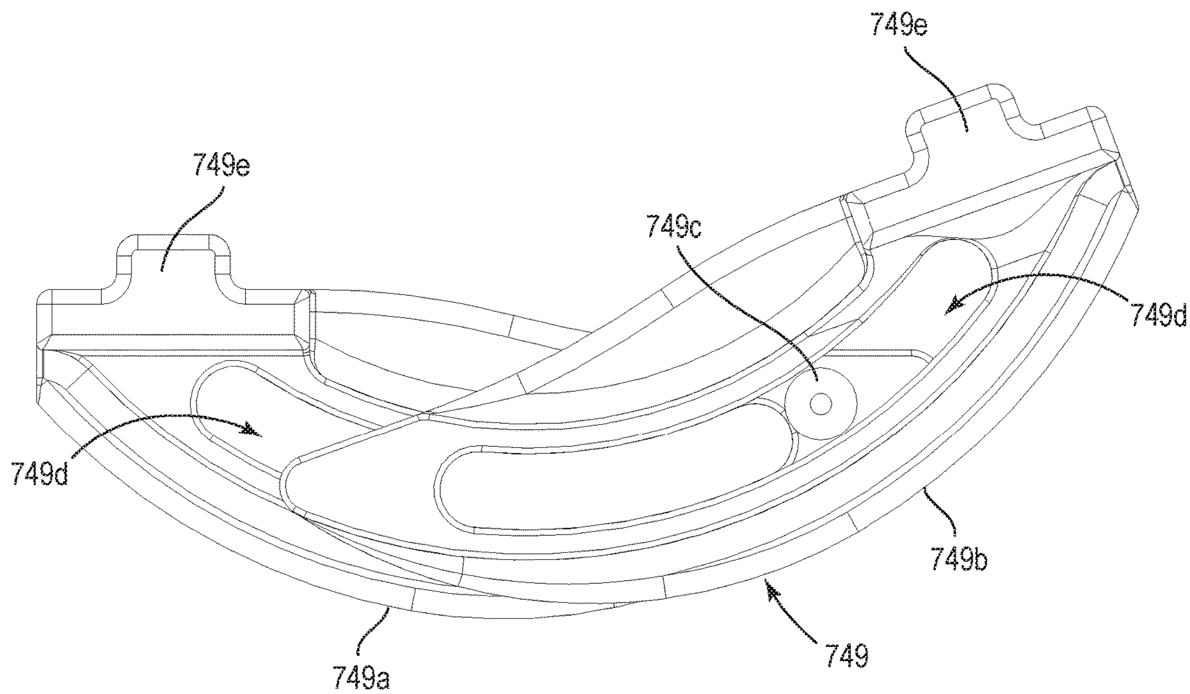
Figure 47:
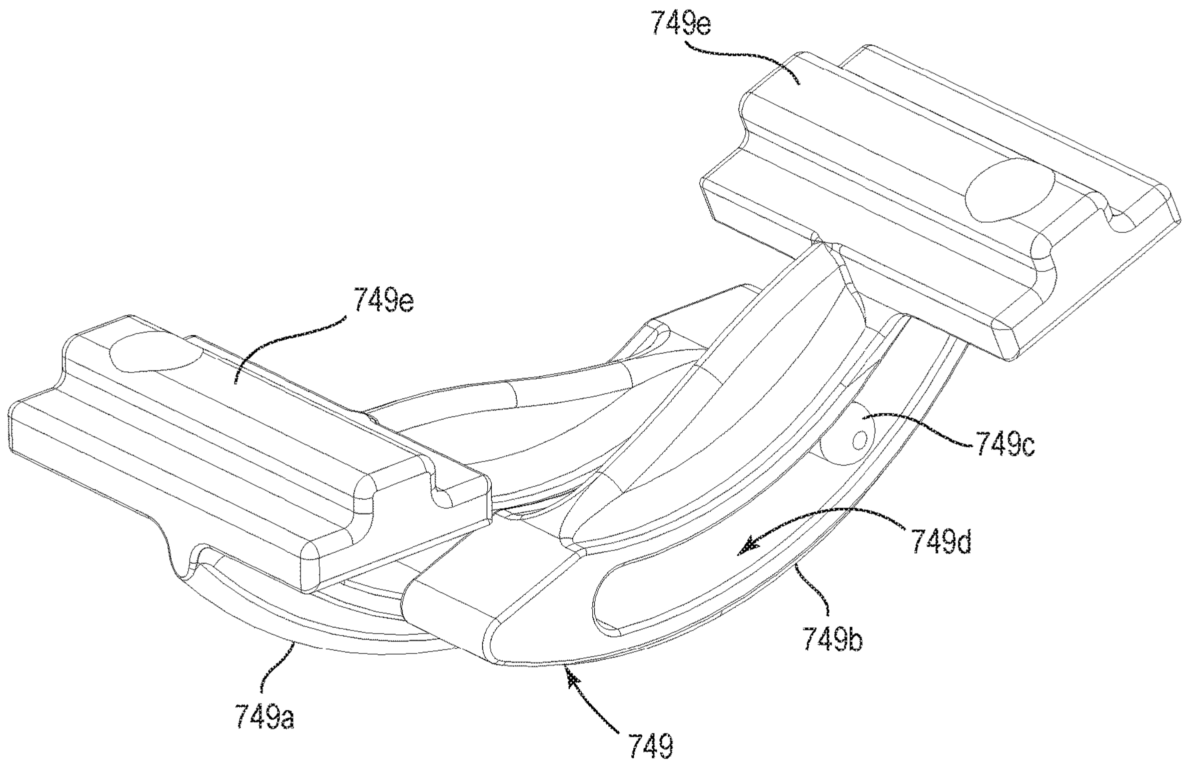

FIG. 39A is a rear perspective view of a portion of the folding tonneau cover apparatus of FIG. 32 showing the rear panel together with the middle panel and the spacer panel rotated forward so that the middle panel and the rear panel are resting together on the top of the front panel, with the spacer panel rotated upward generally at a 90 degree angle to the other panels;

FIG. 39B is a partial section view as seen from the line 39B,C-39B,C of FIG. 39A illustrating the driver's side of the partially folded tonneau cover assembly showing the engaging portion of the latch near the driver's-side end portion of the support bow of the front panel engaged with the lip of the driver's side side rail and a containment bracket;

FIG. 39C is a partial section view similar to the view of FIG. 39B, but showing the arrangement with the engaging portion of the latch retracted and disengaged from the lip of the side rail, allowing the front panel to be lifted up;

FIG. 39D is a partial section view as seen from the line 39D,E-39D,E of FIG. 39A illustrating the driver's side of the partially folded tonneau cover assembly showing a storage strap;

FIG. 39E is a partial section view similar to the view of FIG. 39D showing the storage strap engaged with a storage retainer to secure the rear, middle, and spacer and front panels to the cab panel;

FIG. 40 illustrates the folding tonneau cover apparatus of FIG. 32, including the folding cover assembly secured in the fully folded-up configuration with two cab braces each engaged with a cab bracket secured to the truck cab; an operator can attach or detach the cab braces from the cab brackets, or actuate the hex bolts or handle bolts to disengage the folding cover assembly from the side rails to remove the folding cover assembly from the support frame assembly or attach the folding cover assembly to the support frame assembly as desired;

FIG. 40A is a side perspective view of a portion of the tonneau cover apparatus of FIG. 32 showing a configuration in which the rear, middle, spacer, and front panels are folded onto the cab panel with the rear, middle, and front panels oriented generally vertically;

FIG. 40B is a side perspective view of a portion of the folding tonneau cover apparatus of FIG. 32 similar to the view of FIG. 40A, but showing two cab braces each engaged with a cab bracket to hold the folded up tonneau cover assembly in a generally vertical configuration adjacent the truck cab (shown in phantom);

FIG. 40C is a perspective view of a portion of the folding cover assembly showing the spacer panel and adjacent hinges and a support bow having a cab brace secured to the support bow for storage;

FIG. 40D is a perspective view similar to that of FIG. 40C but with the cab brace rotated outward so that it can be secured to a cab bracket;

FIG. 40E is a side perspective view of a portion of the folding tonneau cover apparatus of FIG. 32 similar to the view of FIG. 40B, but including an auxiliary support bow to which the two cab braces are attached, and showing the two cab braces each engaged with a cab bracket assembly to hold the folded up tonneau cover assembly in a generally vertical configuration adjacent the truck cab (shown in phantom);

FIG. 40F is an exploded perspective view of a portion of the cab bracket assembly shown in FIGS. 40B, 40E, and elsewhere herein;

FIG. 40G is a section view as seen from line G-G of FIG. 40F showing a cab bracket body;

FIG. 40H is a perspective view of the cab bracket assembly of FIG. 40F also showing a cab bracket adhesive;

FIG. 41 is a rear perspective view of an alternate embodiment of folding or hinged tonneau cover apparatus according to the present invention, including a support frame assembly and a folding or hinged cover assembly, with the hinged tonneau cover apparatus attached to a pickup truck which is shown in phantom;

FIG. 42A is a top plan view showing the hinged cover assembly of in FIG. 41;

FIG. 42B is a bottom plan view primarily showing the hinged cover assembly of FIG. 41 and showing retainer bolts which are handle bolts;

FIG. 42C is a side view of portions of the hinged tonneau cover apparatus of FIG. 41 as viewed from line 42C-42C of FIG. 42A;

FIG. 42D is an enlarged detailed view of a portion of the hinged tonneau cover apparatus encircled by dashed line 42D-42D of FIG. 42C;

FIG. 42E is a bottom perspective view of a portion of the hinged tonneau cover apparatus of FIG. 41;

FIG. 42F is a detail bottom perspective view of the portion of the hinged cover assembly of FIG. 41 encircled by dashed line 42F-42F of FIG. 42E;

FIG. 42G is a partial section view as seen from the line 42G-42G of FIG. 42A illustrating the driver's side of the hinged tonneau cover apparatus;

FIG. 42H is a bottom plan view of an alternate hinged tonneau cover apparatus showing an alternate hinged cover assembly similar to that shown in FIG. 41 but having retainer bolts which are hex bolts;

FIG. 42I is a detail bottom perspective view similar to FIG. 42F but of a portion of the hinged cover assembly of FIG. 42H, showing one of the hex bolts and a hinge support;

FIG. 43A is a rear perspective view of the hinged cover assembly of FIG. 42H, with the hinged tonneau cover apparatus attached to a pickup truck which is shown partially and in phantom;

FIG. 43B is a partial section view as seen from the line 43B-43B of FIG. 43A illustrating the engaging portion of one of the latches on the rear support bow or support member of the rear panel engaged with the lip of the side rail, and the side rail clamped to the sidewall of the pickup truck with a portion of the truck sidewall and sidewall cap shown in phantom;

FIG. 44A is a rear perspective view of the folding tonneau cover apparatus of FIG. 42H similar to the view of FIG. 43*a*, but with a release cord pulled to pull the latch to release the latch from the engagement with the side rail, with two portions of the release cord pulled for illustration;

FIG. 44B is a partial section view as seen from the line 44B-44B of FIG. 44A similar to the view of FIG. 43B, but showing the arrangement with the engaging portion of the latch retracted from the closed position where the latch would be engaged with the lip of the side rail;

FIG. 45 is an enlarged detailed view of the portion of the hinged tonneau cover apparatus of FIG. 42H similar to that shown in FIG. 42D, except that some parts have been removed to reveal underlying structures including a hinge support, and the rear panel has been lifted up about 30 degrees;

FIG. 46 is an enlarged detail side view of the hinge support of FIG. 45;

FIG. 47 is a perspective view of the hinge support of FIG. 45; and

Figure 48:
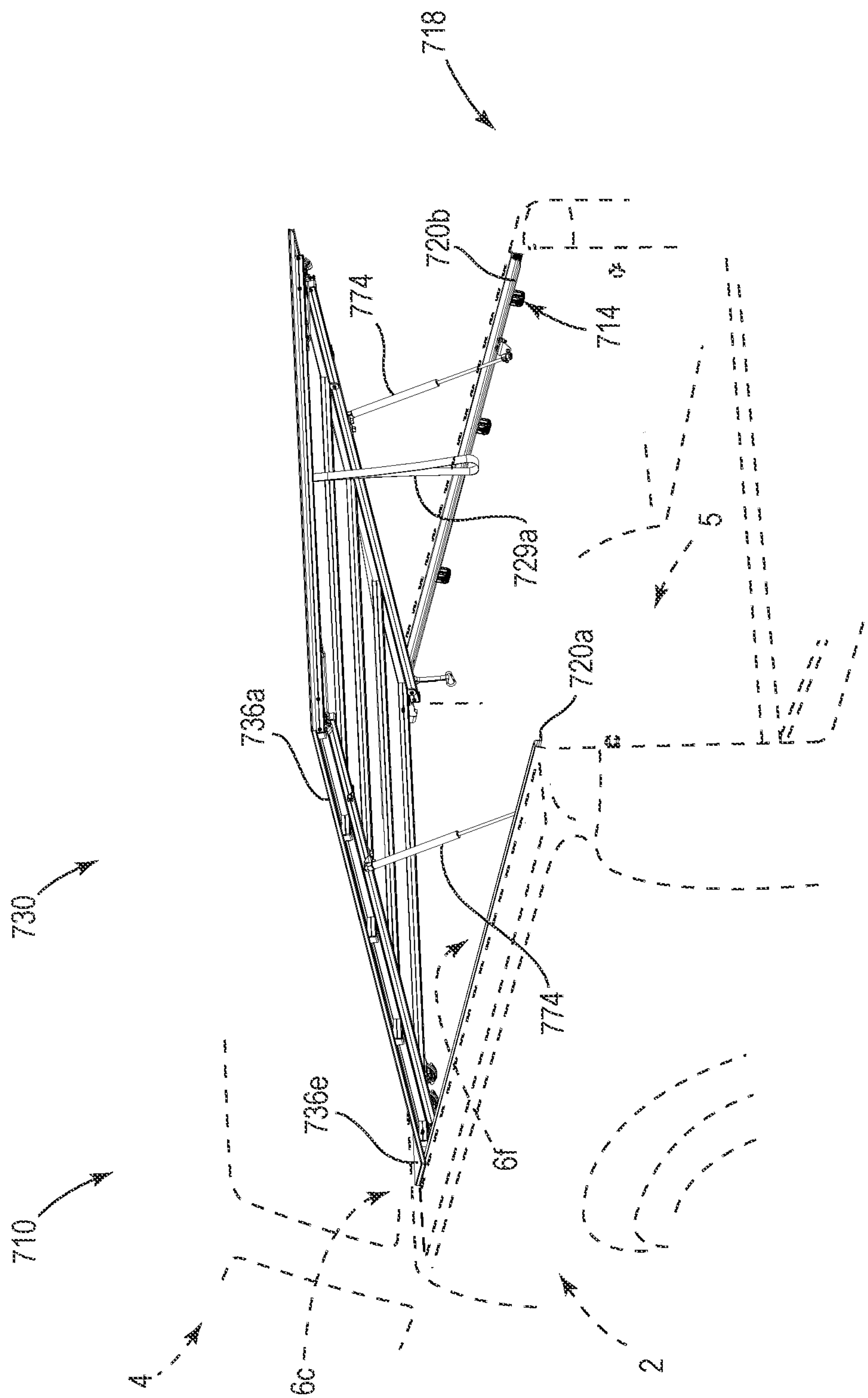

FIG. 48 is a rear perspective view of the hinged tonneau cover apparatus of FIG. 42H with the cover partially lifted up to access the cargo box.

DETAILED DESCRIPTION OF THE PREFERRED EMBODIMENTS

Figure 1:
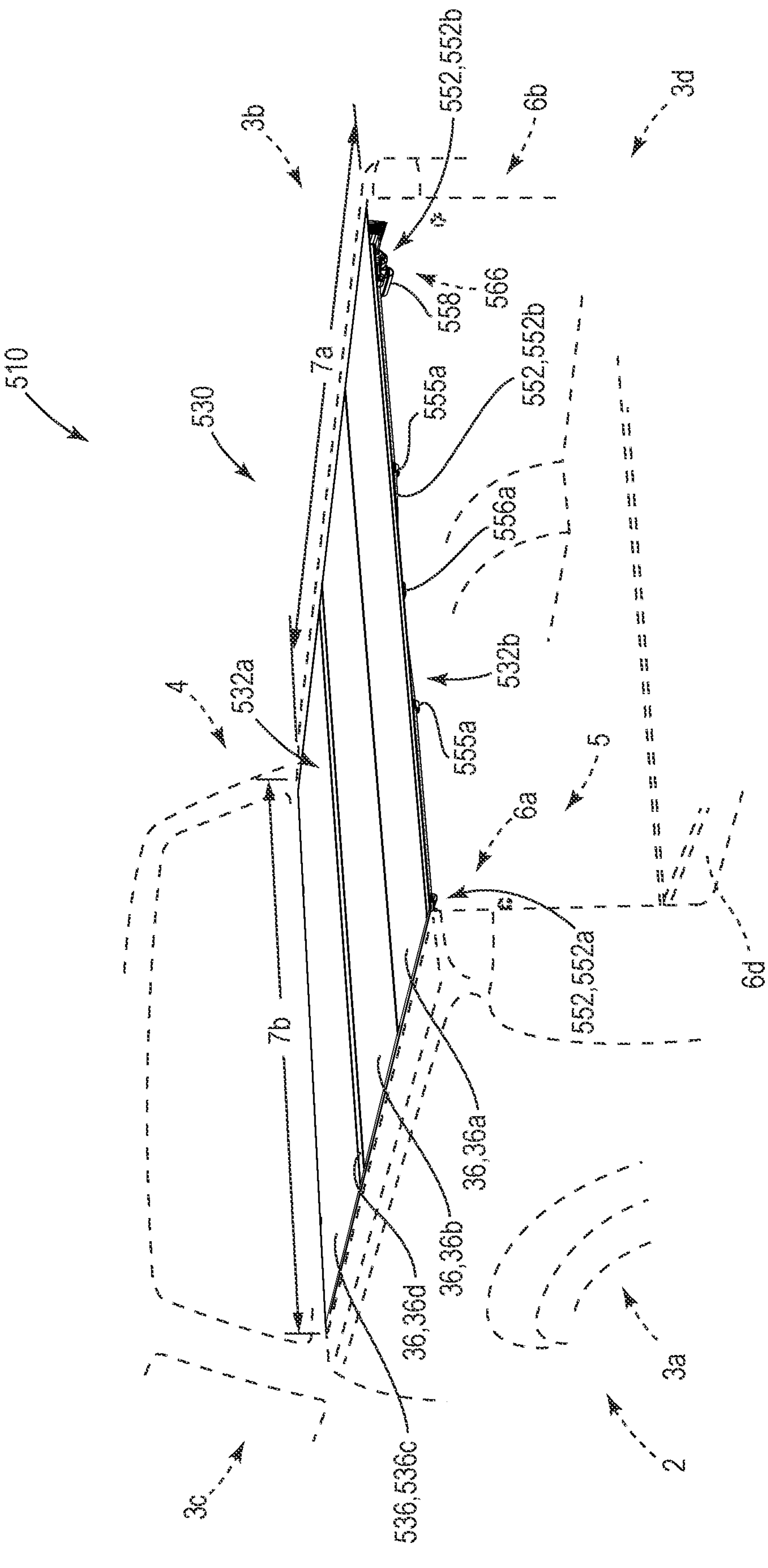
FIG. 1 is a rear perspective view of a folding tonneau cover apparatus according to the present invention, including a folding cover assembly and a support frame assembly, and shown attached to a pickup truck which is shown in phantom.

Referring now to the drawings, a folding tonneau cover apparatus 510 of the present invention is attachable to sidewalls 6*a*, 6*b* of a cargo box 5, such as the cargo box of a truck or pickup truck 2, which is shown in phantom. In FIG. 1, the folding tonneau cover apparatus 510 is shown in a typical application covering the top opening 6*f* (shown in phantom in FIG. 12) of the cargo box 5 of the pickup truck 2. The pickup truck 2 and the cargo box 5 and the sidewalls 6*a* and 6*b* and the front wall 6*c* (FIG. 12) at the forward end of the cargo box 5 and the tailgate 6*d* at the rear end of the cargo box 5 are not a part of the present invention, but are shown in phantom to illustrate a typical application and function of the folding tonneau cover apparatus 510 in covering a cargo box 5, which has a length 7*a* and a width 7*b*. The perimeter of the cargo box 5 includes the forward end or front wall 6*c*, the opposing sidewalls 6*a* and 6*b*, and the rearward end or tailgate 6*d*, which is shown in part. The rearward end or tailgate 6*d* preferably can be opened or closed. It will be appreciated that the perimeter of the top opening of the cargo box 5 will include top surfaces of the front wall 6*c*, the two sidewalls 6*a*, 6*b*, and the tailgate 6*d* when the tailgate is in a closed position (not shown). As further illustrated in FIGS. 2A-3B, the folding tonneau cover apparatus 510 includes a folding tonneau cover assembly, tonneau cover assembly or cover assembly 530 and a support frame assembly 518, including side rails or rails 520*a* and 520*b*. In preferred embodiments, side rails 520*a* and 520*b* are secured to sidewalls 6*a* and 6*b* with clamps 514. In preferred embodiments, the folding cover assembly 530 is configured to be opened to an open position and closed to a closed position, and easily removed and reinstalled by a driver or other operator 8 (FIG. 12), as needed. The side rails 520*a* and 520*b* are constructed and arranged to facilitate securement of the folding cover assembly 530 to the side rails 520*a* and 520*b*. In some embodiments, the side rails 520*a* and 520*b* have a side rail lip 524 and a side rail engagement portion 522*a*. In this example, there are eight clamps 514 arranged to hold the side rails 520*a* and 520*b* to the sidewalls 6*a*, 6*b* of the pickup truck 2, but other numbers of clamps 514 can be used. In some embodiments, the clamps include an outer member 516*a*, an inner member 516*b*, a clamp engagement portion 516*c*, and a fastener assembly 516*d*; the fastener assembly can, for example, include a bolt 516*e*, a washer 516*f* and a nut 516*g* as illustrated.

Figure 2A:
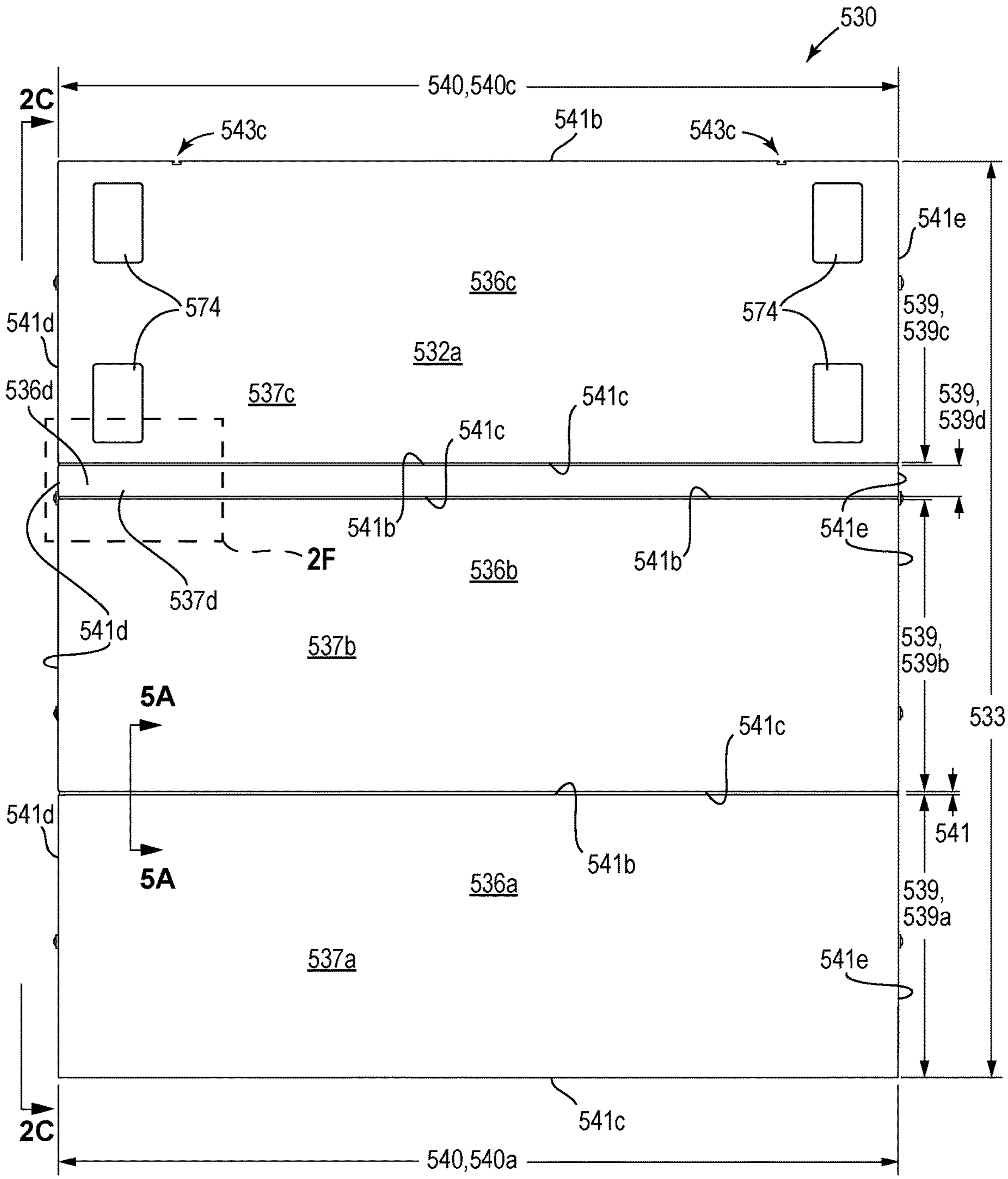
FIG. 2A is a top plan view showing the folding tonneau cover assembly shown in FIG. 1 and also showing a protective film 574 on the top surface of the front panel 536*c*, that is not shown in subsequent Figures, with the exception of FIGS. 9A, 10A, and 10 B where the protective film shown is again shown.

Referring again to FIGS. 2A-2C, the folding tonneau cover apparatus 510 of FIG. 1 is shown in whole or in part, but the truck 2 and the cargo box 5 are not shown. FIG. 2A shows a top view of the folding tonneau cover assembly 530 of FIG. 1. The top 532*a* of the folding cover assembly 530 is shown. The folding cover assembly 530 includes rigid panels or panels 536. In this example, panels 536 include a rear panel 536*a*, a middle panel 536*b*, a front panel 536*c*, and a spacer panel or hinge panel 536*d*. For ease of discussion, panels 536 are specifically referenced herein as 536*a*-536*d*, and non-specifically or collectively referenced as rigid panels 536. The folding cover assembly 530 includes a plurality of such rigid panels 536, and could potentially have from two to 8 panels 536; for example, 6 panels 536 could be used, including 4 “longer” panels (similar to panels 536*a*-536*c* shown herein) and 2 “shorter” panels (similar to panels 536*d* shown herein). While a smaller or a larger number of panels 536 can be used (not shown), the inventors have found that the configurations illustrated herein provide a good trade-off of convenient folded configuration vs. complexity.

As shown in FIG. 2A, and also as further described herein with respect to FIGS. 20A-20E, the length 539 of each of the panels 536*a*-536*d* is indicated as 539*a*-539*d*, respectively. In this example, the spacer panel 536*d* has a substantially smaller length 539*d* than the other panels, as will be further described herein. In preferred embodiments, the length 539*d* of the spacer panel 536*d* is preferably no greater than about one-third of the length 539*a*-539*c* of the other panels 536*a*-536*c*. Panels 536*a*-536*d* can have similar length 539, or the length of some or all of panels 536*a*-536*d* can differ. The width 540 of each of the panels 536*a*-536*d* is indicated as 540*a*-540*d*, respectively. Panels 536*a*-536*d* can have the same width 540, or the width of some or all of panels 536*a*-536*d* can differ. The side angle 542 of each of the panels 536*a*-536*d* is indicated as 542*a*-542*d*, respectively, in FIG. 20A. Panels 536*a*-536*d* can have the same side angle 542, or the side angle 542 of some or all of panels 536*a*-536*d* can differ. Alternative configurations of folding tonneau covers 530 appropriate for covering the cargo box 5 of various models of pickup truck 2 are further described below. Each panel 536 has a top surface 537 and a bottom surface or underside 538; panel 536*a* has a top surface 537*a* and a bottom surface or underside 538*a*, panel 536*b* has a top surface 537*b* and a bottom surface or underside 538*b*, panel 536*c* has a top surface 537*c* and a bottom surface or underside 538*c*, panel 536*d* has a top surface 537*d* and a bottom surface or underside 538*d*.

As further described herein and illustrated in drawing FIGS. 2A-5F, the present invention includes a folding tonneau cover assembly 530 having a plurality of rigid panels

536 arranged in a series, with adjacent rigid panels 536 secured to each other by a flexible hinge 544, so that the folding cover tonneau cover assembly 530 can be unfolded to cover a top opening 6*f* (FIG. 12) of a cargo box 5 of a truck 2, and folded up to uncover at least a portion of the top opening 6*f* of the cargo box 5 of the truck 2. Each rigid panel 536 has a front edge 541*b* and a rear edge 541*c* and a driver's side edge 541*d* and a passenger side edge 541*e* and a top surface 537 and a bottom surface or underside 538. When the folding tonneau cover assembly 530 is unfolded and arranged to cover the top opening 6*f* of the cargo box 5, each of the rigid panels 536 extends between the driver's side 3*a* and the passenger side 3*b* of the cargo box 5, and each flexible hinge 544 extends between the driver's side and the passenger side of the cargo box. In embodiments having 4 rigid panels 536, for example, there are 3 flexible hinges 544, each flexible hinge 544 being secured to two adjacent rigid panels 536. Other configurations are possible, including embodiments having two rigid panels 536 and one flexible hinge 544, embodiments having three rigid panels 536 and two flexible hinges 544, embodiments having five rigid panels 536 and four flexible hinges 544, embodiments having six rigid panels 536 and five flexible hinges 544, and so forth. In preferred embodiments, the number of rigid panels 536 is 1 greater than the number of flexible hinges 544; alternative embodiments include folding tonneau cover assemblies 530 having at least three rigid panels 536 and at least one flexible hinge 544, as described herein, and at least one other hinge or connection as may be known in the art (not shown) have been envisioned by the inventors. The present invention includes such embodiments, as long as the embodiments include at least one flexible hinge 544 as described herein.

Also illustrated in FIG. 2A, is a protective film 574 on the top surface 537*c* of the front panel 536*c*. As described further herein and illustrated in FIGS. 2A, 9A, 10A, and 10 B, alternate embodiments of the folding tonneau cover assembly 530 include the protective film 574, which protects the top surface 537*c* of the front panel 536*c* when the folding tonneau cover assembly 530 is folded up and the standoffs 558 are in contact with the top surface 537*c*. As described below, a protective pad 558*a* is preferably attached to the bottom of each standoff 558, but abrasion of the top surface 537*c* can occasionally occur when the protective pads 558*a* are in direct contact with the top surface 537*c*, especially when the pickup truck on which the folding cover assembly 530 resides is travelling on rough road surfaces that cause the protective pads 558*a* to vibrate on the top surface 537*c*. While the protective film 574 is optional to reduce or prevent such abrasion in some embodiments, they are not required. Such alternate embodiments of the present invention, which include the protective film 574 to minimize abrasive damage to the top surface 537*c*, are disclosed herein. Protective film 574 can be obtained from a variety of suppliers, including Avery Dennison (Glendale, CA), 3M (St. Paul, MN), Arlon (Placentia, CA), and Xpel (San Antonio, TX). One preferred protective film 574 is Avery Dennison SW 900 Series Supreme Wrapping Film. The protective film 574 is preferably applied to specific locations on the top surface 537*c* which will align with the standoffs 558 when the folding tonneau cover assembly 530 is folded up as shown and described herein. For example, for embodiments including 4 standoffs 558, protective film can be applied to the top surface 537*c* in the locations shown in FIG. 2B. The protective film 574 is preferably located in locations on the top surface 537*c* as schematically illustrated on FIG. 2A that correspond to the locations that the protective pads 558*a* of the standoffs 558 will assume when they engage the top surface 537*c* of the front panel 536*c*, when the folding cover assembly 530 is in a fully folded up orientation.

Figure 2B:
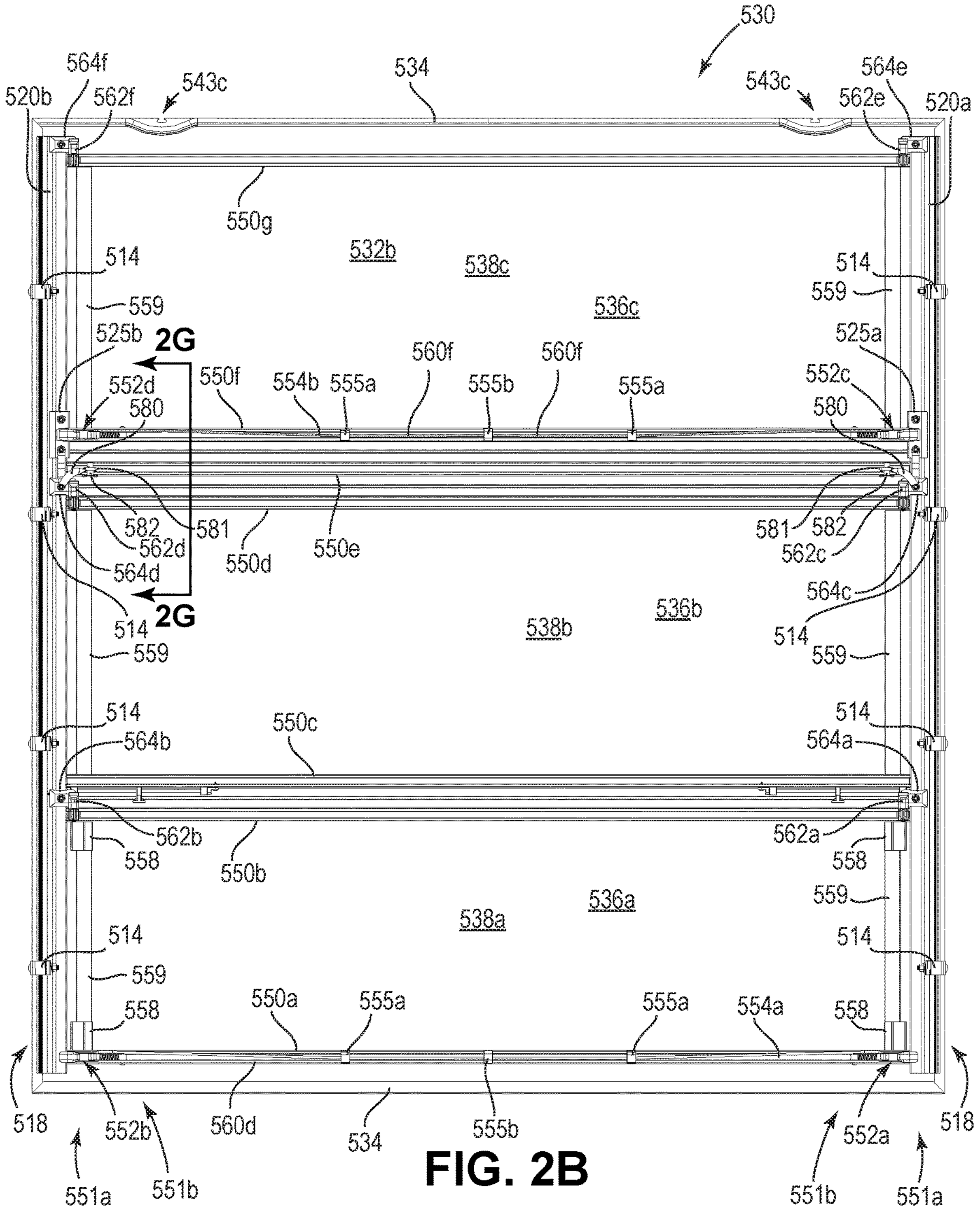
FIG. 2B is a bottom plan view of the folding tonneau cover apparatus of FIG. 1.

FIG. 2B shows a bottom view of the folding tonneau cover apparatus 510. Visible in this view are hinges or flexible hinges 544, which are situated between adjacent panels 536 and adjoin adjacent panels 536. For ease of discussion, hinges 544 are specifically referenced herein as 544*a*-544*c*, and non-specifically or collectively referenced as 544. Specifically, situated between the rear panel 536*a* and the middle panel 536*b* is hinge 544*a*. Similarly, situated between the middle panel 536*b* and the spacer panel 536*d* is hinge 544*b*, and situated between the spacer panel 536*d* and the front panel 536*c* is hinge 544*c*. Hinges 544 allow the folding cover assembly 530 to be folded up and will be more fully described below. Support bows 550 are attached to the panels 536 to provide additional support and rigidity to the panels 536, and also provide a structure for mounting of various other components as described in detail later herein. For ease of discussion, support bows 550 are specifically referenced herein as 550*a*-550*g*, and non-specifically or collectively referenced as 550. The folding tonneau cover assembly 530 is removably secured to the support frame assembly 518 by securing apparatus 551*a*. Preferably, securing apparatus 551*a* includes at least one locking member 551*b* which is engageable and disengageable from the support frame assembly 518. Preferably, the locking member 551*b* includes latches 552 which are located at the support bows as shown and secure the folding cover assembly 530 to the side rails 520*a* and 520*b*. Release cords 554 are attached to the latches 552. For ease of discussion, latches 552 are specifically referenced herein as 552*a*-552*d*, and non-specifically or collectively referenced as 552. Also for ease of discussion, release cords 554 are specifically referenced herein as 554*a*-554*b*, and non-specifically or collectively referenced as 554. The release cords 554 pass through cord guides 555 which are attached to support bows 550 as shown. Cord guides 555 preferably include clip cord guides 555*a* and retainer cord guides 555*b*, which will be described in further detail below. Standoffs 558 are shown, and will be described in further detail below. Sidebars or handles 559 are attached to panels 536*a*, 536*b*, and 536*c*, near each side of each panel 536 to further support the panels 536. Perimeter seal 534 is located on the bottom 532*b* of the folding cover assembly 530 and is arranged to seal against top of the perimeter of the cargo box 5 at the sidewalls 6*a* and 6*b* and the front wall 6*c* and the tailgate 6*d* of the cargo box 5 as shown; some portions of perimeter seal 534 are behind side rails 520*a* and 520*b* and not visible FIG. 2B. The perimeter seal 534 is further described herein.

Figure 2C:
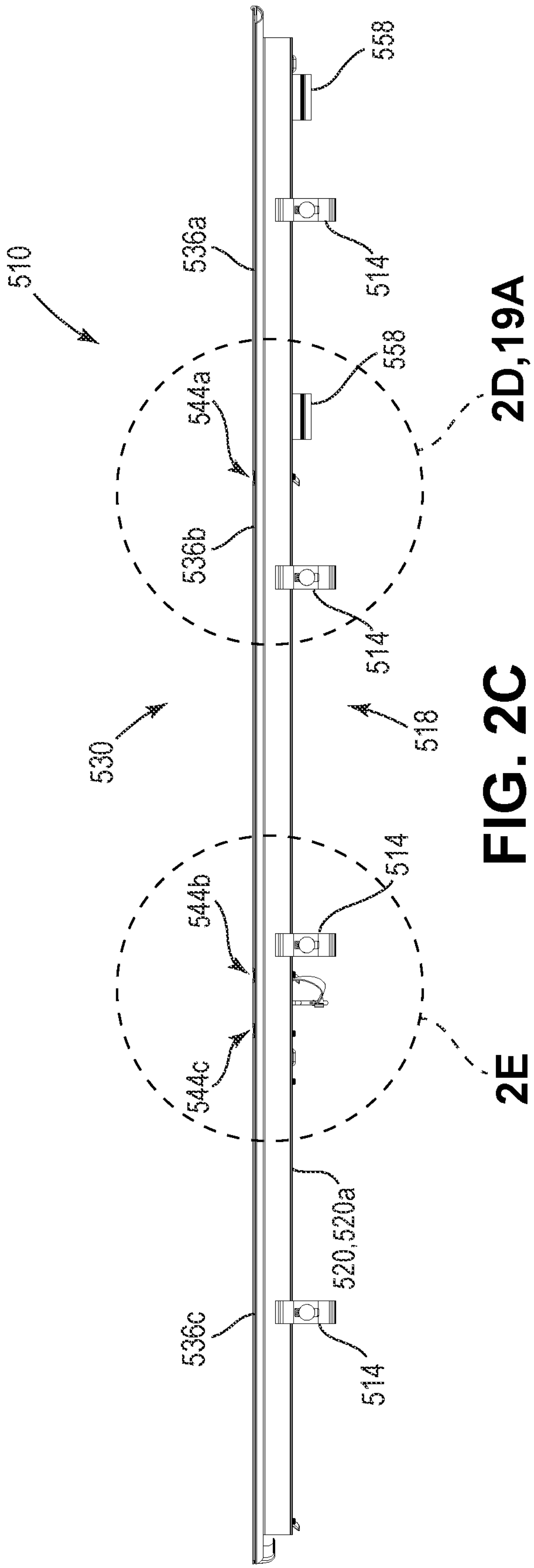
FIG. 2C is a side view of the folding tonneau cover apparatus of FIG. 1 as viewed from line 2C-2C of FIG. 2A which illustrates the driver's side of the pickup truck shown in FIG. 1; however, for clarity of illustration, the perimeter seal on the underside of the outer edge of the respective panels is not shown.

The support bows or transverse frame members or channels 550 provide additional support for the panels 536. In this embodiment, the panels each have two support bows 550, one located near each of the front and rear ends of each panel 536, except for the spacer panel 536*d*, which has only a single support bow 550. In this embodiment, there are latches 552 mounted in pairs, one of each pair mounted near each end of each of the support bows 550*a* and 550*f* as shown. As further described below, the latches 552 engage the side rails 520*a* and 520*b* to secure the folding cover assembly 530, and can slide a short distance towards or away from the side rails 520*a* and 520*b* to engage or release the folding cover assembly 530 or portions thereof or selected panels 536 from the side rails 520*a* and 520*b* as further described below. Note that the support bows 550*b*, 550*c*, 550*d*, 550*e*, and 550*g* do not have associated latches 552 in this embodiment. In this embodiment, there are two latch release cords or release cords or cords 554, each of which are connected to opposing pairs of latches 552 which secure the panels 536 to the side rails 520*a* and 520*b*. The release cords 554 preferably pass through cord guides 555 which are mounted to the support bows 550; the release cords 554 can slide within or behind the cord guides 555 as further described herein. The release cords 554 generally extend from the latches 552 along the support bows 550. As illustrated in FIGS. 2B and 2C, the clamps 514 secure the side rails 520*a* and 520*b* to the sidewalls 6*a* and 6*b* of the cargo box 5. The folding tonneau cover apparatus 510 is seen in a side view from the driver's side in FIG. 2C.

Figure 2D:
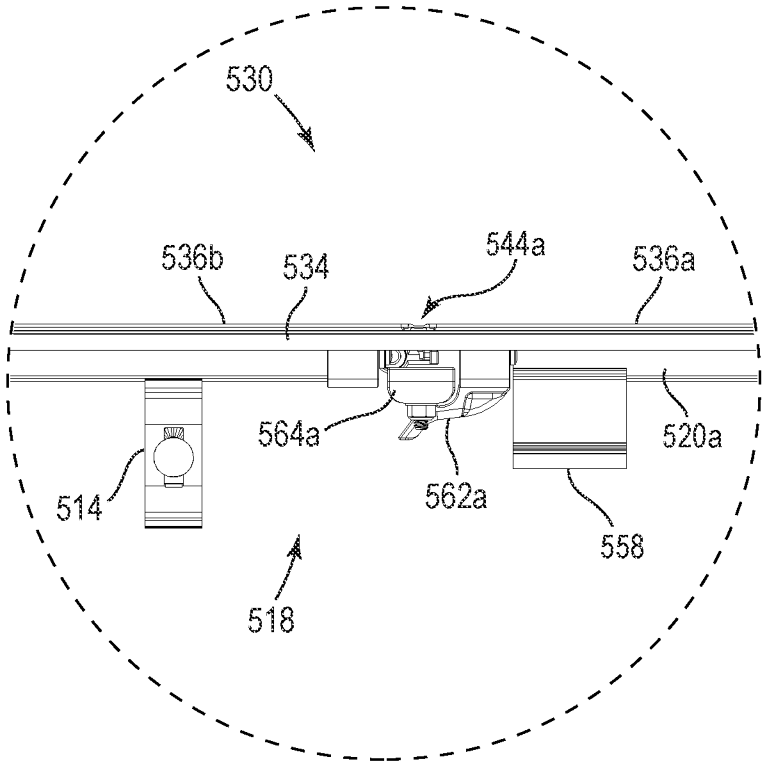
FIG. 2D is a detailed view of a portion of the folding tonneau cover apparatus encircled by the dashed line 2D, 19A of FIG. 2C, illustrating the rear hinge, with a portion of the driver's-side side rail broken away to show the underlying structure.
Figure 2E:
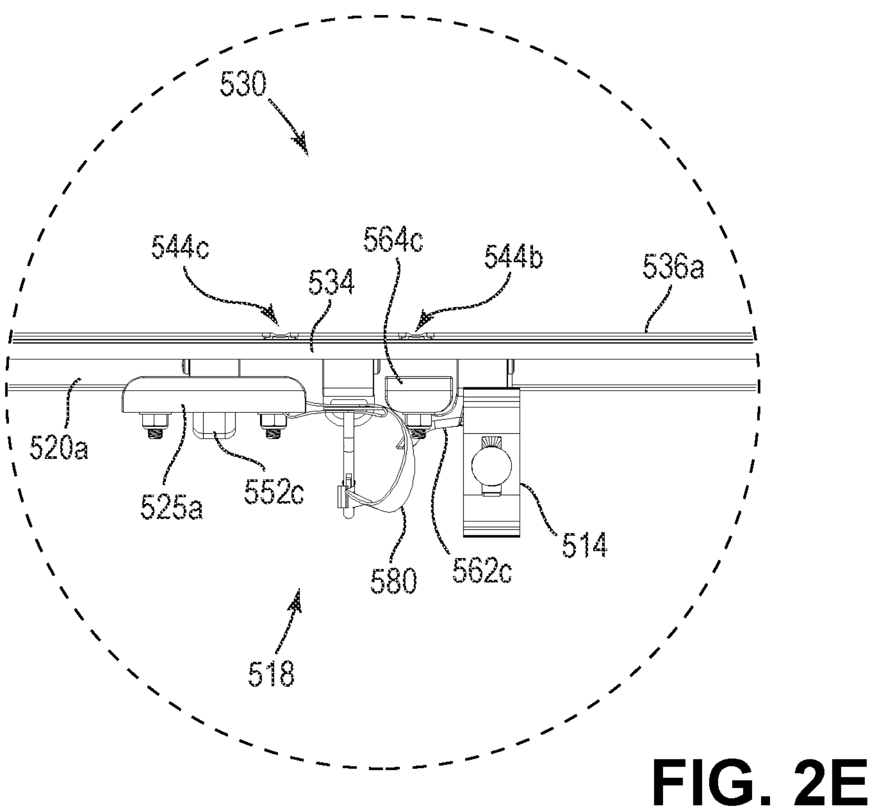
FIG. 2E is a detailed view of a portion of the folding tonneau cover apparatus encircled by dashed line 2E of FIG. 2C, illustrating the middle hinge and the front hinge, with a portion of the driver's-side side rail broken away to show the underlying structure.

In further reference to FIGS. 2C-2E, the portion of the folding tonneau cover apparatus 510 that includes the rear hinge 544*a*, as indicated by the encircled area labeled 2D in FIG. 2C, is illustrated in an enlarged partial cutaway view in FIG. 2D. Similarly, the portion of the folding tonneau cover apparatus 510 that includes the middle and front hinges 544*b* and 544*c*, respectively, as indicated by the encircled area labeled 2E in FIG. 2C, is illustrated in an enlarged partial cutaway view in FIG. 2E. The folding cover assembly 530 preferably includes extended hinge support flange(s) 586 located adjacent the bottom surface or underside 538 of the respective panel 536 and near the front and rear edges 541*b* and 541*c*, respectively, of the rigid panels 536 to which the flexible hinges 544 are secured (for example, FIG. 5A). As will be described in further detail below, the flexible hinges 544 each preferably includes a flexible hinge body 545*a* which includes a central portion 546*a*, side portions 546*b* and 546*c*, and intermediate portions 546*d* and 546*e*. Each side portion 546*b* and 546*c* preferably extends between the extended hinge support flange 586 and the rigid panel 536. Adhesive 570*a* is preferably located between each side portion 546*b* and the respective rigid panel 536 to protect against passage of debris or precipitation into the cargo box 5; the adhesive 570*a* can also aid in securement of the hinge body 545*a* to the respective rigid panel 536. The support bows or channels 550 are preferably secured to the bottom surface or underside 538 of the rigid panels 536, near the front edge 541*b* and/or rear edge 541*c* of the rigid panels 536. Each support bow 550 that is adjacent a flexible hinge 544 preferably includes the extended hinge support flange 586. Further details regarding the structure of the flexible hinge body 545*a* and securement to the rigid panels 536 are described below.

Figure 2F:
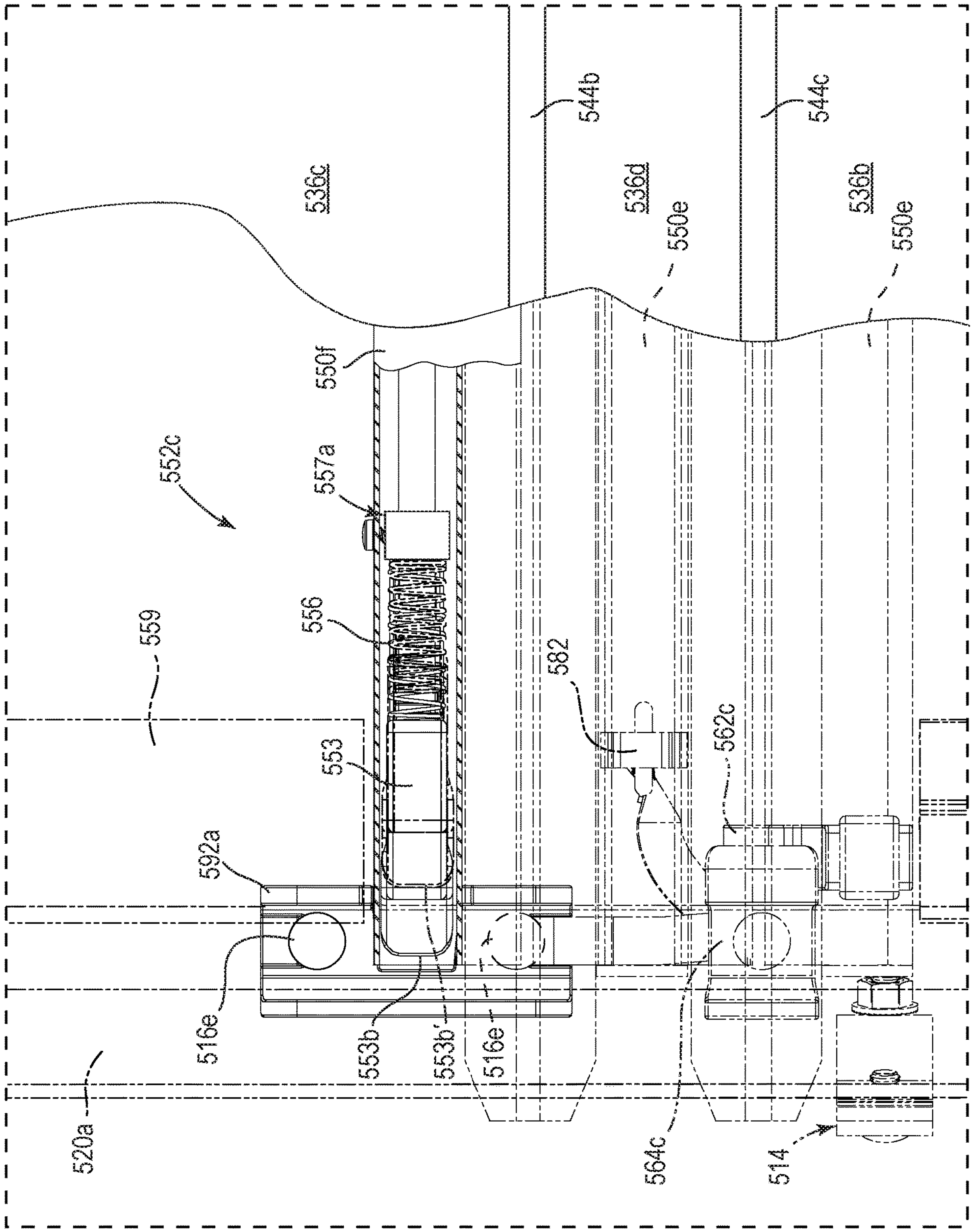
FIG. 2F is an enlarged detailed top plan view of a portion of the folding tonneau cover apparatus shown in the dashed rectangle 2F of FIG. 2A, with portions broken away to show the underlying structure and showing the support member in partial cross section and illustrating the engaging portion of the latch engaged with the containment bracket and the side rail, and showing an alternate position of the engaging portion of the latch in phantom when it is retracted from the containment bracket and with other structures shown in phantom to indicate the relative position of the respective elements.

The folding tonneau cover apparatus 510 preferably includes containment brackets 525*a* and 525*b*. The structure and function of the containment bracket 525*a* is further illustrated in FIG. 2F. Note that in FIG. 2F, portions of the rigid panels 536 and the flexible hinges 544 are broken away to reveal the underlying structure, and many elements are illustrated in phantom to emphasize the elements being described. When the engaging portion 553*b* is engaged under the side rail 520*a* and is contained by the containment bracket or anchor socket 525*a* as illustrated in FIG. 2F, the engaging portion 553*b* is contained by the containment bracket 525*a* so that it cannot slide frontwards or rearwards along the side rail 520*a*. The containment bracket 525*a* is preferably secured to the side rail by a fastener assembly 526, which may include a bolt, nut, washer, or other fasteners known in the art. In this configuration, the spring 556 is urging the latch slide 553 outwards towards the side rail 520*a*. To release the latch 552 and allow the folding cover assembly 530 to be lifted off and removed from the side rail 520, the release cord 554*e* is pulled. When the release cord 554*e* has been pulled, retracting the latch slide 553 and compressing the spring 556, and disengaging the engaging portion 553*b* from the side rail 520*a* and the containment bracket 525*a*, and releasing the latch 552, the configuration is as illustrated in phantom in FIG. 2F. The side rail 520*b* preferably has a mirror-image configuration to the side rail 520*a*, with a side rail front portion 521*c* and side rail rear portion 521*d*, and a containment bracket 525*b* functioning in a similar manner.

Figure 2G:
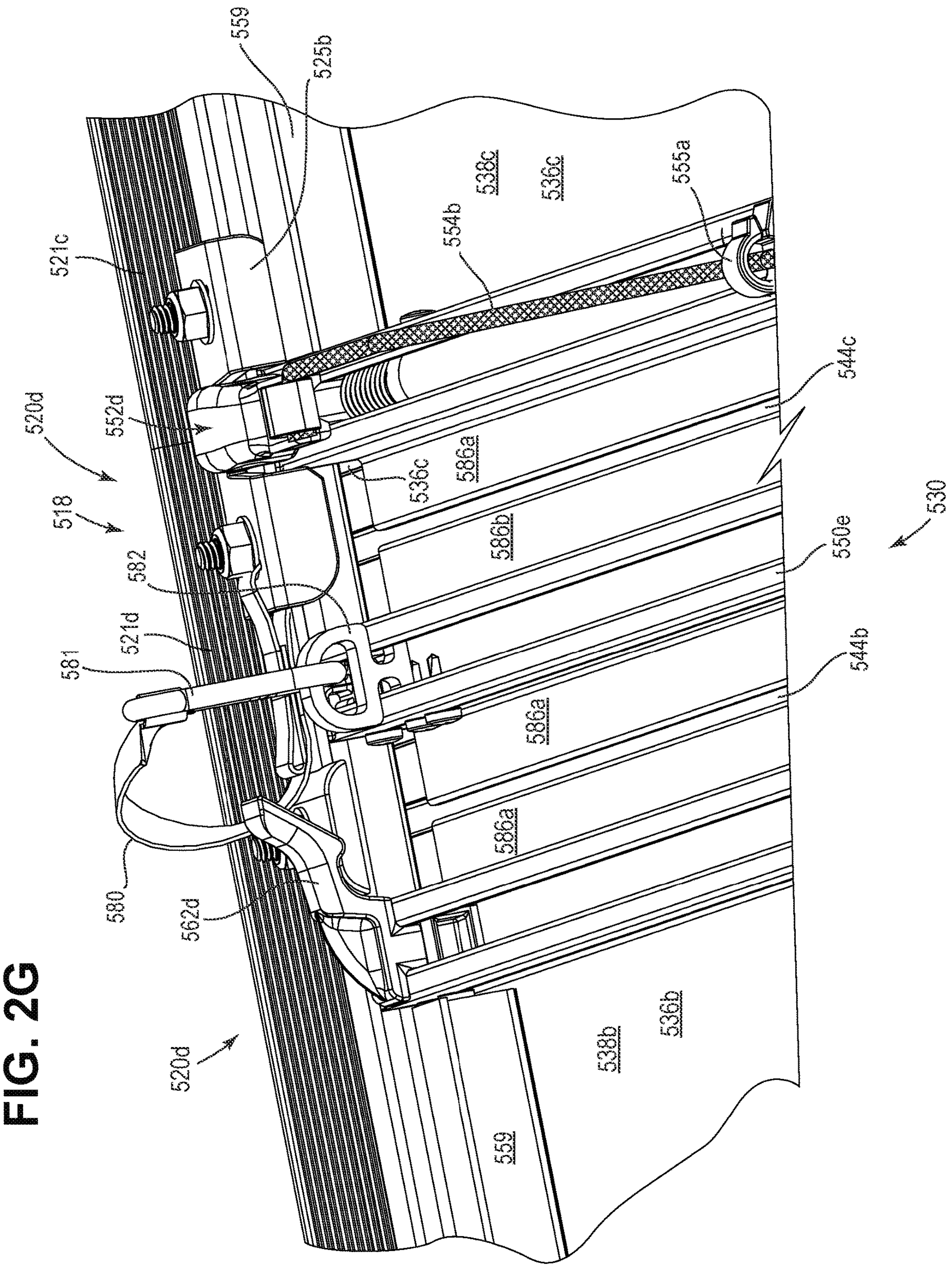
FIG. 2G is an enlarged perspective view as seen generally from a line 2G-2G of FIG. 2B which is seen from below of a portion of a folding tonneau cover apparatus similar to the folding tonneau cover apparatus shown in FIG. 2B, except that the side rail shown in FIG. 2G is an alternate passenger side rail 520*d*, which differs from the side rail 520*b* shown in FIG. 2B.
Figure 2H:
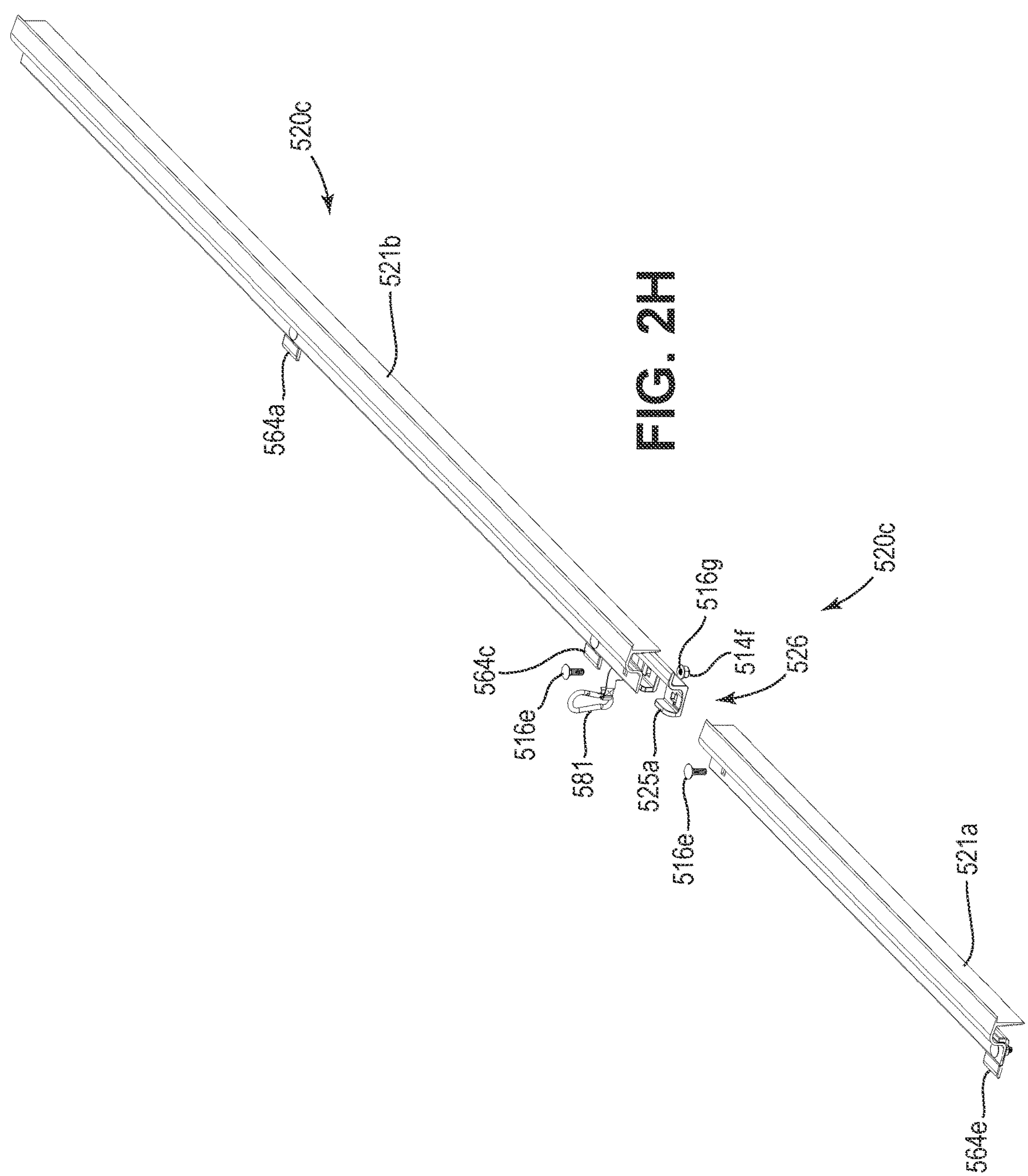
FIG. 2H is an exploded perspective view of an alternative driver's-side split side rail, that is a mirror image of the passenger side split side rail shown in FIG. 2G, both of which have a plurality of sections which are joined together by a driver's side containment bracket.

Some embodiments include the alternative side rail 520*c* which includes a plurality of sections 521 as illustrated in FIG. 2G; the side rail 520*c* preferably includes side rail front portion 521*a* and side rail rear portion 521*b*. The containment bracket 525*a* is preferably secured to the side rail 520*c* by a fastener assembly 526, which may include a bolt 516*e*, nut 516*f*, washer 516*g*, or other fasteners known in the art. In these embodiments, in addition to its function to retain the latch 552 as previously described, the containment bracket 525*a* preferably facilitates securement of the side rail front portion 521*a* and side rail rear portion 521*b* together. One advantage of the "split" side rail 520*c* is that storage and shipment of the side rail 520 can be more practical; a one-piece side rail would be long and in some cases could be more difficult or expensive to transport, for example. The side rail 520*d* preferably has a mirror-image configuration to the side rail 520*c*, with a side rail front portion 521*c* and side rail rear portion 521*d*, and a containment bracket 525*b* functioning in a similar manner as the similar elements just described. The alternative side rail 520*c*, containment bracket 525*a*, and fastener assembly 526 are illustrated in exploded view in FIG. 2H. Preferably, a tether 580 is attached to the containment bracket 525*b* and is releasably secured by a link 581 when desired to a ring 582 that is secured to the support bow 550*e*; this arrangement provides additional stabilization of the folding cover assembly 530 when the folding cover assembly 530 is secured to the side rails 520*a*, 520*b* and will secure the folding cover assembly 530 to the side rail 520 if other attachments fail.

In describing preferred embodiments of the present invention in the description that follows, it will be appreciated that reference will be made either to the "driver's side" or "passenger side" or to the "front" or to the "rear" of the folding tonneau cover apparatus or portions thereof in a manner that is consistent with the orientation of the folding tonneau cover apparatus when it is secured to a vehicle as envisioned, so that the "rear" of a folding tonneau cover apparatus or portion thereof will be consistent with what is seen when one is looking at the rear of such a vehicle when the folding tonneau cover apparatus or portion(s) thereof are attached to such a vehicle as envisioned herein, or such portion thereof which is closer to the rear. The "driver's side" refers to the side corresponding to the side of the vehicle typically used by the driver to operate the vehicle in North America, and the "passenger side" refers to the side opposite the "driver's side". For clarity, the "length" of the folding tonneau cover apparatus, the folding cover assembly, the hinges, and the panels described herein, refers to a measurement of the "front" to "rear" dimension, since the pickup truck and the cargo box are typically longer in that direction. Similarly, "width" of the folding tonneau cover apparatus, the folding cover assembly, the hinges, and the panels described herein, generally refers to the "driver's side" to "passenger side" direction, since the pickup truck and the cargo box are typically shorter in that direction. However, these terminologies, that are used as a matter of convenience, are not intended to be limiting; the folding tonneau cover apparatus could be shorter in the "length" direction than in the "width" direction, for example. For other items such as support bows and sidebars, "length" has the normal meaning, referring to the longer dimension or to the dimension along an extruded shape, for example; any potential confusion in terminology can be eliminated by examination of the various Figures in the accompanying drawings.

Figure 3A:
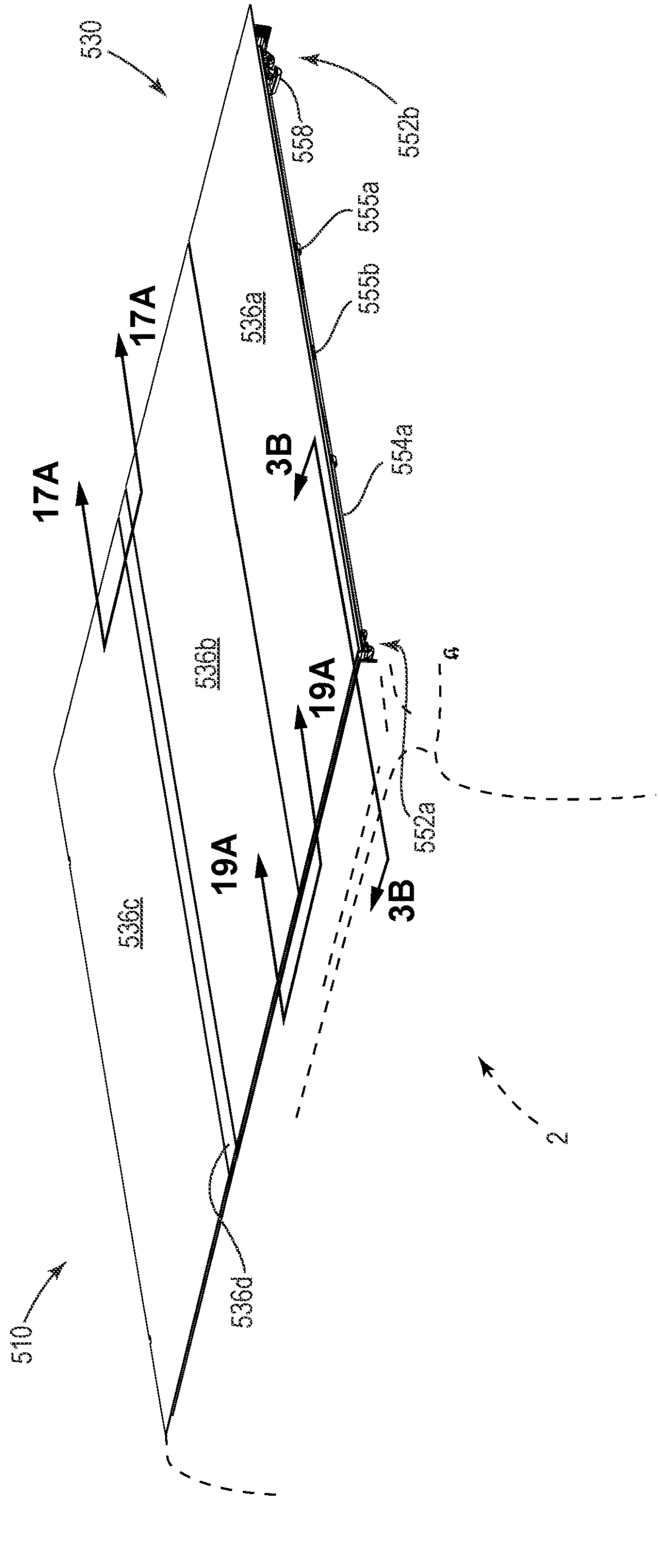
FIG. 3A is a rear perspective view of the folding tonneau cover apparatus of FIG. 1, illustrating additional details.
Figure 3B:
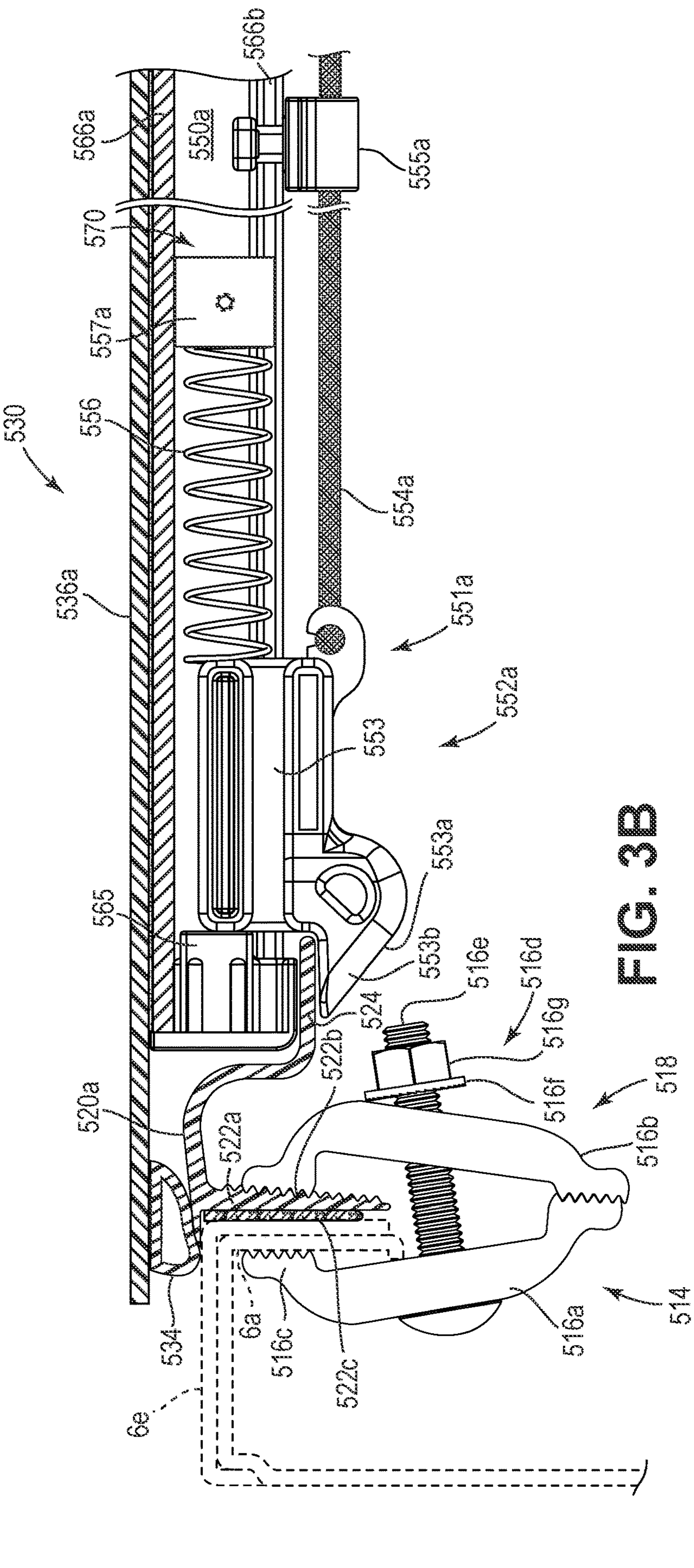
FIG. 3B is a partial section view as seen from the line 3B-3B of FIG. 3A illustrating the engaging portion of one of the latches on the rear support bow or support member of the rear panel engaged with the lip of the side rail and the side rail clamped to the sidewall of the pickup truck with a portion of the truck sidewall and sidewall cap shown in phantom.

Referring now to FIGS. 3A and 3B, the release cord 554*a* near the rear end of the rear panel 536*a* passes through cord guides 555, 555*a*, 555*b*. FIG. 3B is an enlarged partial section view of the driver's side end portion of the support bow 550*a* as indicated in FIG. 3A. The cord guides 555 are preferably molded and made of a strong polymer such as Nylon, which may be reinforced with fiberglass or other embedded material to strengthen the polymer. In alternate embodiments, the cord guides 555 can made of polymeric, metallic or ceramic materials using three-D printing methods or three-D etching methods or other additive or subtractive machining process. One of the standoffs 558 can be seen in FIG. 3A, and will be described in more detail later.

As seen in FIG. 3B, the latch 552 includes latch slide 553 having an engaging portion 553*b* which extends forward to engage the lip 524 of the side rail 520*a*, so as to secure the respective panel 530 to the side rail 520*a*. The latch slide 553 preferably includes a stiff polymer, composite, or metal, although other materials and combinations can be used. Preferably, the latch slide 553 includes fiberglass-reinforced nylon. The latch slide 553 is biased by a biasing member or spring 556 towards the side rail 520*a* so that the engaging portion 553*b* engages the side rail 520*a* to form a secured configuration in which the respective panel 530 is restricted from being lifted up from the cargo box 5; in this example, the spring 556 is a compression spring, but an extension spring, or an elastic element, or other known elements could alternatively be used to bias the latch slide 553 towards the side rail 520*a* so that the engaging portion 553*b* engages the side rail 520*a* so that the latch 552 is in the secured configuration. In this embodiment, the spring 556 is held between the latch slide 553 and a spring retainer assembly 557. The spring retainer assembly 557 is secured in the desired location in the support bow 550*a*. The side rails 520*a* and 520*b* preferably include extruded metal, and have a side rail engagement portion 522*a* (FIG. 3B), arranged to approximate a portion of the sidewall 6*a*, 6*b* of the pickup truck 2. The clamp 514 is shown in detail in FIG. 3B. The clamps 514 preferably include aluminum, although other metals or alloys or polymers or other composite materials can be used. Clamps 514 preferably have an outer member 516*a* and an inner member 516*b* which are tightened towards each other and held as an assembly on the sidewall 6*a* by a fastener assembly 516*d* which preferably includes a bolt 516*e*, a washer 516*f*, and a nut 516*g*. Preferably, inner member 516*b* has a clamp engagement portion 516*c* which, together with side rail engagement portion 522*a* of side rail 520*a*, aids in securing the clamps 514 in place on the side rail 520*a*. Preferably, the clamps 514 are arranged and tightened to secure the side rail 520*a* to the sidewall 6*a*, with a sidewall gasket 522*c* arranged between the side rail 520*a* and the sidewall 6*a* as illustrated. A bow end cap 565 is located at the end of the support bow 550*a*. A release cord 554 and a cord guide 555 are shown, and will be described in further detail herein. In the present example, the side rail engagement portion 522*a* is a generally vertically-oriented portion which configured to be located adjacent a similarly vertically-oriented portion of the sidewall 6*a*, 6*b*. In the example of FIG. 3B, a portion of the sidewall 6*a* of a cargo box 5 of a Chevrolet Silverado pickup truck is illustrated; however, other sidewalls of other cargo boxes of other pickup trucks and the like can be accommodated, by incorporating a side rail engagement portion 522*a* along the length of the side rails 520*a* and 520*b* that are appropriately configured and oriented. In this example, the cargo box 5 of the pickup truck 2 includes a sidewall cap 6*e*, but other cargo boxes 5 lack a sidewall cap. A sidewall 6*a* and sidewall cap 6*e* are similarly illustrated in subsequent drawings herein, including FIGS. 4B 6B, 7B, 8B and 9B. Preferably, the side rail engagement portion 522*a* has a side rail engagement feature 522*b*, such as ridges, knurling, surface patterns or textures, or other features which aid in securing the clamps 514. Preferably, a sidewall gasket 522*c* preferably made of polymeric material is located between the side rail engagement portion 522*a* and the sidewall 6*a*; the sidewall gasket 522*c* can provide protection against damage to the sidewall 6*a* by abrasion against the side rail 520*a*. Other flexible material can also be used. The sidewall gasket 522*c* can provide leak resistance to prevent water, dust, or other debris from passing into the cargo box 5 along the side rail engagement portion 522*a*. The side rail 520*a* has a flange or side rail lip 524 along the length of the side rail 520*a*. The side rail lip 524 provides support for the folding cover assembly 530. In addition, the side rail lip 524 provides a feature for engagement of the engaging portion 553*b* of the latches 552. The driver's side portion of the support bow 550*a* is shown in FIG. 3B; the other end of the support bow 550*a* (toward the passenger side) has a mirror-image configuration, with a latch 552 engaging side rail 520*b*, and side rail 520*b* being attached to sidewall 6*b* in a similar manner.

Figure 4A:
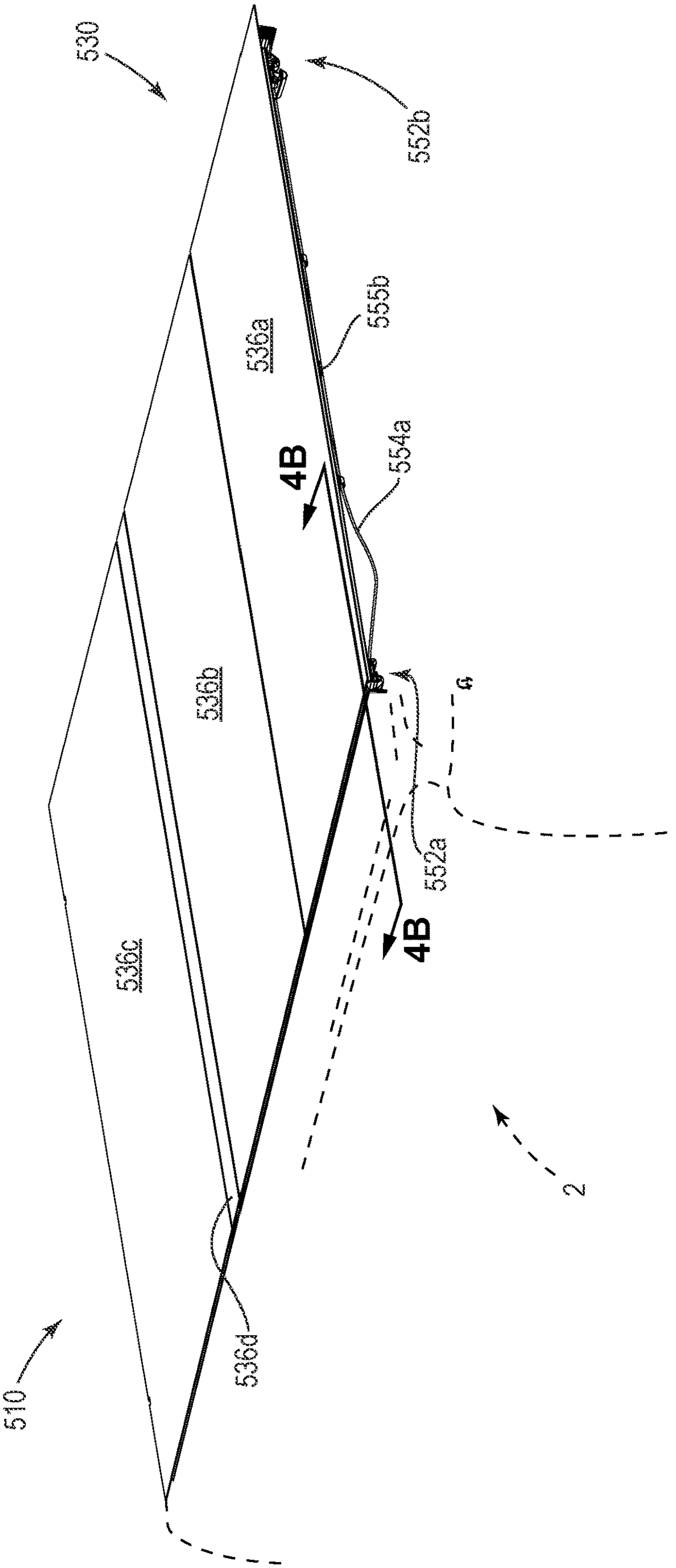
FIG. 4A is a rear perspective view of the folding tonneau cover apparatus of FIG. 1, with the release cord pulled to pull the latch against the bias of the spring to release the latch from the engagement with the side rail.
Figure 4B:
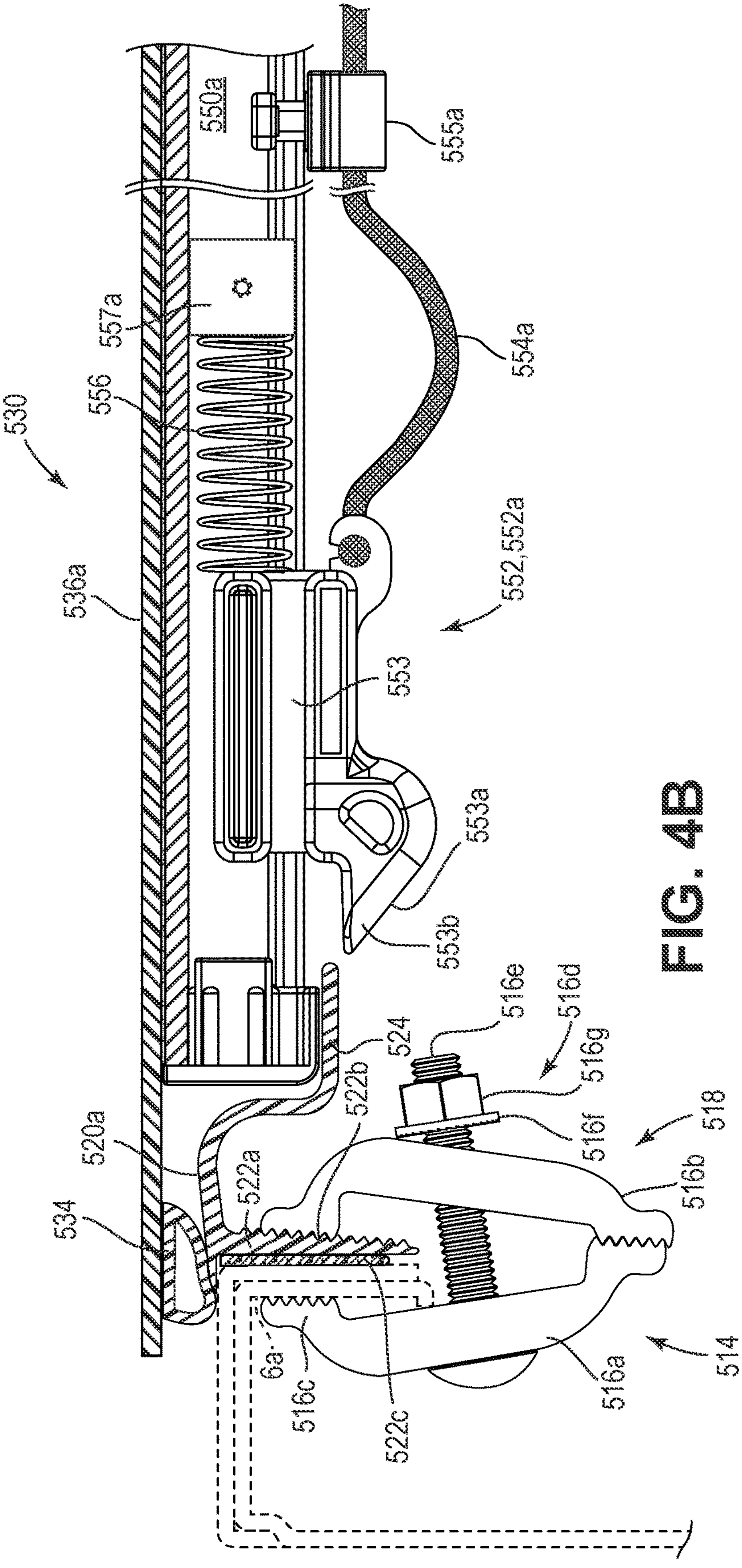
FIG. 4B is a is a partial section view as seen from the line 4B-4B of FIG. 4A similar to the view of FIG. 3B, but showing the arrangement with the engaging portion of the latch retracted from the closed position where the latch would be engaged with the lip of the side rail.

As illustrated in FIGS. 4A and 4B, when it is desired to release the latches 552 at the rear end of the rear panel 536*a*, the release cord 554*a* can be pulled, which will retract each of the latches 552 against the force of the respective biasing member or spring 556. Typically, the release cord 554*a* will be pulled as illustrated in FIG. 4A, by a driver (not shown) who has walked to the rear of the cargo box 5 and has opened the tailgate 6*d* and reaches in to access and pull the release cord 554*a*. When the release cord 554*a* is pulled, the engaging portion 553*b* of the latch 552 is retracted away from the lip 524 of the side rail 520*a* as shown in FIG. 4B, releasing the latch 552 from the side rail 520*a* and allowing the rear portion of the rear panel 536*a* to be lifted up from the side rail 520*a*. The cord guides 555 adjacent to the latches 552 help to maintain alignment of the ends of the release cord 554*a* so that the latches 552 are retracted in alignment with the support bow 550*a*, to avoid excessive friction, wear and potential binding. The driver's side portion of the support bow 550*a* is shown in FIG. 4B; the other end of the support bow 550*a* (toward the passenger side) has a mirror-image configuration, and when the release cord 554*a* is pulled, the latches 552 at both ends of the support bow 550*a* are retracted, so that the rear end of the rear panel 536*a* can be lifted up from both side rails 520*a* and 520*b*.

Referring now also to FIGS. 5A-5D, which illustrate a portion of the folding cover assembly 530 in schematic cross section views as indicated by the line 5A-5A in FIG. 2A, each of the hinges 544 (544*a*, 544*b*, and 544*c*) preferably includes the flexible hinge body 545*a* which is elongated and extends between the driver's side 3*a* and the passenger side 3*b* of the cargo box 5 when the folding cover assembly 530 is unfolded to cover the cargo box 5. The flexible hinge body 545*a* has a hinge longitudinal axis 545*b* which is oriented along the length of the hinge body 545*a*, and a hinge body profile 545*c*, which is the shape of a transverse vertical cross section taken perpendicular to the hinge longitudinal axis 545*b*. The hinge body profile 545*c* is preferably uniform along the hinge longitudinal axis 545*b* of the hinge body 545*a*. In embodiments having more than one flexible hinge 544, each of the flexible hinges 544 can have a similar hinge body profile 545*c*. Alternatively, the hinge body profile 545*c* of the flexible hinge bodies 545*a* can differ from the profile of at least one other of the flexible hinge bodies 545*a*.

The folding tonneau cover assembly 530 of the present invention may include one of several different hinge body embodiments 545*a*, 545*a*', 545*a*", 545*a*"' (see also FIGS. 17C-18F). The first embodiment 545*a*, shown in FIGS. 5A-5C and FIGS. 17A-17D, is a dual durometer hinge having a more flexible polymer material 547*c* making up the central portion 546*a* and a portion of the intermediate portion 546*d*, 546*e* adjacent to and on each side of the central portion 546*a*, and a more rigid or stiff polymer material 547*d* making up the side portions 546*b*, 546*c* and a portion of the intermediate portion 546*d*, 546*e* on each side of the central portion 546*a* of the first embodiment of the hinge body 545*a*. The first embodiment of the hinge body 545*a* will take more than one form depending on the format of the adhesive material attached to the hinge body for the purpose of sealing and sealing the hinge body 545*a* to the underside of the respective rigid panels 536 on either side of the respective hinge 544*a*, 544*b*, 544*c*. In reference to the first embodiment of the hinge body 545*a* shown in FIG. 5A, hinge body 545*a* is secured to the underside of the respective rigid panels 546 by an adhesive material 570*a* described elsewhere herein. In reference to the hinge body 545*a* shown in FIG. 5B, hinge body 545*a* is secured to the underside of the rigid panels 536*a*, 536*b*, respectively, by an adhesive member 571*a* described elsewhere herein. In reference to the hinge body 545*a* shown in FIG. 5C, the hinge body 545*a* is secured to the underside of the respective rigid panels 536*a*, 536*b* with a three-part adhesive member having first, second, and third layers 572*a*, 572*b*, 572*c*, as further described elsewhere herein. The first embodiment is also shown in FIGS. 17A-17D in the first adhesive format employing the adhesive material 570*a*.

Figure 17A:
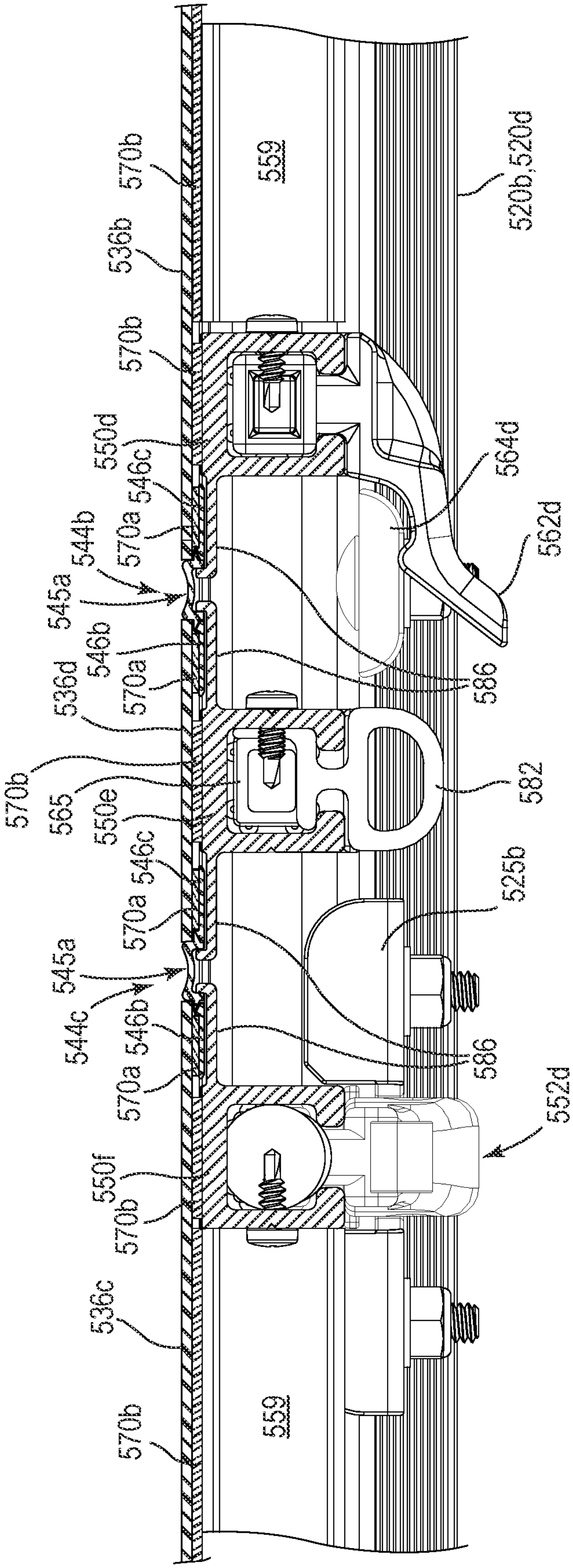
FIG. 17A is a cross sectional detail view as seen from the line 17A-17A in FIG. 3A, showing additional details in the vicinity of the side of the spacer panel, and showing two flexible hinges, a latch, a containment bracket, a hook, and a catch.
Figure 17B:
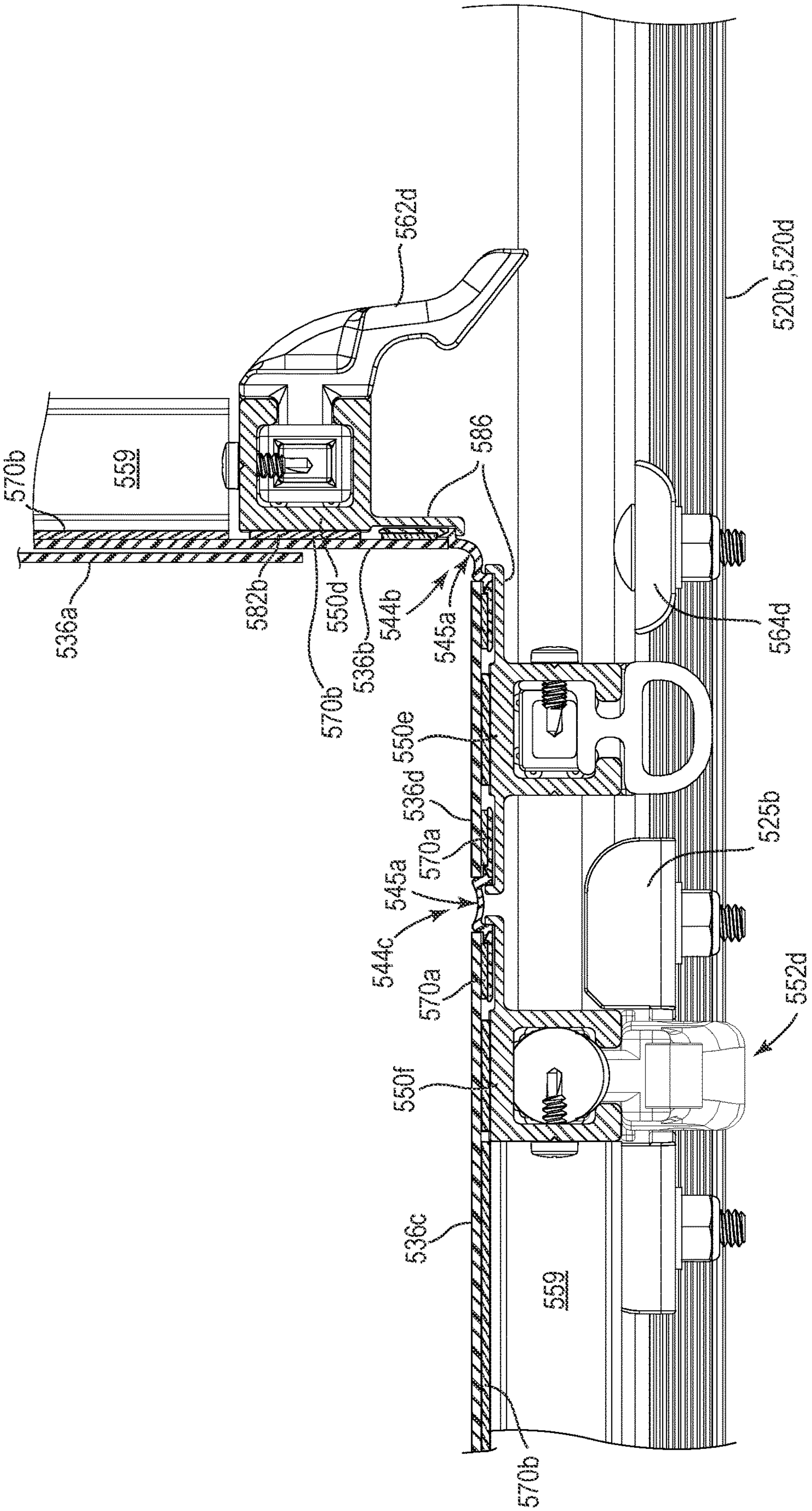
FIG. 17B is a cross sectional detail view similar to the view shown in FIG. 17A, but with one of the flexible hinges folded up from the side rail, similar to the configuration of FIG. 8A.
Figure 17C:
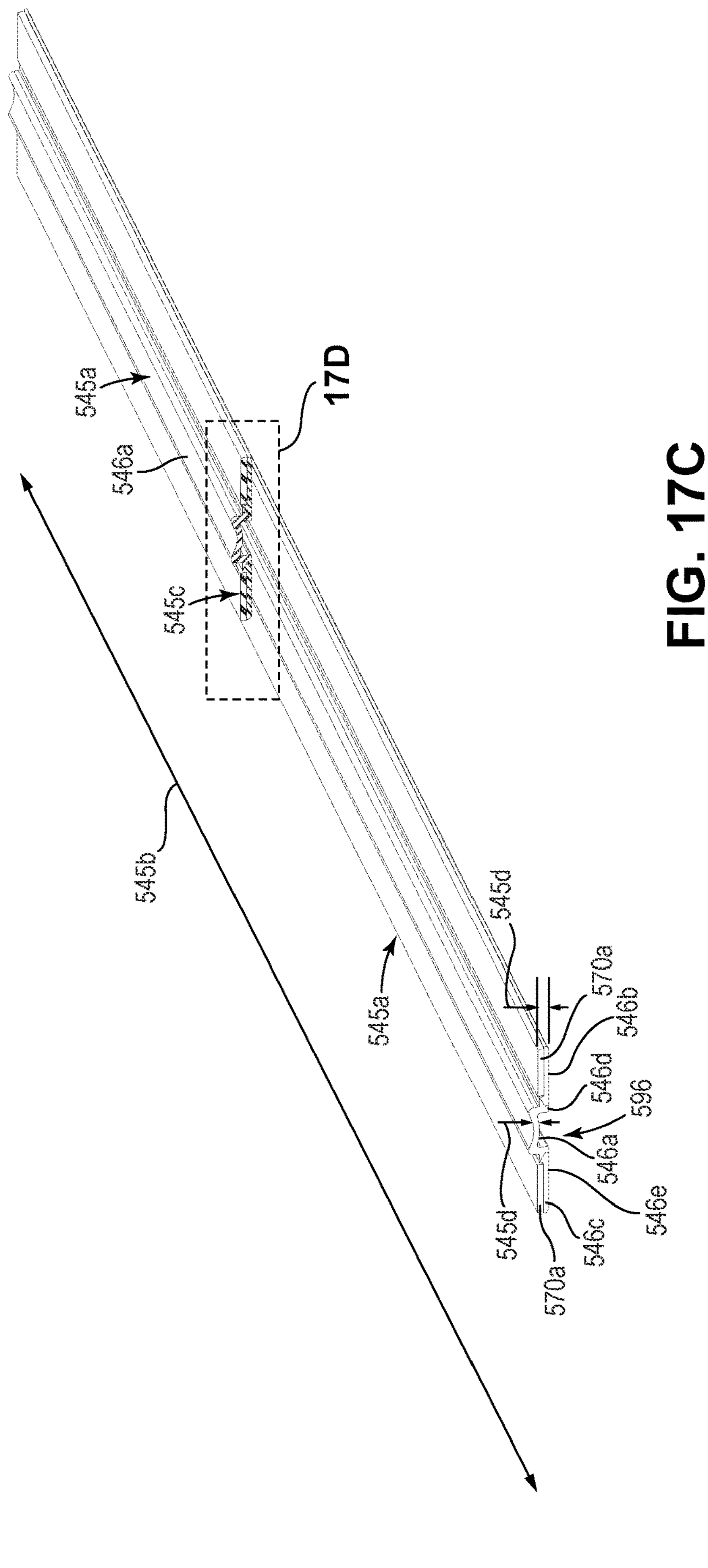
FIG. 17C is a perspective view of a hinge body of the folding cover assembly of FIG. 1 shown isolated and in an unfolded configuration.
Figure 17D:
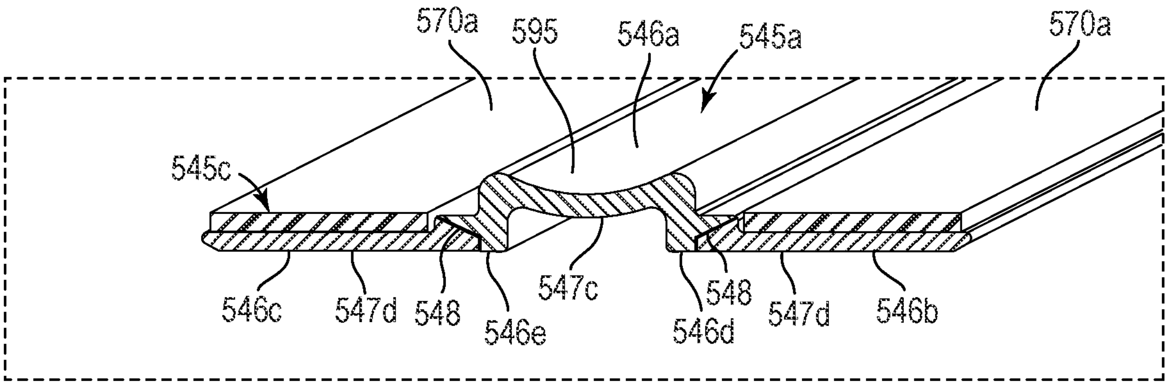
FIG. 17D is a perspective view of a portion of the hinge body including a transverse vertical cross sectional view of the hinge body taken from the dashed rectangle 17D shown in FIG. 17C.
Figure 17E:
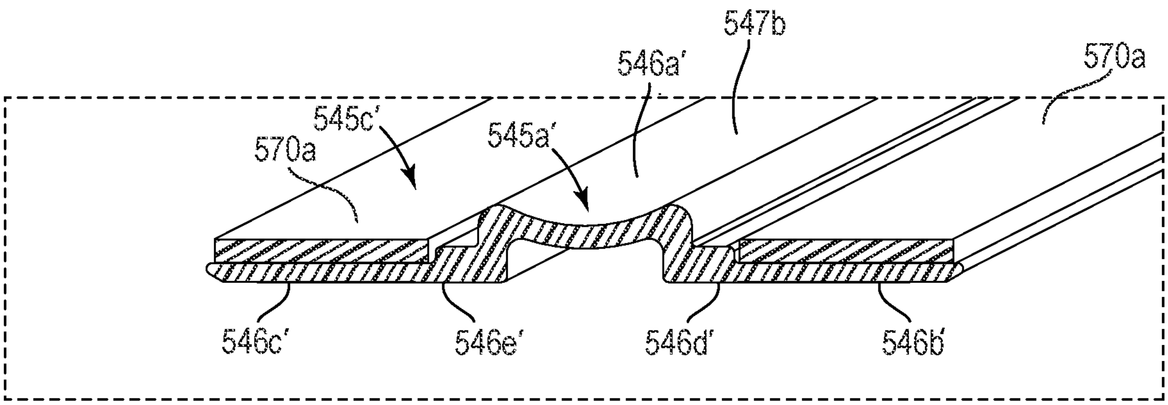
FIG. 17E is a view that is similar to the view shown in FIG. 17D, except that the hinge body that is shown is an alternate hinge body.
Figure 17F:
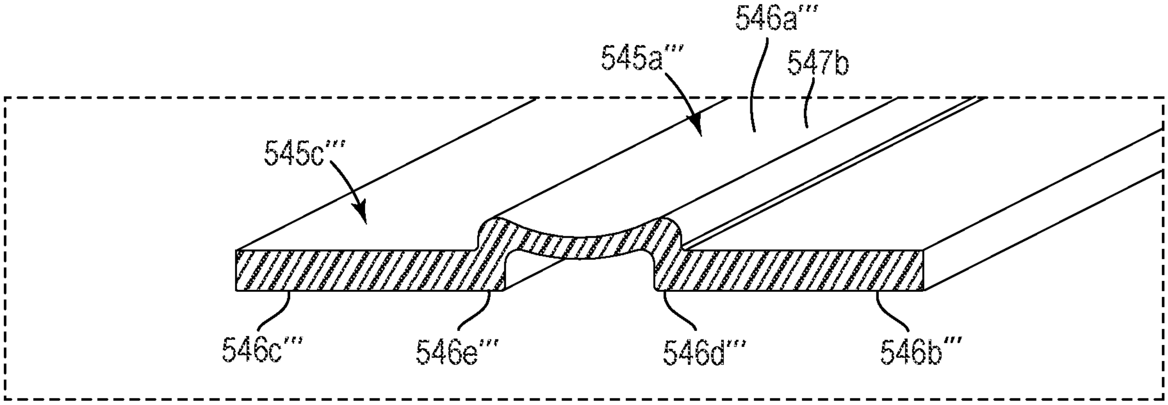
FIG. 17F is a view that is similar to the view shown in FIG. 17D, except that the hinge body that is shown is an alternate hinge body.

A further embodiment of the hinge body 545*a*' having similar adhesive 570*a* for sealing and securing the hinge body 545*a*' to the underside of rigid panels 536 but having only a single durometer polymer design is shown in FIG. 17E. This single-durometer embodiment of the hinge body 545*a*' is also shown in FIG. 18B, but with a different adhesive 571 format. A further embodiment of the hinge body 545*a*" is shown in FIG. 18C and is generally the same as the single-durometer hinge body 545*a*' shown in FIG. 18B, except that the central portion 546" of the hinge body 545*a*" does not include a concave upper surface like hinge body 545*a*', but has instead a flat central portion 546" in which water will not pool or run off along the length of the hinge body toward the sidewalls of the pickup truck 2. The hinge body 545*a*"' shown in FIGS. 17F-17H and FIGS. 18D-18F is also a single-durometer hinge body made of a flexible polymer material 547*c* and it does not need an adhesive member to secure it to the underside of the rigid panels, because the close proximity of the rigid panel 536 and the support bow 550, which has ha hinge support flange 586 having a flange lip 587, which cooperate to form a partial enclosure 592, described elsewhere herein, which will hold the hinge body 545*a*"' in place on each side of the hinge body 545*a*"' as shown in FIGS. 17G, 17H, and 18D-18F. The inventors have found that even when adhesive 570*a*, 5701*a*, or other adhesives or adhesive members as described herein are not required for securement of the hinge body 545*a*, 545*a*', 545*a*", 545*a*"' to the partial enclosure 592, such adhesives or adhesive members can be advantageously included to provide a seal between the hinge body and the respective adjacent panels 536 against intrusion by moisture or debris into the cargo box 5 when the folding cover apparatus 530 is unfolded and covering the cargo box 5.

The flexible hinge body 545*a*"' preferably includes a single polymer material 547*a*, and provides an effective barrier against influx of moisture, precipitation or debris into the cargo box 5 between the adjacent rigid panels 536 when the folding cover assembly 530 is unfolded and in place covering the cargo box 5. The hinge body polymer material 547*a* preferably includes an elastomeric polymer material 547*b* and more preferably includes a thermoplastic polymer. The elastomeric polymer material 547*b* is preferably extruded to form an elongated structure having the desired hinge body profile 545*c*. Examples of the preferable elastomeric polymer material 547*b* include Sarlink® TPE RV-2250D BLK 111 thermoplastic elastomer and Sarlink® TPV 5765B thermoplastic vulcanizate, both available from Teknor Apex Company, Pawtucket, RI.

Each flexible hinge body 545*a* preferably includes the two side portions 546*b* and 546*c*, and the central portion 546*a* located between the two side portions 546*b* and 546*c*; each flexible hinge body 545*a* preferably includes the two intermediate portions 546*d* and 546*e*, each one of the intermediate portions 546*d* and 546*e* located between the central portion 546*a* and one of the two respective side portions 546*b* and 546*c*. The central portion 546*a*, side portions 546*b* and 546*c*, and intermediate portions 546*d* and 546*e* of the flexible hinge body 545*a* preferably extend along the length of the flexible hinge body 545*a*, and the hinge thickness 545*d* of the central, side, and intermediate portions 546*a*-546*e* together at least partially define the hinge body profile 545*c*. Each of the two side portions 546*b* and 546*c* is preferably secured to a respective adjacent rigid panel 536. When it is desired to fold up the folding tonneau cover assembly 530, one of the adjacent rigid panels 536 is lifted up and folded towards the other of the adjacent rigid panels 536, and the central portion 546*a* bends to function as a hinge as further described herein.

Figure 5A:
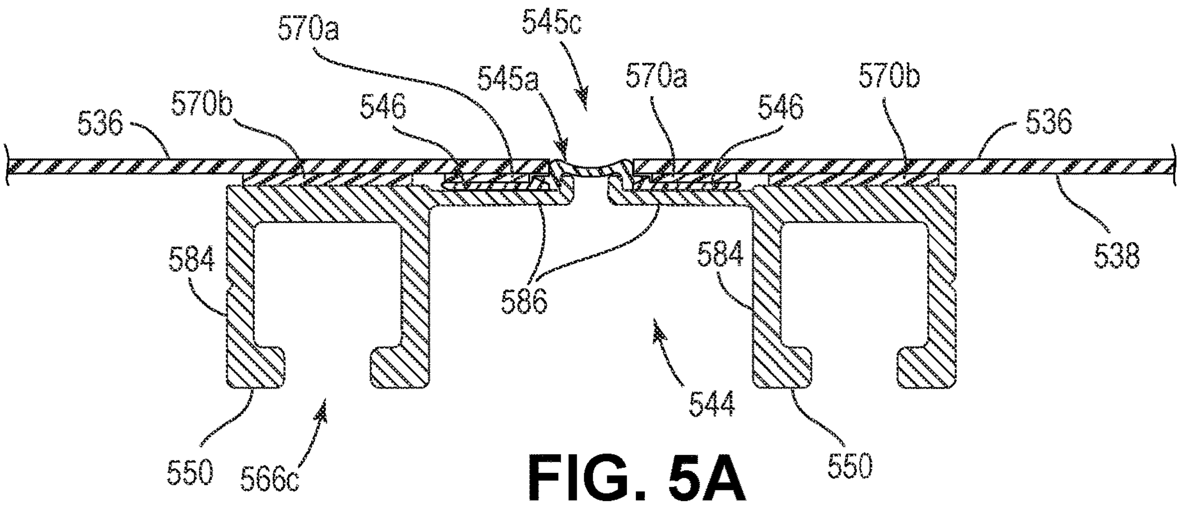
FIG. 5A is schematic illustration of a vertical cross section along a front-to-back plane as seen from the line 5A-5A of FIG. 2A of one of the hinges of the folding tonneau cover assembly of FIG. 1 showing the basic configuration with the hinge unfolded.
Figure 5B:
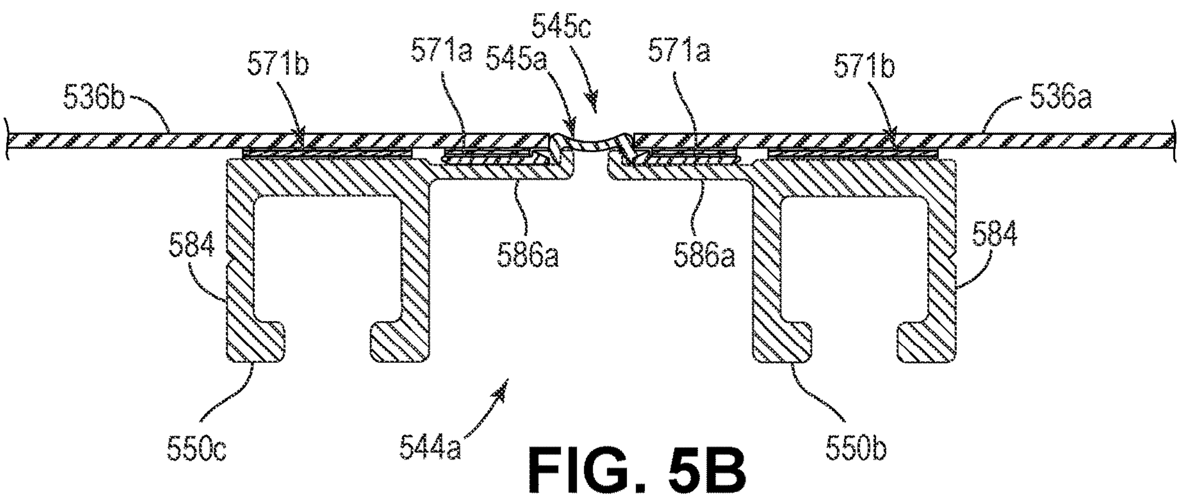
FIG. 5B is a schematic illustration similar to FIG. 5A of a transverse vertical cross section along a front-to-back plane showing an alternate embodiment of one of the hinges of the folding tonneau cover assembly of FIG. 1 showing the hinge unfolded.
Figure 5C:
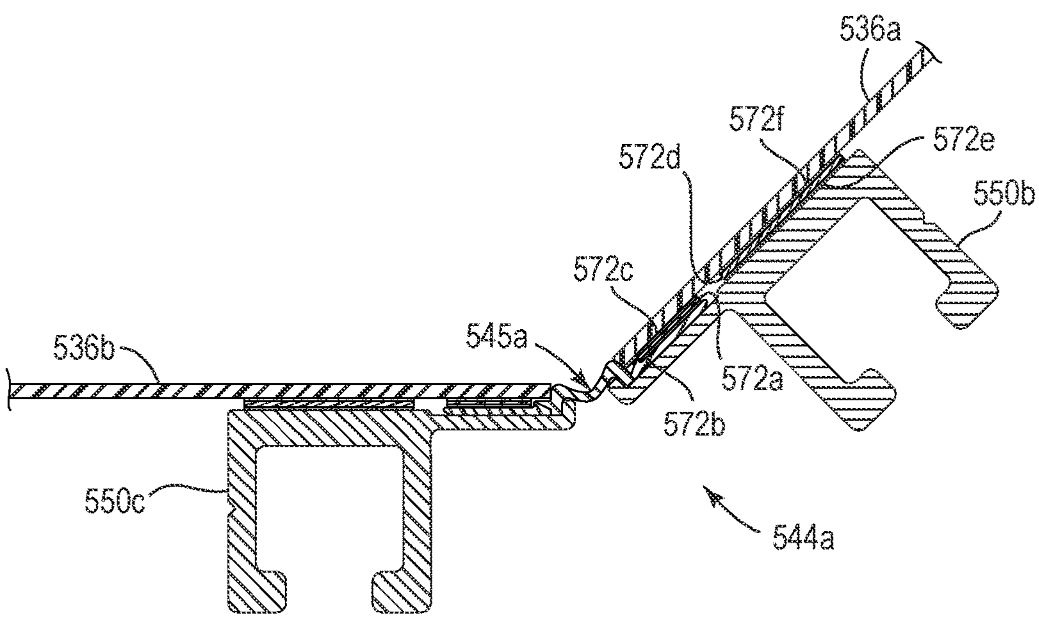
FIG. 5C is a schematic illustration showing the hinge of FIG. 5B, but with the hinge folded at about 45 degrees from the unfolded orientation shown in FIG. 5B.

In some embodiments, such as schematically illustrated in FIGS. 5A-5C, the flexible hinge body 545*a* includes more than one polymeric material such as those described herein; for example, the flexible hinge body 545*a* may include a softer or lower-durometer elastomeric polymer material 547*c* and a harder or higher-durometer elastomeric polymer material 547*d*. The central portion 546*a* preferably includes the softer elastomeric polymer material 547*c*, and the side portions 546*b* and 546*c*, which are secured to the rigid panels 536 as stated, preferably include the harder elastomeric polymer material 547*d*. In such embodiments, a transition or mixing of the materials preferably occurs in the intermediate portions 546*d* and 546*e*. This arrangement preferably provides a structure with the central portion 546*a* being more flexible in bending than the intermediate portions 546*d* and 546*e* and the side portions 546*b* and 546*c*, so that bending of the flexible hinge body 545*a* preferentially occurs in the central portion 546*a*, although some flexing and bending can occur in other portions of the flexible hinge 544 in addition to the central portion. This arrangement is schematically illustrated in FIG. 5C, which shows the hinge illustrated in FIG. 5B somewhat bent. In the drawings, which illustrate embodiments of the hinge body 545*a* having more than one polymeric material, the intermediate portions 546*d* and 546*e* have a transition between polymeric materials schematically indicated by a partially diagonal line in the drawings. As just described, the transition between materials may be gradual with a mixing of the polymeric materials in the intermediate portions, which will generally occur during either a molding process or an extrusion process, either of which could be used to manufacture a dual-durometer hinge body, so, for that reason, the line is not intended to define a precise sudden transition, but rather just generally indicate that the respective intermediate portion includes a transition between the different polymeric materials that have different durometers. Depending on the process and mixing of materials during fabrication of the hinge body, the transition can be more sudden or more gradual. The transition between polymeric materials will generally be located in the respective intermediate portions 546*d* and 546*e* as indicated by the schematic transition line shown in these portions.

For example, in one preferred embodiment, the central portion 546*a* includes the softer elastomeric polymer material 547*c*, one example of which is Sarlink® TPE RV-2250D BLK 111 thermoplastic elastomer, and the side portions 546*b* and 546*c* include the harder or higher-durometer elastomeric polymer material 547*d*, one example of which is Sarlink® TPV 5765B thermoplastic vulcanizate. These materials can be extruded together to form the disclosed structure, with a mixing of these materials occurring in the intermediate portions 546*d* and 546*e*. The thickness 545*d* of the various portions of the flexible hinge body 545*a* can also affect the bending properties, but the variation of polymeric materials as just described can be useful in facilitating bending of the hinge 544 in the central portion 546*a*, which in use is located between the adjacent panels 536, and in facilitating securement of the side portions 546*b* and 546*c* to the adjacent panels 536.

While forming the flexible hinge body 545*a* by extrusion of thermoplastic elastomers such as those listed above is preferred, other materials and fabrication methods can be utilized. For example, the flexible hinge body 545*a* can include a structure fabricated by molding or other additive or subtractive manufacturing process. The flexible hinge body 545*a* may have additional material added, such as reinforcing fibers or filaments (not shown) adhered to or incorporated into the flexible hinge body 545*a*, including cloth-inserted, cloth-reinforced, fiberglass-reinforced, and fiber-reinforced polymer materials. The hinge body polymer material 547*a* can include a vinyl material, natural or synthetic rubber or other flexible polymeric material, EPDM rubber, neoprene rubber, nitrile rubber, latex, silicone rubber, polyurethane material, or other polymer materials known in the art, or combinations of materials. The flexible hinge body 545*a* preferably includes a flexible material that can withstand deformation without failure due to cracking or breakage to allow bending of the hinge 544 to fold up the folding cover assembly 530, and that is moisture-resistant to avoid leakage into the cargo box 5.

As stated above, adhesive 570*a* is preferably located between each side portion 546*b* and the respective rigid panel 536 as illustrated in FIG. 5A to protect against passage of debris or precipitation into the cargo box 5; the adhesive 570*a* can also aid in securement of the flexible hinge 544 to the respective rigid panel 536. The adhesive 570*a* can include known adhesives and sealant materials which can be used to protect against passage of debris or precipitation between the rigid panel 536 and the respective flexible hinge 544 or to secure the flexible hinge 544 to the respective rigid panel 536. In some preferred embodiments, the adhesive 570*a* includes a double-sided adhesive tape 571*a*, which preferably includes an acrylic foam material 572*a*, with adhesive layer 572*b* arranged on one side of the acrylic foam material 572*a*, and adhesive layer 572*c* arranged on the other side of the acrylic foam material 572*a*, for example. For example, the double-sided adhesive tape 571*a* can be 3M 5933 from 3M, St. Paul, MN ("thermal adhesive tape"), the adhesive layer 572*b* includes heat-activated adhesive and an adhesive layer 572*c* includes pressure-sensitive adhesive which may be protected by a release strip (not shown) until it is desired to activate the pressure-sensitive adhesive layer 572*c*. Preferably, the adhesive layer 572*b* (in this example, heat-activated adhesive) is aligned with the flexible hinge body 545*a* while the heat-activated adhesive is activated to adhere the double-sided adhesive tape 571*a* to the flexible hinge body 545*a*; the flexible hinge body 545*a* together with the attached double-sided adhesive tape 571*a* is subsequently aligned with the rigid panel 536 and the release strip is removed. Preferably, after the adhesive layer 572*c* is aligned with the panel 536, the flexible hinge body 545*a* is attached to the rigid panel 536 by activating the adhesive layer 572*c* (in this example, pressure-sensitive adhesive). The adjacent rigid panel 536 is similarly attached to the flexible hinge body 545*a* with double-sided adhesive tape 571*a* forming the structure of hinge 544 illustrated in FIG. 5B. The flexible hinge body 545*a* allows the hinge 544 to take a flat or open configuration as illustrated in FIGS. 5A and 5B, or to flex or bend as illustrated in FIGS. 5C, 7C, and other figures herein, providing a flexible hinge 544 that allows the folding cover assembly 530 to fold as illustrated throughout the Figures and described herein, with rigid panels 536 folding up and rotating towards other rigid panels 536 as shown. Preferably, the flexible hinge body 545*a* is adhered to the respective bottom or underside 538 of the rigid panels 536 (specifically, the underside 538*a*-538*d* off respective adjacent panels of 536*a*-536*d* as described herein) of the folding cover assembly 530 as shown. In the preferred arrangements discussed herein, the hinges 544 are securely attached to the respective rigid panels 536 and are sealed to prevent water or debris from entering the cargo box through the folding cover assembly 530 at the hinges 544, and are generally impervious to environmental factors such as precipitation, wind, and temperatures to which a typical cargo box 5 would be exposed.

The support bows 550 are also schematically illustrated in FIGS. 5A-5C. The support bows preferably include a bow main portion 584 including a generally C-shaped channels with a bow upper portion 585 configured for attachment to the bottom surface 538 of the respective panel 536 and oriented with a channel opening 566*c* at the bottom. The support bows 550 which are located at the flexible hinges 544 preferably include the hinge support flange 586, 586*a*, 586*b*; the support bows which are located at the flexible hinges 544 preferably also include the flange lip 587, 587*a*, 587*b*.

As stated above, the support bows 550 are secured to the respective panel 536. The support bows 550 are preferably located at the bottom surface 538 of the respective panel 536, and near the front edge 541*b* or rear edge 541*c* of the respective panel 536. The support bows 550 are preferably secured to the bottom surface 538 of the respective panel 536 by an adhesive 570*b*, which may include a layer or coating of adhesive or a double-sided adhesive tape 571*b*, for example. Alternatively, a thermal or hot-melt or chemically activated adhesive, or a mechanical attachment, or a weld, or a combination, can be used to attach the support bows 550, to the respective panels 536. The double-sided adhesive tape 571*b* preferably includes an acrylic foam material 572*d* with adhesive layer 572*e* arranged on one side of the acrylic foam material 572*d* and adhesive layer 572*f* arranged on the other side of the acrylic foam material 572*d*, for example. Preferably, the adhesive 570*b* includes a double-sided adhesive tape 571*b* such as 3M CV62F from 3M, St. Paul, MN ("pressure adhesive tape"), wherein the double-sided adhesive tape 571*b* is an acrylic foam tape having an adhesive layer 572*e* which includes pressure-sensitive adhesive and having an adhesive layer 572*f* which includes pressure-sensitive adhesive which may be protected by a release strip (not shown) until it is desired to activate the pressure-sensitive adhesive, adhesive layer 572*f*. Preferably, the adhesive layer 572*e* (in this example, pressure-sensitive adhesive) is aligned with and adhered to the upper surface 566*d* of the support bow 550 to adhere the double-sided adhesive tape 571*b* to the support bow 550; the support bow 550 together with the attached double-sided adhesive tape 571*b* is subsequently aligned with the panel 536 and the release strip is removed. Preferably, the adhesive layer 572*f* is then aligned with the panel 536 and the support bow 550 is attached to the respective panel 536 by activating the adhesive layer 572*f* (in this example, pressure-sensitive adhesive). While the arrangement just described is a preferred configuration, any of the adhesive layers just described can include heat-activated adhesive or pressure-sensitive adhesive, and the acrylic foam material 572*a*, 572*d* is also preferable but not always required. For example, in alternative configurations, a single layer of adhesive could be used, similar to the arrangement schematically illustrated in FIG. 5A. Other pressure-activated acrylic adhesive foam tape can be used, such as Lamatek 5357 from Lamatek, Inc., West Deptford, NJ The sidebars or handles 559 are preferably also attached to the bottom surface or underside 538 of the respective panels 536, preferably in a similar manner as that just described for the support bow 550. Although adhesive 570*b* can be applied at selected portions of the length of the support bow 550 or the sidebar 559, adhesive 570*b* is preferably applied along substantially the entire length of the support bow 550 and the sidebar 559, to enhance stability and to minimize unwanted vibrations. Alternatively, the sidebars 559 and support bows 550 can be attached to the panels 536 with adhesives such as glue, or with fasteners, or spot welds.

Figure 5D:
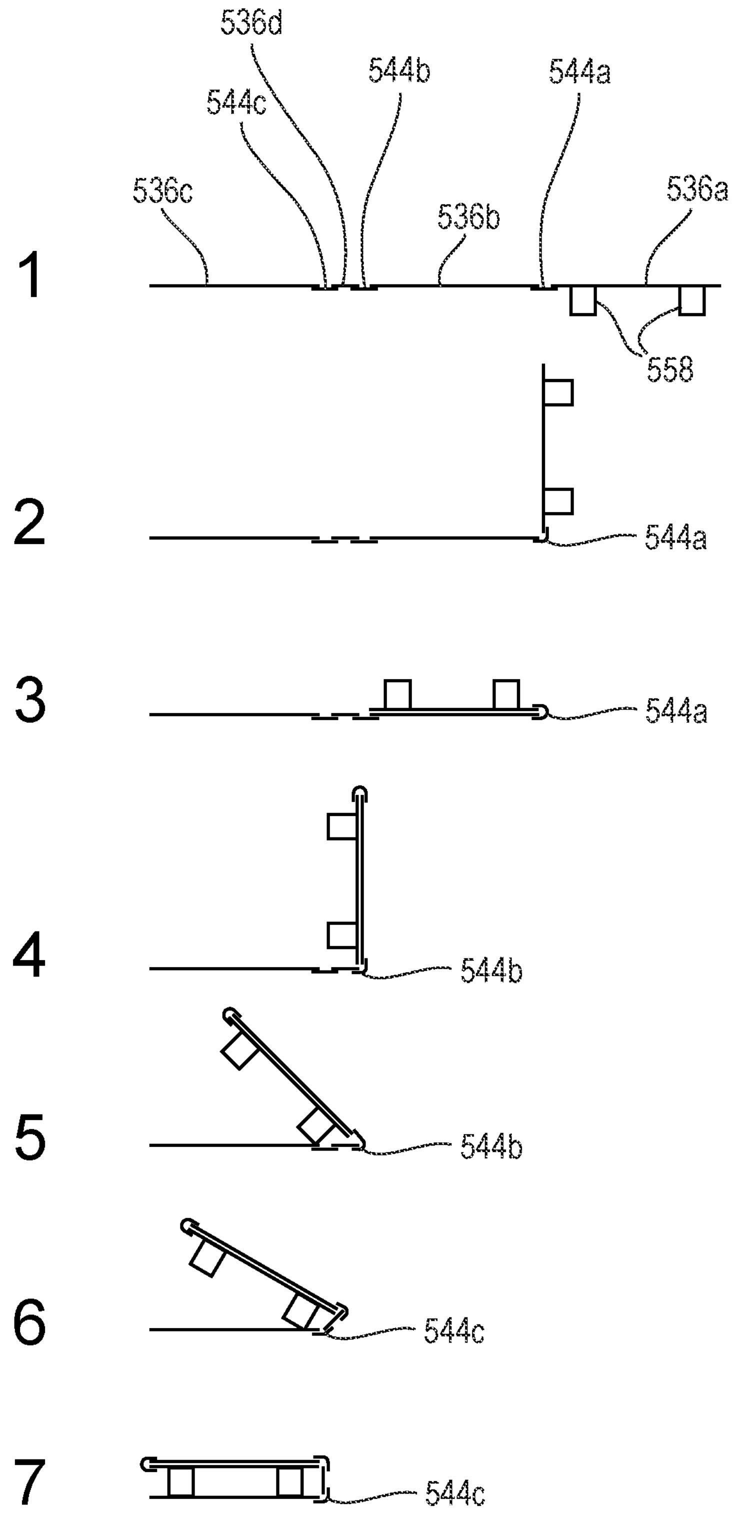
FIG. 5D is a schematic illustration showing the general steps and configurations of the folding tonneau cover assembly of FIG. 1 as it is folded up into a fully folded orientation.

In some apparatus and methods embodiments, the folding cover assembly 530 folds in stages or steps; a preferred embodiment is schematically illustrated in FIG. 5D. In this embodiment, starting from the unfolded or closed configuration of the folding cover assembly 530 (configuration 1), the hinge 544*a* flexes to allow the rear panel 536*a* to fold up, passing through 90 degrees (configuration 2) towards the middle panel 536*b*, and fold over onto the middle panel 536*b* (configuration 3). The hinge 544*b* flexes to allow the middle panel 536*b* (together with the rear panel 536*a* which is folded onto the middle panel 536*b*) to fold up, passing through 90 degrees (configuration 4) towards the spacer panel 536*d*, passing through a point at which standoffs 558 contact the front panel (configuration 5). The hinge 544*b* flexes back towards 90 degrees as the hinge 544*c* flexes to allow the spacer panel 536*d* to fold up, and continue to fold over (together with the rear panel 536*a* which is folded onto the middle panel 536*b*, and the middle panel 536*b*) towards the front panel 536*c* (configuration 6), until the folding cover assembly 30 is folded up (configuration 7). Note that FIG. 5D is a schematic overview of the general folding of the folding cover assembly 530; the various configurations are further illustrated and described elsewhere herein in greater detail.

Figure 5E:
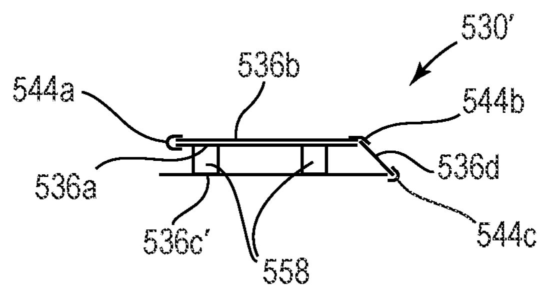
FIG. 5E is a further schematic illustration showing an alternate configuration of the fully folded orientation of the tonneau cover assembly of FIG. 5D.

An alternate configuration of an alternate folding cover assembly 530' folded up is schematically illustrated in FIG. 5E. In some embodiments, the front panel 536*c'* is noticeably longer than panels 536*a* and 536*b*. In some embodiments, the spacer panel 536*d* is oriented approximately vertically when the folding cover assembly 530 is folded up, and the front panel 536*c* simply extends farther frontward than the middle panel 536*b* and the rear panel 536*a*. In the example illustrated in FIG. 5E, the spacer panel 536*d* is correspondingly longer to accommodate the lengths of the panels 536*a*, 536*b*, and 536*c'* as illustrated. In this case, the spacer panel 536*d* is noticeably non-vertical when the folding cover assembly 530' is folded up. The alternate folding cover assembly 530' also preferably includes corresponding flexible hinges 544*a*, 544*b*, 544*c* and standoffs 558.

Figure 5F:
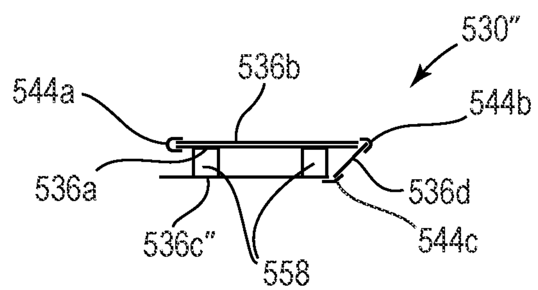
FIG. 5F is a further schematic illustration similar to that of FIG. 5E, but showing yet another alternate configuration of the fully folded tonneau cover assembly.

Another alternate configuration of an alternate folding cover assembly 530" folded up is schematically illustrated in FIG. 5F, similar to the illustration of FIG. 5E. In some embodiments, the front panel 536*c"* is noticeably shorter than panels 536*a* and 536*b*. In some embodiments, the spacer panel 536*d* is oriented approximately vertically when the folding cover assembly 530 is folded up, and the middle panel 536*b* and the rear panel 536*a* simply extend farther frontward than the front panel 536*c*. In the example illustrated in FIG. 5F, the spacer panel 536*d* is correspondingly longer to accommodate the lengths of the panels 536*a*, 536*b*, and 536*c"* as illustrated. In this case, the spacer panel is noticeably non-vertical when the folding cover assembly 530" is folded up. The alternate folding cover assembly 530" also preferably includes corresponding flexible hinges 544*a*, 544*b*, 544*c* and standoffs 558.

Figure 14A:
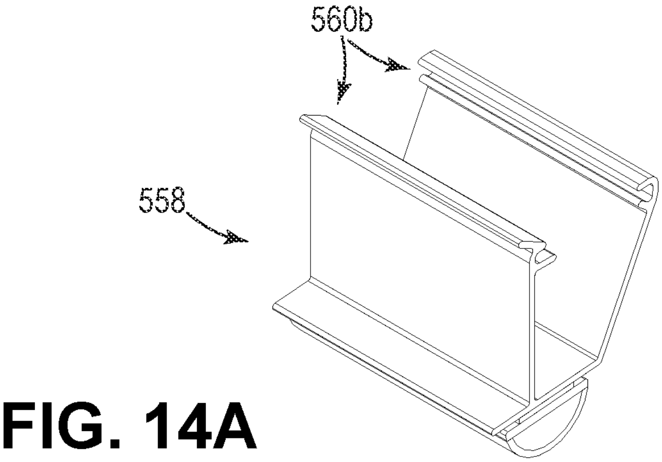
FIG. 14A is a perspective view illustrating a standoff.
Figure 14B:
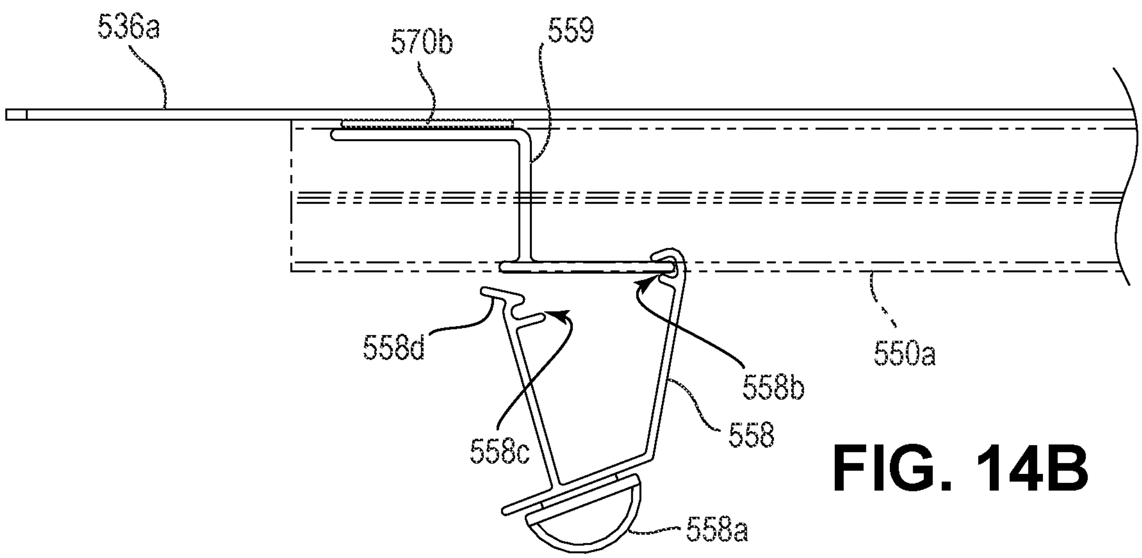
FIG. 14B is a side view illustrating the standoff of FIG. 14A with longitudinal groove 558*b* engaged with a sidebar 559 secured to the bottom surface of the rear panel 536*a* and showing the support bow in phantom.
Figure 14C:
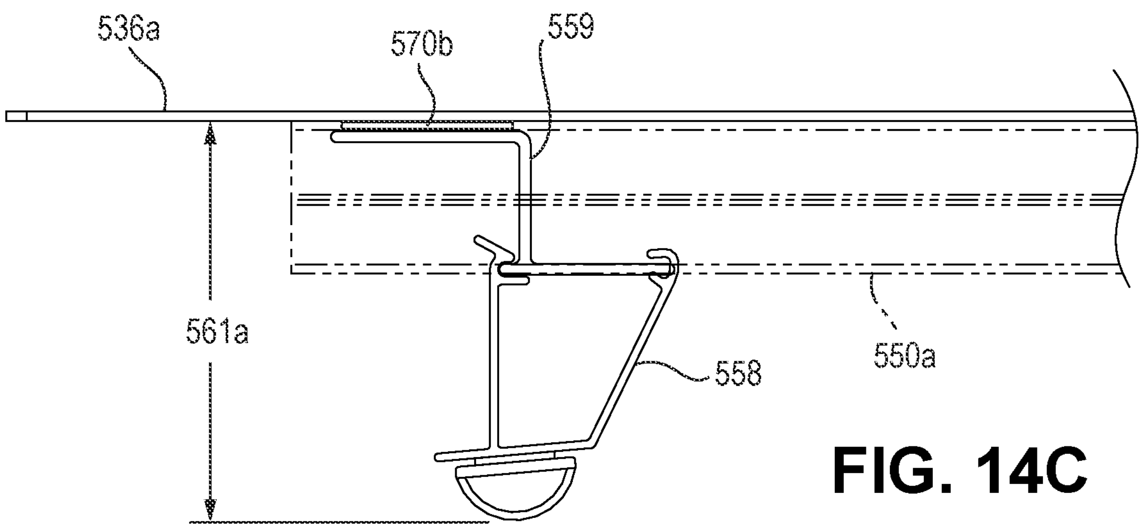
FIG. 14C is a side view illustrating the standoff of FIGS. 14A and 14B pivoted upward so that the longitudinal groove 558*c* is engaged with the sidebar as shown and illustrating a standoff distance between a top of the protective pad on the standoff and the top surface of the rear panel and showing the support bow in phantom.

In the examples illustrated in FIGS. 5E and 5F, the spacer panel 536*d* can be oriented preferably from about zero to about 60 degrees from a vertical orientation; the orientation is determined by the various lengths of the panels 536 and a standoff distance 561*a* (see FIG. 14C). When the cover assembly is in the fully folded position, the top surface 537*d* of the spacer panel 536*d* can stand generally at an angle of from about 30 to about 150 degrees to the top surface 537*c* of the front panel 536*c*, preferably from about 40 to about 140 degrees to the top surface 537*c* of the front panel 536*c*; more preferably from about 50 to about 130 degrees to the top surface 537*c* of the front panel 536*c*; even more preferably from about 60 to about 120 degrees to the top surface 537*c* of the front panel 536*c*, and even more preferably from about 80 to about 100 degrees to the top surface 537*c* of the front panel 536*c*, generally depending upon the length of the front panel 536*c*, which can be varied in various embodiments of the cover assembly. In the preferred embodiment shown in FIG. 1, the top surface 537*d* of the spacer panel 536*d* will generally reside at an angle of about 90 degrees to the top surface 537*c* of the front panel 536*c*.

Figure 20A:
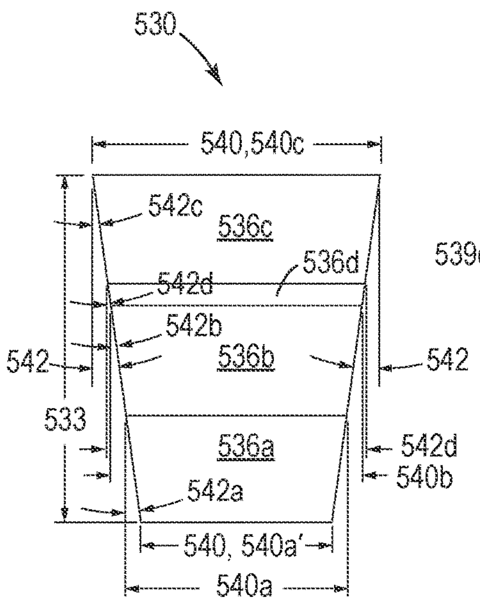
FIG. 20A is a schematic illustration of the folding tonneau cover apparatus of FIG. 1, as configured for a cargo box having angled sides.
Figure 20B:
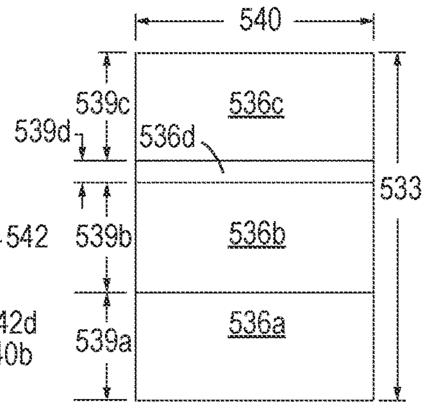
FIG. 20B is a schematic illustration of the folding tonneau cover apparatus of FIG. 1, as configured for a cargo box having parallel sides.

Referring now also to FIGS. 20A-20B, the length 539*a* of the rear panel 536*a* is preferably somewhat smaller than the length 539*b* of the middle panel 536*b* so that the rear panel 536*a* does not interfere with the hinges 544*b*, 544*c*, support bow 550*e*, or other nearby structures when the folding cover assembly 530 is folded up or unfolded. If the length 539*a* of the rear panel 536*a* is too much smaller than the length 539*b* of the middle panel 536*b*, the standoffs 558 attached to the support bow 550*a* will be farther removed from the respective edges of the front panel 536*c* and the middle panel 536*b* and may not provide the desired support in the folded up configuration. More preferably, the length 539*a* of the rear panel 536*a* is from about 0.25 inch to about 8 inches smaller than the length 539*b* of the middle panel 536*b*. Still more preferably, the length 539*a* of the rear panel 536*a* is from about 0.5 inch to about 2 inches smaller than the length 539*b* of the middle panel 536*b*. Even more preferably, the length 539*a* of the rear panel 536*a* is about 0.75 inch smaller than the length 539*b* of the middle panel 536*b*.

Figure 10A:
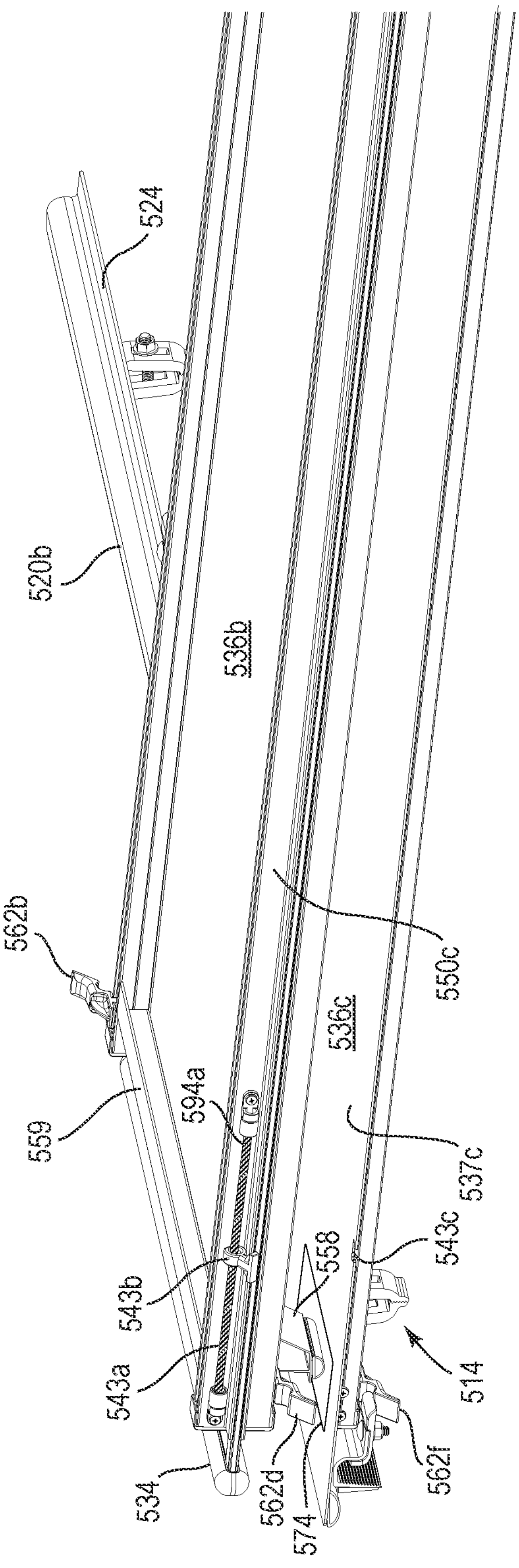
FIG. 10A is a front perspective view of the folding tonneau cover apparatus of FIG. 1 wherein the rear panel together with the middle panel and the spacer panel have been pivoted or rotated forward so that the middle panel and the rear panel are resting on the top surface of the front panel as in FIG. 9A and showing the alternate protective film on the front panel engaged by the standoff 558 which rests on the protective film 574.
Figure 10B:
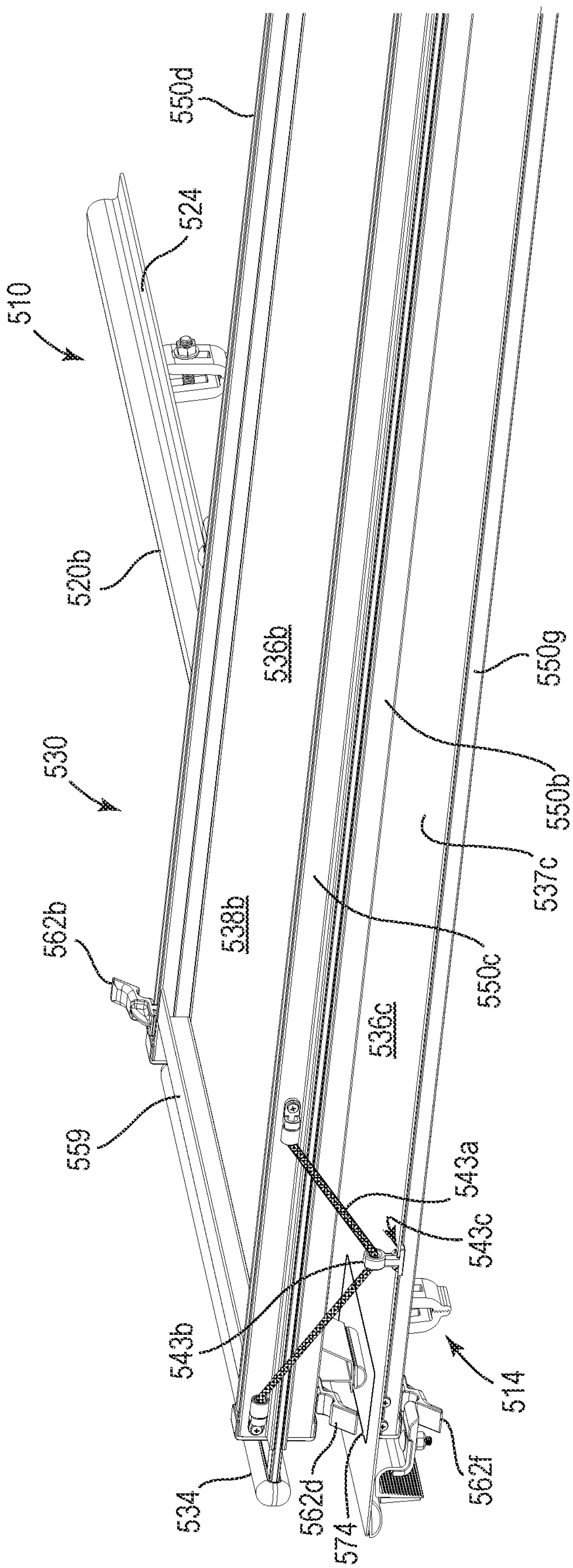
FIG. 10B is a front perspective view of the folding tonneau cover apparatus of FIG. 1 similar to the view of FIG. 10A, but showing the storage strap 543*a* pulled down and a strap bracket 543*b* engaged with a bracket slot 543*c* on the front edge of the front panel, securing the folding tonneau cover assembly 530 in the fully folded up configuration.
Figure 10C:
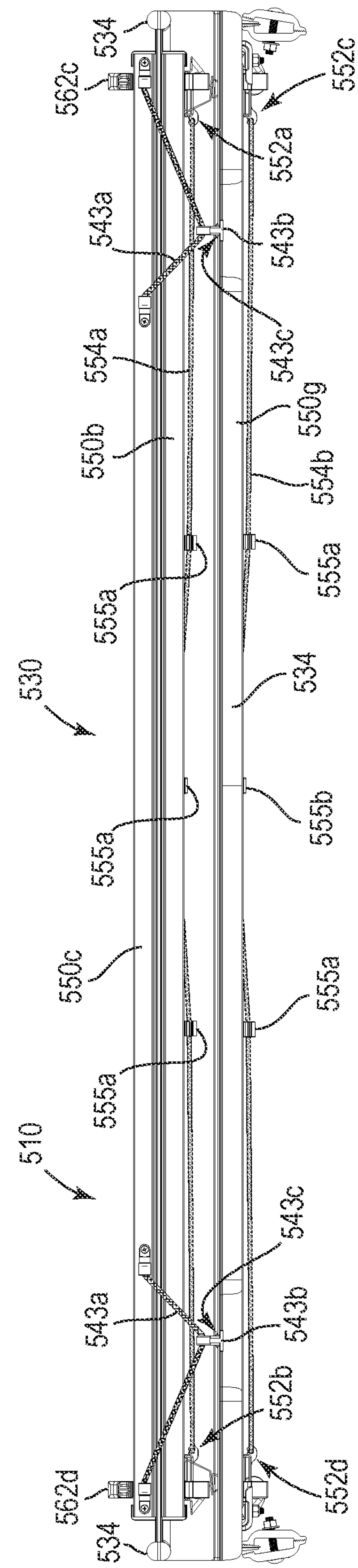
FIG. 10C is a front view of the folding tonneau cover apparatus of FIG. 1 showing a storage strap toward each side of the folded tonneau cover, with each storage strap pulled down and a strap bracket engaged with a bracket slot on the front edge of the front panel, securing the folding tonneau cover in the folded up configuration.
Figure 10D:
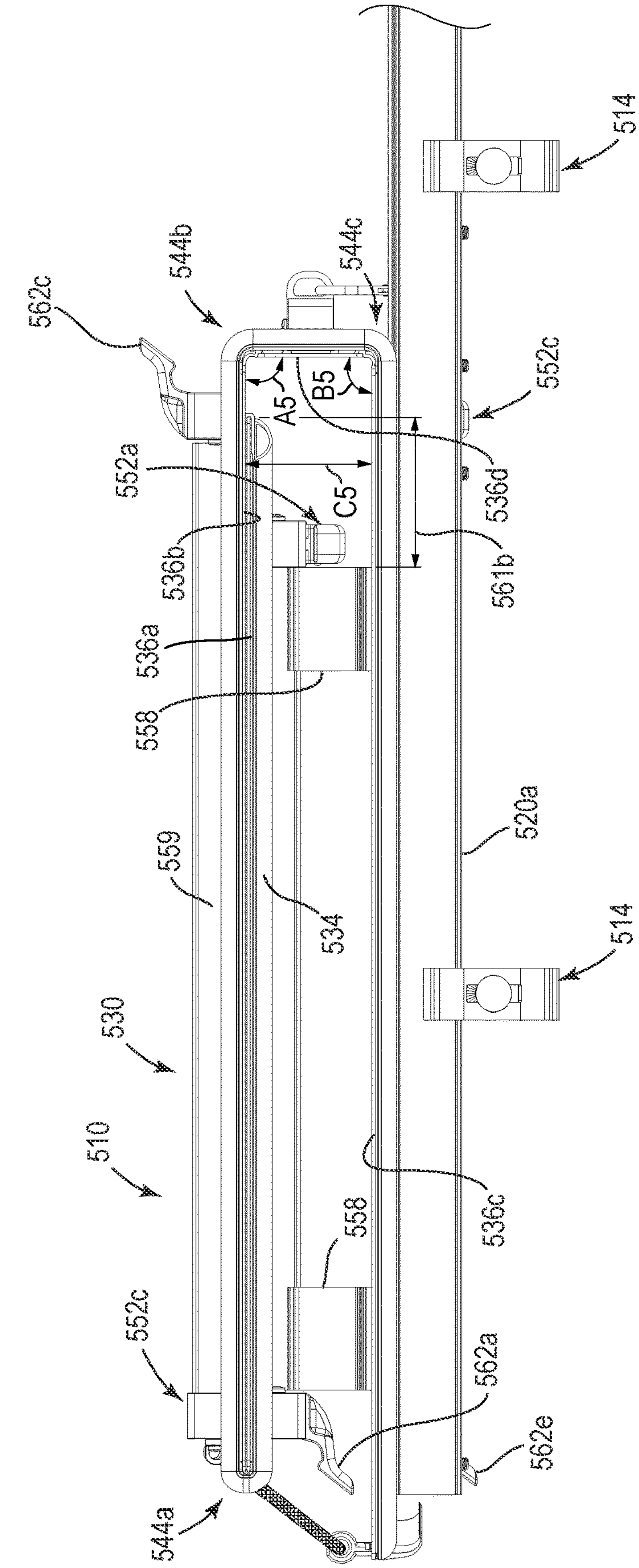
FIG. 10D is a side view from the driver's side of the folding tonneau cover apparatus of FIG. 1 in the configuration of FIG. 10C further showing the fully folded configuration and schematically illustrating the flexible hinges in the folded-up configuration, with one of the storage straps being visible and a strap bracket engaged with a bracket slot on the front panel, securing the folding tonneau cover in the fully folded up configuration.

Preferably, the length 539*d* of the spacer panel 536*d* is large enough to accommodate the hinges 544*b* and 544*c* without interference with the support bow 550*e*, but is preferably not significantly larger than required to accommodate the hinges 544*b*, 544*c* and support bow 550*e* so that the stored profile of the folding cover assembly 530 is minimized, and the folded profile when the folding cover assembly 530 is folded up but remains attached to the side rails 520*a*, 520*b* as illustrated in FIG. 10D is minimized, which is believed to reduce any tendency for the folding cover assembly 530 to catch wind when the folding cover assembly 530 is folded up but remains attached to the side rails 520*a*, 520*b* and when the truck 2 is in motion. In some embodiments, the length 539*d* of the spacer panel 536*d* is no greater than about one-third the lengths 539*a*, 539*b*, 539*c* of the other respective panels 536*a*, 536*b*, 536*c*.

Preferably, the length 539*b* of the middle panel 536*b* is somewhat smaller than the length 539*c* of the front panel 536*c* so that the driver or operator 8 can easily grasp the storage straps 543*a* and strap brackets 543*b*, when the folding cover assembly 530 is in the folded up configuration illustrated in FIG. 10A, to hook the strap brackets 543*b* in the bracket slots 543*c* at the front of the front panel 536*c* as described below and illustrated in FIG. 10A-10D. If the length 539*c* of the front panel 536*c* is longer than the length 539*b* of the middle panel 536*b*, the folded up configuration of the folding cover assembly 530, as illustrated in FIG. 10D, will cover a larger portion of the cargo box 5 so that there is a more limited opening to the cargo box 5 when the folding cover assembly 530 is folded up and secured on the truck 2 as illustrated in FIG. 10D. More preferably, the length 539*b* of the middle panel 536*b* is from about 0.25 inch to about 6 inches smaller than the length 539*c* of the front panel 536*c*. Still more preferably, the length 539*b* of the middle panel 536*b* is from about 1 inch to about 3 inches smaller than the length 539*c* of the front panel 536*c*. Even more preferably, the length 539*b* of the middle panel 536*b* is about 1.733 inches smaller than the length 539*c* of the front panel 536*c*.

Figure 6A:
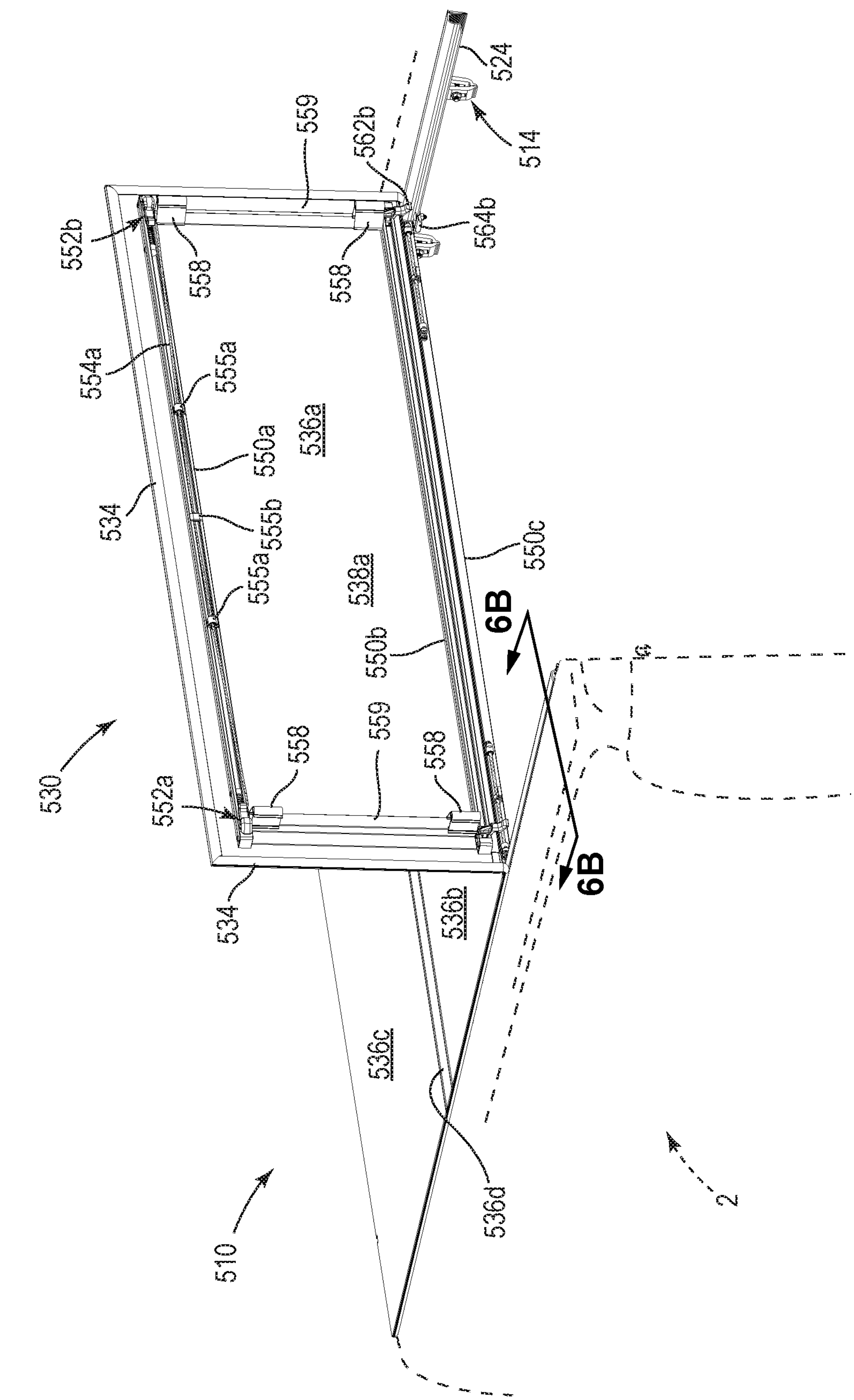
FIG. 6A is a rear perspective view of the folding tonneau cover apparatus of FIG. 1 wherein the latches on the rear panel have been released to allow the rear panel to be lifted up in a first step toward folding up the tonneau cover assembly.
Figure 6B:
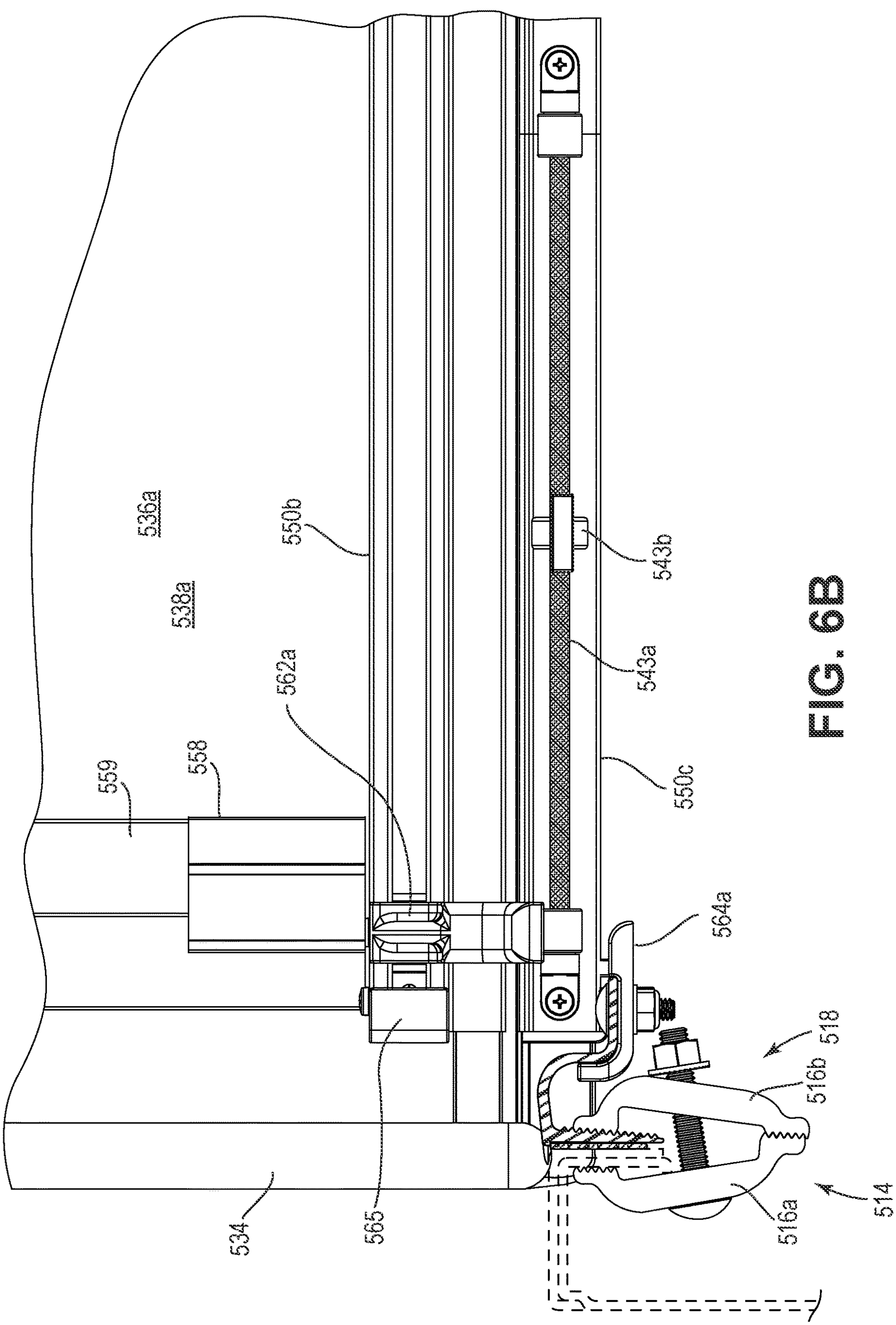
FIG. 6B is a partial section view as seen from line 6B-6B of FIG. 6A showing the hook or swing latch 562*a* near the driver's side end portion of the rear support bow of the middle panel retracted from catch 564*a* secured to the lip of the side rail.

Once the latches 552 at both ends of the support bow 550*a* are retracted as shown in FIGS. 4A and 4B and described above, the rear end of the rear panel 536*a* can be lifted up from both side rails 520*a* and 520*b*, bending the hinge 544*a* as illustrated in FIGS. 6A and 6B. As the rear panel 536*a* is lifted up, hooks 562 at the ends of the support bow 550 at the front of the rear panel 536*a* disengage from the respective catches 564; specifically, hook 562*a* disengages from catch 564*a* attached to side rail 520*a*, and hook 562*b* disengages from catch 564*b* attached to side rail 520*b*. The structure and function of the hooks 562 and catches 564 are described in further detail elsewhere herein (see, for example, FIG. 19A).

Figure 7A:
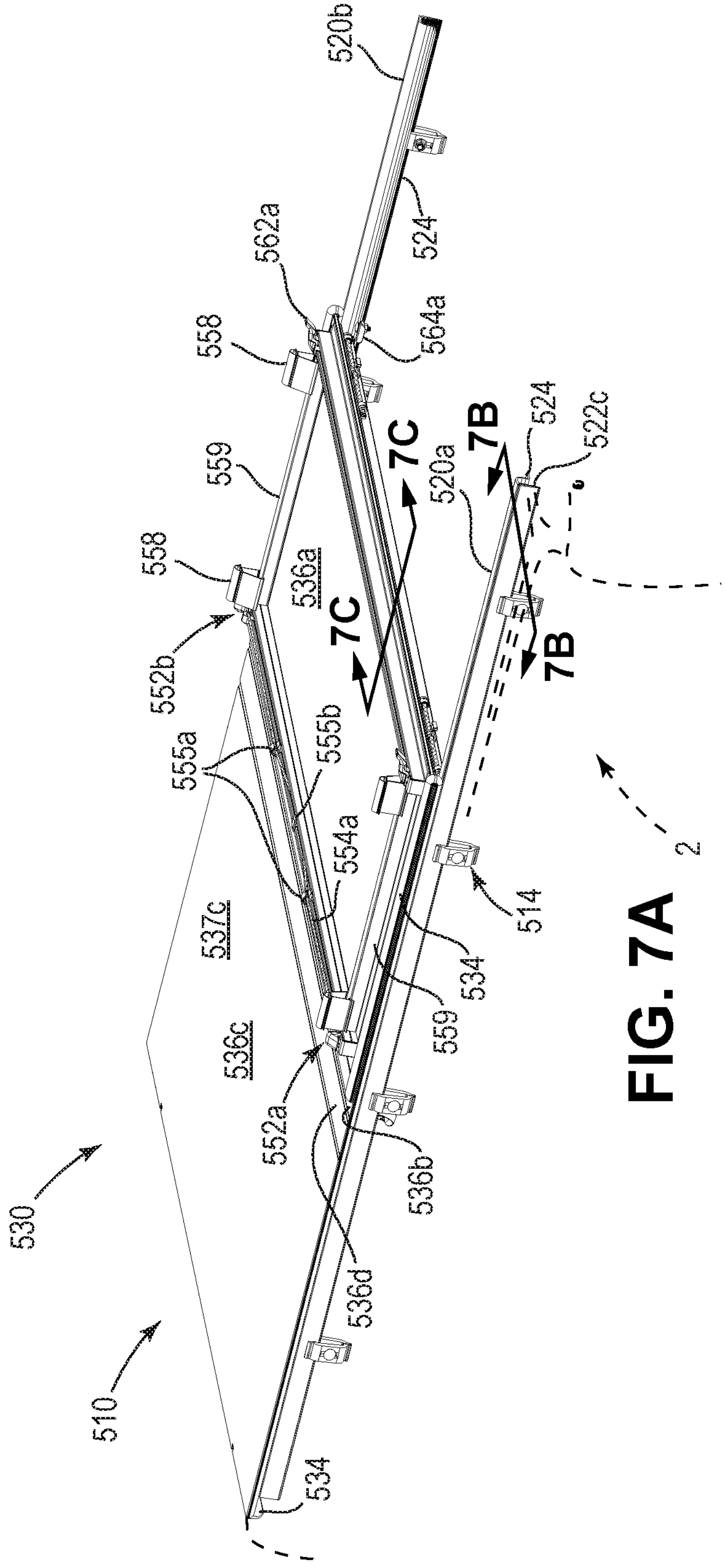
FIG. 7A is a rear perspective view of the folding tonneau cover apparatus of FIG. 1 wherein the rear panel has been rotated forward onto the middle panel in a further step toward folding up the cover assembly.
Figure 7B:
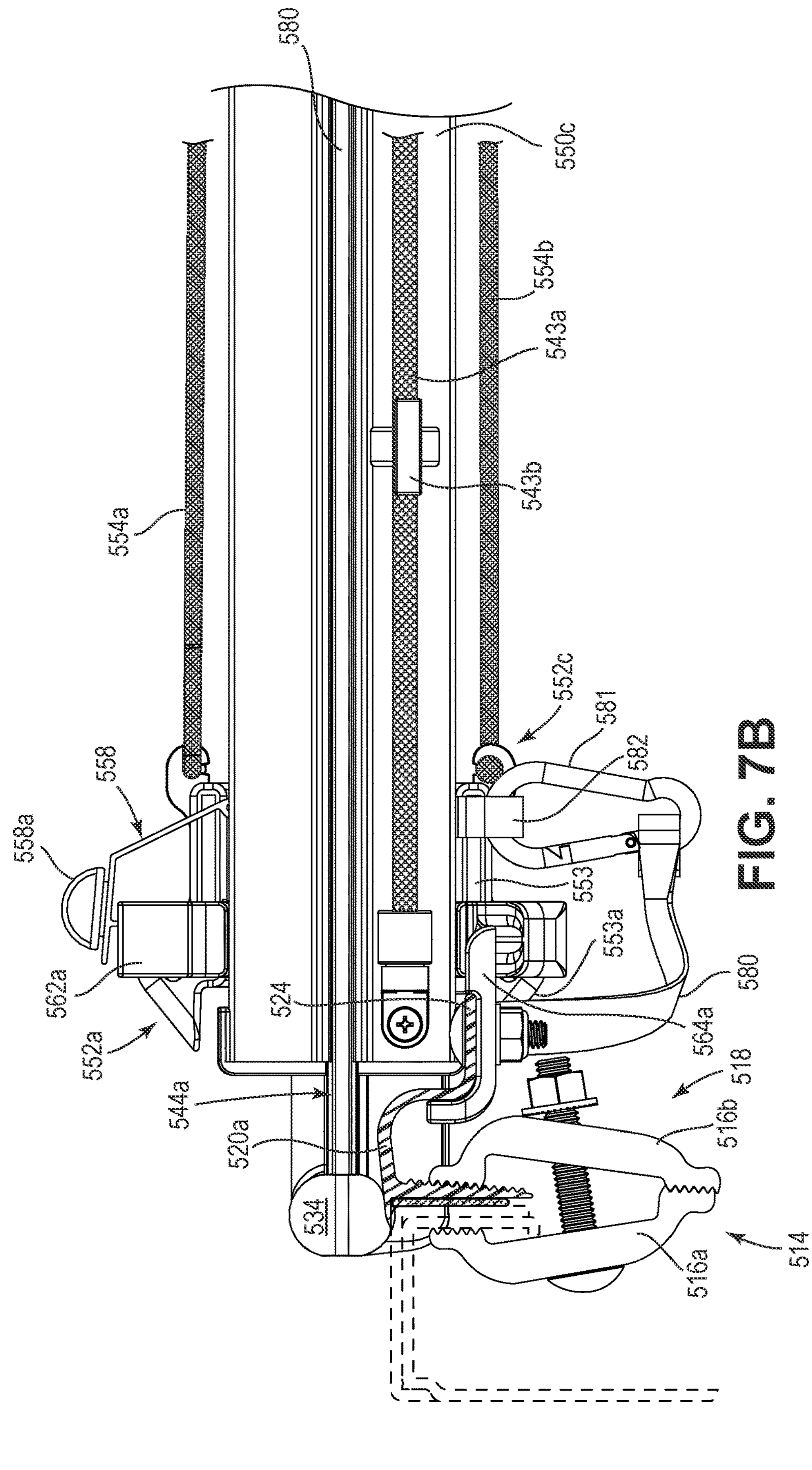
FIG. 7B is a partial section view as seen from the line 7B-7B of FIG. 7A showing the engaging portion of the swing latch 562*a* disengaged from the catch 564*a;*
Figure 7C:
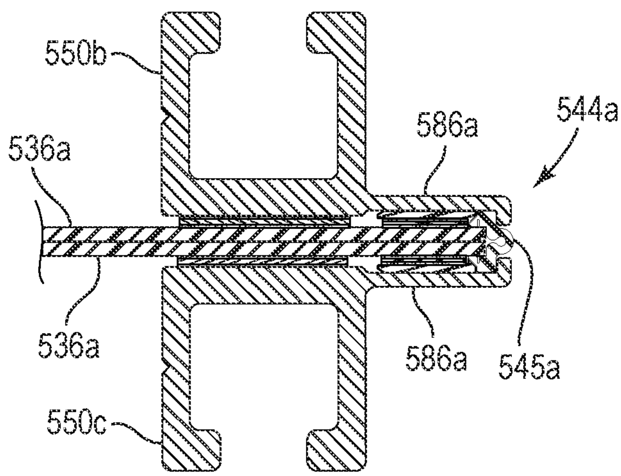
FIG. 7C is a schematic illustration similar to that shown in FIG. 5C showing the alternate hinge body of FIG. 5B but with the hinge body folded about 180 degrees as shown in the configuration illustrated in FIGS. 7A-7B.

The rear panel 536*a* is rotated further, onto the middle panel 536*b* as illustrated in FIGS. 7A and 7B. At this point, the middle panel 536*b* can be lifted from the side rails 520*a* and 520*b*, with the middle panel 536*b* (together with the rear panel 536*a* which is folded onto the middle panel 536*b*) pivoting upwards and frontwards, bending the hinge 544*b*. A portion of the folding cover assembly 530 in schematic cross section view similar to the views of FIGS. 5A and 5B is illustrated in FIG. 7A, which shows the hinge 544*a* folded in the configuration of FIGS. 7A and 7B.

Figure 8A:
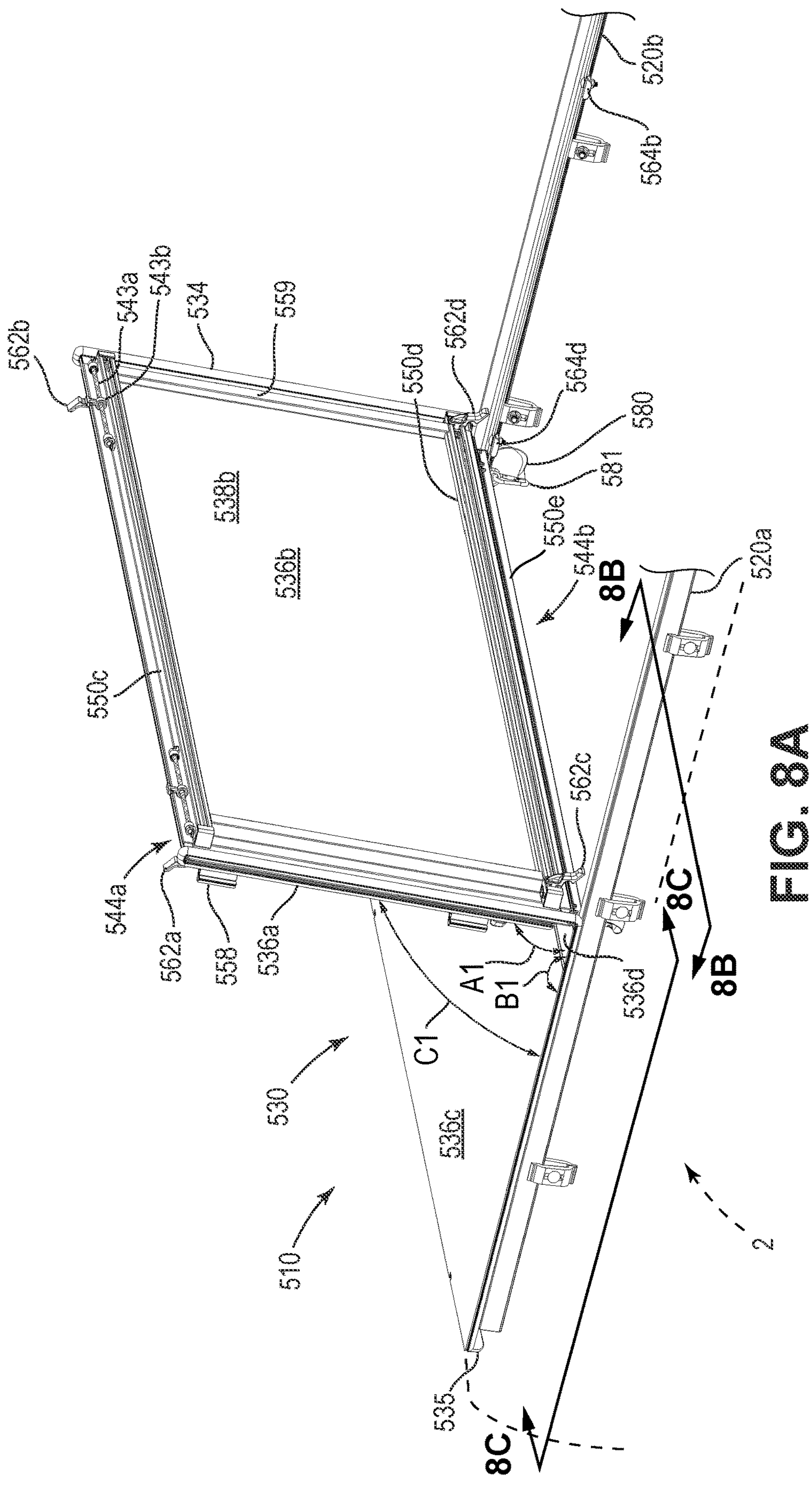
FIG. 8A is a rear perspective view of the folding tonneau cover apparatus of FIG. 1, wherein the rear panel is folded over onto the middle panel and wherein both panels have been lifted up and pivoted forward generally about 90 degrees with respect to the front panel that is resting on the side rails and is generally in a horizontal plane with respect to the pickup truck shown in part in phantom.
Figure 8B:
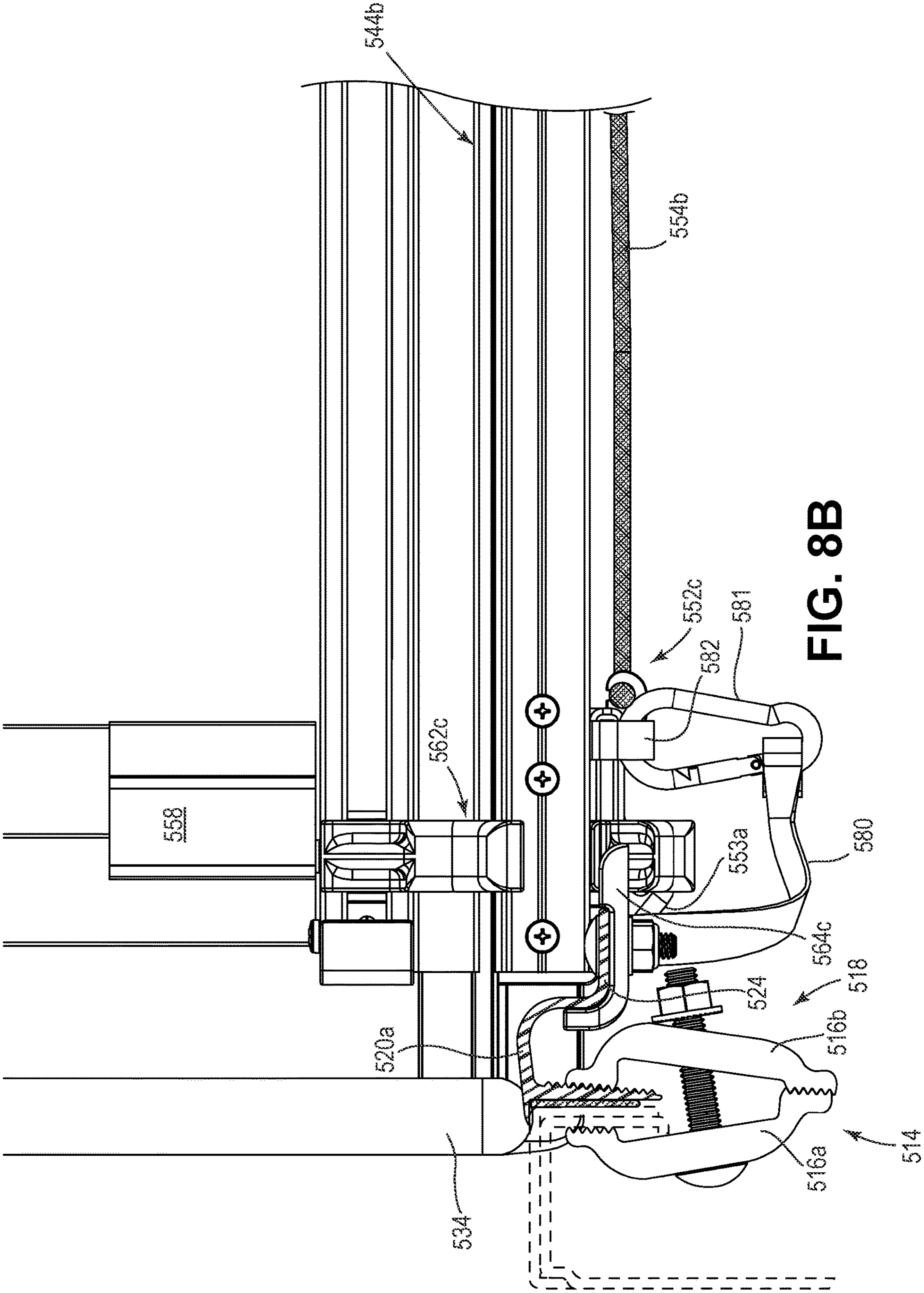
FIG. 8B is a partial section view as seen from the line 8B-8B of FIG. 8A showing the swing latch 562*c* near the driver's-side end portion of the support bow of the spacer panel disengaged from the corresponding catch 564*c;*
Figure 8C:
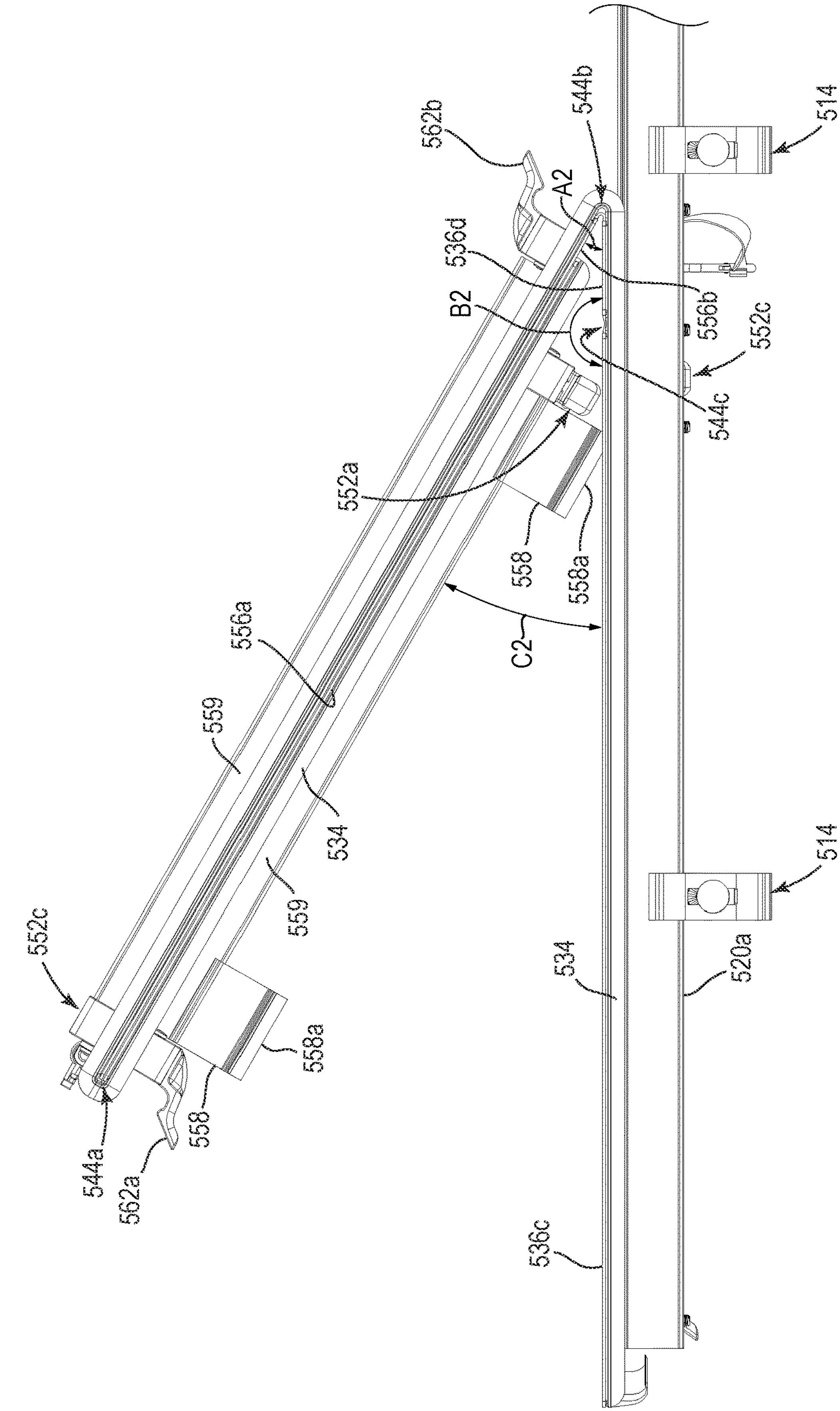
FIG. 8C is a side view as seen from the line 8C-8C of FIG. 8A, but illustrating the rear panel together with the middle panel engaged top surface to top surface as shown in FIG. 8A, but showing the two panels rotated forward further than shown in FIG. 8A to the point that the standoff 558 touches the front panel 536*c;*
Figure 8D:
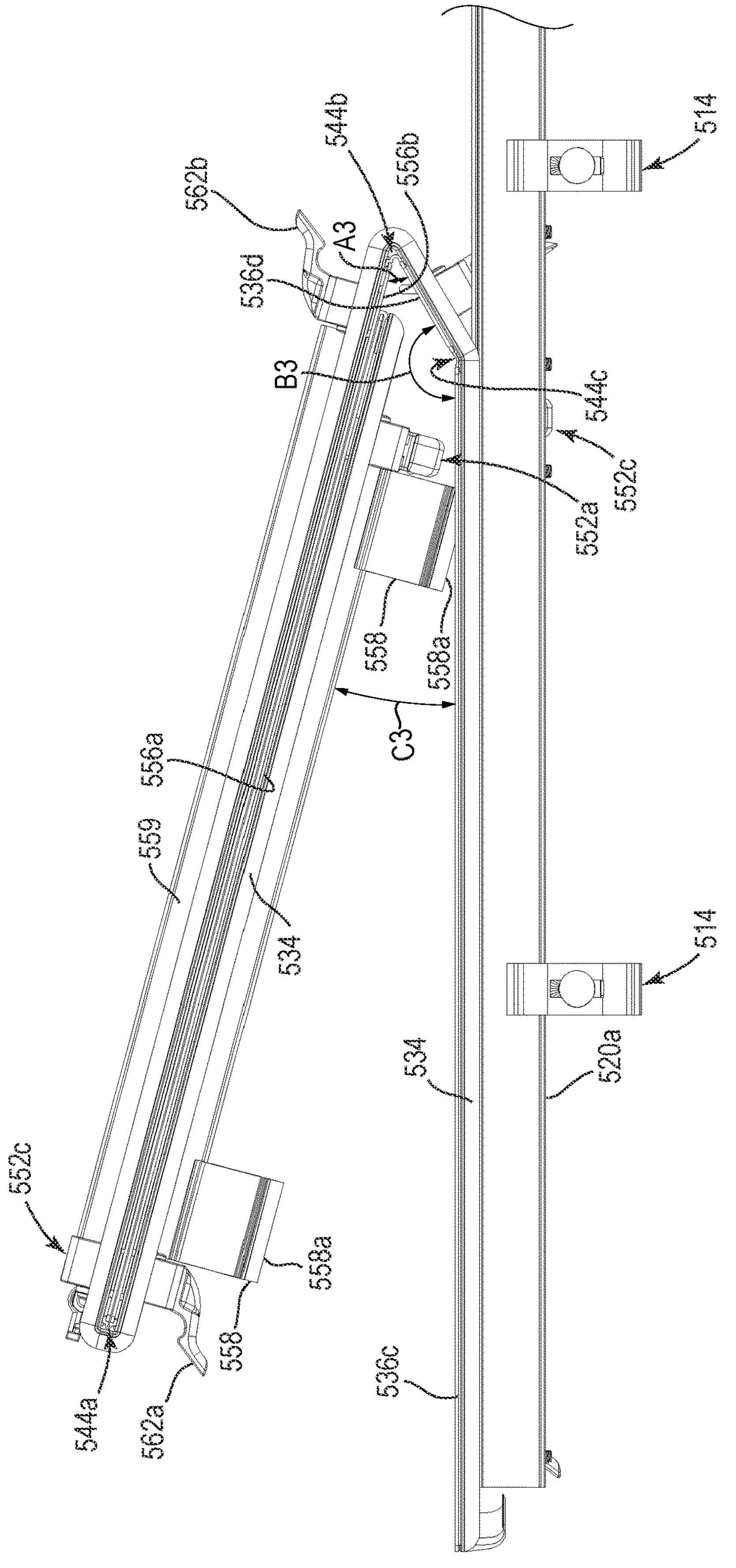
FIG. 8D is a side view similar to FIG. 8C, except that the rear panel together with the middle panel are rotated further forward so that the standoff is touching the front panel and the spacer panel is lifted up and rotated partially forward.
Figure 8E:
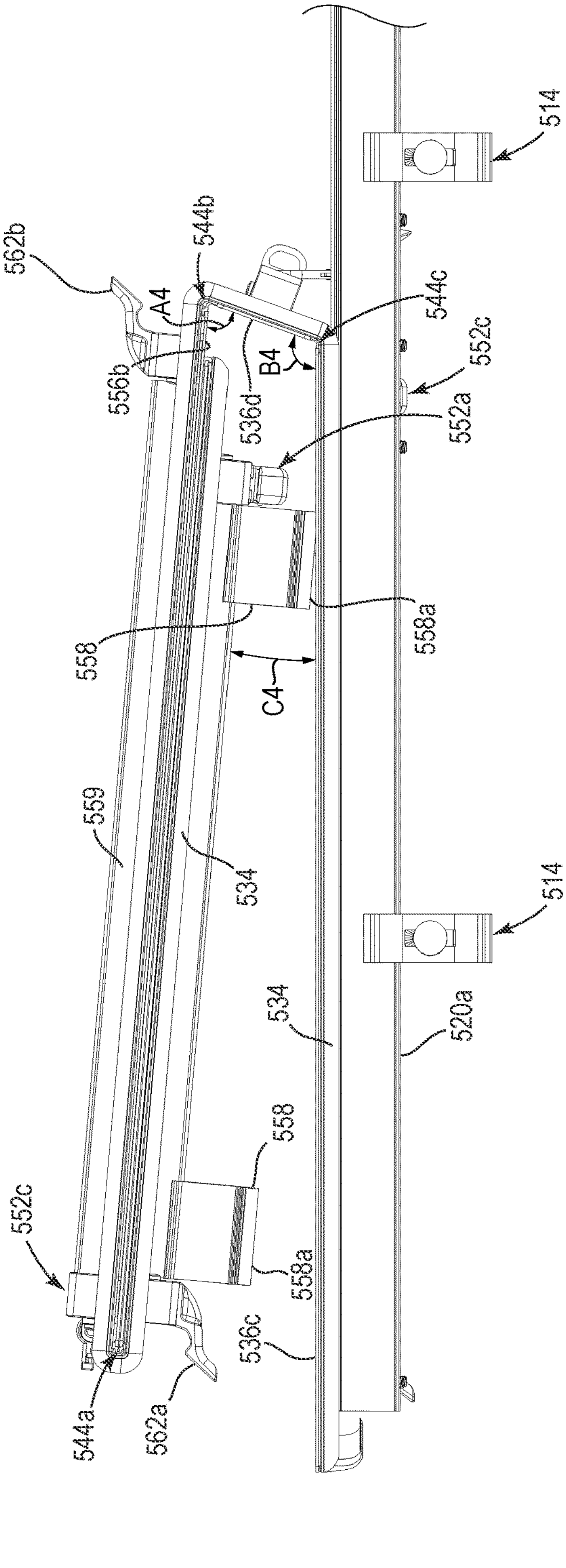
FIG. 8E is a side view similar to FIG. 8D, except that the rear panel together with the front panel are rotated still further forward and the standoff is touching the front panel and the spacer panel is lifted up further and rotated further forward.
Figure 8F:
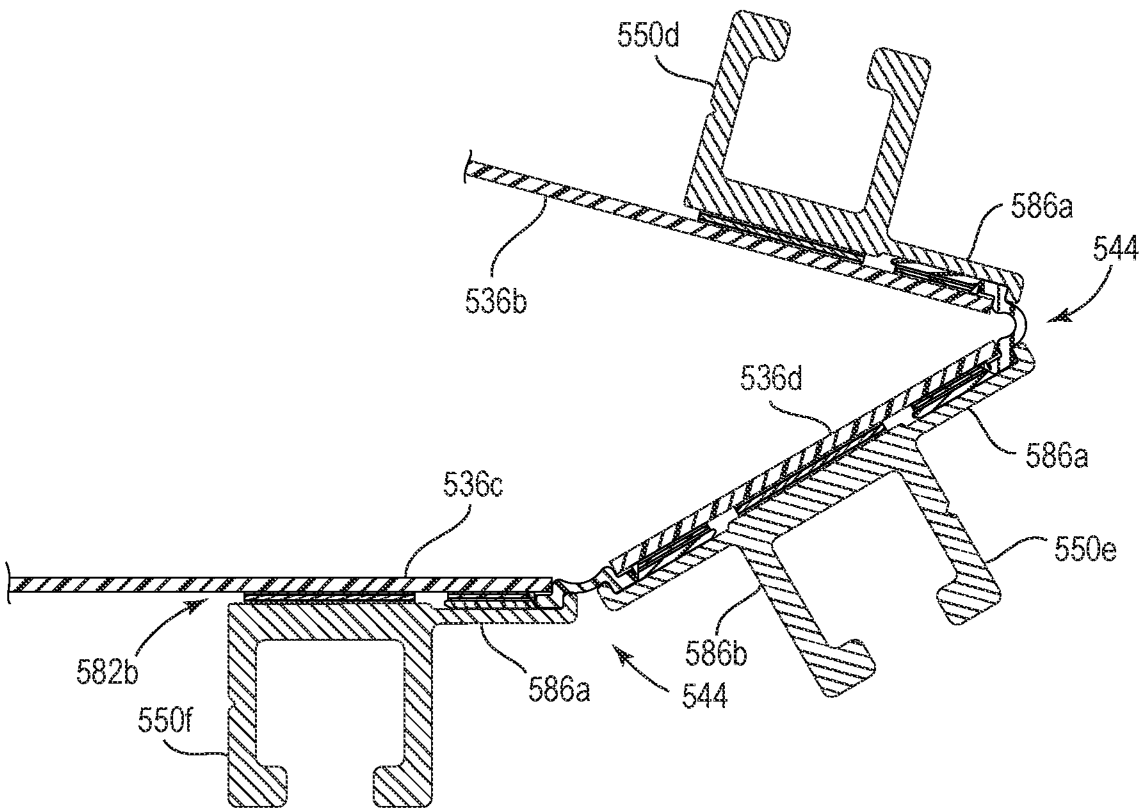
FIG. 8F is a schematic illustration showing a transverse vertical cross section similar to that of FIGS. 5C and 7C, but showing the spacer panel and two adjacent alternate hinges of the folding tonneau cover assembly of the present invention, illustrating both of the alternate hinges in a partially folded configuration similar to the partially folded orientation shown in FIG. 8D.
Figure 9A:
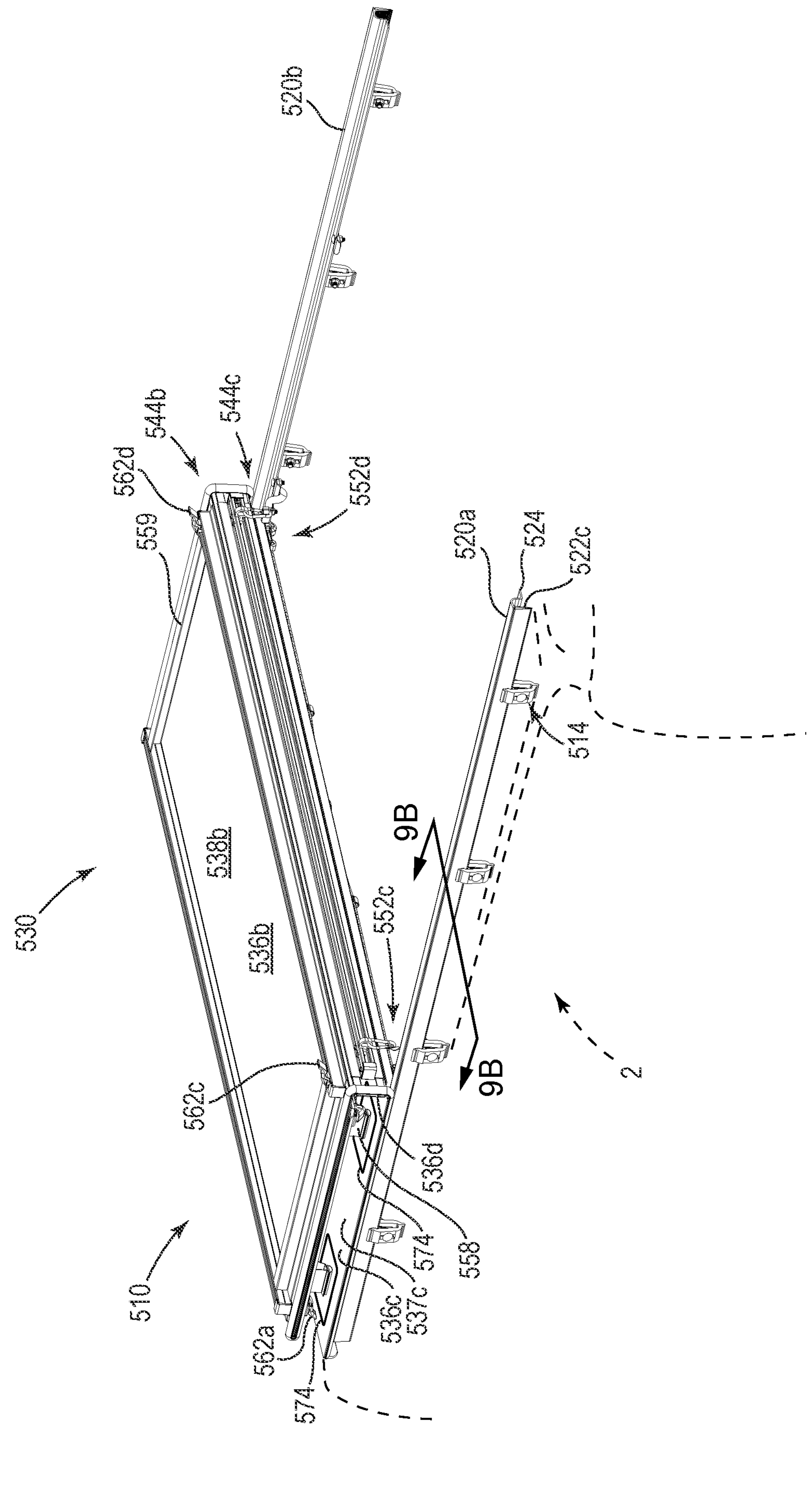
FIG. 9A is a rear perspective view of the folding tonneau cover apparatus of FIG. 1 showing the rear panel together with the middle panel and the spacer panel rotated forward so that the middle panel and the rear panel are resting together on the top of the front panel, with the spacer panel rotated upward generally at a 90 degree angle to the other panels in a fully folded orientation, but also showing the standoffs 558 resting on alternate protective films 574 shown only in FIGS. 2A, 9A, 10A, and 10B as an alternate element in those figures.
Figure 10E:
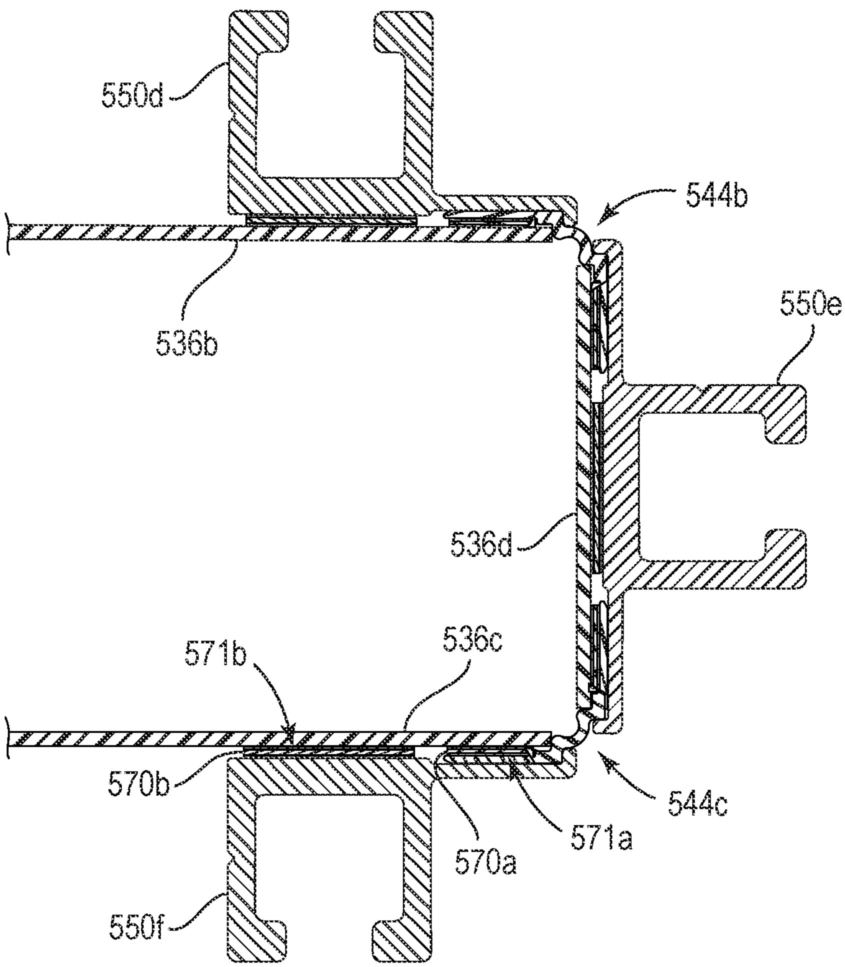
FIG. 10E is a schematic illustration showing a transverse vertical cross section similar to that of FIG. 8F, showing the a spacer panel and two adjacent hinges of the folding tonneau cover of FIG. 1, illustrating both of the alternate hinges in a 90-degree folded configuration.

With lifting and rotating of the middle panel 536*b* together with the rear panel 536*a* until the middle panel 536*b* is approximately vertical, the configuration is as depicted in FIG. 8A-8B. With continued lifting and rotating of the middle panel 536*b* frontwards, the middle panel 536*b* together with the rear panel 536*a* rotates frontwards towards the front panel 536*c*. Preferably, the folding cover assembly 530 includes standoffs 558, located on the underside 538*a* of the rear panel 536*c*. The standoffs 558 can be attached to the bottom side of the rear panel 536*a* or attached to other structures such as support bows 550 or handles 559; in the example illustrated in FIGS. 8A-8E, there are four standoffs 558, two of which are attached to each of two sidebars or handles 559 on the underside 538*a* of the rear panel 536*c*. The standoffs 558 are preferably located so that two are proximate the front edge 541*b* of the rear panel 536*a*, and two are proximate the rear edge 541*c* of the rear panel 536*a*. The standoffs 558, and a preferred attachment of the standoffs 558 to the handles 559, are described further below, including with reference to FIGS. 14A-14C. Through the folding and rotating of the middle panel 536*b* and the rear panel 536*a* as just described, the standoffs 558 proximate the rear edge 541*c* of the rear panel 536*a* contact the top surface 537*c* of the front panel 36*c* as shown in FIG. 8C. The standoffs 558 help to maintain a spaced relationship between the rear panel 536*a* and the front panel 536*c*. With continued rotating of the middle panel 536*b* (together with the front panel 536*a*) the hinge 544*c* bends and the spacer panel 536*d* lifts off the side rails 520*a* and 520*b* as illustrated in FIG. 8D. With continued rotating of the middle panel 536*b* frontwards, together with the rear panel 536*a* and the spacer panel 536*d*, and pivoting and sliding of the standoffs 558, the middle panel 536*b*, the rear panel 536*a*, and the spacer panel 536*d* rotate progressively farther frontwards towards the front panel 536*c*, as illustrated in FIGS. 8E, until the standoffs 558 all contact the front panel 536*c* (FIG. 9A). During this folding of the folding cover assembly 530, the hinges 544*b* and 544*c* flex as the middle panel 536*b*, the rear panel 536*a*, and the spacer panel 536*d* rotate towards the front panel 536*c* as schematically illustrated in FIGS. 8F and 10E. Depending on forces applied by the driver or other operator 8, the hinges 544*b* and 544*c* can flex to pass through various increasing or decreasing angles. Most commonly, however, the angles will vary in the following manner. Referring to FIGS. 8A, 8C-8E, and 10D, during the folding up of the folding cover assembly 530, the angle A between the middle panel 536*b* and the spacer panel 536*d* (which is about 180 degrees before beginning the folding up of the middle panel 536*b* onto the front panel 536*c*, as in the configuration illustrated in FIG. 7A) initially decreases to angle A1 which is about 90 degrees as shown in FIG. 8A, then decreases past 90 degrees to angle A2 at which point the standoffs 558 contact the top surface 537*c* of the front panel 536*c* as shown in FIG. 8C; angle A2 may be about 35 degrees, but may be somewhat larger or smaller than about 35 degrees depending on the standoff distance 561*a* (FIG. 14C) and a setback distance 561*b* (FIG. 10D) between the standoff 558 proximate the rear edge 541*c* of the rear panel 536*a* and the rear edge 541*c* of the rear panel 536*a*, and also depending on the relative lengths 539*a* and 539*b* of the rear panel 536*a* and the middle panel 536*b*, respectively. Angle B between the spacer panel 536*d* and the front panel 536*c* (which is about 180 degrees before beginning the folding up of the folding cover assembly 530, as in the configuration illustrated in FIG. 7A) is shown as angle B1 in the configuration of FIG. 8A as about 180 degrees, and is shown as angle B2 in the configuration of FIG. 8C, preferably remaining at about 180 degrees until the standoffs 558 contact the top surface 537*c* of the front panel 536*c* as shown in FIG. 8C. Angle C between the rear panel 536*b* and the front panel 536*c* (which is about 180 degrees before beginning the folding up of the folding cover assembly 530, as in the configuration illustrated in FIG. 7A) initially decreases to angle C1 which is about 90 degrees as shown in FIG. 8A, then decreases past 90 degrees to angle C2 at which point the standoffs 558 contact the top surface 537*c* of the front panel 536*c* as shown in FIG. 8C. With continued rotation of the rear panel 536*a* and middle panel 536*b* and spacer panel 536*d*, depending on the forces and manipulations applied by the driver or operator 8, the angle A may remain about the same or may increase again as the angle B begins to decrease and the angle C continues to decrease, as shown as angles A3, B3, and C3 in FIG. 8D. With still continued rotation of the rear panel 536*a* and middle panel 536*b* and spacer panel 536*d*, the angles A and B continue to approach about 90 degrees as the angle C continues to approach zero degrees as shown as angles A4, B4, and C4 in FIG. 8E. When the folding cover assembly 530 is completely folded, the angles A and B are preferably about 90 degrees and the angle C is preferably about zero degrees, as shown as angles A5, B5 and C5 in FIG. 10D, with the rear panel 536*a*, the middle panel 536*b*, and the front panel 536*c* being approximately parallel to each other, and the spacer panel 536*d* approximately vertical, oriented at about 90 degrees with respect to the panels 536*a*, 536*b*, and 536*d*.

As the folding cover assembly 530 is folded up, the angle C between the rear panel 536*a* and the front panel 536*c* decreases towards about zero degrees, passing through the configurations depicted in FIGS. 8C-8E. For embodiments in which the folded configuration of the folding cover assembly 530 has the rear panel 536*a* folded so that it is parallel to the front panel 536*c*, the approximate relationship between the angles A, B, and C is believed to be given by the equation (angle C)=(angle A)+(angle B)−(180 degrees).

Figure 9B:
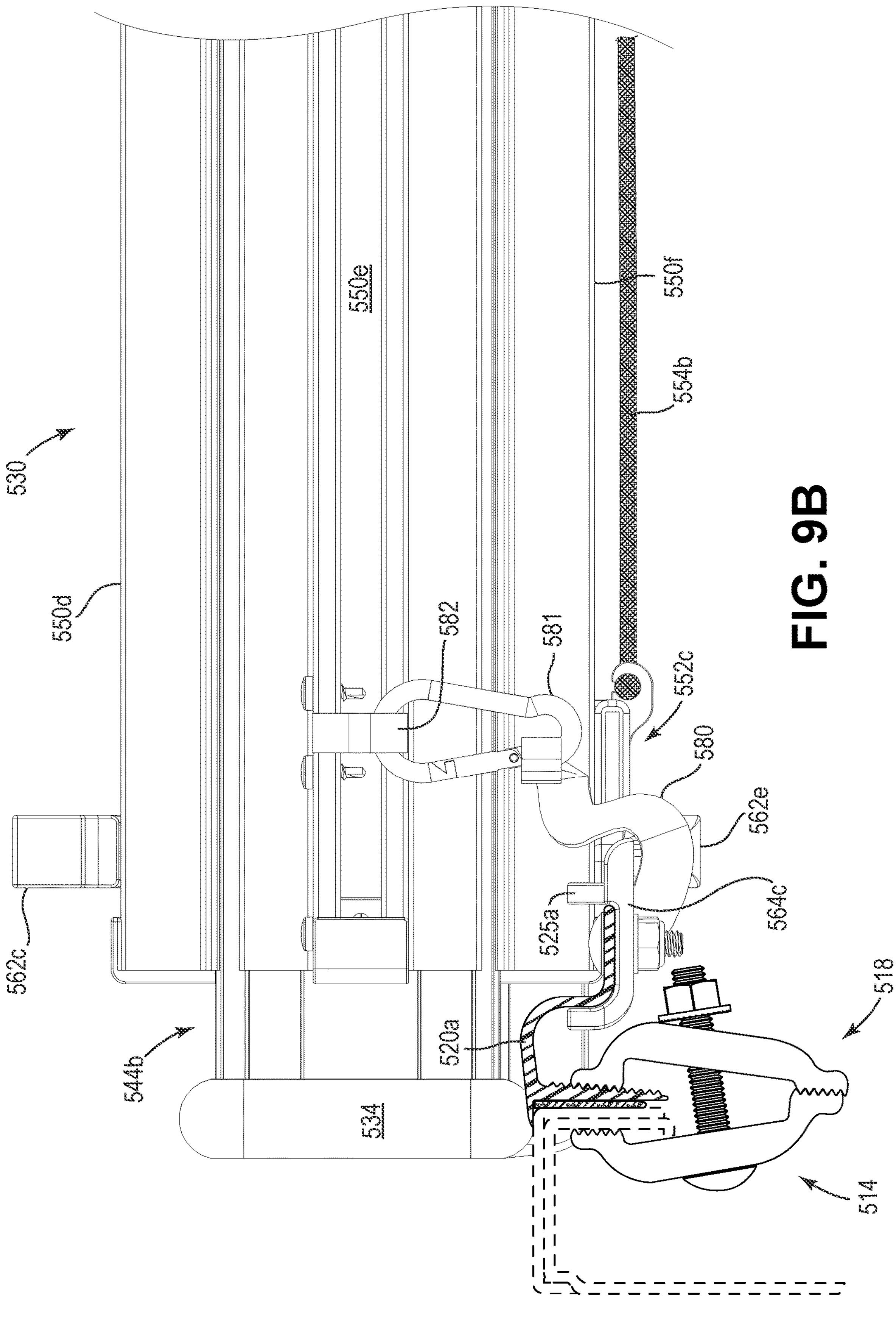
FIG. 9B is a partial section view as seen from the line 9B-9B of FIG. 9A illustrating the driver's side of the completely folded tonneau cover assembly showing the rear support bow of the front panel resting on the lip of the driver's side side rail.

At this point, as illustrated in FIGS. 9A, 9B, and 10A, the folding cover assembly 530 is folded up, but is still attached to the side rails 520*a* and 520*b*, with the latches 552*c* and 552*d* (proximate the ends of the support bow 550*f*) engaged with the side rail lip 524 of the side rails 520*a* and 520*b*, respectively, and the hooks 562*e* and 652*f* proximate ends of the support bow 550*g* engaged with the catches 564*e* and 564*f*, respectively, as illustrated in FIGS. 10C-11A. Preferably, the containment bracket or anchor socket 525*a* is affixed to the side rail 520*a* (see for example FIGS. 2E and 9B), and a mirror-image anchor socket 525*b* is affixed to side rail 520*b* (see for example FIG. 11A). The anchor sockets or containment brackets 525*a* and 525*b* keep the engaging portion 553*b* of the latches 552 proximate each end of the support bow 550*g* in a desired location along the side rail lip 524 of the side rails 520*a* and 520*b* and thereby aid in positioning the folding cover assembly 530 in a desired alignment with respect to the cargo box 5 when the engaging portion 553*b* of the latches 552 at each end of the support bow 550*g* are engaged with the side rail lip 524 of the side rails 520*a* and 520*b*.

Referring now to FIGS. 10A-10D, bundling means such as bungee cords or storage straps 543*a* can be utilized to fix the folding cover assembly 530 in the folded configuration; other straps, buckles, or hooks can be utilized as bundling means. FIGS. 10A-10D show a preferred embodiment, in which two elastic storage straps 543*a* are provided, one towards either side of the middle panel 536*b*, for securing the folding cover assembly 530 in a folded configuration. Preferably, strap brackets 543*b* are provided for each storage strap 543*a*, for hooking the storage straps 543*a* to the front panel 536*c*; the strap brackets 543*b* are preferably formed of a strong polymer such as a polyamide, although other materials, including composites and metals, can be used. More preferably, the strap brackets 543*b* are formed of nylon. Preferably, bracket slots 543*c* are provided in the front panel 536*c*, and accommodate the strap brackets 543*b*. The strap brackets 543*b* are attached to or captured on the storage straps 543*a*, and the strap brackets 543*b* hook to the bracket slots 543*c* in the front panel 536*c* to secure the folding cover assembly 530 in the folded configuration when desired. In the front perspective view of FIG. 10B of the folded folding cover assembly 530, a storage strap 543*a* is hooked to the front panel 536*c* with a strap bracket 543*b*. Also illustrated on FIG. 10B are support bows including support bows 550*b*, 550*c*, 550*d*, and 550*g*, swing latches 562*b*, 562*d*, and 562*f*, standoff 558, protective pad 558*a*, and protective film 574. FIG. 10C is a front view which illustrates a storage strap 543*a* near each side of the middle panel 536*b* which is hooked to the front panel 536*c* with corresponding strap brackets 543*b* to secure the folded folding cover assembly 530 in a folded configuration as shown. FIG. 10D shows a side view of this folded configuration of the folding cover assembly 530, with the rear panel 536*a* secured to the front panel 536*c*. The folding cover assembly 530 can be left in this folded configuration, as illustrated in FIG. 10D, covering only the front portion of the cargo box 5.

The protective film(s) 574 is preferably located on the top surface 537*c* of the front panel 536*c* so that the protective film 574 is aligned with the respective standoff 558 as illustrated in FIGS. 9A, 10, and 10B, which illustrate the folding tonneau cover assembly 530 folded up. When the protective film 574 is located as shown between the standoff 558 and the top surface 537*c* of the front panel 536*c*, damage to the top surface 537*c* by contact and abrasion by the protective pad 558*a* is minimized. When traveling, the folding tonneau cover assembly 530 may be in the folded up configuration such as illustrated in FIG. 10B, with the strap bracket 543*b* of each storage strap 543*a* engaged with the bracket slot 543*c* as illustrated.

Figure 11A:
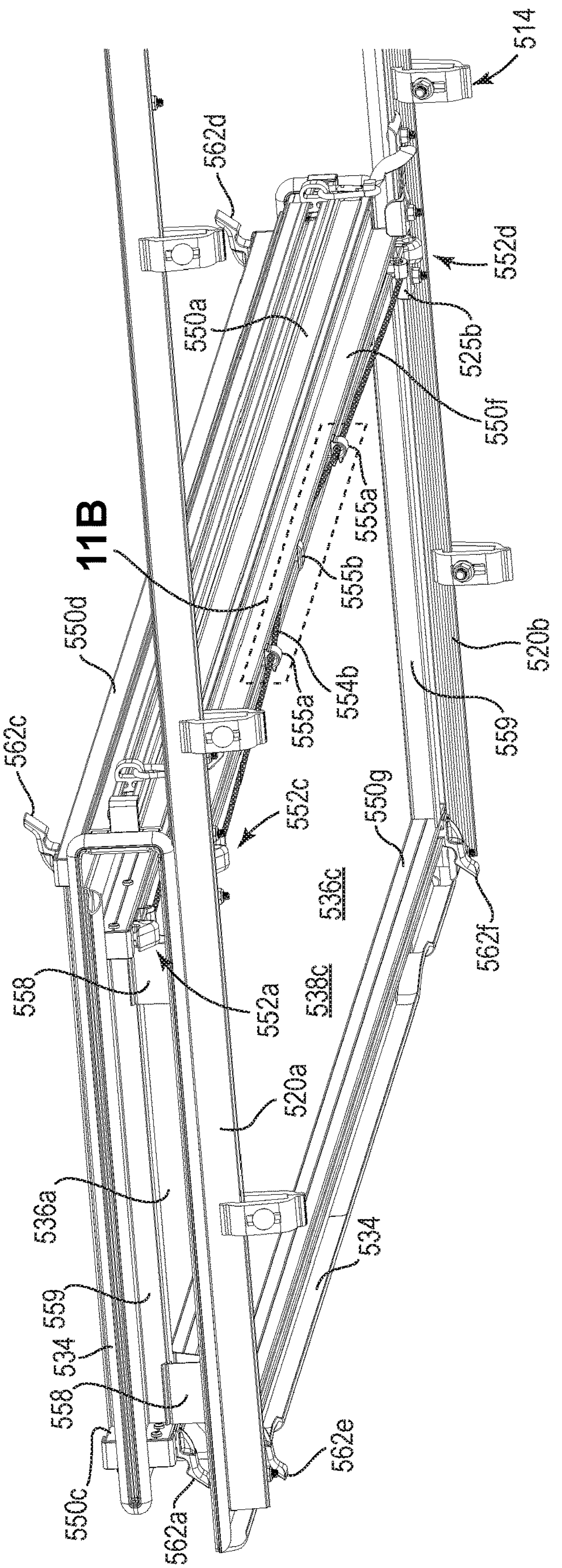
FIG. 11A is a rear perspective view of the folding tonneau cover apparatus of FIG. 1 viewed from slightly below and to the driver's side of the folding tonneau cover apparatus, wherein the folding tonneau cover assembly is secured in the fully folded up configuration similar to that of FIGS. 10B-10D, showing a release cord for pulling the latches on the front panel against the bias of the springs to release the latches and schematically illustrating the flexible hinges in a manner similar to that in FIG. 10D.
Figure 11B:
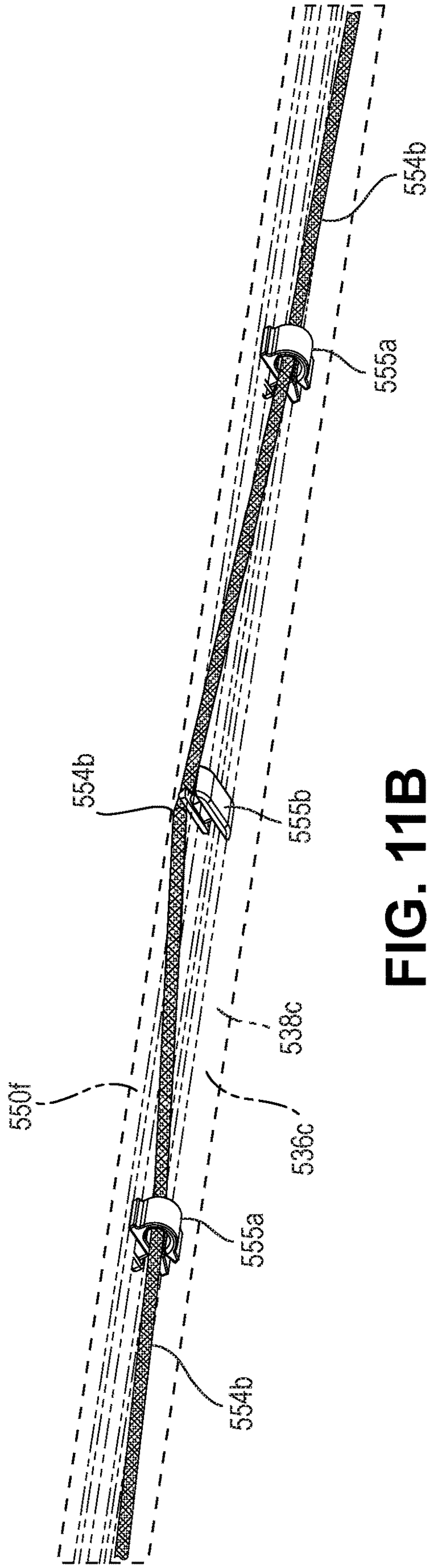
FIG. 11B is a partial view of the portion of the folding tonneau cover apparatus of FIG. 1 shown in the dashed rectangle 11B of FIG. 11A, illustrating clip cord guides and a retainer cord guide and a corresponding release cord along a support bow, with the support bow shown in phantom to reveal the underlying structures.

The folding cover assembly 530, folded up and bundled and left secured to the side rails 520*a* and 520*b* in the configuration of FIGS. 10B-10D is illustrated in a rear perspective view, viewed from slightly below and to the driver's side of the folding tonneau cover apparatus in FIG. 11A. As state above, the cord guides 555 preferably include clip cord guides 555*a* and retainer cord guides 555*b*; the clip cord guides 555*a* and retainer cord guides 555*b* are further illustrated in FIG. 11B. The truck can be driven with the folding cover assembly 530 in this folded up configuration if desired.

Figure 12:
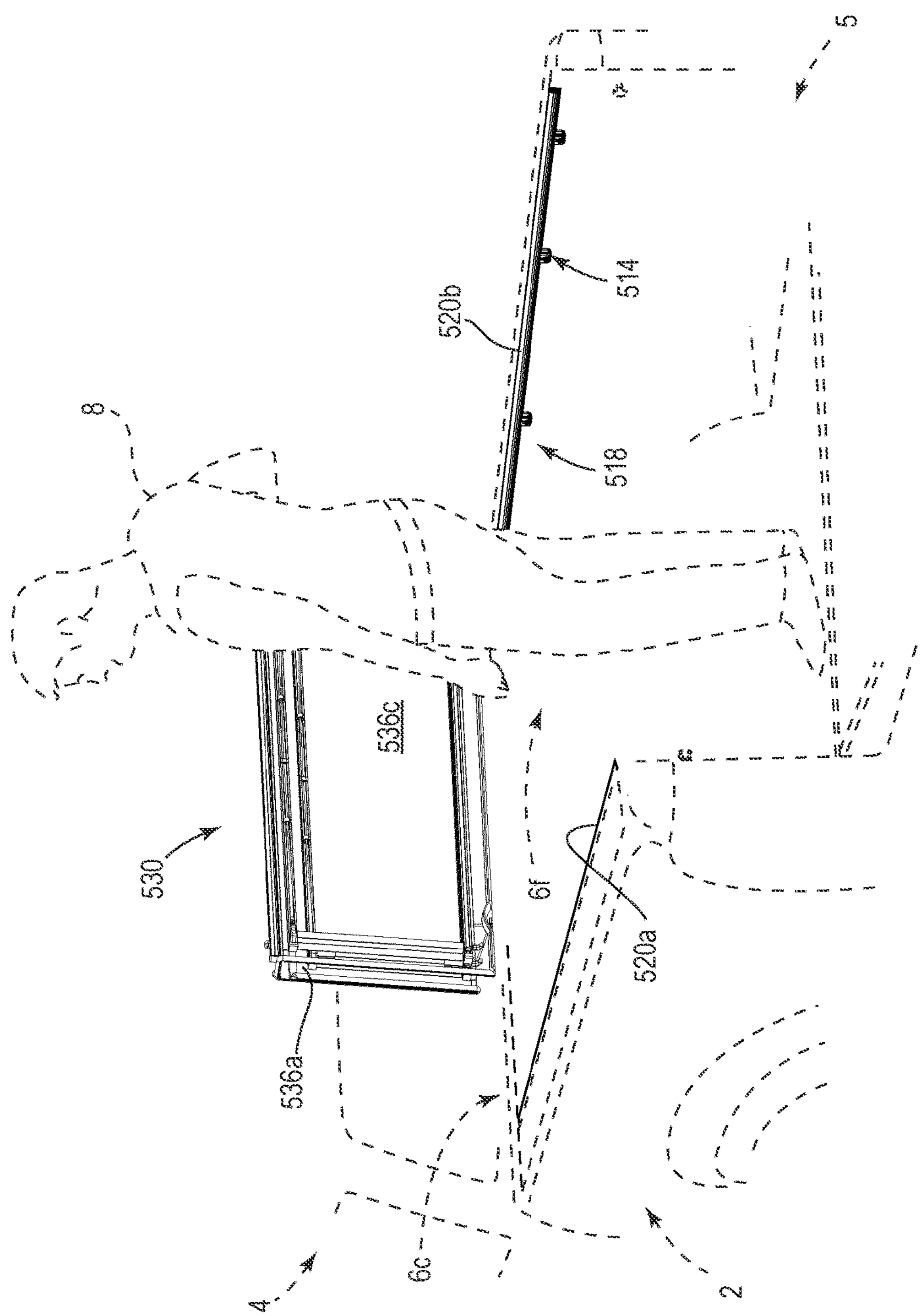
FIG. 12 illustrates the folding tonneau cover assembly 530 of FIG. 1, secured in the fully folded up configuration disengaged from the support frame assembly 518 and being held in the arms of an operator.

Alternatively, if it is desired to remove the folding cover assembly 530 to leave the cargo box 5 completely uncovered, the folding cover assembly 530 can be removed as follows. As illustrated in FIG. 11A the release cord 554*b* is accessible and can easily be grasped by a driver or other operator 8. Pulling on the release cord 554*b* will retract the latches 552 at the ends of the support bow 550*f* against the force of the biasing members or springs 556, similar to the way in which pulling on the release cord 554*a* retracts the latches 552 at the ends of the support bow 550*a* as illustrated in FIG. 4B. Typically, the release cord 554*b* will be pulled by a driver or other operator 8; the operator 8 preferably has entered the cargo box 5 via the tailgate 6*d* to grasp the release cord 554*b*. When the release cord 554*b* is pulled, the engaging portions 553*b* of the latches 552 at the ends of support bow 550*f* are retracted away from the lips side rail lips 524 of the side rails 520*a* and 520*b*, releasing the latches 552 from the side rails 520*a* and 520*b*, and allowing the rear portion of the front panel 536*c* to be lifted up from the side rails 20*a* and 20*b* and rotated to disengage the hooks 562*e* and 562*f* from the catches 564*e* and 564*f*, respectively. In this configuration, the folded folding cover assembly 530 is free from the side rails 520*a* and 520*b* of the support frame assembly 518 and can be lifted up and off the cargo box 5 as illustrated in FIG. 12; the folding cover assembly 530 can be moved away from the pickup truck 2, or stowed in the cargo box 5 or elsewhere as desired. In this case, the top opening 6*f* of the cargo box 5 is not partially covered by the folded up folding cover assembly 530.

When it is desired to replace the folding cover assembly 30 on the cargo box 5, or to close one or more panels 36, the various steps illustrated can be done in the reverse order, as described in further detail below in reference to FIG. 19C. To latch the various latches 552, however, it is not necessary to manually retract any of the release cords 554, since the latch slide 553 has an inclined bottom surface 553*a*. When the latch slide 553 contacts and is forced further towards the side rail lip 524 of the side rails 520*a* or 520*b*, the inclined bottom surface 553*a* of the latch slide 553 will retract the engaging portion 553*b* to allow the engaging portion 553*b* to move past the side rail lip 524, whereupon the spring 556 will move the engaging portion 553*b* into the secured configuration, such as illustrated in FIG. 3B and elsewhere herein.

Figure 13A:
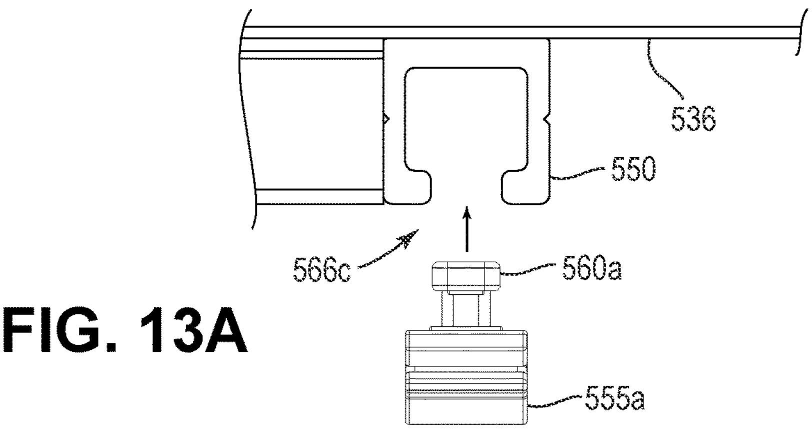
FIG. 13A illustrates a clip cord guide aligned for attachment to a support bow or support member.
Figure 13B:
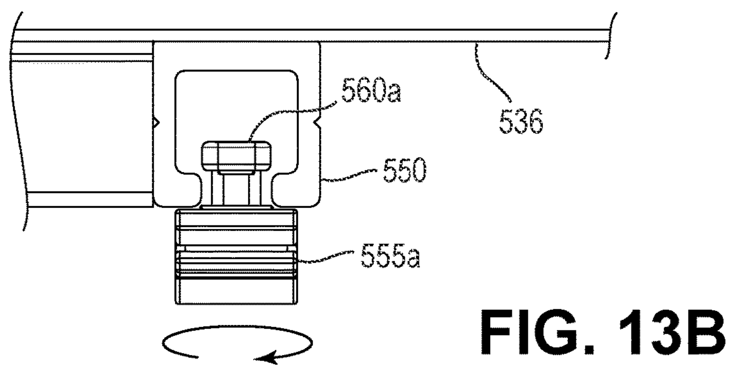
FIG. 13B illustrates the clip cord guide of FIG. 13A inserted into a channel of the support bow.
Figure 13C:
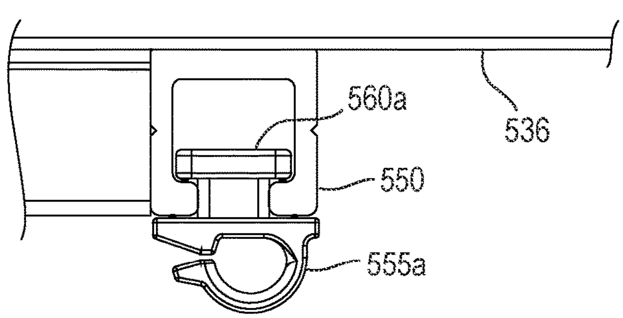
FIG. 13C illustrates the clip cord guide of FIGS. 13A and 13B rotated so that an oblong securement feature engages the clip cord guide within the channel of the support bow.
Figure 13D:
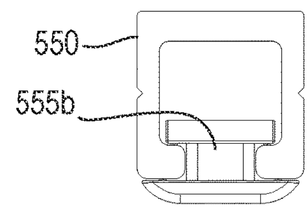
FIG. 13D illustrates a retainer cord guide secured to a support bow.

Referring now to FIGS. 13A-13D, the cord guides 555 are schematically illustrated. As stated above, the cord guides 555 preferably include clip cord guides 555*a* and retainer cord guides 555*b*. Each clip cord guide 555*a* is preferably attached to a support bow 550 as illustrated in FIGS. 13A-13C. The clip cord guide 555*a* preferably has a securement feature or securement portion 560*a* which is configured for attachment to the support bow 550. The securement feature 650*a* is preferably oblong and is narrow enough to fit into the channel opening 566*c*, and when aligned with the open bottom of the bow bottom portion 566*b* as illustrated in FIG. 13A, the securement feature 650*a* can be inserted into the support bow 550 as shown in FIG. 13B. The clip cord guide 555*a* is then rotated as indicated by the arrow on FIG. 13B so that the securement feature 650*a* secures the clip cord guide 555*a* to the support bow 550 as shown in FIG. 13C. Each retainer cord guide 555*b* is preferably inserted into the open end of the support bow 550 and slid along the support bow 550 to a desired location. The release cord 554 passes between the retainer cord guide 555*b* and the support bow 550 as schematically illustrated in FIG. 13D so that the retainer cord guide 555*b* retains the release cord 554. The combination of clip cord guide(s) 555*a* and retainer cord guide(s) 555*b* keep the respective release cord positioned in alignment with the latches 552 and adjacent to or within the respective support bow 550. Note that in the schematic illustrations of FIGS. 13A-13D, some elements are not shown, such as the adhesive 570*b* (which may include adhesive tape 571*b*), hinge 544, hinge support flange 586, and so forth, in order to highlight the particular features being described. The elements shown in the schematic illustrations of FIGS. 13A-13D are not necessarily drawn to scale.

Referring now to FIGS. 14A-14C, attachment of a standoff 558 to a sidebar or handle 559 is illustrated. The standoff 558 preferably has a securement portion 560*b* which is configured for attachment to the sidebar or handle 559. Preferably, the securement portion 560*b* preferably includes two longitudinal grooves 558*b* and 558*c* which can engage the handle 559. The standoff 558 preferably includes an elongated projection 558*d* which can be grasped to snap the standoff 558 onto the handle 559 or to remove the standoff 558 from the handle 559. Further, the elongated projection 558*d* is preferably angled to aid in guiding the standoff 558 into engagement with the handle 559. Preferably, the longitudinal groove 558*b* is hooked onto the handle 559 as illustrated in FIG. 14B, and the elongated projection 558*d* is used to aid in hooking the longitudinal groove 558*c* onto the handle 559 to secure the standoff 558 on the handle 559 as illustrated in FIG. 14C. The dimensions of the standoff 558 and position of the standoff 558, including the standoff distance 561*a* and the setback distance 561*b* (FIG. 10D) when secured to the handle 559 together determine the angle C2 (FIG. 8C) at which the standoff 558 contacts the front panel 536*c* when the folding cover assembly 530 is being folded up. Preferably, a protective pad or insert or rubber foot 558*a* is attached to the end of the standoff 558 as shown; the protective pad 558*a* preferably secures to the standoff 558 by adhesive such as those described herein or other adhesive known in the art. The protective pad 558*a* serves to reduce impact or abrasion damage to the front panel 536*c* when the folding cover assembly 530 is folded up onto the front panel 536*c*.

In this example, the length 539*d* of the spacer panel 536*d* is substantially smaller than the lengths 539*a*, 539*b*, 539*c* of the other panels 536*a*, 536*b*, 536*c* (FIG. 2A). The dimensions of the standoff 558 are chosen to accommodate the length 539*d* of the spacer panel 536*d*, so that the front panel 536*a* and the rear panel 536*c* are preferably parallel and separated from one another in the folded configuration such as is illustrated in FIG. 10D. The larger lengths 539*a*, 539*b*, 539*c* of panels 536*a*, 536*b*, 536*c* provide for efficient coverage of the cargo box 5, while the smaller length 539*d* of the spacer panel 536*d* provides for folding up of the folding cover assembly 530 to a convenient folded size, while providing space for the various hinges 544, support bows 550, and other components within the folded-up folding cover assembly 530. As the spacer panel 536*d*, the middle panel 536*b*, and the rear panel 536*a* are folded together onto the front panel 536*c*, the standoff 558 the rear end of each of the handles 559 attached to the bottom surface 538*a* of the rear panel 536*a* contacts the front panel 536*c* and provides a pivot point and sliding support to aid in orienting the panels 536 in the folded configuration as shown. Preferably, the standoff 558 is long enough to ensure contact between the protective pad 558*a* and the top surface 537*c* of the panel 536*c* in order to minimize movement and stress on the hinges 544*b* and 544*c* and to minimize any damage due to abrasion between the protective pad 558*a* and the top surface 537*c* of the panel 536*c*. Preferably, the standoff 558 is short enough to avoid undue stress on the panel 536*c* and the hinges 544*b* and 544*c* when the folding cover assembly 530 is folded up as illustrated in FIGS. 10A-10D.

Figure 15A:
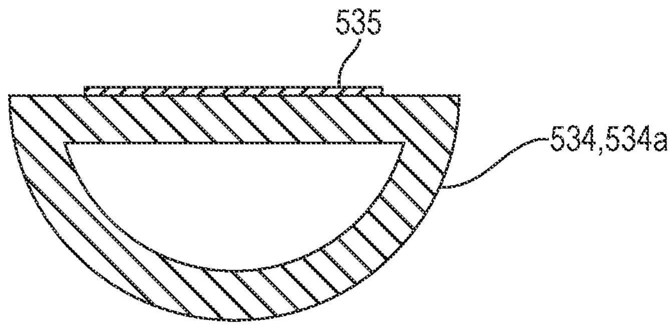
FIG. 15A illustrates a preferred perimeter seal in a transverse vertical cross section.
Figure 15B:
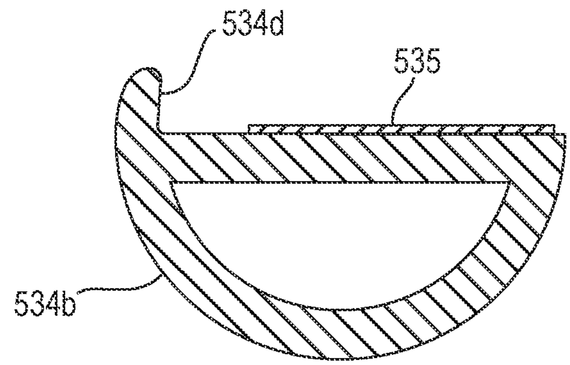
FIG. 15B illustrates an alternate perimeter seal in a transverse vertical cross section.
Figure 15C:
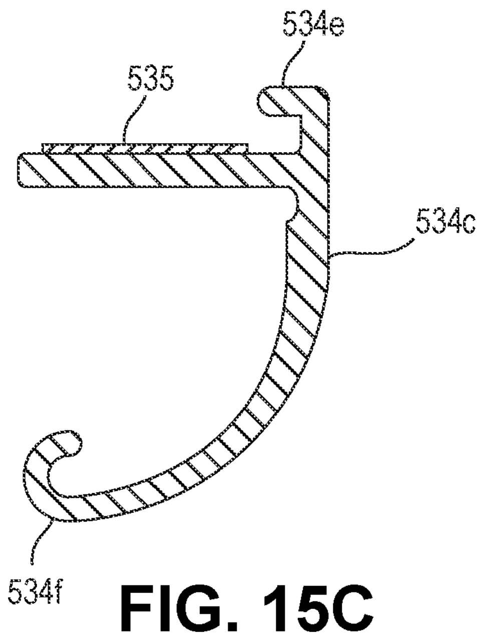
FIG. 15C illustrates a further alternate perimeter seal in a transverse vertical cross section.
Figure 15D:
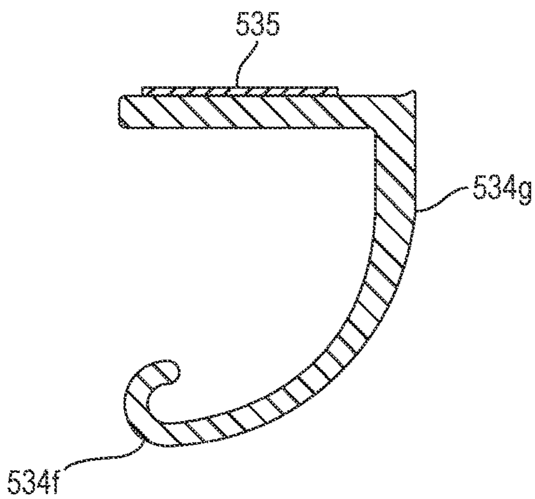
FIG. 15D illustrates another alternate perimeter seal in a transverse vertical cross section.
Figure 15E:
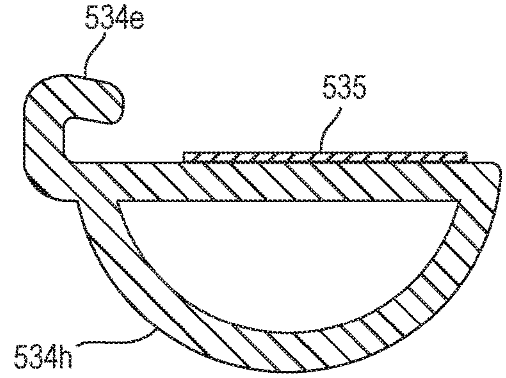
FIG. 15E illustrates another alternate perimeter seal in a transverse vertical cross section.
Figure 15F:
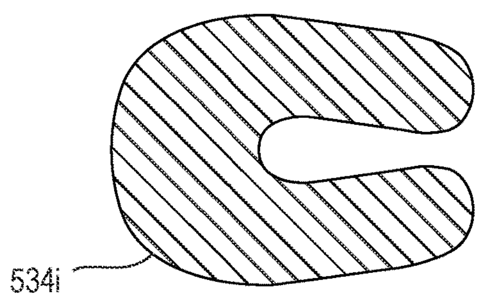
FIG. 15F illustrates a rigid panel edge guard in a transverse vertical cross section.
Figure 15G:
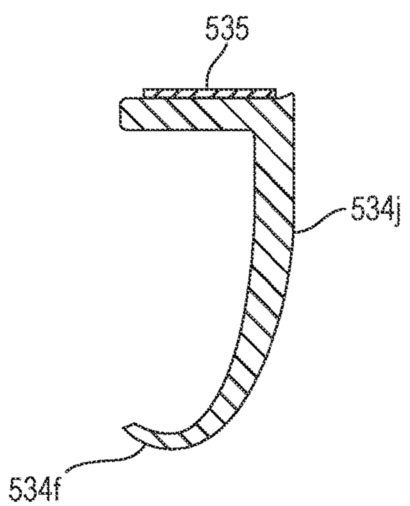
FIG. 15G illustrates a still further alternate perimeter seal in a transverse vertical cross section.
Figure 15H:
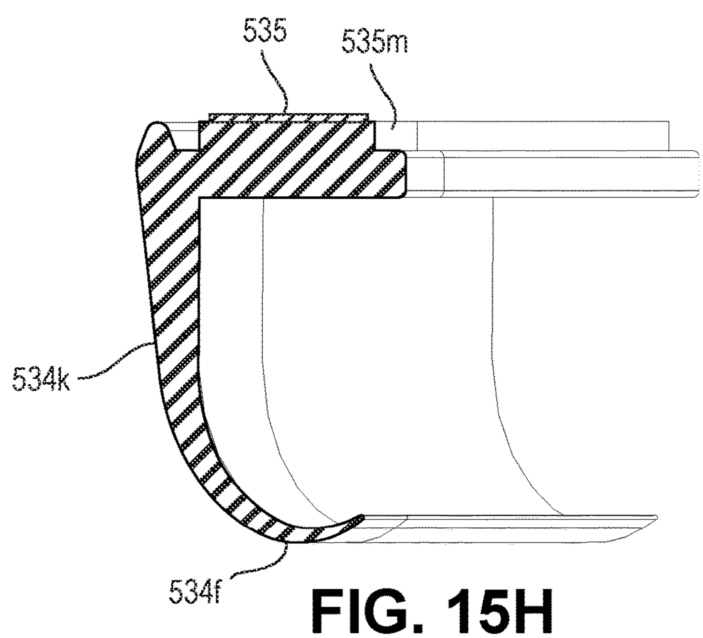
FIG. 15H illustrates a further alternate perimeter seal in a transverse vertical cross section.

Referring to FIGS. 15A-15C, the perimeter seal 534 provides a seal against the entry of water, dust, or other debris into the cargo box 5 around the perimeter of the folding cover assembly 530. The perimeter seal 534 can also adapt to irregularities in the fit between the folding cover assembly 530 and the sidewalls 6*a*, 6*b*, front wall 6*c*, and tailgate 6*d* of the cargo box 5. The perimeter seal 534 is preferably attached to the panels 536 with adhesive such as adhesive 570*a*, 570*b* described above, although other attachment mechanisms can be used to secure the perimeter seal 534 to the underside 538 of the respective panel 536, such as those described herein for attachment of the flexible hinge 544 or the support bows 550 or the handle 559 to the panels 536. FIG. 15A schematically illustrates one example perimeter seal 534*a* having D-shaped cross section as shown. Preferably, adhesive 535 is used to secure the perimeter seal 534 to the panels 536; although other types of adhesive, such as pressure-activated, heat-activated, UV-activated, chemical-reaction-cure, or other adhesives that are known in the art, can be used, preferably adhesive 535 is an adhesive such as the previously described adhesives 570*a*, 570*b*, 571*a*, 571*b*. FIG. 15B schematically illustrates another example perimeter seal 534*b* having a perimeter seal lip 534*d*; perimeter seal lip 534*d* can aid in alignment of the perimeter seal 534 at the edge of the panel 536, and can also provide some protection when manipulating panel 536 so that injury from contact with any narrow or sharp edges of the panel 536 is avoided. FIG. 15C schematically illustrates another example perimeter seal 534*c* having an extended perimeter seal flange 534*e* which provides similar advantages as the perimeter seal lip 534*d* but also extends a short distance over the top surface of the panel 536; the example perimeter seal 534*c* has an open cross section with an extended sealing feature 534*f*. Different configurations of the perimeter seal 534 can be used in different portions of the folding cover assembly 530. For example, the perimeter seal 534*a* could be used along the front of the front panel 536*c* to seal against the front wall 6*c* of the cargo box 5, while the perimeter seal 534*b* could be used along the sides of the panels 536 to seal against the sidewalls 6*a*, 6*b* (or sidewall cap 6*e*, if the truck 2 is so equipped), while the perimeter seal 534*c* could be used along the rear of the rear panel 536*a* to seal against the tailgate 6*d*. Further example perimeter seals include perimeter seal 534*g*, schematically illustrated in FIG. 15D, which has an open cross section similar to perimeter seal 534*c* but without an extended lip or flange. FIG. 15E illustrates an example perimeter seal 534*h* which is similar to perimeter seal 534*b* but also includes an extended perimeter seal flange similar to that shown in FIG. 15C. FIG. 15F shows an edge guard 534*i* for attachment at an exposed edge of a panel 536 but with minimal intrusion along the top surface 537 or the bottom surface or underside 538 of the respective panel 536 (corresponding to the top surface 532*a* or the bottom surface 532*b*, respectively, of the folding cover assembly 530); edge guard 534*i* can be used for protection at the rear edge of the rear panel 536*a*, for example. Edge guard 534*i* is preferably secured by an interference fit with the respective panel 536; alternatively, edge guard 534*i* can be secured to the respective panel 536 by an adhesive such as adhesive 535 illustrated in FIGS. 15A-15E, 15G-15H. FIG. 15G schematically illustrates a perimeter seal 534*j* similar to perimeter seal 534*g* of FIG. 15D but having an extended sealing feature 534*f* somewhat shorter than the perimeter seal of FIG. 15D, as shown. A preferred perimeter seal 534*k* is schematically illustrated in FIG. 15H. The perimeter seal 534*k* preferably includes extended sealing feature 534*f* and a thick back portion 534*m*, with the adhesive 535 located at the thick back portion 534*m* for securing the perimeter seal 534*k* to the respective panel(s) 536. The perimeter seal 534 can be formed into a bend at the corners of the cargo box 5, or separate segments of the perimeter seal 534 can be applied near each of the driver's side, passenger side, front side, and rear side of the folding cover apparatus 530, preferably cut to meet at a 45 degree angle to provide an essentially continuous perimeter seal around the perimeter. In a similar manner, differing configurations of perimeter seal 534, such as various perimeter seals 534*a*, 534*b*, 534*c*, 534*g*, 534*h*, 534*j*, and 534*k* described herein can be used along different portions of the perimeter, preferably cut to meet in close approximation and thereby providing an essentially continuous perimeter seal around the perimeter but with differing seal configurations at different portions of the perimeter. An edge guard such as edge guard 534*i* can be used to protect against damage or injury from the edge of the panel 536. Preferably, the perimeter seal 534 is arranged to provide an essentially continuous seal around the perimeter of the cargo box 5, and in addition, the rear edge of the rear panel 536*a* preferably has an edge guard 534*i*. Thus, some portions of the folding cover assembly 530 have perimeter seals 534 (which may include perimeter seals 534*a*, 534*b*, 534*c*, 534*g*, 534*h*, 534*j*, 534*k*, for example) in addition to edge guard 534*i*. Alternatively, the extended perimeter seal flange 534*e* can be incorporated into the perimeter seal 534 so that a separate edge guard 534*i* is not required. Various perimeter seals and edge guards made of polymeric material, as shown in FIGS. 15A-15H, are available from Lakeview Industries, Chaska, MN Preferably, the folding cover assembly 530 described herein includes a perimeter seal such as a perimeter seal disclosed herein, such as perimeter seal 534, 534*a*, 534*b*, 534*c*, 534*g*, 534*h*, 534*j*, 534*k*. In some views in the drawings, the perimeter seal is not shown for clarity of illustration. The folding cover assembly 530 preferably includes the perimeter seal 534*a* along each of the sidewalls 6*a* and 6*b*, and the perimeter seal 534*k* along the front wall 6*c*, and the perimeter seal 534*h* along the rear portion (proximate the tailgate 6*d*).

The panels 536 preferably include sheet metal, although a rigid and tough polymer sheet can be used. In particular, lightweight and strong metal alloys, such as aluminum alloys, are preferred. The panels 536 are preferably relatively rigid as compared to the hinges 544, so that when the folding cover assembly 530 is folded up as described herein, the panels 536 remain relatively flat, while the hinges 544 can flex to fold up the folding cover assembly 530. Preferably, the panels 536 are from about 0.020 inches to about 0.200 inches thick. More preferably, the panel material is 5052-T34 rolled aluminum alloy from Aleris Inc., Cleveland, OH, which has a thickness of about 0.063 inches thick and is coated on the top with a Krystal Kote™ polyester paint system coating from Valspar Sourcing, Inc., Minneapolis, MN and on the bottom with a clear epoxy coating while it is in the factory. The rolled aluminum alloy is manufactured into a coil of rolled aluminum. Once cooled, the coil is unrolled and separately coated on the top and the bottom surfaces of the aluminum material, heat treated and recoiled for delivery to a material handler or to the buyer. The coated panel material is then unrolled and panels are cut using a laser cutting machine or such other equipment that allows the panels to be effectively cut to desired size and shape specifications. The thickness of the respective panels is minimized to limit the weight of the respective panels and the cost of the materials, but it the panels are too thin they will be subject to deformation between supporting structures. The panel material will preferably have a thickness of from about 0.020 inches to about 0.200 inches, more preferably from about 0.030 inches to about 0.126 inches, still more preferably from about 0.040 inches to about 0.100 inches, even more preferably from about 0.050 inches to about 0.080 inches, and most preferably about 0.063 inches. Other protective coatings can be used, such as urethane coatings, which may include UV protection. Protective coatings may be obtained, for example, from BASF (Wyandotte, MI) and Glasteel (Moscow, TN). One preferred protective coating is BASF Elastocoat R85A92 WHT. Other rigid panels such as fiber reinforced plastic panels, such as can be obtained from Polser FRP Panels, Inc. (Izmir, Turkey).

This most preferred thickness was selected for a number of reasons including strength and process limitations. For the preferred coating described above, 0.063 inches is the thickest size that is believed to be presently available from manufacturers of the product. Since this was the thickest material that could be obtained with the preferred coating, the rigid alloy 5052-T34 with the aforementioned coatings was selected from a number of other materials having a number of other sizes. The inventors have determined that using an aluminum alloy allows the cover to be both light weight and rigid. The 5052-T34 material was chosen because it allows the cover to be strong and resistant to permanent deflections under static loads, denting, bending and long term abuse. The thickness also creates limitations if it is too thick because the panels 536 may interfere with one another at the hinge locations when the folding tonneau cover 530 is folded up and can therefore add a lot of unwanted stress on the hinge flexible hinge body 545*a* or the adhesive 570*a*, 571*a* where the respective hinges 544 are attached and sealed to the adjacent panels 536. If the panel material is too thin, the panels 536 will sag and easily deform with static loads. In alternate embodiments, other materials are used to make the panels 536 such as steel, aluminum, fiberglass, carbon fiber, ceramic, thermoset plastics, thermoplastics, HDPE, LDPE, ABS, PVC, Nylon, titanium alloy, magnesium alloy, copper, brass, stainless steel, rubber, fiber-reinforced or glass-containing polymeric materials and the like.

As noted, the preferred coatings on the panels 536 are a Kyrstal Kote™ polyester paint system from Valspar, preferably a black polyester base coat with a clear texture top coat on the top surface 537 and a clear epoxy coating on the underside or bottom surface 538 of the panels 536. Other coatings that could be used in alternate embodiments include acrylic paints, polyester paints, epoxy coatings, galvanized coatings, zinc plating, anodizing, other plating systems and the like. Alternative coatings include any combination of the above-mentioned coatings on either the top or the bottom sides of the panels 536. The texture on the top surface 537, bottom surface 538 of the respective panels 536 can be smooth, brushed, embossed, dented, sandblasted, rolled, waved and the like. Although a black top surface is preferred on the panels 536, coating including others colors that are well known in the art may also be applied on the top surfaces 537 and the bottom surfaces 538 of the respective panels 536 in alternative embodiments. It will be appreciated that the coating on the respective surfaces are desirable both aesthetically and functionally to enable the respective surfaces to hold up over time in harsh environments.

Figure 16A:
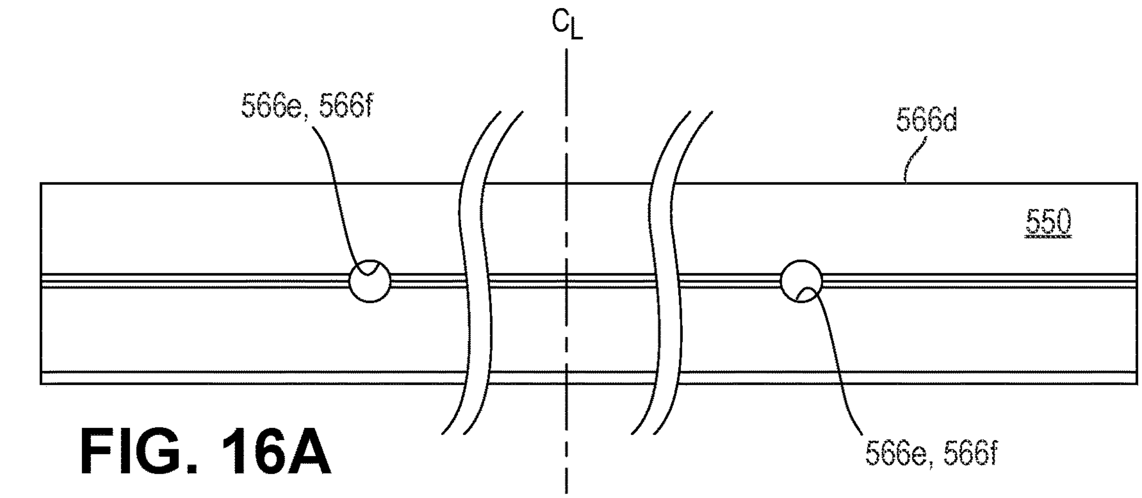
FIG. 16A illustrates a front view of a support bow or support member.
Figure 16B:
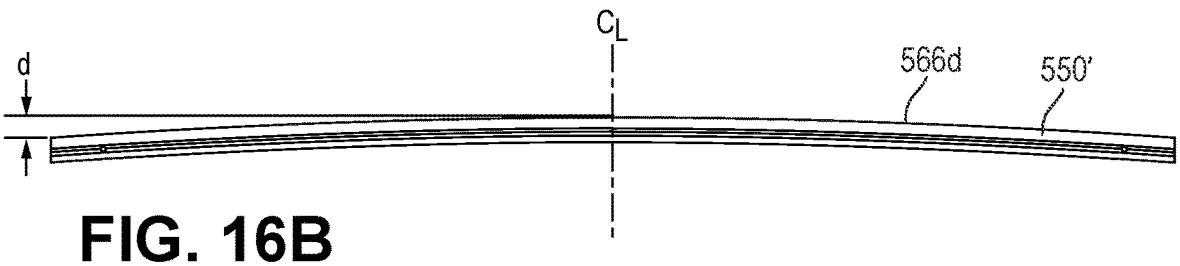
FIG. 16B illustrates an alternate support bow similar to the support bow of FIG. 16A, but wherein the alternate support bow has a slight bend or deflection of the support bow making its upper surface curved downwardly at the ends.
Figure 16C:
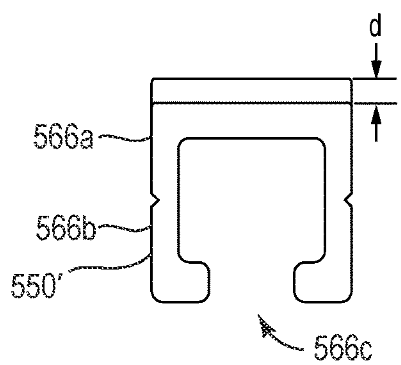
FIG. 16C is an end view of the support bow of FIG. 16B showing the deflection d.
Figure 16D:
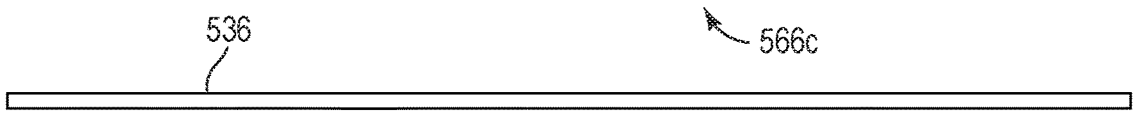
FIG. 16D is a schematic illustration of a front view of a rigid panel 536' of the folding tonneau cover of FIG. 1.
Figure 16E:
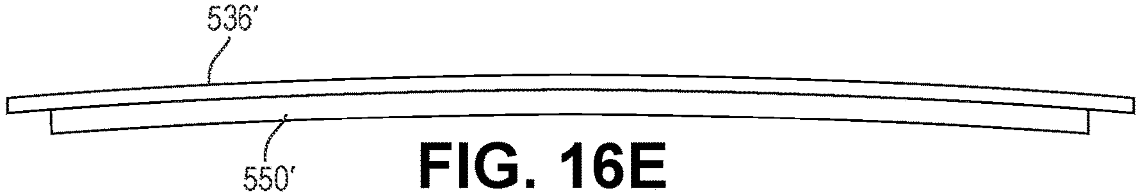
FIG. 16E is a schematic illustration of a rigid panel of FIG. 16D after being attached to the support bow of FIG. 16B, causing the panel to have a slight downwardly concave curvature reflecting the deflection of the alternate support bow of FIG. 16B.

Now referring also to FIGS. 16A-16K, the support bows 550 are preferably metal channels, more preferably extruded aluminum, although a strong thermoplastic or other polymeric material that is either molded or extruded could be used. Preferably, the support bows 550*b*-550*f* have a slight bend or bow, and are curved so that they are downwardly concave or concave down as shown (deflection distance d is exaggerated in some views for clarity of illustration). When the panels 536 are attached to the bent support bows 550*b*-550*f*, the panels 536 deflect and take on a corresponding slight bend or bow, except for the rear portion of the rear panel 536*a* and the front portion of the front panel 536*c*, which are preferably flat so that they approximate the shape of the tailgate 6*d* and the front wall 6*c* of the cargo box 5. For this reason, the support bows 550*a* and 550*g* are preferably straight. The resulting slight bow in the folding cover assembly 530 aids in shedding of water or debris from the folding cover assembly 530. Although the support bows 550 preferably include extruded channel, as long as the upper surface 566*d* of the support bow 550 has this downward curvature, the curvature will be imposed upon the panels 536 in the manner described. An example support bow 550 which is straight is schematically illustrated in FIG. 16A; the support bow 550*a* at the rear of the rear panel 536*a* and support bow 550*g* at the front of the front panel 536*c* are preferably straight. Support bows 550 which are curved or bent are schematically illustrated in FIGS. 16B, 16C, 16E, 16G, 16I, and 16K; the support bows 550*b*, 550*c*, 550*d*, 550*e*, and 550*f* are preferably curved. Such curved support bows 550 are referenced as 550' in FIGS. 16B, 16C, and 16E, 550*a'* in FIG. 16G, 550*d'*, 550*f'* in FIG. 16I, and 550*e'* in FIG. 16K, to distinguish them from the straight support bows 550, 550*a*, 550*d*, 550*f*, and 550*e*, respectively, in FIGS. 16A, 16F, and 16H, and 16J. The upper surface 566*d* of each respective support bow 550', 550*a'*, 550*d'*, 550*f'* is preferably curved so that the upper surface 566*d* at the ends of the respective support bow 550 are a deflection distance d lower than a highest extent of the upper surface 566*d* of the support bow 550 as shown (between the ends of the support bow 550, but preferably at the center portion of the support bow 550 as shown in FIG. 16B). The deflection distance d is preferably between about zero and about 1 inch; more preferably, the deflection distance d is preferably between about 1/64th inch and about ½ inch; still more preferably, the deflection distance d is about ⅛ inch. These example approximate deflection distances are for a typical cargo box 5 of a typical pickup truck 2; for wider or narrower cargo boxes, the length of the respective panels 536 and the respective support bows 50 may be longer or shorter, and the deflection distance d is preferably correspondingly larger or smaller, in order to provide a similar function in aiding the run-off of water or other debris from the panels 536. Currently, for example, most common pickup truck cargo boxes are from about 3.5 feet to about 6 feet in width; the deflection distance is preferably correspondingly smaller or larger when the folding cover assembly is sized to cover a cargo box which is narrower than about 3.5 feet or wider than about 6 feet, respectively. The inventors have found that for most common trucks, a deflection distance d which is about 1/16 inch or less typically does not provide the preferred water run-off. The inventors have also found that a deflection distance d which is about 3/16 inch or more can create unwanted stress particularly in the panels 536*a* and 536*c* which preferably have one curved support bow 550 and one generally straight support bow 550 configured to approximate the shape of the tailgate 6*d* and the front wall 6*c* of the cargo box 5. Therefore, we have found that for the typical truck cargo boxes 5 about 3.5 to about 6 feet in width, the preferred deflection distance is between about 1/16 inch and 3/16 inch. In some embodiments, support bows 550 include optional opposed support holes 574*e* in the front and rear portions of the support bow as illustrated.

Figure 16F:
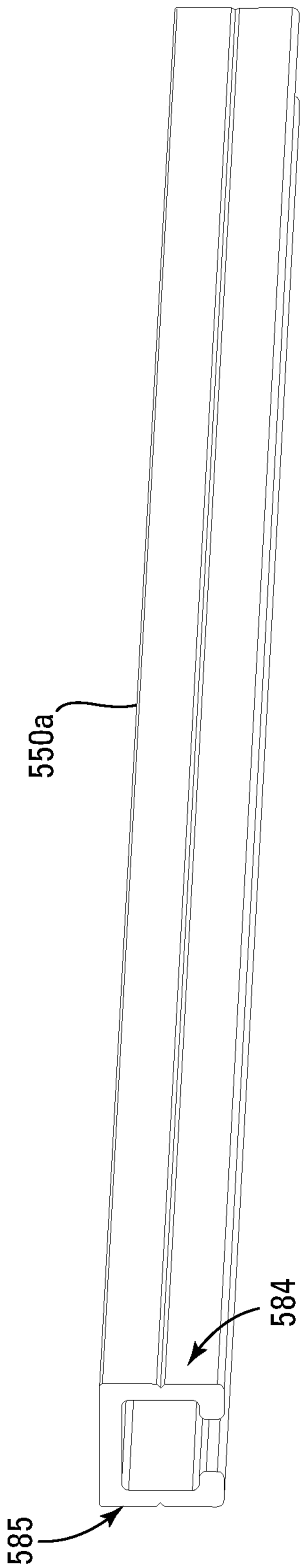
FIG. 16F is a perspective view of a straight support bow or support member with no hinge support flange and no downward deflection.
Figure 16G:
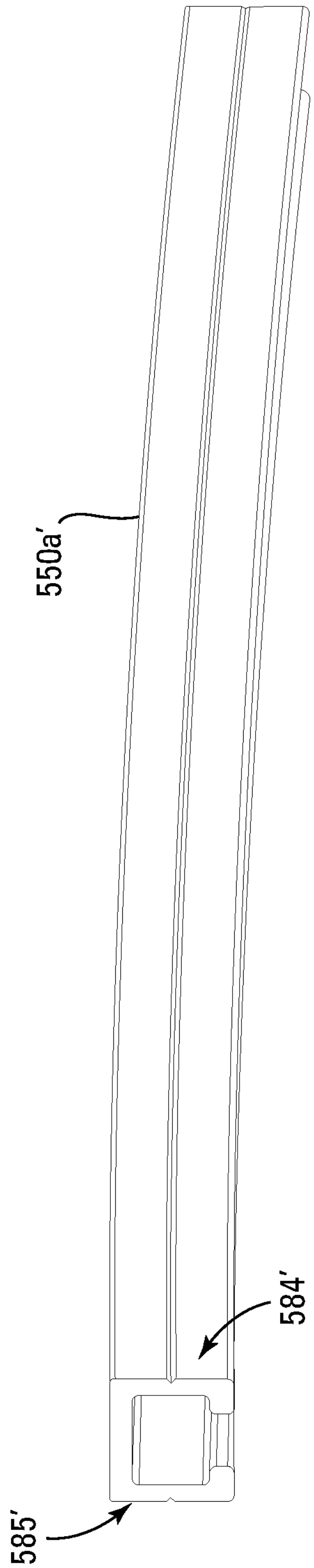
FIG. 16G is a perspective view of a curved support bow or support member with no hinge support flange and a downward curvature or deflection.
Figure 16H:
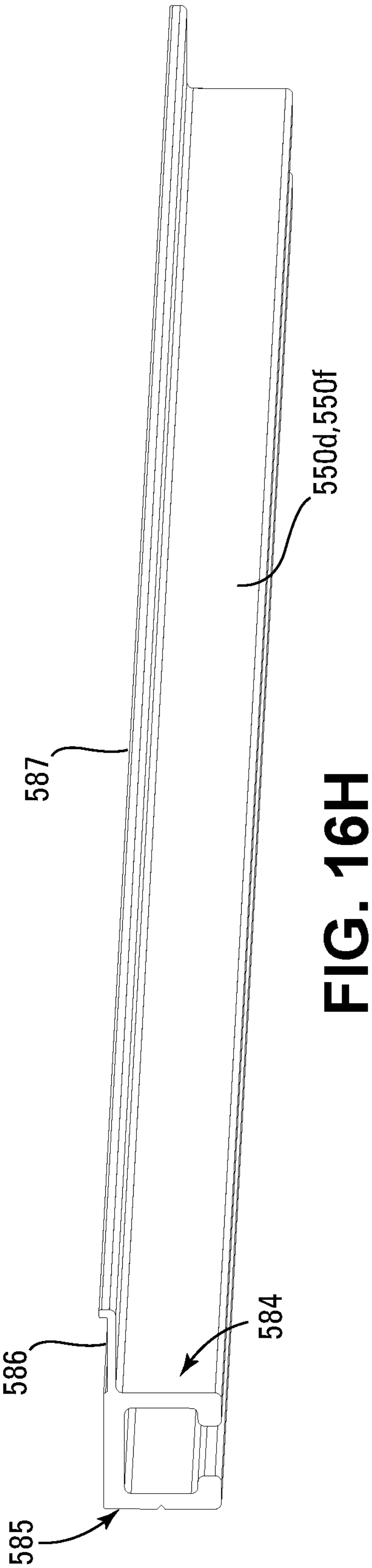
FIG. 16H is a perspective view of a straight support bow with one hinge support flange having a lip.
Figure 16I:
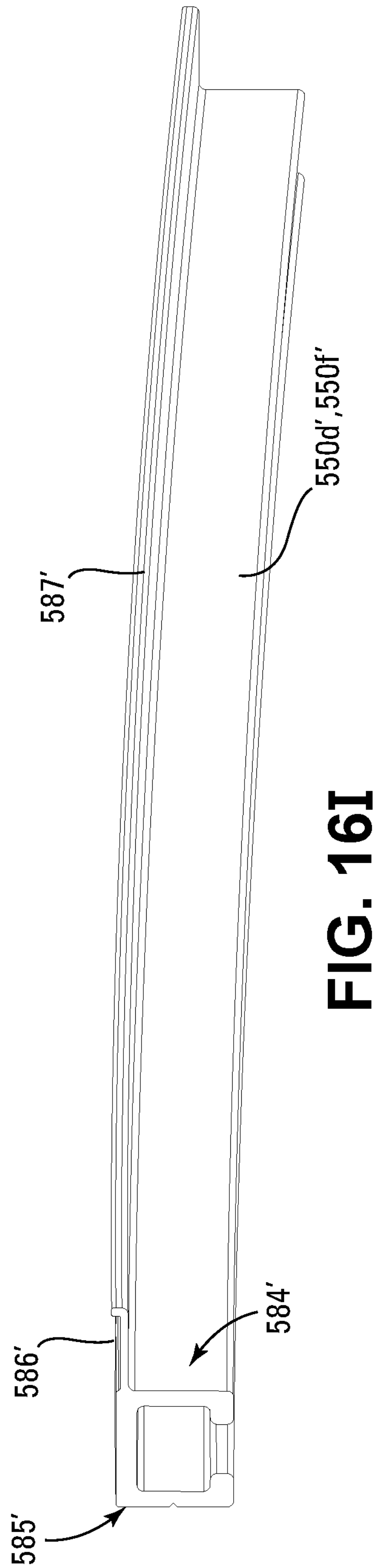
FIG. 16I is a perspective view of a curved support bow having a downward deflection and one hinge support flange having a lip.
Figure 16J:
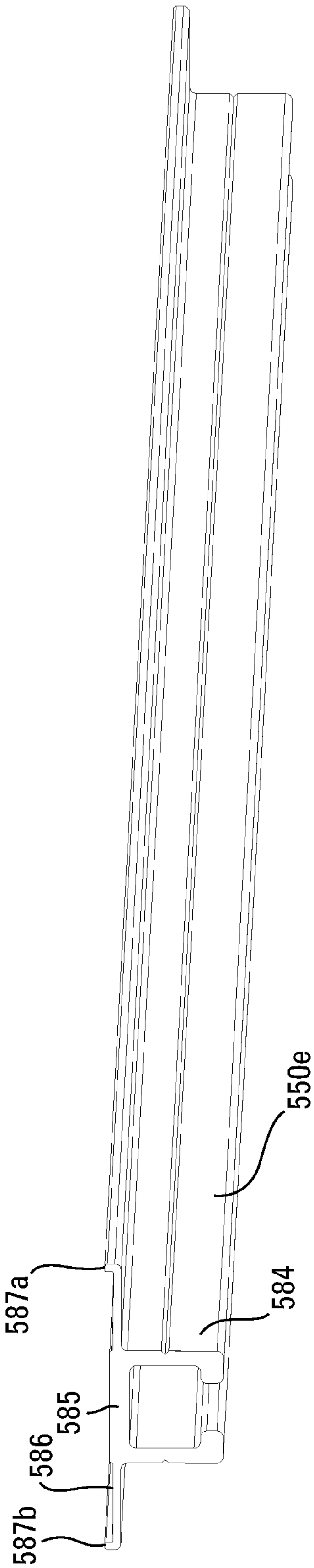
FIG. 16J is a perspective view of a straight support bow having two hinge support flanges.
Figure 16K:
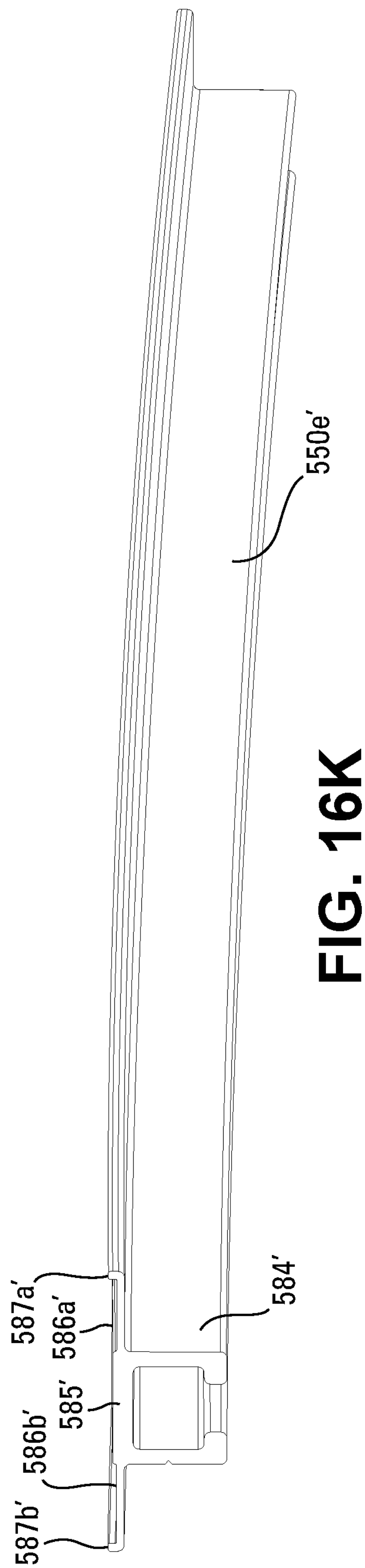
FIG. 16K is a perspective view of a curved support bow having two hinge support flanges and a downward deflection.

Support bow 550*e* is shown in FIG. 16J, which also illustrates bow main portion 584, bow upper portion 585, hinge support flange 586, and flange lips 587*a* and 587*b*. Similarly, curved support bow 550*e'* is shown in FIG. 16K, which also illustrates bow main portion 584', bow upper portion 585', hinge support flanges 586*a'* and 586*b'*, and flange lips 587*a'* and 587*b'*.

In preferred embodiments, the support bows 550 include the bow main portion 584 including a generally C-shaped channel with the bow upper portion 585 configured for attachment to the bottom surface 538 of the respective panel 536 and oriented with the channel opening 566*c* at the bottom. Some components of the folding tonneau cover apparatus 510 preferably slide into or are attached to the support bows 550, including the latch slides 553, the cord guides 555, the standoffs 558, spring 556, and the spring retainers 557*a*. The bow end caps 565 preferably slide into the ends of the support bows 550.

Some embodiments include support bows 550 that are straight, such as the support bows 550 that are schematically illustrated in FIGS. 16F, 16H, and 16J, which include no hinge support flange 586*a*, 586*b*, one hinge support flange 586*a*, 685*b*, or two hinge support flanges 586*a*, 586*b*, respectively. Some embodiments include support bows 550 that are curved or bent, such as the support bows 550 that are schematically illustrated in FIGS. 16G, 16I and 16K, which include no hinge support flange 586*a*, 586*b*, one hinge support flange 586*a*, 685*b*, or two hinge support flanges 586*a*, 586*b*, respectively. The folding cover assembly 530 preferably includes support bows 550 that are straight as support bows 550*a* and 550*g* illustrated in FIGS. 2B, 16A, and 16F; support bows 550*a* and 550*g* are not adjacent to a hinge 544 and therefore do not require a hinge support flange 586*a* or 586*b* (FIGS. 16A, 16F). The folding cover assembly 530 preferably includes support bows 550 that are curved or bent (concave down) and include a hinge support flange 586*a* located to one side of the bow main portion 584 and extending to support the hinge side portion 546*b*, 546*c* as described above and further illustrated in FIGS. 16H and 16I. The folding cover assembly 530 more preferably includes support bows 550 that are bent and have a hinge support flange 586*a* as support bows 550*b*, 550*c*, 550*d* and 550*f* (FIG. 2B). Preferably, the folding cover assembly 530 includes a support bow 550 that includes two hinge support flanges 586*a* and 586*b*, located on opposed sides of the bow main portion 584, each hinge support flange 586*a*, 586*b* extending to support the hinge side portion 546*b*, 546*c* of hinge 544*b*, 544*c*, as described above and further illustrated in FIGS. 16J and 16K. The folding cover assembly 530 more preferably includes a support bow 550 that is bent and has two hinge support flanges as support bow 550*e* (FIGS. 2B, 16K).

The sidebars or handles 559 are attached to panels 536*a*, 536*b*, and 536*c* near each side of each panel 536. The sidebars 559 provide additional support along the side portions of the panels 536. The sidebars 559 are preferably metal, although a strong polymer can be used. More preferably, the sidebars 559 are formed of aluminum. The sidebars 559 are preferably formed with recesses or other grasping features, to facilitate grasping for lifting and positioning the panels 536 during opening and closing of the folding cover assembly 530. Preferably, the support bows 550 and the sidebars or handles 559 are elongated, so that they can provide support across the width 540 or length 539, respectively, of the respective panel 536.

Referring now to FIGS. 17A-17B, viewed along the viewing line 17A-17A in FIG. 3A, additional details in the vicinity of the side of the spacer panel 536*d* are illustrated. These views show hinges 544*b* and 544*c*, latch 552*d*, and support bows 550*d*, 550*e*, 550*f*, and the containment bracket 525*b*. In FIG. 17B, the middle panel 536*b* has been raised up to begin folding this portion of the folding cover assembly 530. The hinge 544*b* is shown flexing, and the hook 562*d* is rotated and displaced from the catch 564*d* so that the spacer panel 536*d* can also be lifted up. Some elements shown elsewhere herein are not shown in FIGS. 17A and/or 17B to show the hinge function more clearly.

The hinge body 545*a* is further illustrated in FIG. 17C, which is an isolated perspective view of the hinge body 545*a* and the adhesive 570*a*, illustrating the hinge longitudinal axis 545*b*, the hinge body profile 545*c* along a representative vertical front-rear section plane 597, the hinge body upper surface 595, the hinge body lower surface 596, representative hinge thickness 545*d* in two locations, the central portion 546*a*, the side portions 546*b*, 546*c*, and the intermediate portions 546*d*, 546*e*.

As described above in relation to the schematic illustrations in FIGS. 5A-5B, the flexible hinge body 545*a* preferably includes more than one polymeric material such as those described herein; for example, the flexible hinge body 545*a* may include a softer or lower-durometer elastomeric polymer material 547*c* and a harder or higher-durometer elastomeric polymer material 547*d*. The central portion 546*a* preferably includes the softer elastomeric polymer material 547*c*, and the side portions 546*b* and 546*c*, which are secured to the rigid panels 536 as stated, preferably include the harder elastomeric polymer material 547*d*. In such embodiments, a transition or mixing of the materials preferably occurs in the intermediate portions 546*d* and 546*e*. This arrangement preferably provides a structure with the central portion 546*a* being more flexible in bending than the intermediate portions 546*d* and 546*e* and the side portions 546*b* and 546*c*, so that bending of the flexible hinge body 545*a* preferentially occurs in the central portion 546*a*, although some flexing and bending can occur in other portions of the flexible hinge 544 in addition to the central portion. Embodiments of the hinge 544*a* are further illustrated in FIGS. 18A-18F, which are schematic illustrations similar to those of FIGS. 5A and 5B, with similar orientation as viewed from line 5A-5A on FIG. 2A.

A portion of the hinge body 545*a* is shown in a perspective view in FIG. 17D taken from the dashed rectangle 17D shown in FIG. 17C, which shows the hinge body profile 545*c* of the hinge body 545*a*, and also showing the central portion 546*a*, the side portions 546*b* and 546*c*, the intermediate portions 546*d* and 546*e*, more flexible polymer material 547*c*, stiffer polymer material 547*d*, intermediate polymer material 547*e*, adhesive 570*a* and 570*b*, hinge body upper surface 595, and hinge body lower surface 596.

A portion of the hinge body 545*a*' is shown in perspective view in FIG. 17E which is similar to the view shown in FIG. 17D, except that the hinge body that is shown is an alternate hinge body 545*a*', which shows the hinge body profile 545*c*' of the hinge body 545*a*', and also showing the central portion 546*a*', the side portions 546*b*' and 546*c*', the intermediate portions 546*d*' and 546*e*', hinge body polymer material 547*a*', and double-sided adhesive tape 571*a*. A portion of the hinge body 545*a*''' is shown in perspective view in FIG. 17F which is similar to the view shown in FIG. 17D, except that the hinge body that is shown is an alternate hinge body 545''', which shows the hinge body profile 545*c*''' of the hinge body 545*a*''', and also showing the central portion 546*a*''', the side portions 546*b*''' and 546*c*''', the intermediate portions 546*d*''' and 546*e*''', hinge body polymer material 547*a*', and double-sided adhesive tape 571*a*.

Figure 17G:
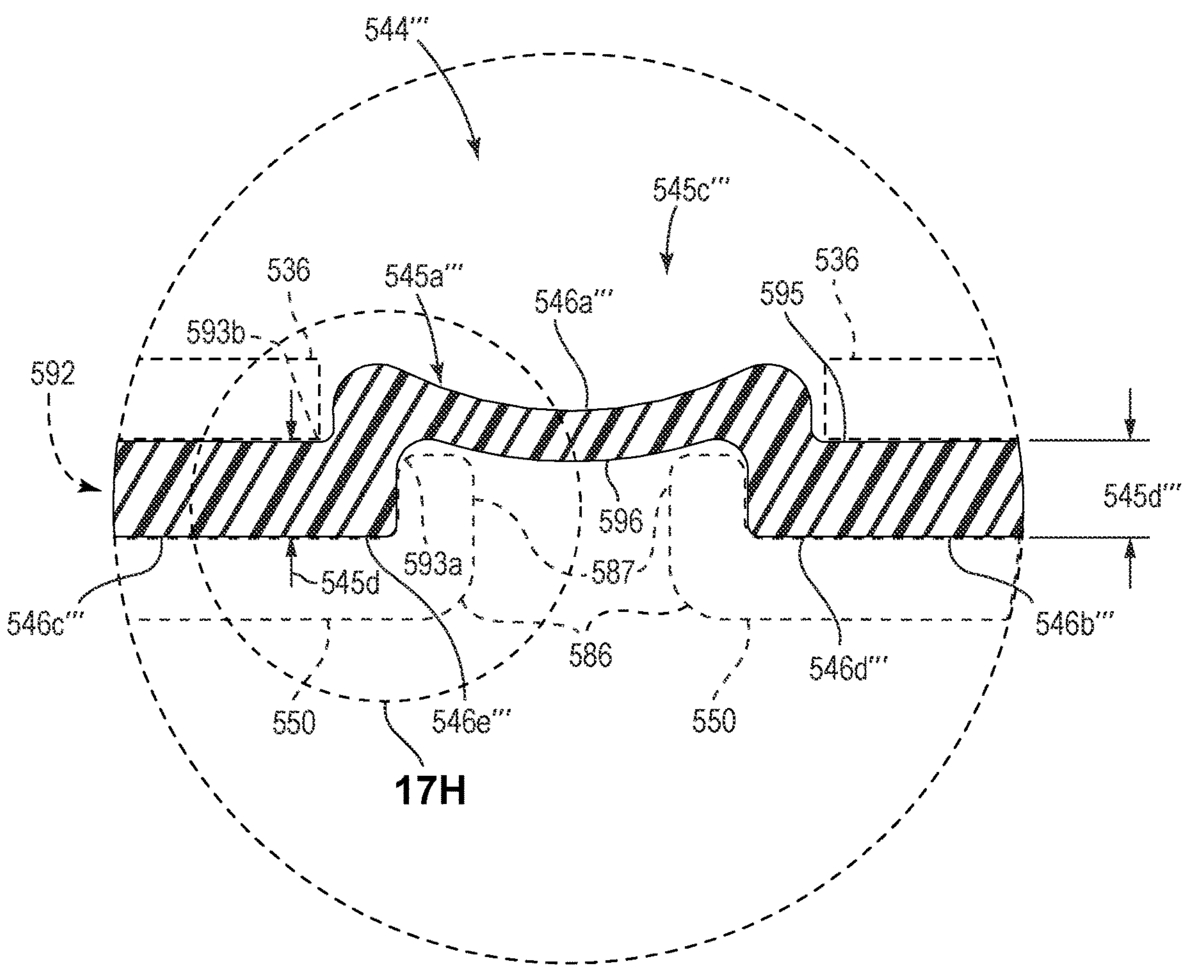
FIG. 17G is an enlarged schematic illustration similar to that shown in FIG. 18J, which is referenced herein below, except that the hinge body is different which allows the configuration of the partial enclosure 592 to engage the alternate hinge body 545*a*''' in a slightly different manner wherein the panel 336 does not abut against the hinge body 545*a*''' the same way that is shown in FIG. 18J.
Figure 18A:
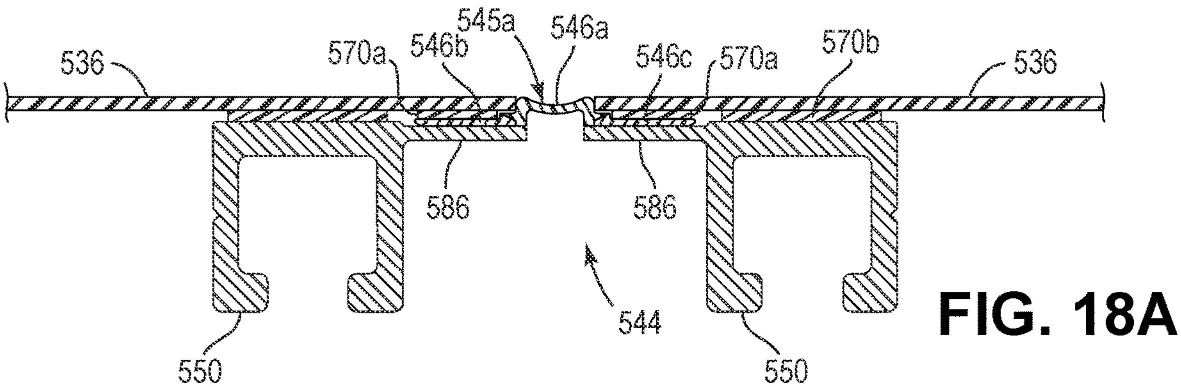
FIG. 18A is a schematic illustration similar to that of FIG. 5A, but illustrating an alternative embodiment of the support bows each having a flange, but neither of which have a flange lip.
Figure 18B:
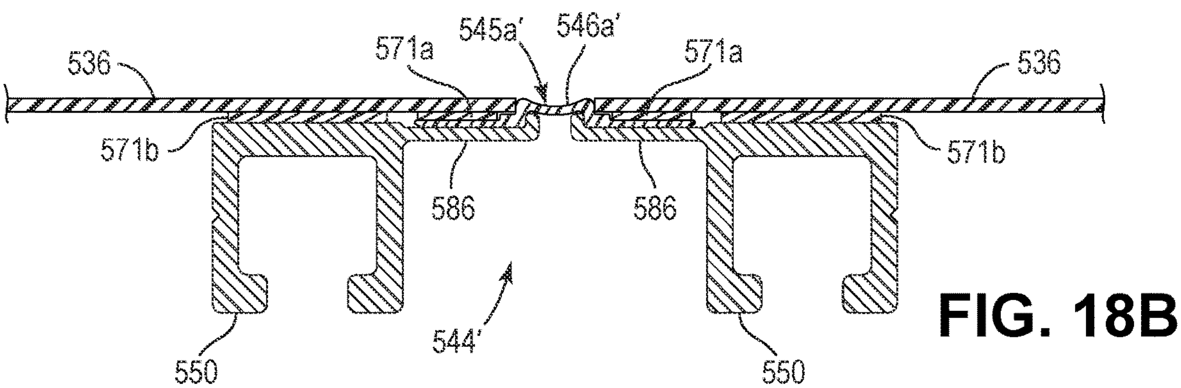
FIG. 18B is a schematic illustration similar to that of FIG. 5A, but illustrating an alternative embodiment of the hinge body 545*a*' having a single hinge body polymer material and having support bows that have a lip at the end of each of the support flanges of the partial enclosure.
Figure 18C:
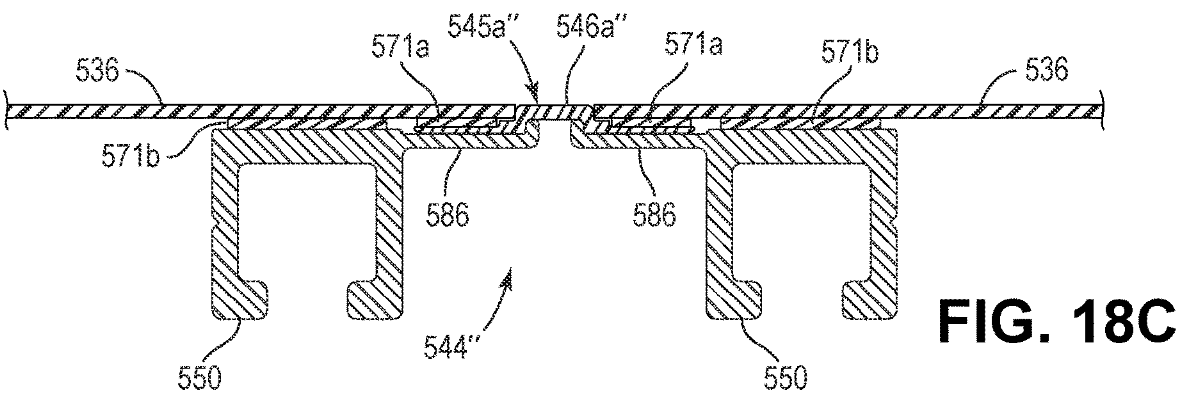
FIG. 18C is a schematic illustration similar to that of FIG. 18B, but illustrating a further alternative embodiment of the hinge body 545*a*'' made of a single polymeric material and having a flat central portion.
Figure 18D:
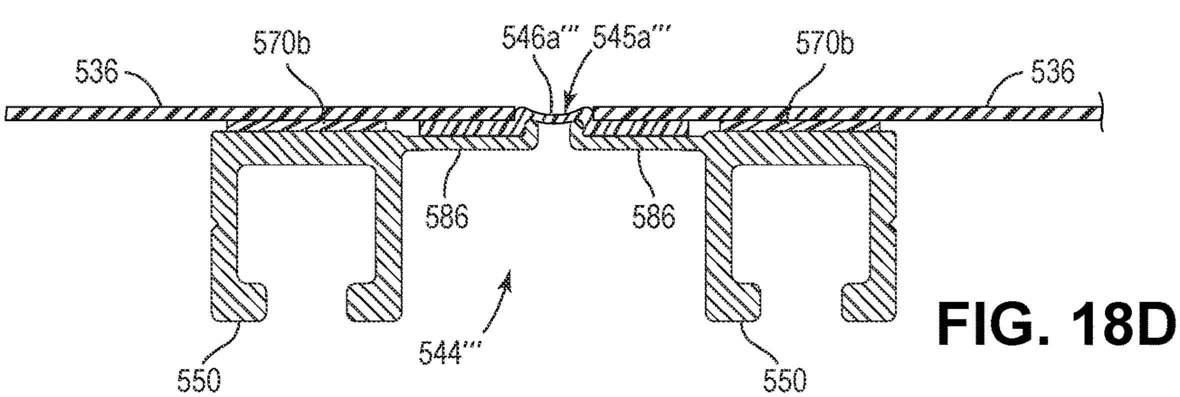
FIG. 18D is a schematic illustration similar to that of FIG. 18B, but illustrating a further alternative embodiment of the hinge body 545*a*''' made of a single polymeric material that is secured on each side within a partial enclosure created by the panel 536 and the support bow 550 without an adhesive securing the side portion to the rigid panel.
Figure 18E:
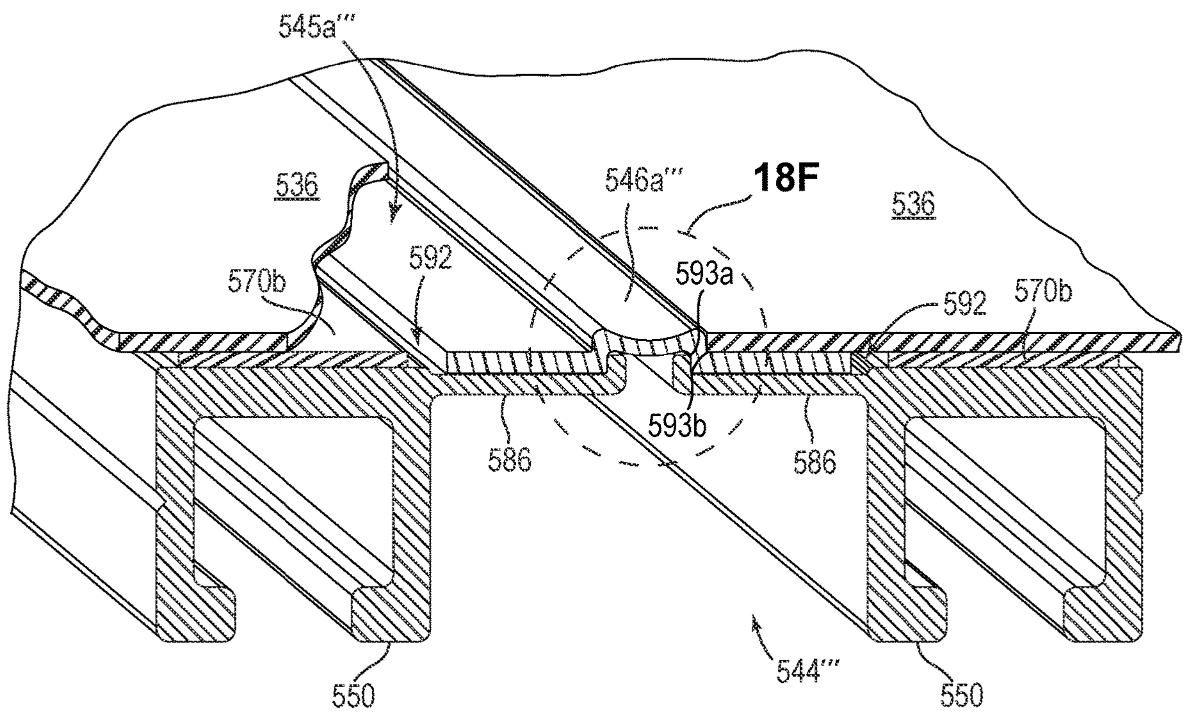
FIG. 18E is an enlarged schematic perspective illustration similar to that of FIG. 17G, but with the hinge body shown partially secured within a partial enclosure 592 created by rigid panels 536, one of which is partially broken away, and support bows having a lip at the end of each of the support flanges of the partial enclosure.
Figure 18F:
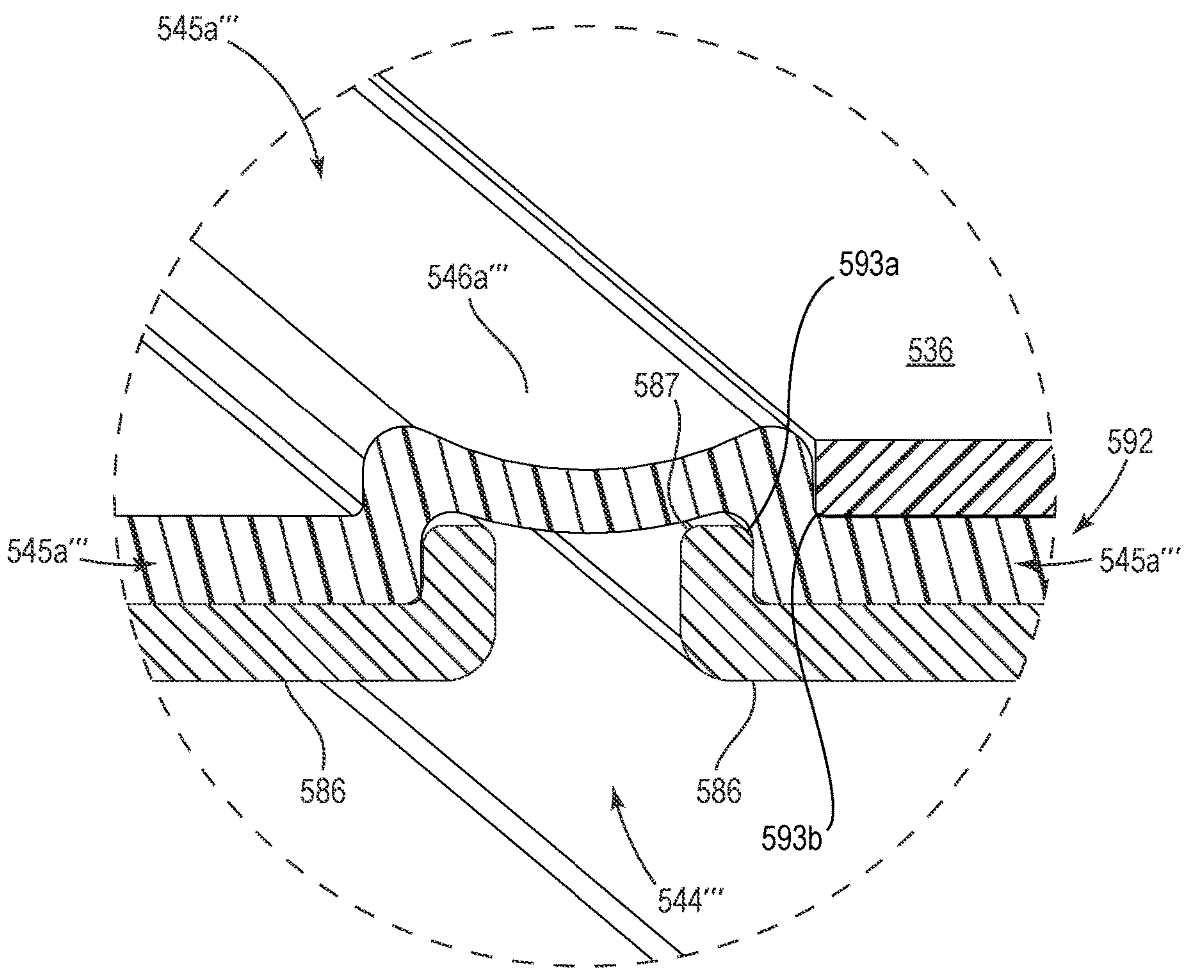
FIG. 18F is an enlarged schematic perspective view of the portion of FIG. 18E shown in the dashed circle 18F, but with the rigid panels and support bows shown only in part.
Figure 18G:
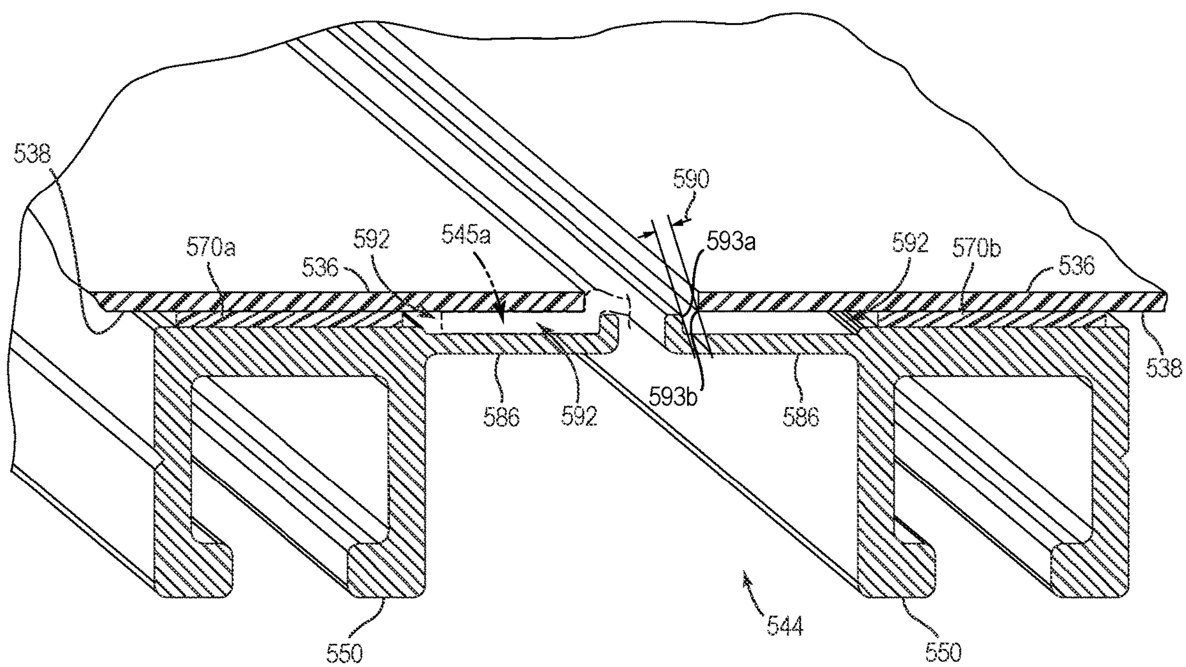
FIG. 18G is a further schematic perspective view similar to FIG. 18E but showing the structure of the partial enclosure 592 with the hinge body shown only partially in phantom, with the rigid panels and support bows shown in cooperation with one another as shown in FIG. 18D.
Figure 18H:
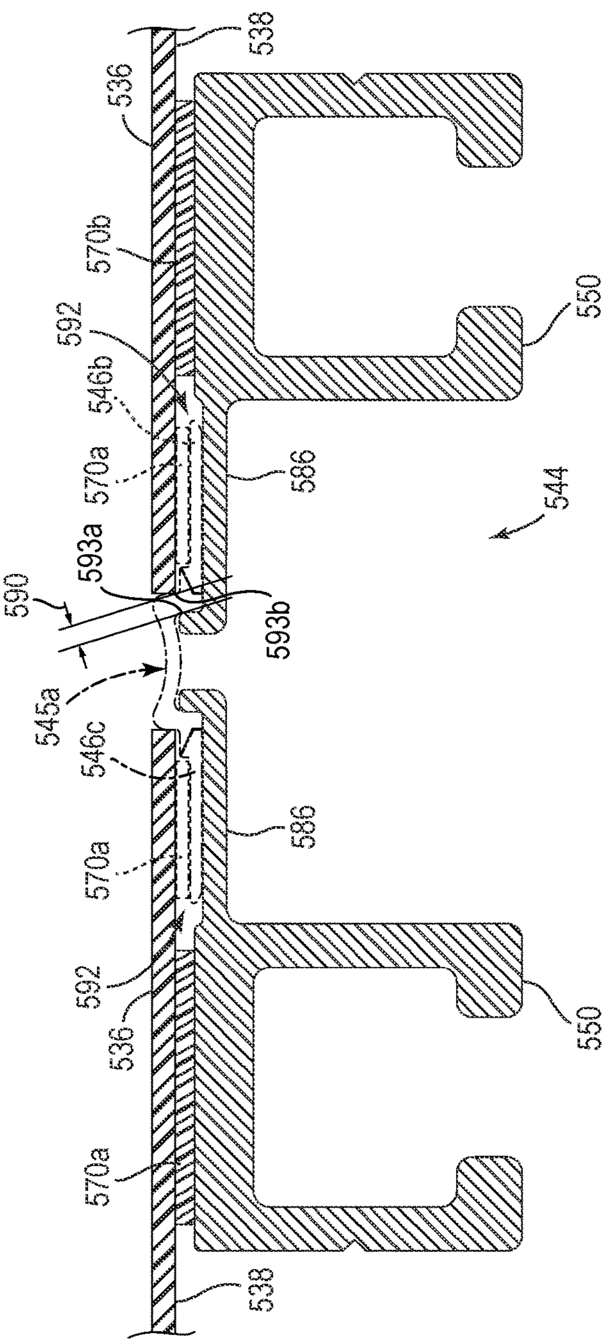
FIG. 18H is an enlarged view providing a transverse vertical cross section of the portion of the folding tonneau cover assembly shown in FIG. 18A, but showing the hinge body 545*a* in phantom.
Figure 18I:
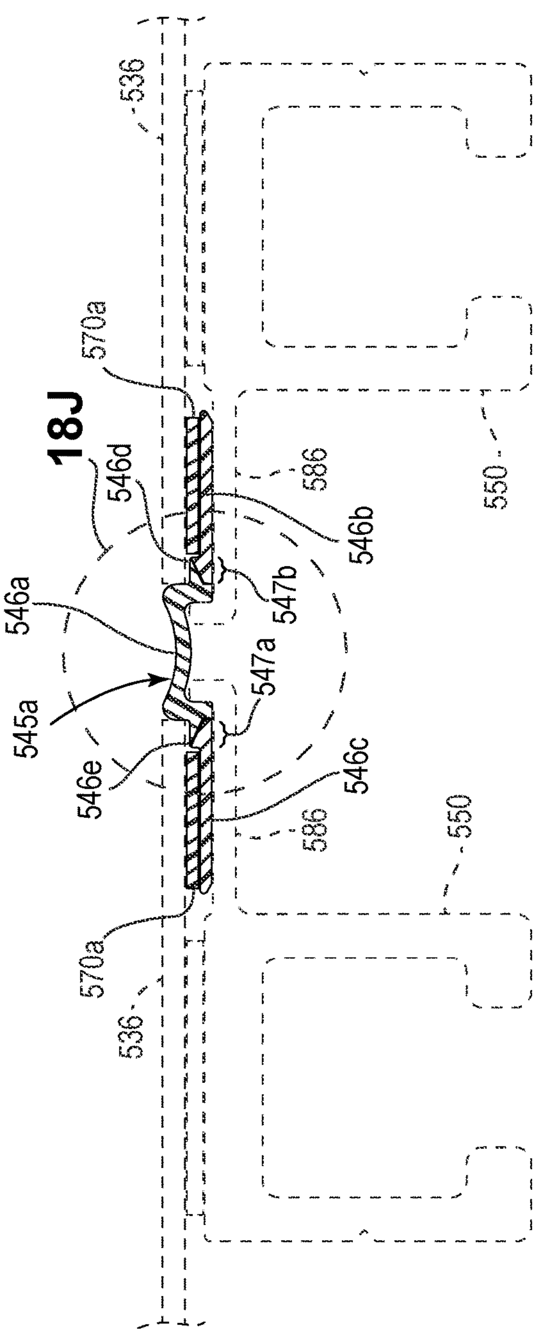
FIG. 18I is an enlarged view similar to that shown in FIG. 18H, except that the hinge body 545*a* is shown in cross section and the rigid panels 536 and the support bows 550 are shown in phantom.
Figure 18J:
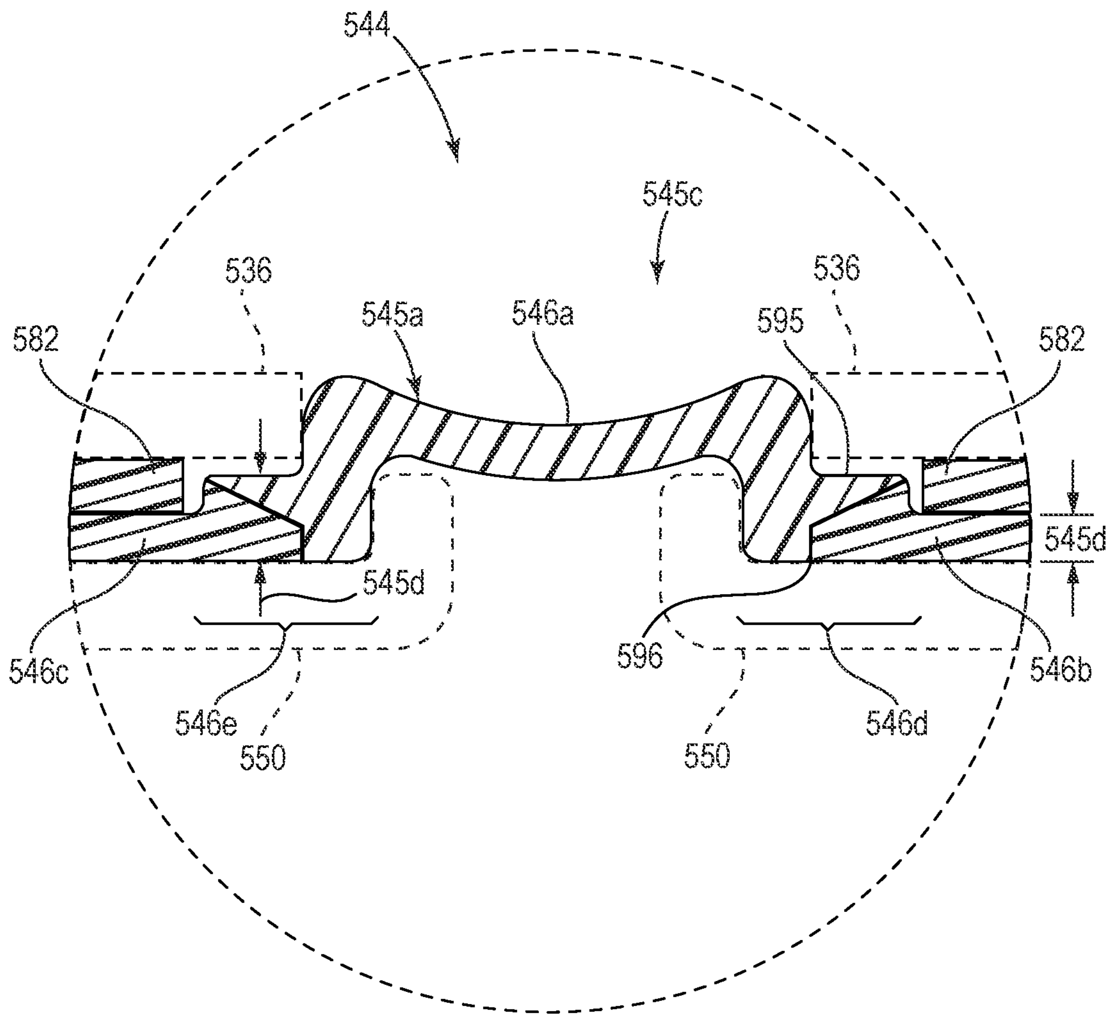
FIG. 18J is an enlarged view of the portion of the folding tonneau cover assembly 530 shown in the dashed circle 18J of FIG. 18I.

A portion of the hinge body profile 545*c*''' of hinge body 545*a*''' is shown in FIG. 17G, in an enlarged schematic illustration similar to that shown in FIG. 18J, which is referenced herein below, except that the hinge body 545*a*, shown in FIG. 18J, is somewhat different from that of the hinge body 545*a*''' which allows the configuration of the partial enclosure 592 to engage the alternate hinge body 545*a*''' in a slightly different manner wherein the panel 336 does not abut against the hinge body 545*a*''' the same way that is shown in FIG. 18J.

Figure 17H:
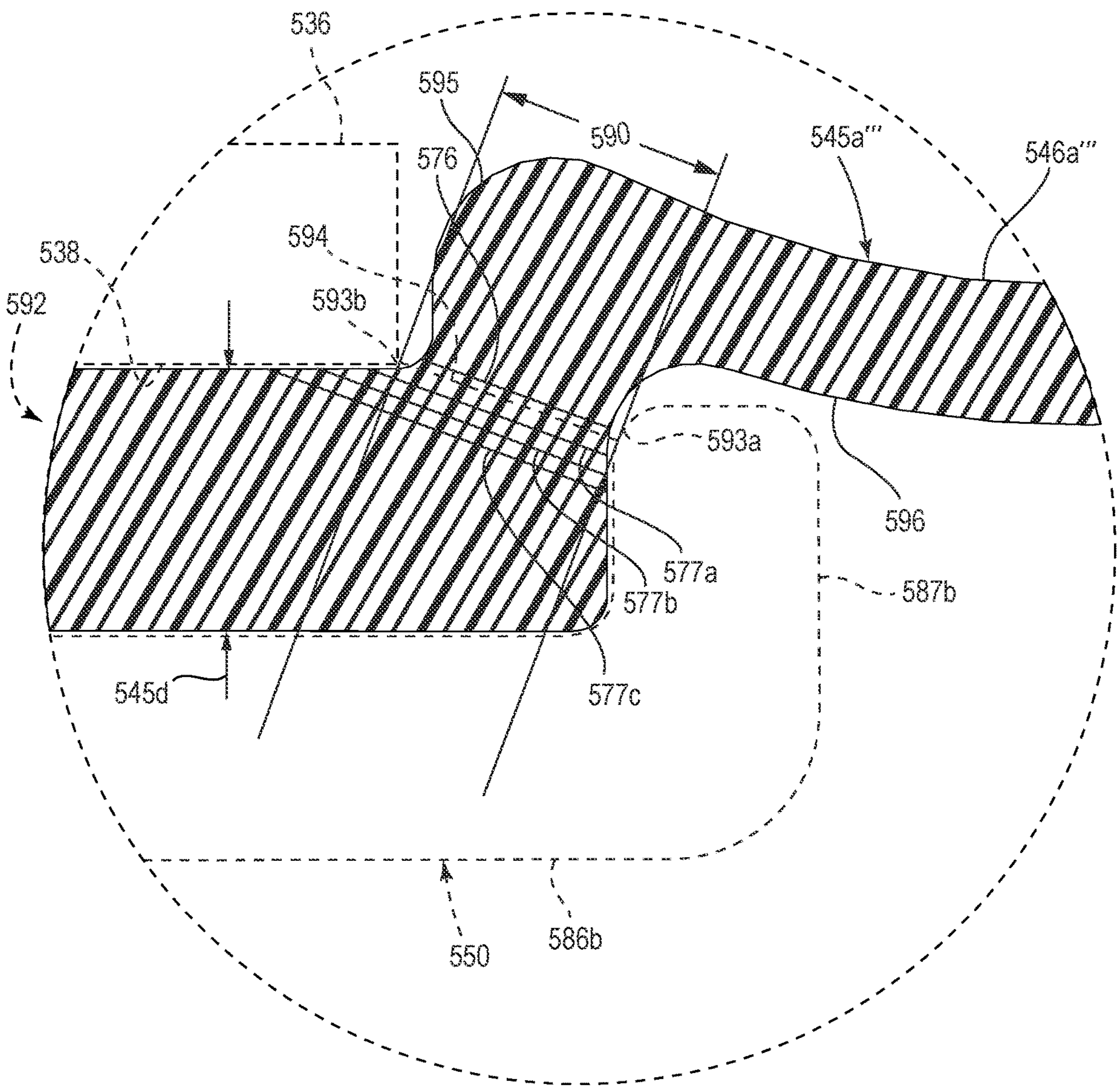
FIG. 17H is a further enlargement of a portion of the hinge body 545*a*''' and the partial enclosure 592 in which the hinge body is secured and also showing the gap 590 between a first point 593*a* on the lip 587*b* of the flange 586*b* of the support bow 550 and a second point 593*b* at the lower corner of the panel 536 which is taken from the dashed circle 17H of FIG. 17G.

The hinge body 545*a*''' is shown in a further enlargement, shown in FIG. 17H, which is taken from the dashed circle 17H of FIG. 17G, which illustrates a portion of the hinge body 545*a*''' and the partial enclosure 592 in which the hinge body is secured and also showing the gap 590 between a first point 593*a* on the lip 587*b* of the support flange 586*b* of the support bow 550 and a second point 593*b* at the lower corner of the rigid panel 536.

In preferred embodiments of the present folding tonneau cover assembly 530, the preferred hinge body 545*a*''' will be made of a single polymeric material 547*a* having a single durometer, as shown in FIGS. 17F, 17G, 17H, 18D, 18E and 18F and no adhesive material will be required to secure the hinge body 545*a*''' within the partial enclosure 592 created in part by both the bottom surface 538 of the respective rigid panel 536 and a support bow 550 secured to the bottom surface 538 of the rigid panel 536 on each side of the hinge 544 so as to secure the respective side portion 546*b*, 546*c* and intermediate portion 546*d*, 546*e* at least partially within the respective partial enclosure 592. In other embodiments disclosed herein, various ways of incorporating adhesive materials into the folding tonneau cover assembly 540 are used to secure the respective hinge body 545*a* within the respective partial enclosure 592, but with this embodiment of the hinge body 545*a*''' it will be appreciated that the partial enclosure 592 is sufficient to retain the hinge body 545*a*''' without having a need for adhesive material to secure the hinge body 545*a*''' within the partial enclosure 592. The hinge body 592*a*''' may also be made of multiple polymeric materials and be made of dual or multiple durometer material (not shown) and not require adhesive material for suitable securement in the partial enclosure 592 and adhesive material can, of course, be used to secure the alternate hinge body within the partial enclosure 592.

Referring now further to FIGS. 17F, 17G and 17H, the partial enclosure 592 on each side of the hinge body 545*a*''' is constructed and arranged to retain one of the respective side portions 546*b*, 546*c* and the adjacent intermediate portions 546*d*, 546*e* within the partial enclosure 592 without a need for any adhesive. It will be appreciated that the lack of a need for an adhesive is especially advantageous during the assembly process and also if a need arises to remove and replace the hinge body after manufacture. The key to retaining the hinge body 545*a*''' within the partial enclosure 592 is the limited width of a gap 590 that exists between a first point 593*a* on an inside surface of the lip 587 of the support flange 586 of the support bow or support member 550 that is secured to a bottom surface 538 of the proximate panel 536 and a second point 593*b* at the bottom corner of the adjacent rigid panel 536. This gap 590 is constructed and arranged to be large enough to accommodate a portion of the hinge body 545*a*''' that resides between the central portion 546*a*''' and the respective intermediate portion 546*d*''', 546*e*''' to fit within the gap 590. As shown in FIG. 17H, the length of gap 590, which is the same as the length of the dashed line 594, that extends from the first point 593*a* on the inside surface of the lip 587*b* to the second line 593*b* at the lower corner of the bottom surface 538 of the rigid panel 536. This dashed line 594, which has the same length as the gap 590, is longer than the line 576 that extends from the upper surface 595 of the hinge body 545*a*''', proximate the second point 593*b*, to the lower surface 596 of the hinge body 545*a*''', proximate the first point 593*a*. Lines 577*a*, 577*b*, and 577*c* are each parallel to line 576 and also parallel to dashed line 594. As can be seen, lines 577*a* 577*b*, and 577*c* are each successively longer in length than the line 594 and line 576, because the width of the intermediate portion 546*d*''' and 546*e*''' on each side of the central portion 546*a*''' become progressively wider or larger as the lines grow progressively further away from the gap 590 and the upper surface 595 and the lower surface 596 diverge from one another as these respective surfaces become farther away from the gap in the immediate vicinity of the intermediate portions 546*d*''', 546*e*''', respectively. As the respective intermediate portion 546*d*''', 546*e*''' descends away from the central portion 546*a*''', the hinge thickness 545*d* of the respective intermediate portion 546*d*''', 546*e*''' becomes enlarged, so much so that respective intermediate portion or shoulder 546*d*''', 546*e*''' is restricted from passing through the gap 590 under normal conditions that generally exist during the use of such a folding tonneau cover assembly 530. This restriction is generally believed to be sufficient to prevent the disengagement of the respective shoulders 546*d*''', 546*e*''' and side portions 546*b*''', 546*c*''' from the partial enclosure 592 under normal conditions generally experienced by truck owners.

The edges of the gap 590 are generally unyielding because the preferred rigid panels 536 and the preferred support bows 550 are preferably made of aluminum which is generally unyielding when a polymeric material such as the polymeric material preferably used to make the hinge bodies 545*a* of the present invention are drawing against the aluminum under great force. In most cases, the polymeric material will tear or deform before the aluminum material will bend significantly or break, but in any case, such levels of force are not generally expected under the anticipated conditions under which such tonneau cover assemblies are generally required to operate. As shown in the drawings, the thickness of the respective shoulder or intermediate portion 546*d*''', 546*e*''' of the hinge body 545*a*''' becomes greater as the thickness is measured in lines 577*a*, 577*b*, and 577*c*, which are each of incrementally greater length than the prior line as the distance from the central portion 546*a*''' of the hinge body 545*a*''' increases in series: 577*a* to 577*b* to 577*c*. Each of these lines are incrementally greater in length than line 575 that stretches from a point on the upper surface 595 of the hinge body proximate the second point 593*b* on the lower corner of the most proximate rigid panel 536 to a point on the lower surface 596 proximate the first point 593*a* on the lip 587 of the support flange respective 586. Each of the lines 577*a*, 577*b*, 577*c* are parallel to line 275 and each is incrementally longer and incrementally farther away from the line 275. Because the shoulder 546*d*''', 546*e*''' becomes wider or thicker as the shoulder becomes farther removed from the central portion 546*a*''' the shoulders 546*d*''', 546*e*''' and the side portions 546*b*''', 546*c*''' of the hinge body 545*a*''' are restricted from becoming disengaged from the partial enclosure 592 by being drawn out of the partial enclosure 592 through the gap 590.

In the embodiment schematically illustrated in FIG. 18A, the configuration is similar to that illustrated in FIG. 5A; the support bows 550*b* and 550*c* have hinge support flanges 586*a* and 586*b*, respectively, but lack the flange lips 587*a* and 587*b* which are present in the embodiment illustrated in FIG. 5A. In the embodiment of FIG. 18A, the arrangement preferably includes adhesive 570*a* to secure and seal the respective side portions 546*b*, 546*c* to the bottom surface 537 of the respective rigid panels 536*a* and 536*b*.

In the embodiment schematically illustrated in FIG. 18B, the configuration is similar to that illustrated in FIG. 5A, except that an alternate hinge 544' is shown, having a hinge body 545*a*' that has a single hinge body polymer material 547*a* (which preferably includes an elastomeric polymer material 547*b* and more preferably includes a thermoplastic polymer as stated above) is used throughout the central portion 546*a*' and the side portions 546*b*' and 546*c*' of the flexible hinge body 545*a*'. Preferably, bending of the flexible hinge body 545*a*' preferentially occurs in the central portion 546a' based on the hinge thickness 545d of the central portion 546a' and the side portions 546b' and 546c' of the flexible hinge body 545a'.

In the embodiment schematically illustrated in FIG. 18C, the configuration is similar to that illustrated in FIG. 18B, but an alternate hinge 544" is shown, having a hinge body 545a" that has hinge body profile 545c" that is different, having a more uniformly flat profile in the central portion 546a" than in the embodiment illustrated in FIG. 18B.

In the embodiment schematically illustrated in FIG. 18D, the configuration is similar to that illustrated in FIG. 18B, but an alternate hinge 544'" is shown, having a hinge body 545a'" but the adhesive 570a is not used at the side portions 546b'" and 546c'" and instead the hinge thickness 545d at the side portions 546b'" and 546c'" is such that each side portion 546b'", 546c'" preferably contacts both the respective hinge support flange 586a, 586b and the respective bottom surface 538 of the respective rigid panel 536 without intervening adhesive 570a.

The portion of the folding cover assembly 530 illustrated in FIG. 5A is schematically illustrated in further detail in FIG. 18E, which shows a portion of one of the panels 536 broken away to show the underlying structure of the hinge 544'", and which shows the flexible hinge body 545a'", and the central portion 546a'", and illustrates the partial enclosure 592 in which a portion of the hinge body 545'" is secured.

An enlarged view of the portion of the flexible hinge 544'" shown in the encircled area labeled 18F in FIG. 18E is illustrated in FIG. 18F. A portion of the hinge body 545a'" and the central portion 546a'", and the lip 587 are shown, and the hinge body 545a'" is partially enclosed in the partial enclosure 592. The lip 587 has a point 593a closest to the panel 536.

The partial enclosure 592 is illustrated in FIG. 18G in a further schematic perspective view similar to FIG. 18E but showing the structure of the partial enclosure 592 with the hinge body 545a shown only partially and in phantom, with the rigid panels 536 and support bows 550 shown in cooperation with one another as shown in FIG. 18D.

A portion of the folding tonneau cover assembly 530 is illustrated in FIG. 18H, which is an enlarged view providing a transverse vertical cross section of the portion of the folding tonneau cover assembly shown in FIG. 18A, but showing the hinge body 545a in phantom. A portion of the folding tonneau cover assembly 530 is illustrated in FIG. 18I in a further enlarged view similar to that shown in FIG. 18H, except that the hinge body 545a is shown in cross section and the rigid panels 536 and the support bows 550 are shown in phantom.

A further enlarged view of the portion of the folding tonneau cover assembly 530 shown in the dashed circle 18J of FIG. 18I is illustrated in FIG. 18J. Portions of the partial enclosure 592, hinge 544, hinge body 545a, central portion 546a, side portions 546b and 546c, intermediate portions 546d and 546e, hinge body profile 545c, hinge thickness 545d, hinge adhesive 570a, hinge body upper surface 595, and hinge body lower surface 596 are shown. Portions of the support bows 550 and rigid panels 536 are shown in phantom.

Preferably, the hinge thickness 545d between the hinge upper surface 595 and the hinge lower surface 596 is large enough in comparison to the gap 590 to provide a degree of securement of the flexible hinge body 545a so that the respective side portion 546b, 546c is retained between the hinge support flange 586a, 586b and the respective bottom surface 538a, 538b of the respective rigid panel 536a, 536b. The hinge thickness 545d at the respective intermediate portion 546d, 546e is greater than the gap 590, thereby reducing the possibility of the respective intermediate portion 546d, 546e passing through the gap 590 due to movements and stresses anticipated in use of the folding tonneau cover apparatus 510. In embodiments which include the adhesive 570a (such as the double-sided adhesive tape 571a, for example), the adhesive 570a provides further securement of the flexible hinge body 545a to the respective rigid panels 536.

As described above, adhesive 570a is preferably located between each side portion 546b, 546c and the respective rigid panel 536 (536a, 536b, 536c, 536d) to protect against passage of debris or precipitation into the cargo box 5; the adhesive 570a can also aid in securement of the flexible hinge body 545a to the respective rigid panel 536. Alternatively, the side portions 546b, 546c can fit tightly between the respective extended flange or hinge support flange 586 (586a, 586b) and the respective rigid panel 536, to provide a degree of protection against passage of debris or precipitation into the cargo box 5. The folding cover assembly 530 preferably includes support bows or channels 550 (550a, 550b, 550c, 550d, 550e, 550f, 550g) secured to the underside 538 (538a, 538b, 538c, 538d) of at least some of the rigid panels 536, near the front edge 541b and/or the rear edge 541c of the respective rigid panels 536, and which extend between the driver's side and the passenger side of the rigid panels 536. The support bows 550 are preferably secured to the underside 538 of the respective rigid panels 536 by adhesive 570b. In preferred embodiments, the support bows 550 include the hinge support flanges 586.

The extended flanges 586 are preferably separated a short distance from the respective rigid panel 536, so that there is a gap 590 between the hinge support flange 586 and the respective rigid panel 536. The hinge support flange 586 and the respective rigid panel 536 form a partial enclosure 592 into which the side portions 546b, 546c extend. The hinge support flanges 586 each preferably include a raised lip 587a, 587b to further secure the flexible hinge body 545a to the respective rigid panel 536. The raised lip is preferably positioned to create a restricted gap 590 between the raised lip 587a, 587b and the respective rigid panel 536, so that the side portion 546b, 546c cannot easily slip out from the partial enclosure 592 through the gap 590, further securing the flexible hinge body 545a to the respective rigid panel 536. The intermediate portion 546b, 546c preferably has a hinge thickness 545d which does not permit the intermediate portion 546b, 546c to easily pass through the restricted gap 590, further securing the flexible hinge body 445a to the respective rigid panel 536. In some embodiments, the geometry of the partial enclosure 592, gap 590, side portion 546b, 546c, and intermediate portion 546b, 546c provides a mechanical interlock to secure the flexible hinge body 545a to the respective rigid panel 536 without the need for adhesive or other fastening mechanism. In other embodiments, adhesive 570a is used to secure the flexible hinge body 545a to the respective rigid panel 536; in alternative embodiments, adhesive 570a is located at an interface between the flexible hinge body 545a and the hinge support flanges 586, adhesive 570a is located at an interface between the flexible hinge body 545a (at the hinge body upper surface 595) and the bottom surface or underside 538 of the respective rigid panel 536, or adhesive 570a is located both at an interface between the flexible hinge body 545a (at the hinge body lower surface 596) and the hinge support flanges 586 and at an interface between the flexible hinge body 545a and the bottom surface or underside 538 of the respective rigid panel 536. In further embodiments, a mechanical interlock together with adhesive 570*a* secures the flexible hinge body 545*a* to the respective rigid panel 536. In still further embodiments which include the flange lip 587, the mechanical interlock includes the geometry of the intermediate portion and the geometry of the lip.

As stated above, the flexible hinge body 545*a* preferably includes polymer material 547*a*, which more preferably includes an elastomeric polymer material 547*b*. In some embodiments, a single type of elastomeric polymer material 547*b* is used in the central portion 546*a*, side portions 546*b*, 546*c*, and intermediate portions 546*d*, 546*e* of the flexible hinge body 545*a*. In other embodiments, the flexible hinge body 545*a* includes a plurality, i.e. more than one type of polymer material 547*a*, which differ in elastic properties; for example, a more flexible elastomeric polymer material 547*c* may be preferably incorporated in the central portion 546*a* and a stiffer elastomeric polymer material 547*d* may be preferably incorporated in the side portions 546*b*, 546*c*. In this case, the intermediate portion 546*d*, 546*e* may include an intermediate polymer material 547*e* which may be a mixture or combination of the more flexible elastomeric polymer material 547*c* and the stiffer elastomeric polymer material 547*d*, and may provide a transition from the more flexible elastomeric polymer material 547*c* to the stiffer elastomeric polymer material 547*d*. In some embodiments, the flexible hinge body 545*a* includes more than one type of polymer material to provide for more optimal properties in the various portions; for example, a more flexible elastomeric polymer material 547*c* may be utilized advantageously in the central portion 546*c* to provide for bending of the flexible hinge body 545*a* when folding or unfolding the folding cover assembly 530, while a stiffer elastomeric polymer material 547*d* may be utilized advantageously in the side portion 546*b*, 546*c* to provide for securement of the flexible hinge body 545*a* to the respective rigid panel 536. Preferably, in embodiments which incorporate more than one type of polymer material 547*a*, the flexible hinge body 545*a* is fabricated by co-extruding the more than one type of polymer material 547*a* to form the flexible hinge body 545*a* of materials which vary along the hinge body profile 545*c* but which are generally the same along the hinge longitudinal axis 545*b* of the flexible hinge body 545*a*.

Figure 19A:
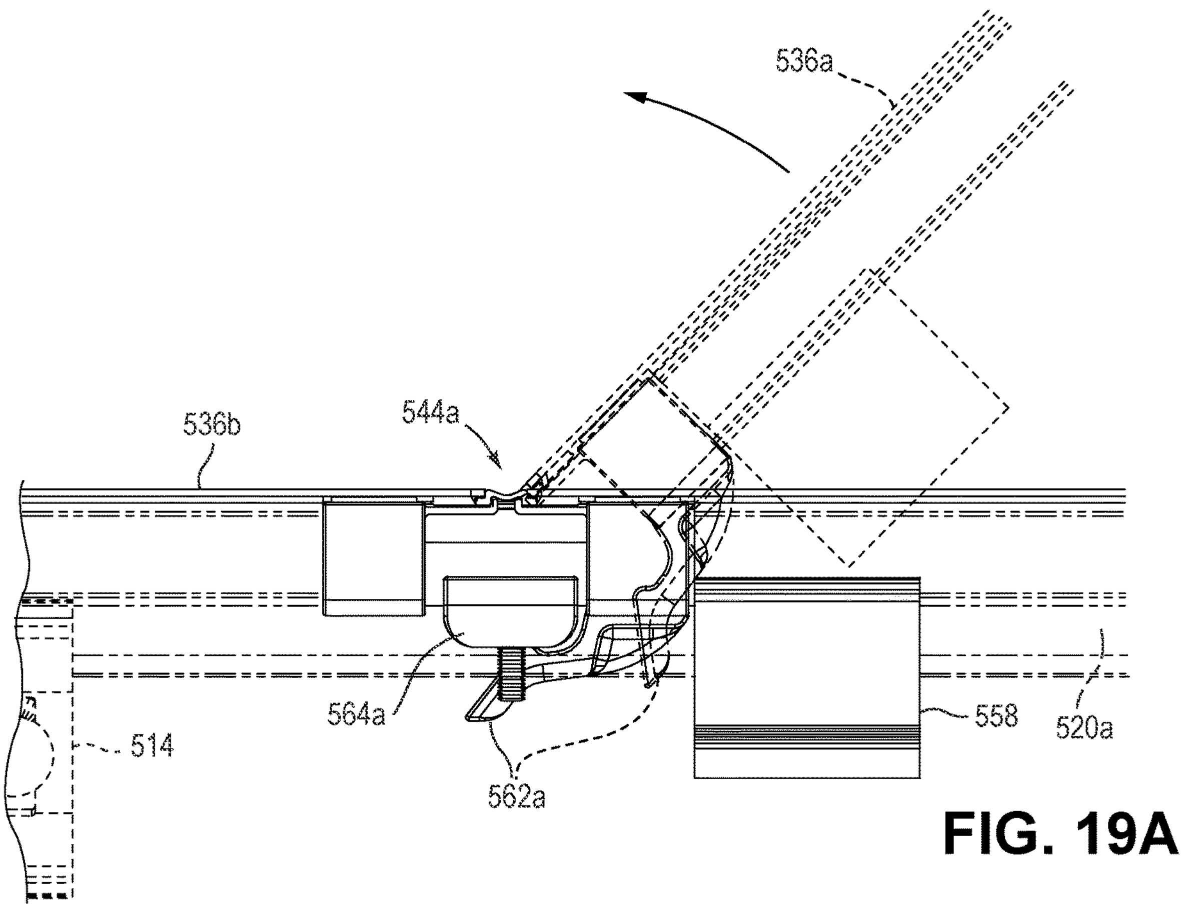
FIG. 19A is a detail side view of a portion of the folding tonneau cover apparatus of FIG. 1 as viewed from line 19A—19A as indicated in FIG. 3A, with the side rail on the driver's side in phantom and the truck removed to show the underlying structure, and showing in phantom an alternate position of the same portion of the folding tonneau cover apparatus in which the rear panel has been lifted up and rotated frontward somewhat so that the hook is disengaged from the catch.
Figure 19B:
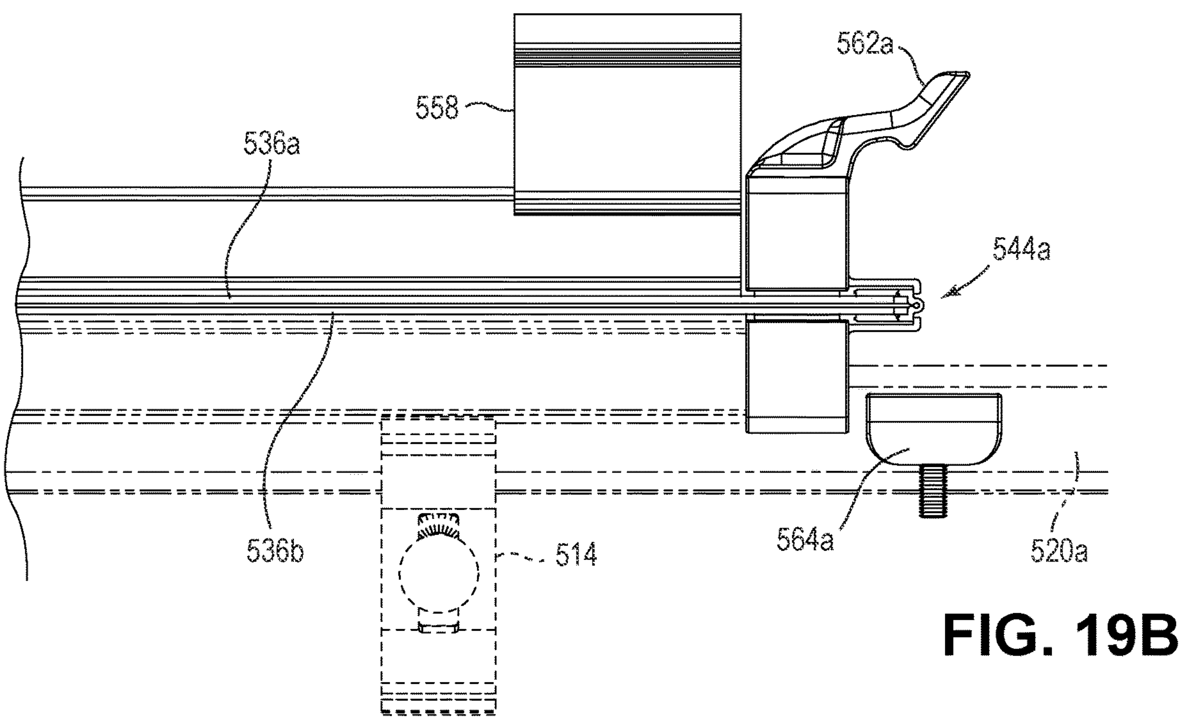
FIG. 19B is a detail side view similar to that of FIG. 19A, but in which the rear panel has been rotated completely forward onto the middle a panel.

A portion of the folding tonneau cover apparatus 510 that includes the rear hinge 544*a*, as indicated by the encircled area labeled 2D, 19A in FIG. 2C, is further illustrated in an enlarged partial phantom view in FIG. 19A, with the driver's-side side rail 220*a* shown in phantom and the truck 2 removed to show the underlying structure, and showing in phantom an alternate position of the same portion of the folding tonneau cover apparatus 510 in which the rear panel 536*a* has been lifted up and rotated frontward somewhat in the direction of the arrow so that the hook 562*a* is disengaged from the catch 564*a*. With further rotation of the rear panel 536*a* as illustrated in FIG. 19B, the rear panel 536*a* has been rotated completely forward onto the middle panel 536*b*, and the hook 562*a* is disengaged from the catch 564*a*, so the middle panel 536*b* is free to be lifted up if desired. The other hooks 562 and catches 564 described herein function in a similar manner as hook 562*a* and catch 564*a* just described.

Figure 19C:
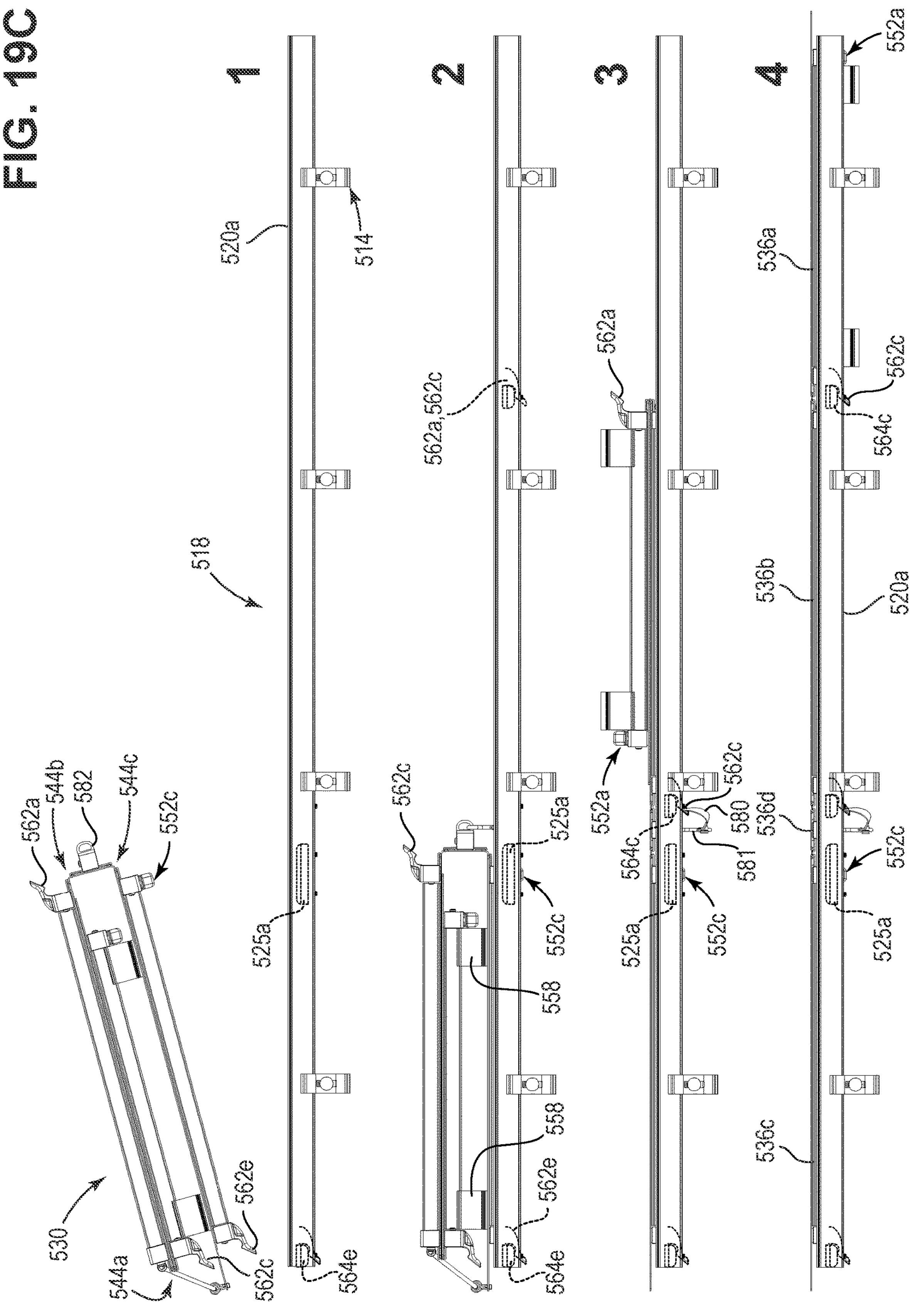
FIG. 19C is a schematic illustration of steps and configurations of the folding tonneau cover apparatus of FIG. 1 showing the folding cover assembly being installed onto the side rails, showing the hooks at the front of the front panel approaching the catches at the front of the side rails, then the hooks at the front of the front panel engaged with the catches at the front of the side rails and the latches at the rear of the front panel engaged with the side rails and the respective containment brackets, then the spacer panel and middle panel unfolded with the hooks at the front of the middle panel engaged with the respective catches on the side rails, then the rear panel unfolded with the hooks at the front of the rear panel engaged with the respective catches on the side rails and the latches at the rear of the rear panel engaged with the respective side rails and containment brackets.

When it is desired to replace the folding cover assembly 230 onto the cargo box 5 and cover the cargo box 5, the folding cover assembly 230 can be placed onto the side rails 520 and unfolded as schematically illustrated in FIG. 19C, beginning with (1) placing the bundled folding cover assembly 530 on the side rails 520 with the hooks 562 at the front of the front panel 536*c* aligned with the respective catches 564 on the respective side rails 520; (2) lowering the folding cover assembly 530 onto the side rails 520 until the latches 552 at the rear of the front panel 536*c* are engaged with the side rail lip 524 of the respective side rails 520 and the containment brackets 525*a* and 525*b*. The bundled folding cover assembly 530 can be left secured in this configuration, or if it is desired to unfold the folding cover assembly 530 to cover the cargo box 5, the strap brackets 543*b* can be disengaged from the bracket slots 543*c*, and (3) the middle panel 536*b* can be rotated rearward onto the side rails 520, with the hooks 562 at the front of the middle panel 536*b* engaging the respective catches 564, and (4) the rear panel 536*a* can be rotated rearward onto the side rails 520, with the hooks 562 at the front of the rear panel 536*a* engaging the respective catches 564 and the latches 552 at the rear of the rear panel 536*a* engaging with the side rail lip 524 of the respective side rails 520.

FIGS. 20A-20E are schematic illustrations of the folding tonneau cover apparatus 510 for various configurations of cargo box 5 geometries as may be found on various trucks 2. Preferred embodiments of the folding cover assembly 530 include the rear panel 536*a*, the middle panel 536*b*, the front panel 536*c*, and the spacer panel 536*d*, as previously described. In FIGS. 20A-20E, the overall length 533 of the folding cover assembly 530 is shown for each example, and the length 539 of each of the panels 536*a*-536*d* is indicated as 539*a*-539*d*, respectively, and the width 540 of the panels 536*a*-536*d* is indicated as 540*a*-540*d*, respectively, and the side angle 542 of the panels 536*a*-536*d* is indicated as 542*a*-542*d*, respectively. Panels 536*a*-536*c* can have similar length 539*a*-539*c*, or the length of some or all of panels 536*a*-536*c* can differ. Panel 536*d* can have a similar length 539*d* as panels 536*a*-536*c*, but preferably the length 539*d* of panel 536*d* is substantially smaller than the lengths 539*a*-539*c* of panels 536*a*-536*c*. Panels 536*a*-536*d* can have similar width 540, or the width of some or all of panels 536*a*-536*d* can differ. Panels 536*a*-536*d* can have the same side angle 542, or the side angle 542*a*-542*d* of some or all of panels 536*a*-536*d* can differ.

FIG. 20A shows the folding cover assembly 530 as configured for a cargo box having angled sides; since this example folding cover assembly 530 has angled sides, the width 540 is different at the front and rear of a panel. In this example, the width 540 of the rear panel 536*a* at the rear of the rear panel 536*a* is labeled 540*a*', to distinguish it from the width 540*a* of the rear panel 536*a* at the front of the rear panel 546*a*. The width 540 of the panel 536*b* at the rear of the panel 536*b* is similar to the width 540*a* of the panel 536*a* at the front of the panel 536*a*, and so forth.

Figure 20C:
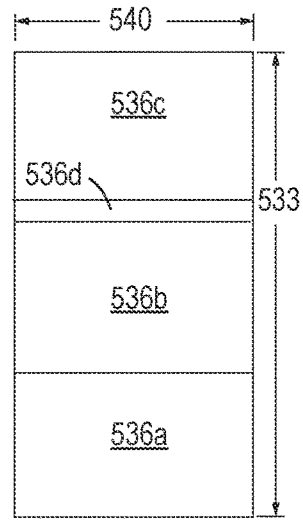
FIG. 20C is a schematic illustration of the folding tonneau cover apparatus of FIG. 1, as configured for an elongated cargo box.
Figure 20D:
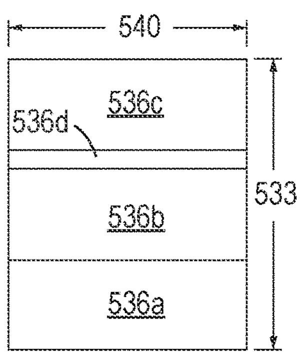
FIG. 20D is a schematic illustration of the folding tonneau cover apparatus of FIG. 1, as configured for a shorter cargo box.
Figure 20E:
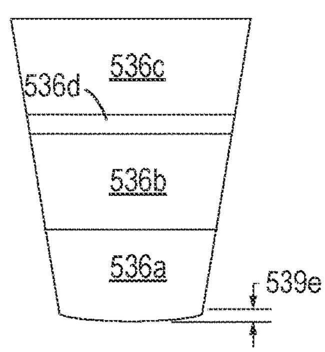
FIG. 20E is a schematic illustration of the folding tonneau cover apparatus of FIG. 1, as configured for a cargo box with arbitrary shape.

FIG. 20B is a schematic illustration of the folding cover assembly 530 as configured for a cargo box having parallel sides; in this example, the width 540 of each of the panels is similar. FIG. 20C is a schematic illustration of the folding cover assembly 530 as configured for an elongated cargo box; in this example, the overall length 533 is longer than in the example of FIG. 20B. FIG. 20D is a schematic illustration of the folding cover assembly 530 as configured for a shorter cargo box; in this example, the overall length 533 is shorter than in the example of FIG. 20B. FIG. 20E is a schematic illustration of the folding cover assembly 530 as configured for a cargo box with arbitrary shape; in this example, the sides of the panels 536 are angled, and the rear of the rear panel 536*a* is curved, extending a curved extension distance 539*e* in the central portion with respect to the side portions of the rear panel 536*a*. The folding cover assembly 530 can be configured for a variety of other configurations of truck box 5, with any of the panels 536*a*-536*d* configured with straight or angled or curved shapes such as those illustrated in the examples of FIGS. 20A-20E, in various combinations.

Figure 21A:
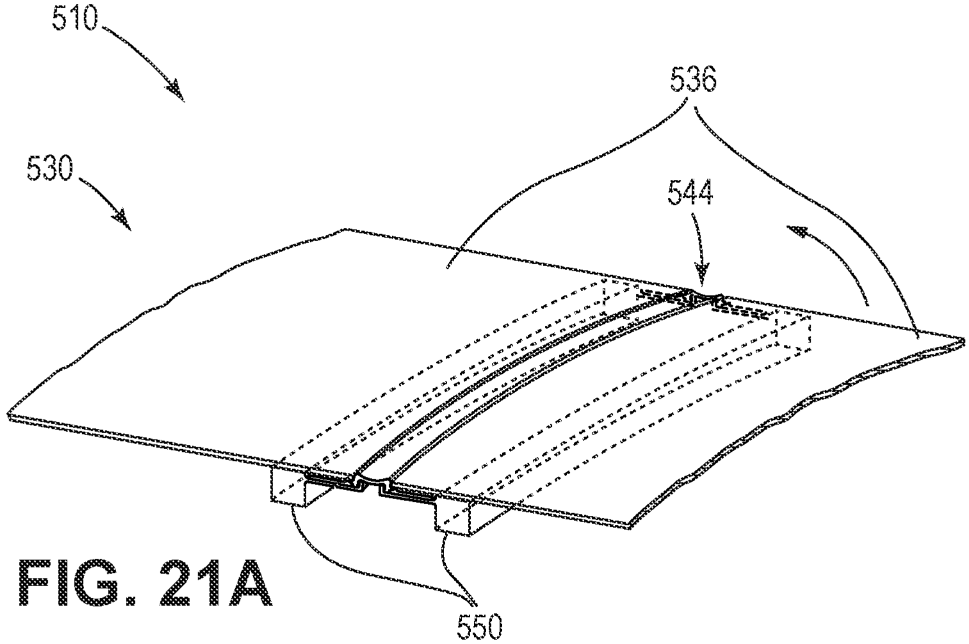
FIG. 21A is a schematic illustration of a portion of the folding tonneau cover apparatus of FIG. 1, illustrating a flexible hinge interconnecting two adjacent panels, showing bent or bowed support bows creating a bending or bowing of the panels attached thereto (see also FIGS. 16B-16E, 16G, 16I, and 16K), with the bending or bowing exaggerated for illustration, with the panels unfolded.
Figure 21B:
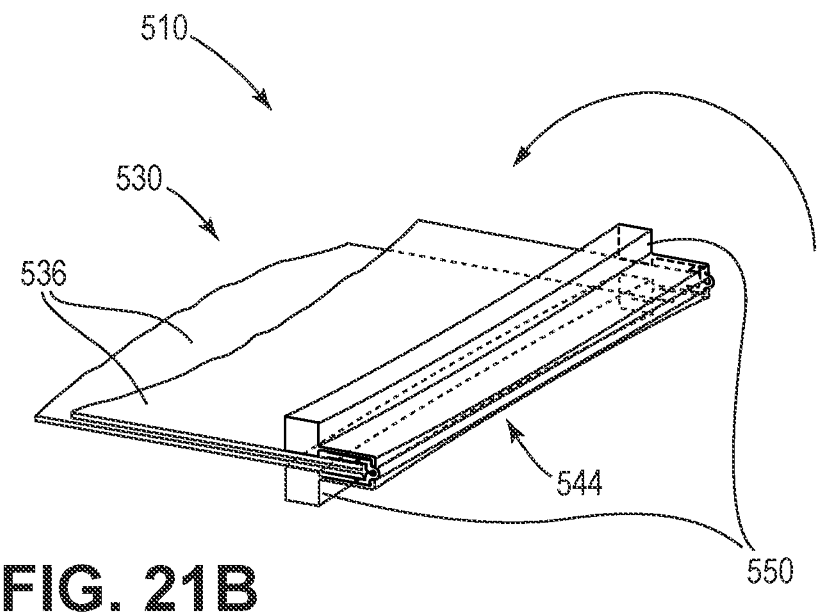
FIG. 21B is a schematic illustration similar to that of FIG. 21A, showing the panels folded up, and together with FIG. 21A illustrating how the flexible hinge can accommodate the folding up and unfolding of such bent or bowed panels.

Further advantages to the structure described herein of the flexible hinge 544 are illustrated in FIGS. 21A and 21B. The hinge 544 as described herein is low profile, reducing the overall thickness, bulk, and weight of the folding cover assembly 530. The flexible hinge 544 can tolerate some deformation, so that if adjacent panels 536 are not aligned perfectly, or are not perfectly flat, the hinge 544 can still function to allow the folding cover assembly 530 to fold without binding. The configuration disclosed herein of hinge 544 can accommodate panels 536, some of which are preferably slightly bowed as described herein and illustrated in FIG. 16E. FIG. 21A is a schematic illustration of a portion of the folding tonneau cover apparatus 510 showing a respective flexible hinge 544 interconnecting two respective adjacent panels 536, showing bent or bowed support bows 550 creating a bending or bowing of the panels 536 attached thereto (see also FIGS. 16B-16E), with the bending or bowing exaggerated for illustration, with the panels 536 unfolded. FIG. 21B is a schematic illustration similar to that of FIG. 21A, showing the two respective adjacent panels 536 folded up in the direction indicated by the arrow. FIGS. 21A-21B illustrate how the flexible hinge 544 can accommodate the folding up and unfolding of such bent or bowed panels 536.

Figure 22:
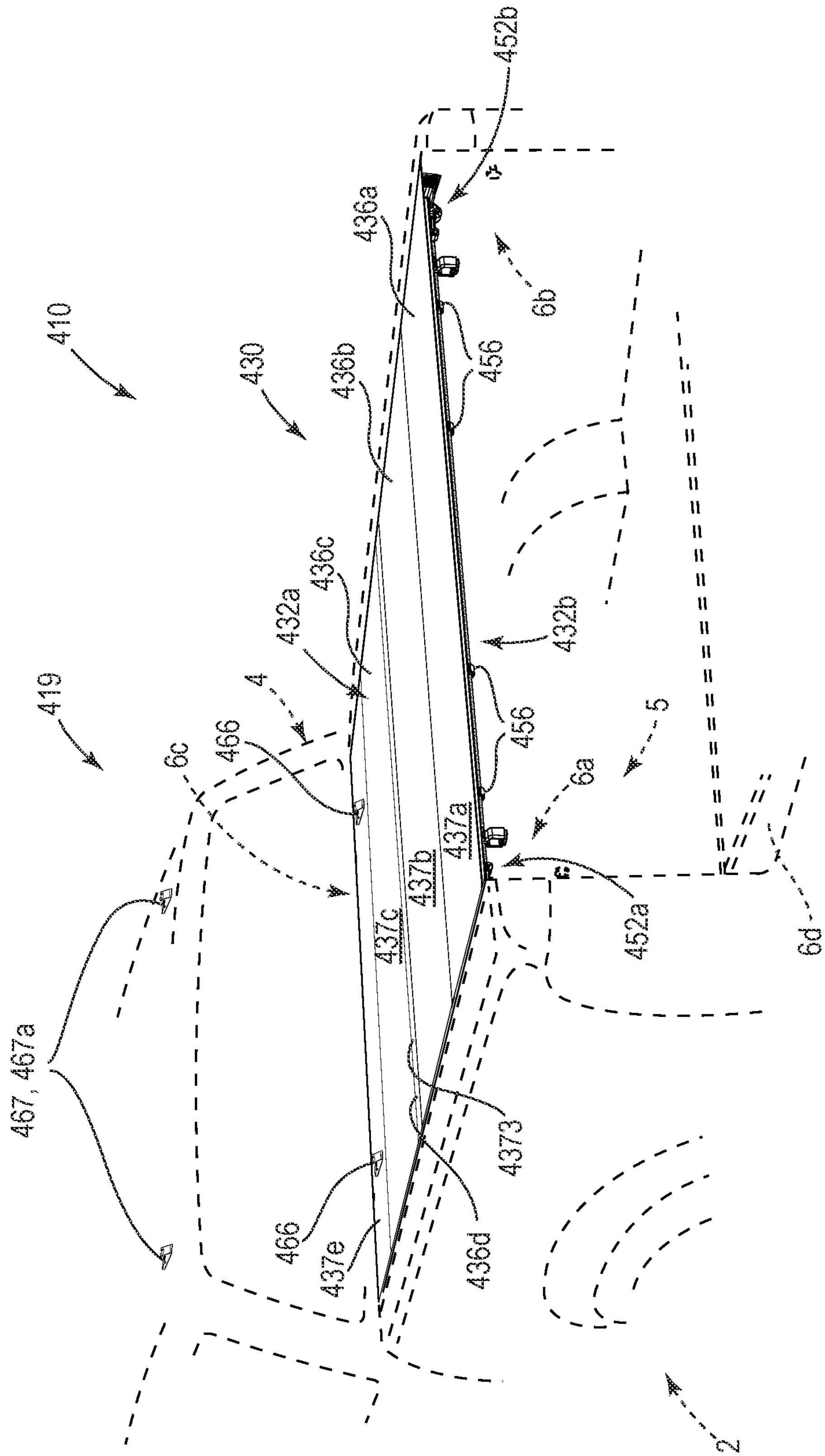
FIG. 22 is a rear perspective view of an alternate embodiment of folding tonneau cover apparatus having a folding cover assembly incorporating a cab panel onto which rear, middle, spacer, and front panels can fold, with the folding tonneau cover apparatus attached to a pickup truck which is shown in phantom, but for clarity of illustration the perimeter seal is not shown.

FIG. 22 is a rear perspective view of an alternate embodiment of folding tonneau cover apparatus 410 having a folding cover assembly 430 incorporating a cab panel 436*e* onto which the rear, middle, spacer, and front panels 436*a*, 436*b*, 436*d*, and 436*c*, respectively, can fold, with the folding tonneau cover apparatus 410 attached to a pickup truck 2 which is shown in phantom.

Figure 23:
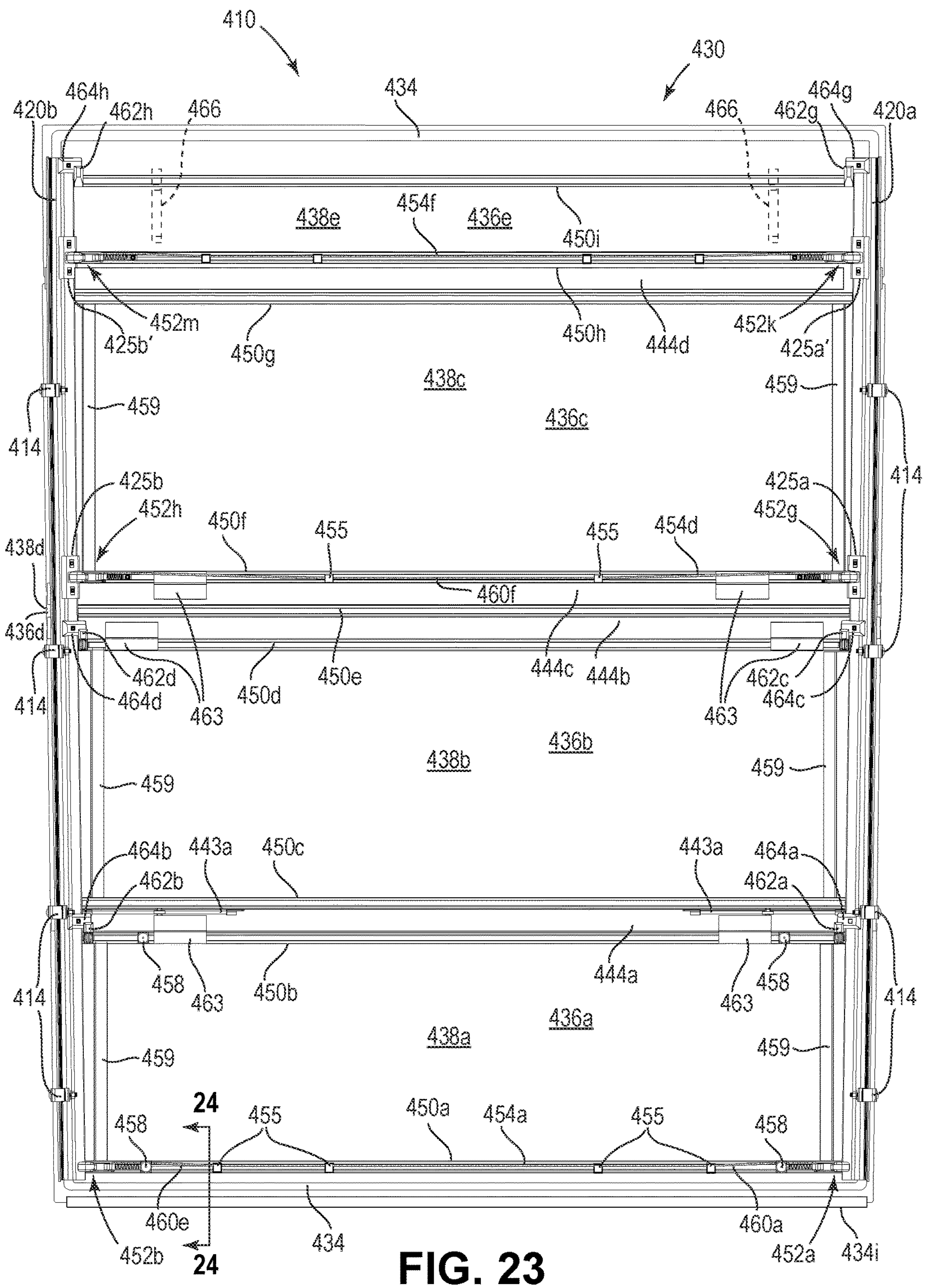
FIG. 23 is a bottom plan view of the folding tonneau cover apparatus of FIG. 22.

FIG. 23 is a bottom plan view of the folding tonneau cover apparatus 410 of FIG. 22. Visible in this view are hinges 444, which are situated between adjacent panels 436 and adjoin adjacent panels 436. Each panel 436 has a top surface 437 and a bottom surface or underside 438; panel 436*a* has a top surface 437*a* and a bottom surface or underside 438*a*, panel 436*b* has a top surface 437*b* and a bottom surface or underside 438*b*, panel 436*c* has a top surface 437*c* and a bottom surface or underside 438*c*, panel 436*d* has a top surface 437*d* and a bottom surface or underside 438*d*, and panel 436*e* has a top surface 437*e* and a bottom surface or underside 438*e*. For ease of discussion, hinges 444 are specifically referenced herein as 444*a*-444*d*, and non-specifically or collectively referenced as 444. Specifically, situated between the rear panel 436*a* and the middle panel 436*b* is hinge 444*a*. Similarly, situated between the middle panel 436*b* and the spacer panel 436*d* is hinge 444*b*, situated between the spacer panel 436*d* and the front panel 436*c* is hinge 444*c*, and situated between the front panel 436*c* and the cab panel 436*e* is hinge 444*d*. Hinges 444 allow the folding cover assembly 430 to be folded up and will be more fully described below. Optional hinge guards 463 are shown; hinge guards 463 provide additional support to the hinges 444 when the folding cover assembly 430 is unfolded and in place covering the cargo box 5 of truck 2 (FIG. 22). Hinge guards 463 also provide protection against slicing through the hinges 444; further description of the hinge guards 463 is provided herein. Support bows 450 are attached to the panels 436 to provide additional support and rigidity to the panels 436, and also provide a structure for mounting of various other components as described in detail herein. For ease of discussion, support bows 450 are specifically referenced herein as 450*a*-450*i*, and non-specifically or collectively referenced as 450. Similar to support bows 550, 650, 750 described herein, bow end caps (not visible in the figures but similar to other bow end caps shown and described herein, such as bow end caps 565 shown in FIG. 3B) are preferably secured to each end of the support bows 450. The folding tonneau cover apparatus 410 is removably secured to the support frame assembly 418 by securing apparatus 451*a*. Preferably, securing apparatus 451*a* includes at least one locking member 451*b* which is engageable and disengageable from the support frame assembly 418. Preferably, the locking member 451*b* includes latches 452 which are located at the support bows as shown and secure the folding cover assembly 430 to the side rails 420*a* and 420*b*. The latches are similar to latches 552, 652, 752 shown and described herein, and preferably include a latch slide with inclined bottom surface, an engaging portion, a spring, and a spring retainer, similar to corresponding elements 653, 653*a*, 653*b*, 656, 657, and 657*a* of latches 562, for example, shown and described herein and illustrated in FIG. 33B and elsewhere herein. Release cords 454 are attached to the latches 452. For ease of discussion, release cords 454 are specifically referenced herein as 454*a*, 454*d*, and 454*f*, and non-specifically or collectively referenced as 454. The release cords 454 pass through cord guides 455 which are attached to support bows 450 as shown. For example, the cord guides 455 can be retainer cord guides 455*b*, which are similar to retainer cord guides 555*b* illustrated in FIG. 11B. The cord guides are non-specifically or collectively referenced herein as 455, but cord guides 455*c*-455*d* are specifically referenced herein to facilitate the detailed description herein. Standoffs 458 are shown, and are described in further detail herein. Sidebars or handles 459 are preferably attached to panels 436*a*, 436*b*, 436*c*, and 436*e* near each side of each respective panel 436 to further support the respective panels 436. Perimeter seal 434 is located on the bottom 432*b* of the folding cover assembly 330 and is arranged to seal against the sidewalls 6*a* and 6*b* and the front wall 6*c* and the tailgate 6*d* of the cargo box 5; some portions of perimeter seal 434 are behind side rails 420*a* and 420*b* and not visible in FIG. 23. The perimeter seal 434 is further described herein. Clamps 414 secure the side rails 420*a* and 420*b* to the sidewalls 6*a* and 6*b* of the cargo box 5 in a similar manner as other clamps 514, 614, 714 described herein.

The support bows or transverse frame members or channels 450 provide additional support for the panels 436. In this embodiment, the panels each have two support bows 450, one located near each of the front and rear ends of each panel 436, except for the spacer panel 436*d*, which has only a single support bow 450. In this embodiment, there are latches 452 mounted in pairs, one of each pair mounted near each end of each of the support bows 450*a*, 450*f* and 450*h* as shown, similar to the latches 552, 652, 752 of other embodiments described herein. As further described herein, the latches 452 engage the side rails 420*a* and 420*b* to secure the folding cover assembly 430, and can slide a short distance towards or away from the side rails 420*a* and 420*b* to engage or release the folding cover assembly 430 or selected panels 436 or portions thereof from the side rails 420*a* and 420*b* as further described herein. In this embodiment, there are three latch release cords or release cords or cords 454, each of which are connected to opposing pairs of latches 452 which secure the panels 436 to the side rails 420*a* and 420*b*. The release cords 454 pass through cord guides 455 which are mounted to the support bows 450; the release cords 454 can slide within the cord guides 455. The release cords 454 generally extend from the latches 452 along the support bows 450. The release cords 454 can be actuated to release each pair of latches 452 by a driver or operator 8 when desired, to open the folding cover assembly 430. Also seen on FIG. 23 are optional hinge guards 463; the optional hinge guards 463 are preferably attached to one of the support bows 450 adjacent to each of the respective hinges 444. In this example, the hinge guards 463 are shown attached to the support bows 450*b*, 450*d*, and 450*f*. Optionally, hinge guards 463 can be attached to the support bow 450*g* or 450*h* to provide support for the hinge 444*d* in a similar manner. The hinge guards 463 provide support for the hinges 444, such as to support weight or pressure applied to the hinges 444, the panels 436, or other portions of the folding cover assembly 430. The hinge guards 463 can also provide some protection against cutting through a hinge 444 to enter the cargo box 5.

In the folding tonneau cover apparatus 410, hooks 462 are attached to some of the support bows 450. Preferably, hooks 462 are located adjacent each end of each of the support bows 450*b*, 450*d*, and 450*i*, and are aligned with respective catches 464 which are attached to the side rails 420*a* and 420*b* as illustrated. Similar to other embodiments further described herein, when the folding cover assembly 430 is in place covering the cargo box 5, the hooks 462 are engaged with the catches 464 and help to secure the folding cover assembly 430 to the side rails 420*a* and 420*b*. When a panel 430 is rotated upward, the hooks 462 disengage from the catches 464, allowing the panel to be rotated and stacked onto other panels 430, as shown herein. Preferably, the hooks 462 slide into the support bows 450 and are secured in position; preferably, the hooks 462 are secured by an interference fit with the support bows 450, but other securement mechanisms can be utilized, such as screws or other fasteners or adhesives known in the art, or a combination of securement mechanisms. In various embodiments disclosed herein, hooks and catches such as hooks 462 and catches 464 are located along selected support bows 450, 550, 650, 750. In the folding tonneau cover apparatus 410, hooks 462*a* and 462*b* are located near the driver's side end and passenger side end, respectively, of support bow 450*b* (near the front end of the rear panel 436*a*), hooks 462*c*, 462*d* on support bow 450*d* (near the front end of the middle panel 436*b*); hooks 462*g* and 462*h* are located near the driver's side end and passenger side end, respectively, of support bow 450*i* (near the front of the cab panel 436*e*). Together, the various latches 452 and hooks 462 engage the catches 464 and the side rails 420*a* and 420*b* to secure the folding cover assembly 430 to the side rails 420*a* and 420*b* and thereby to the cargo box 5 in order to cover the cargo box 5 when desired, but can be disengaged as described herein to open the folding cover assembly 430 to enter the cargo box 5 when desired. The containment brackets 425*a*, 425*b* are shown, which help to secure the folding cover assembly 430 in position on the side rails 420*a*. Similarly, the containment brackets 425*a*', 425*b*' are shown, which help to secure the folding cover assembly 430 in position on the side rails 420*a*, 420*b* especially when the folding cover assembly 430 is in a folded configurations such as those illustrated in FIGS. 30, 31A-31E. Note that in some embodiments, the containment brackets 425*a*, 425*b* can be omitted, as long as the containment brackets 425*a*', 425*b*' are present. Preferably, the tonneau cover apparatus 410 includes containment brackets 425*a*, 425*b*, 425*a*' and 425*b*'.

Figure 24:
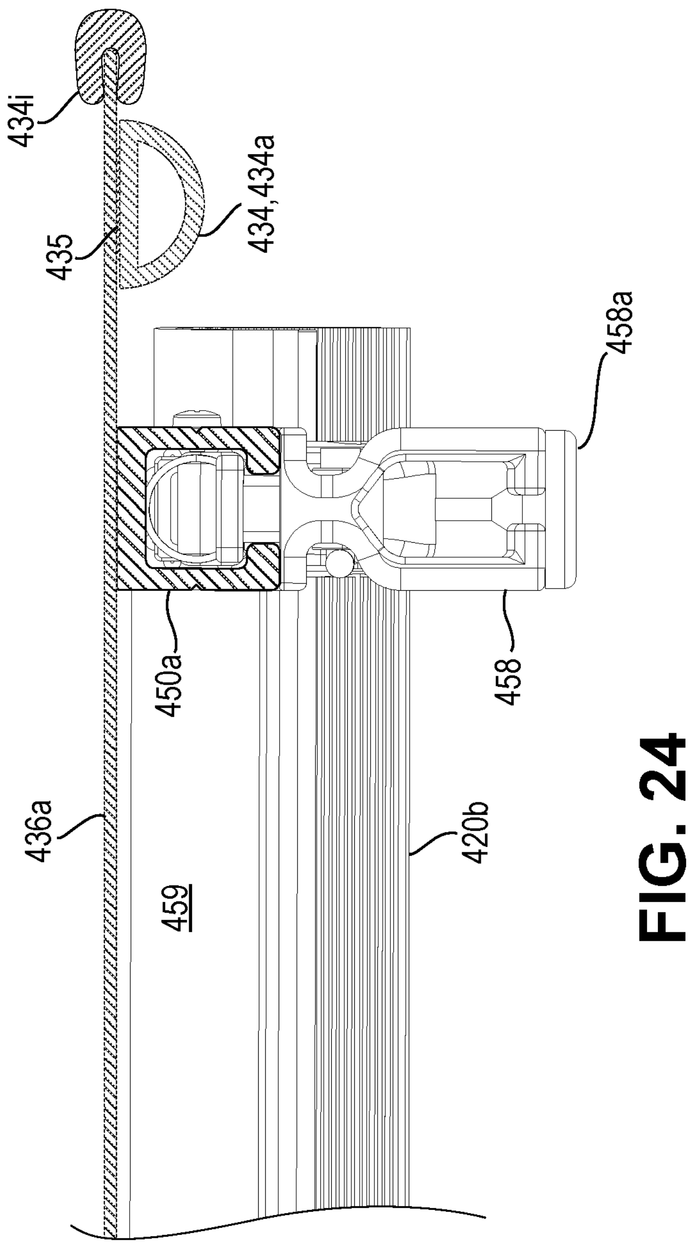
FIG. 24 is a partial section view of the rear portion of the folding tonneau cover apparatus of FIG. 22 as indicated on FIG. 23 and illustrating an edge guard at the rear portion of the rear panel.

FIG. 24 is a partial section view of the rear portion of the folding tonneau cover apparatus 410 of FIG. 22 as indicated on FIG. 23 and illustrating the edge guard 434*i* at the rear portion of the rear panel 436*a*. Preferably, the folding cover assembly 430 includes a perimeter seal 434, such as the perimeter seal 434*a* (or other perimeter seals shown in FIGS. 15A-15E, 15G, for example) around substantially the entire perimeter, attached to the bottom surface 438 of each respective panel as described with regard to other embodiments herein. Preferably, the folding cover assembly 430 also includes the edge guard 434*i* (such as the edge guard 34*i* shown in FIG. 15F) at the rear portion of the rear panel 436*a*. This edge guard will minimize potential contusions or abrasions that may arise to an operator 8, if the operator 8 accidentally allows one or more of his or her fingers to rest of the top of the tailgate when securing the rear panel to the respective side rails.

Referring now to FIGS. 25A-27, hinges 444 include flexible sheet material or flexible material 447 which is attached to each of the adjacent panels 436 (specifically, respective adjacent panels of 436*a*-436*d* as described herein). Flexible sheet material 447 is moisture resistant to avoid leakage into the cargo box 5. Flexible sheet material 447 can include fabric, or a polymeric layer, and may have a reinforcing fiber which can be separate fibers, long (generally continuous) or short (generally discrete) fibers, fibrous yarns, or a web material, or woven material, single-axis or biaxial oriented fibers, or a braid or a felt of fibers, for example. For example, flexible material 447 can be a vinyl material, preferably a polyvinyl chloride or PVC covered fabric, a fiber-reinforced rubber or other flexible polymeric material, or a fabric having a water-resistant coating or impregnation. In additional examples, the flexible material 447 can be cloth-inserted EPDM rubber, cloth-inserted neoprene rubber, nylon cloth reinforced nitrile rubber, fiberglass-reinforced silicone rubber, polyester-reinforced neoprene sheet, nylon-reinforced neoprene sheet, and other materials available from multiple sources; information regarding example materials is available from www.rubbersheetroll.com and from www.mscdirect.com; note that not all materials listed on those web sites would be preferred for this application. A variety of materials could be used as flexible hinge material, such as neoprene, EPDM, flexible PVC, nitrile, natural rubber, flexible thermoplastics, silicone, latex, Hypalon rubber, butyl rubber, recycled rubber, Viton rubber, Santoprene rubber, Skirtboard rubber, SBR rubber, and so forth, that can be used in conjunction with a reinforcing fiber such as EPDM, Nylon, polyester, fiberglass, carbon fiber, aramid fibers, boron fibers, metal fibers, cellulose, wood-derived fibers, and so forth can be used for the flexible hinge material 447. The hinge or flexible hinge 444 is preferably made of a flexible material that can withstand deformation without failure due to cracking or breakage and that is selected from the group consisting of a laminated polymeric material, a fiber-reinforced polymeric material, an elastomeric material, a woven material and a laminated material that is includes a woven material and a moisture-resistant polymeric material. Preferably, a hinge material 447 is chosen that can be heat bonded to the thermal adhesive tape 471*a* such as 3M 5933 from 3M, St. Paul, MN described herein. Other considerations in choosing an acceptable flexible hinge material 447 are durability over time and resistance to environmental factors such as precipitation, sunlight, temperature ranges, and physical stresses such as impacts and abrasions. Preferably, the flexible material 447 is polyester fiber reinforced polymeric material. More preferably, flexible material 447 is PVC-coated woven polyester material such as part number 90749 available from Lakeview Industries, Chaska, MN.

Figure 25A:
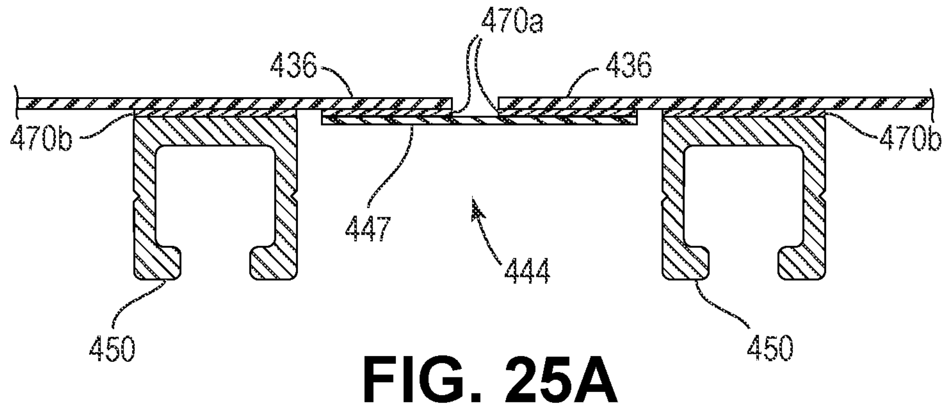
FIG. 25A is schematic illustration of a cross section along a front-back plane of one of the hinges of the folding tonneau cover of FIG. 22 showing the basic configuration with the hinge unfolded.
Figure 25B:
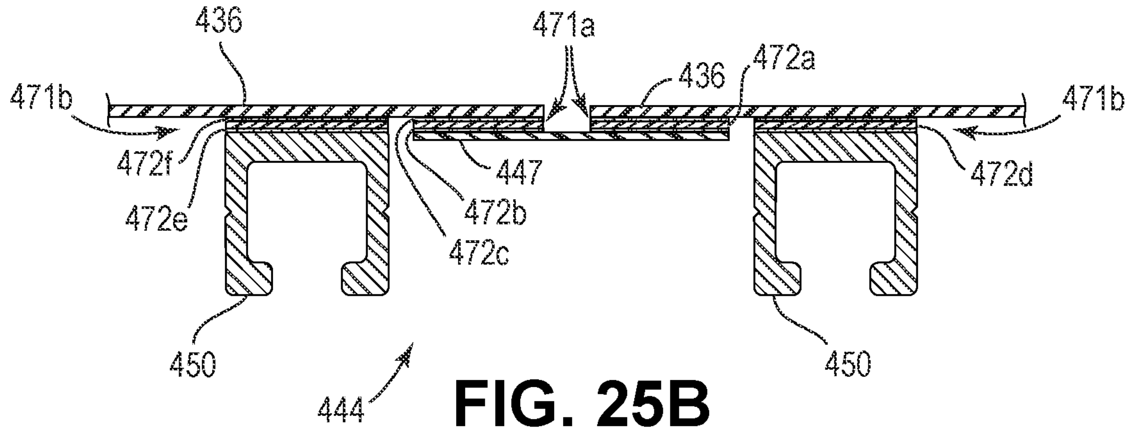
FIG. 25B is a schematic illustration of a cross section along a front-back plane of a preferred embodiment of one of the hinges of the folding tonneau cover of FIG. 22 showing the hinge unfolded.
Figure 25C:
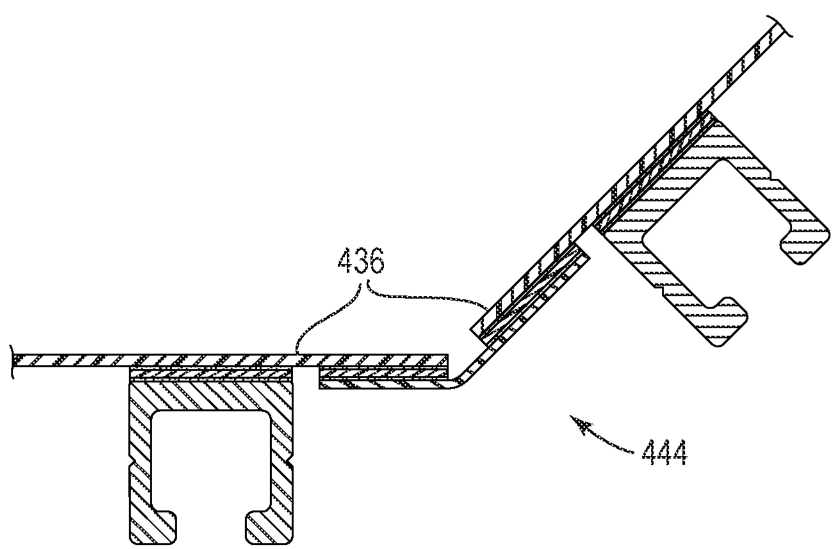
FIG. 25C is a schematic illustration showing the hinge of FIG. 25B but with the hinge folded about 45 degrees.
Figure 26:
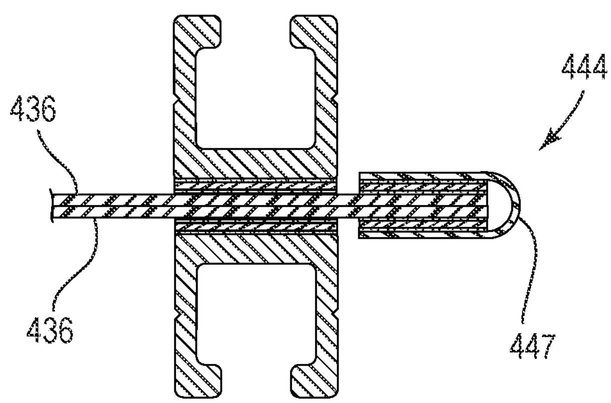
FIG. 26 is a schematic illustration showing the hinge of FIG. 25B but with the hinge folded about 180 degrees.
Figure 27:
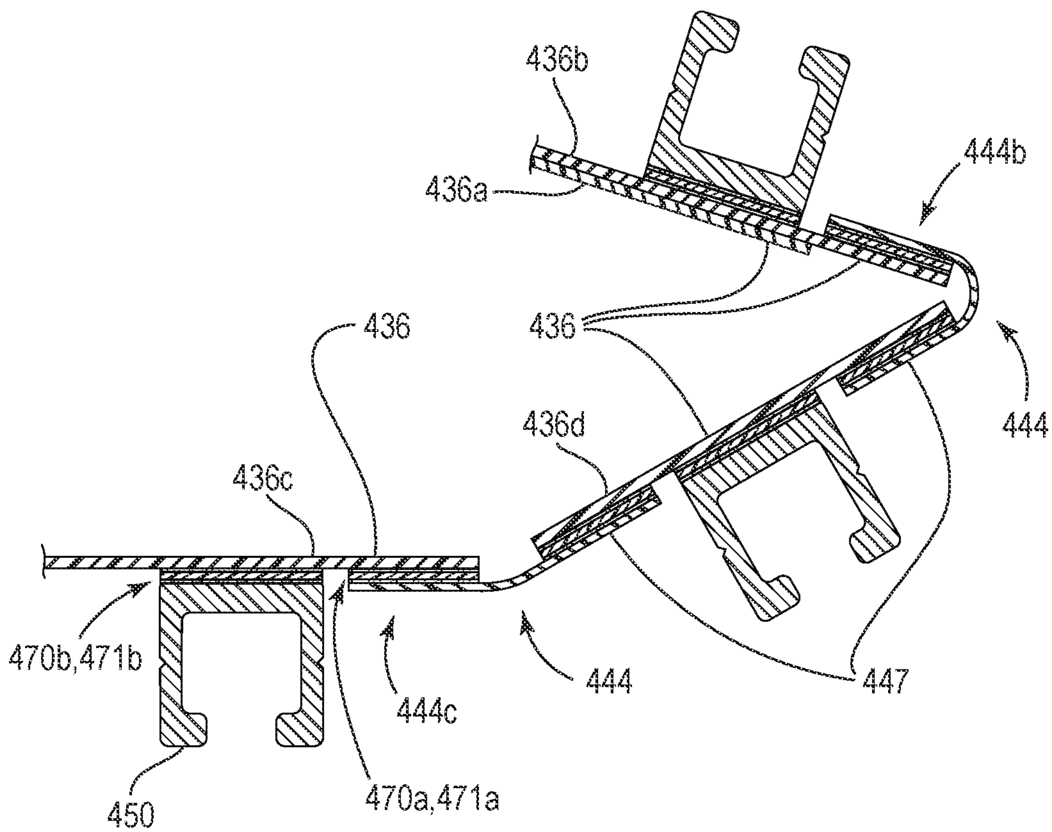
FIG. 27 is a schematic illustration showing a cross section similar to that of FIG. 25C showing a spacer panel and two adjacent hinges of the folding tonneau cover of FIG. 22, illustrating both hinges in a partially folded configuration.

Attachment of the flexible sheet material 447 to the panels 436 is preferably by an adhesive 470*a* which may include a layer or coating of adhesive or a double-sided adhesive tape 471*a* for example. Alternatively, a contact adhesive, or a thermal or hot-melt or chemically activated adhesive, or a mechanical attachment, or a combination, can be used to attach the flexible sheet material 447 to the panels 436, 436. Double-sided adhesive tape 471*a* can include an acrylic foam material 472*a*, with adhesive layer 472*b* arranged on one side of the acrylic foam material 472*a*, and adhesive layer 472*c* arranged on the other side of the acrylic foam material 472*a* for example. Preferably, the adhesive 470*a* includes a double-sided adhesive tape 471*a* such as 3M 5933 from 3M, St. Paul, MN ("thermal adhesive tape"), wherein the double-sided adhesive tape 471*a* is an acrylic foam tape having an acrylic foam material 472*a* and an adhesive layer 472*b* which includes heat-activated adhesive and an adhesive layer 472*c* which includes pressure-sensitive adhesive which may be protected by a release strip (not shown) until it is desired to activate the pressure-sensitive adhesive, adhesive layer 472*c*. Preferably, the adhesive layer 472*b* (in this example, heat-activated adhesive) is aligned with the flexible sheet material 447 while the heat-activated adhesive is activated to adhere the double-sided adhesive tape 471*a* to the flexible sheet material 447; the flexible sheet material 447 together with the attached double-sided adhesive tape 471*a* is subsequently aligned with the panel 436 and the release strip is removed. Preferably, after the adhesive layer 86*c* is aligned with the panel 436 the flexible sheet material 447 is attached to the panel 436 by activating the adhesive layer 472*c* (in this example, pressure-sensitive adhesive). The adjacent panel 436 is similarly attached to the flexible sheet material 447 with double-sided adhesive tape 472*a* forming the structure of hinge 444 as shown in FIG. 25B. The flexible sheet material 447 allows hinges 444 to take a flat or open configuration as illustrated in FIGS. 25A and 25B, or to flex or bend as illustrated in FIGS. 25C, 26 and 27, providing a hinge 444 that allows the folding cover assembly 430 to fold as illustrated throughout the Figures and described herein, with panels 436 folding up and rotating towards other panels as shown. Preferably, the flexible sheet material 447 is adhered to the respective bottom or underside 438 of the panels 436 (specifically, the underside 438*a*-438*d* of respective adjacent panels of 436*a*-436*d* as described herein) of the folding cover assembly 430 as shown. In the preferred arrangements discussed herein, the hinges 444 are securely attached to the respective panels 436, are sealed to prevent water or debris from entering the cargo box through the folding cover assembly 430 at the hinges 444, and are generally impervious to environmental factors such as precipitation, wind, and temperatures to which a typical cargo box 5 would be exposed. Preferably, the hinge 444 is low profile, so that the thin structure provides an effectively continuous seal along the perimeter seal 434 to prevent ingress of precipitation or debris or loss of contents from the cargo box 5, or lifting of the folding cover assembly by the wind under normal circumstances. All of the respective seals that are disclosed herein and can be used as a perimeter seal 434 are water resistant, preferably water proof such that water cannot flow through the seal material and is prevented from egress into the cargo box 5 through the respective seal material. In preferred embodiments, the perimeter seal 434 will be secured with an adhesive material to the underside of each of the respective panels proximate an outer portion of each of the respective panels and an outer portion of each of the respective flexible hinges proximate the outer edges of each of the respective panels, so that the passage of moisture through the juncture of any areas where such bonding occurs is minimized, if not entirely prevented. Furthermore, when the perimeter seal 434 is secured to each of the respective rigid panels proximate an outer portion of each of the respective panels and to an outer portion of each of the respective flexible hinges proximate the outer edges of each of the respective panels and compressed between the outer edges of each of the respective panels and each of the respective side rails 420*a*, 420*b*, the top of the tailgate 6*d* and the top of front wall 6*c*, wherein the cover assembly 430 is fully secured to the support frame assembly 418, the perimeter seal 434 will act to minimize the egress of moisture, wind and debris into the cargo box 5, preferably completely preventing moisture, wind and debris of any kind from entering the cargo box 5 when the cover assembly is fully secured to the support frame and the pickup truck.

FIG. 25B also schematically illustrates support bows 450 which are preferably attached to respective panels 436 by an adhesive 470*b*, which may include a layer or coating of adhesive or a double-sided adhesive tape 471*b*, for example. Alternatively, a thermal or hot-melt or chemically activated adhesive, or a mechanical attachment, or a weld, or a combination, can be used to attach the support bows 450 to the respective panels 436. Double-sided adhesive tape 471*b* preferably includes an acrylic foam material 472*d*, with adhesive layer 472*e* arranged on one side of the acrylic foam material 472*d*, and adhesive layer 472*f* arranged on the other side of the acrylic foam material 472*d*, for example. Preferably, the adhesive 470*b* includes a double-sided adhesive tape 471*b* such as 3M CV62F from 3M, St. Paul, MN ("pressure adhesive tape"), wherein the double-sided adhesive tape 471*b* is an acrylic foam tape having an adhesive layer 472*e* which includes pressure-sensitive adhesive and having an adhesive layer 472*f* which includes pressure-sensitive adhesive which may be protected by a release strip (not shown) until it is desired to activate the pressure-sensitive adhesive, adhesive layer 472*f*. Preferably, the adhesive layer 472*e* (in this example, pressure-sensitive adhesive) is aligned with and adhered to the upper surface 474*d* of the support bow 450 to adhere the double-sided adhesive tape 471*b* to the support bow 450; the support bow 450 together with the attached double-sided adhesive tape 471*b* is subsequently aligned with the panel 436 and the release strip is removed. Preferably, the adhesive layer 472*f* is then aligned with the panel 436, and the support bow 450 is attached to the respective panel 436 by activating the adhesive layer 472*f* (in this example, pressure-sensitive adhesive). While the arrangement just described is a preferred configuration, any of the adhesive layers just described can include heat-activated adhesive or pressure-sensitive adhesive, and the acrylic foam material is also preferable but not always required. For example, in alternative configurations, a single layer of adhesive could be used, similar to the arrangement shown in FIG. 55A. Other pressure-activated acrylic adhesive foam tape can be used, such as Lamatek 5357 from Lamatek, Inc., West Deptford, NJ The sidebars or handles 459 are preferably also attached to the underside 438 of the respective panels 436, preferably in a similar manner as that just described for the support bow 450. Although adhesive 470*b* can be applied at selected portions of the length of the support bow 450 or the sidebar 459, adhesive 470*b* is preferably applied along substantially the entire length of the support bow 450 and the sidebar 459, to enhance stability and to minimize unwanted vibrations. Alternatively, the sidebars 459, support bows 450, or the flexible sheet material 447 of hinges 444 can be attached to the panels 436 with adhesives such as glue, or with fasteners, or spot welds.

FIG. 26 is a schematic illustration showing the hinge of FIG. 5B but with the hinge folded about 180 degrees.

FIG. 27 is a schematic illustration showing a cross section similar to that of FIG. 25C but showing a spacer panel and two adjacent hinges of the folding tonneau cover of FIG. 22 illustrating both hinges in a partially folded configuration.

Figure 28:
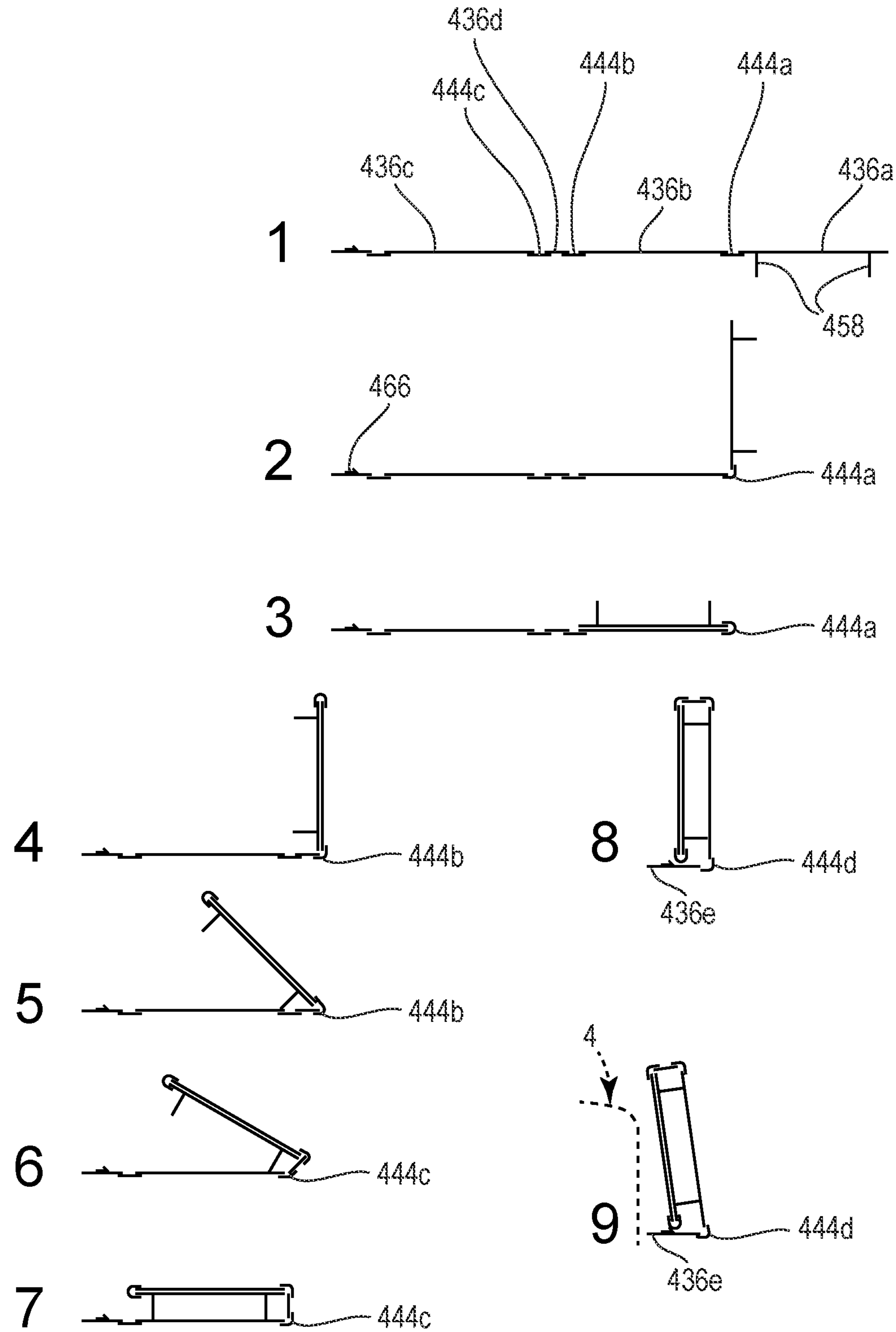
FIG. 28 is a schematic illustration showing the general steps and configurations of the folding cover assembly of FIG. 22 as it is folded up.

FIG. 28 is a schematic illustration showing a preferred embodiment of general steps and configurations of the folding cover assembly of FIG. 22 as it is folded up or unfolded. In this embodiment, starting from the unfolded or closed configuration of the folding cover assembly 430 (configuration 1), the hinge 444*a* flexes to allow the rear panel 436*a* to fold up, passing through 90 degrees (configuration 2) towards the middle panel 436*b*, and fold over onto the middle panel 436*b* (configuration 3). The hinge 444*b* flexes to allow the middle panel 436*b* (together with the rear panel 436*a* which is folded onto the middle panel 436*b*) to fold up, passing through 90 degrees (configuration 4) towards the spacer panel 436*d*, passing through a point at which standoffs 458 contact the front panel (configuration 5). The hinge 444*b* flexes back towards 90 degrees as hinge 444*c* flexes to allow the spacer panel 436*d* to fold up, and continue to fold over (together with the rear panel 436*a* which is folded onto the middle panel 436*b*, and the middle panel 436*b*) towards the front panel 436*c* (configuration 6), until the rear panel 436*a*, middle panel 436*b*, and spacer panel 436*d* are folded onto the front panel 436*c* (configuration 7). The hinge 444*d* flexes to allow the rear panel 436*a*, middle panel 436*b*, spacer panel 436*d*, and front panel 436*c* to fold up into a generally vertical orientation onto the cab panel 444*d* (configuration 8). The hinge 444*d* flexes further to allow the rear panel 436*a*, middle panel 436*b*, spacer panel 436*d*, and front panel 436*c*, folded up onto the cab panel 444*d*, to be secured near or adjacent or touching the cab (configuration 9) with folded cover forward securing assembly 419, including various securing members 465 as are described below. Note that FIG. 28 is a schematic overview of the general folding of the folding cover assembly 430; the various configurations are further illustrated and described elsewhere herein in greater detail in relation to the folding cover assembly 430 or other folding cover assemblies 530, 630 described herein.

Figure 29:
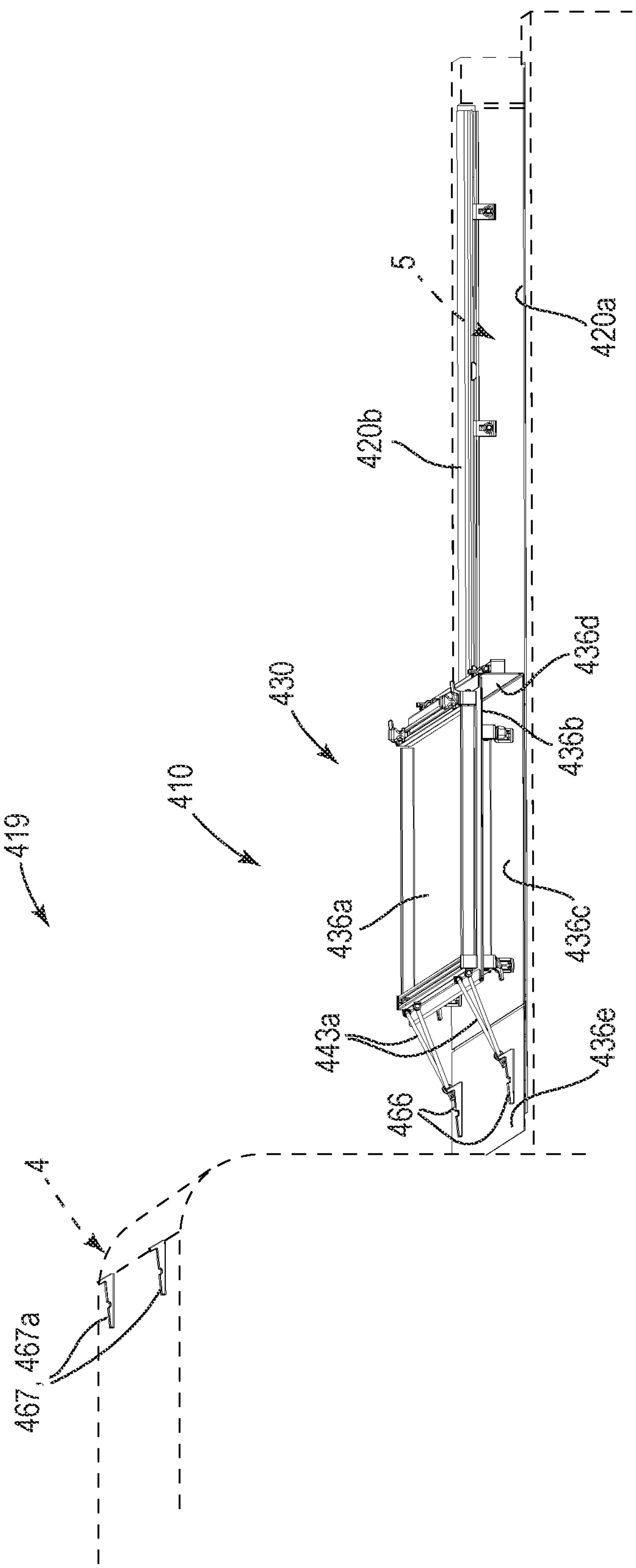
FIG. 29 is a side perspective view from the driver's side of the folding tonneau cover apparatus of FIG. 22, showing a configuration in which the rear, middle, and spacer panels are folded onto the front panel and secured with storage straps, but for clarity of illustration the perimeter seal is not shown.
Figure 30:
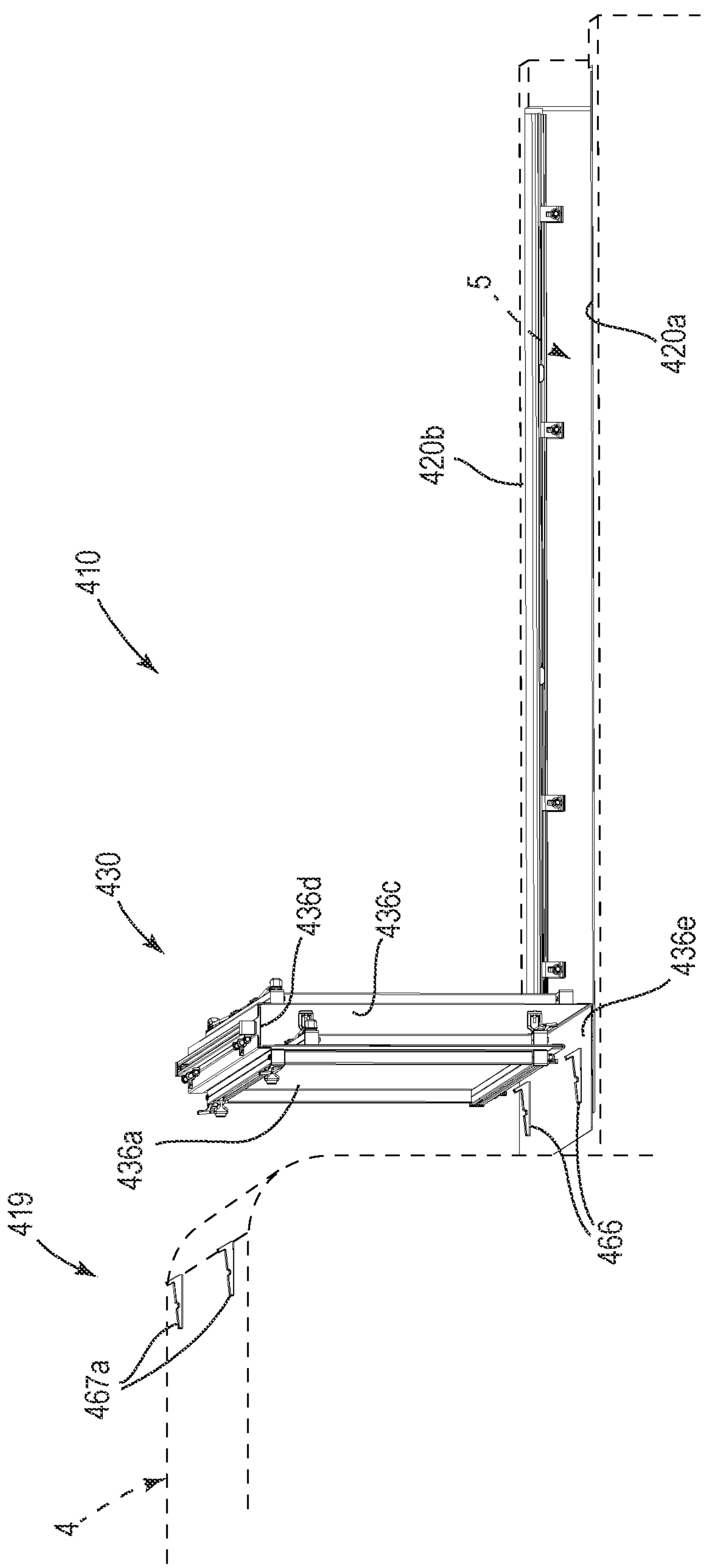
FIG. 30 is a side perspective view similar to that of FIG. 29, but showing a configuration in which the rear, middle, spacer, and front panels are folded onto the cab panel with the rear, middle, and front panels oriented generally vertically, but for clarity of illustration the perimeter seal is not shown.

FIG. 29 is a side perspective view from the driver's side of the folding tonneau cover apparatus 410 of FIG. 22, showing a configuration in which the rear panel 436*a*, the middle panel 436*b*, and the spacer panel 436*d* are folded onto the front panel 436*c* and secured with storage straps 494*a*. The various mechanisms and methods in releasing latches 450, disengaging hooks 462 from catches 464, bending the hinges 444, rotating and folding up of panels 436 of the folding cover assembly 430 to the configuration of FIG. 29 are generally similar to those described herein in relation to folding cover assemblies 530 and 630, and particularly similar to that of the folding cover assembly 630 described herein. In this embodiment, the storage straps 494*a* can attach to the panel brackets 466 which are attached to the top surface 437*e* of the cab panel 436*e*. The folding cover assembly 430 can be further folded up onto the cab panel 436*e* as illustrated in FIG. 30, and panel brackets 466 also provide support to the panels 436*a*, 436*b*, 436*c*, 436*d* as seen in FIGS. 30-31E. This configuration allows entry into a substantial portion of the cargo box 5. If entry into a greater portion of the cargo box 5 is desired, then the folding cover assembly 430 can be folded up onto the cab panel 436*e* as shown in FIG. 30; as with other latches 52 described herein, the driver or operator 8 can pull release cord 454*f* to release the latches 452*k* and 452*m* at the ends of the support bow 450*h* at the rear of the cab panel 436*e*, disengaging them from the side rails 420*a*, 420*b* and the containment brackets 425*a*', 425*b*' in a manner similar to that already described herein with regard to other latches 552, 652, 752. In the configuration illustrated in FIG. 30, the rear panel 436*a*, the middle panel 436*b*, the front panel 436*c* and the spacer panel or hinge panel 436*d* are folded together and are turned upward on top of the cab panel 436*e*, with the rear panel 436*a*, the middle panel 436*b*, and the front panel 436*c*, oriented in a generally vertically orientation while resting upon the cab panel 436*e*.

Figure 31A:
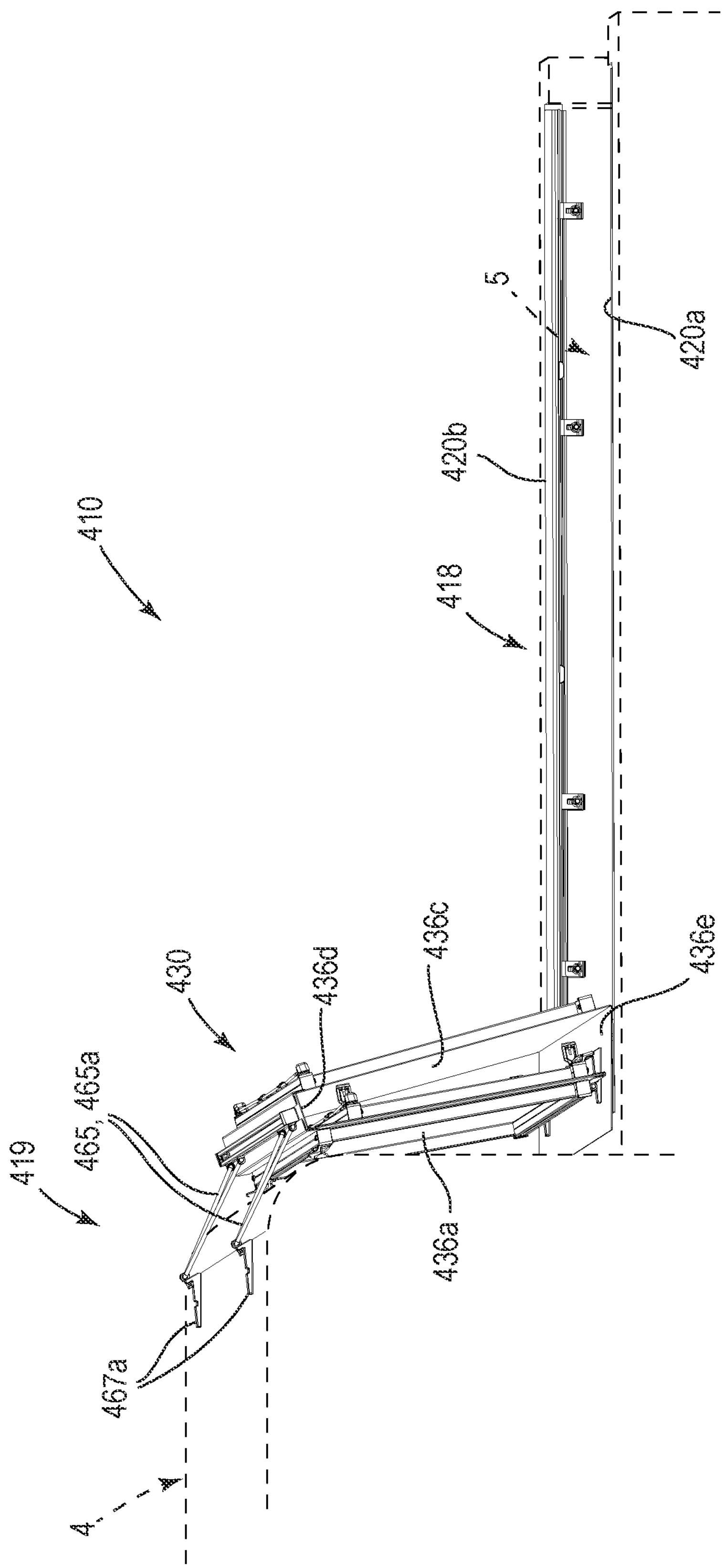
FIG. 31A is a side perspective view similar to that of FIG. 30, but showing a configuration in which the rear, middle, spacer, and front panels are folded onto the cab panel with the rear, middle, and front panels oriented generally vertically and secured to the truck cab with a securing member including cab straps, but for clarity of illustration the perimeter seal is not shown.
Figure 31B:
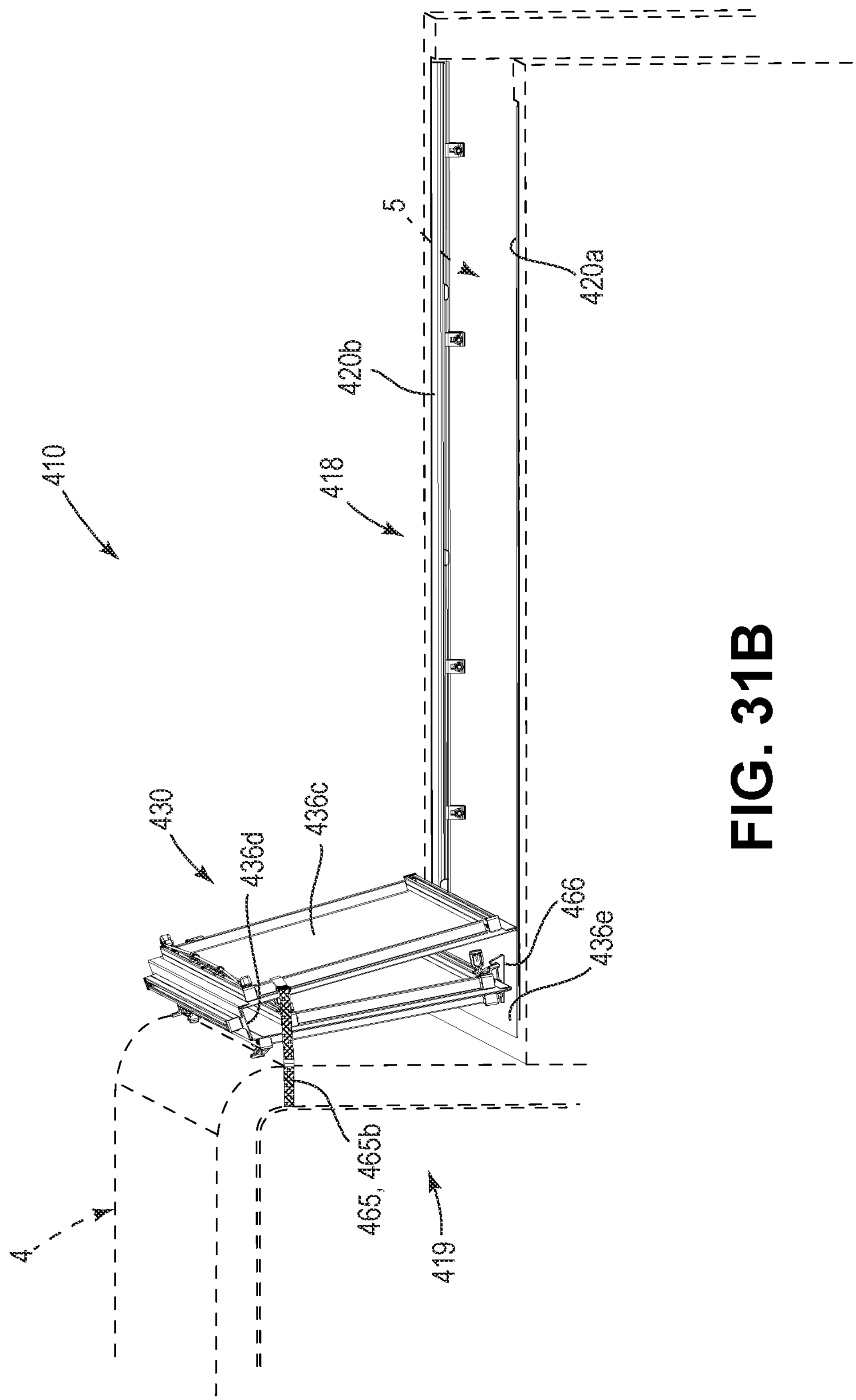
FIG. 31B is a side perspective view similar to that of FIG. 30, but showing a configuration in which the rear, middle, spacer, and front panels are folded onto the cab panel with the rear, middle, and front panels oriented generally vertically and secured to the truck cab with a securing member including a side strap, but for clarity of illustration the perimeter seal is not shown.
Figure 31C:
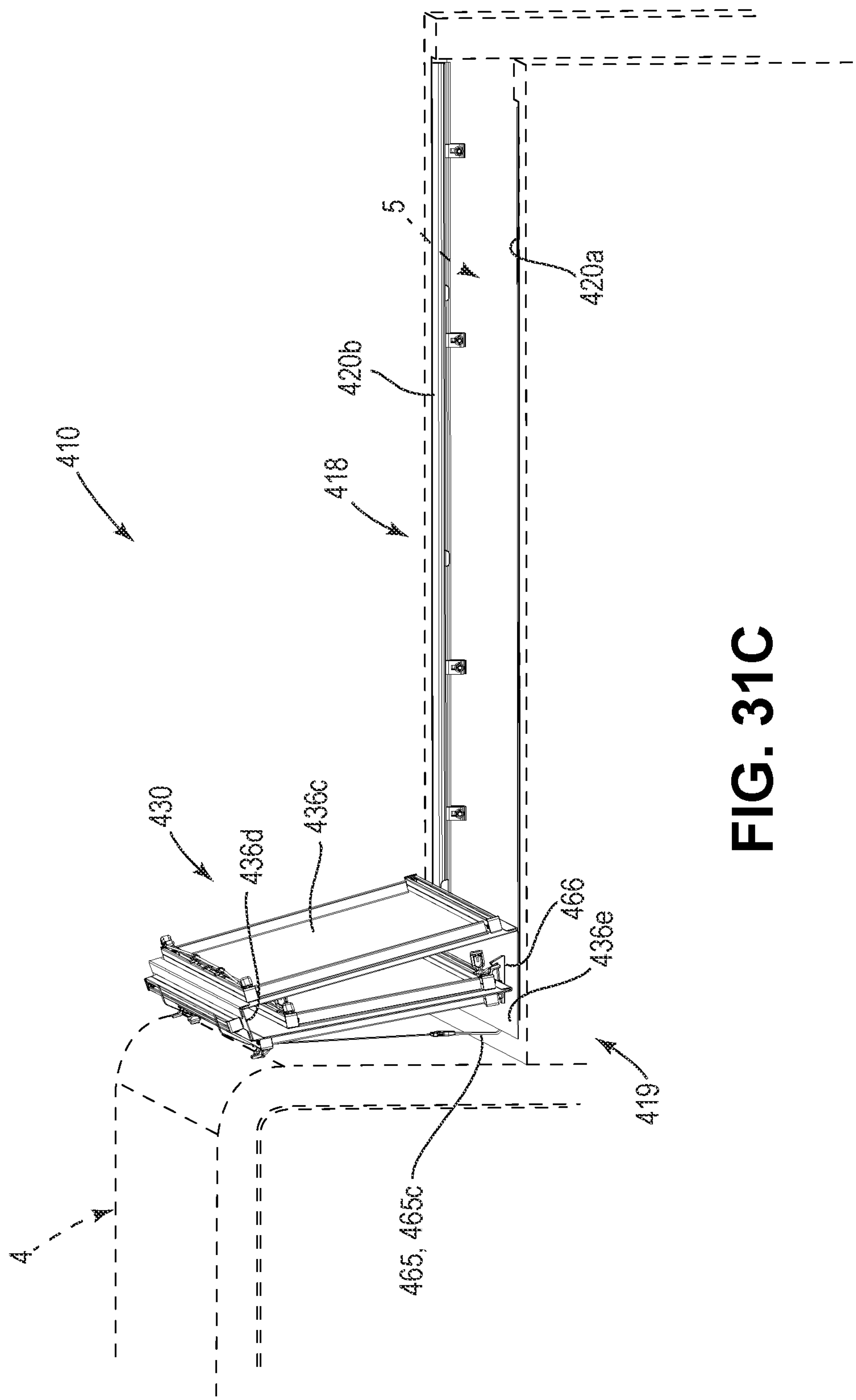
FIG. 31C is a side perspective view similar to that of FIG. 30, but showing a configuration in which the rear, middle, spacer, and front panels are folded onto the cab panel with the rear, middle, and front panels oriented generally vertically and secured to the truck cab with a securing member including a cab panel strap, but for clarity of illustration the perimeter seal is not shown.
Figure 31D:
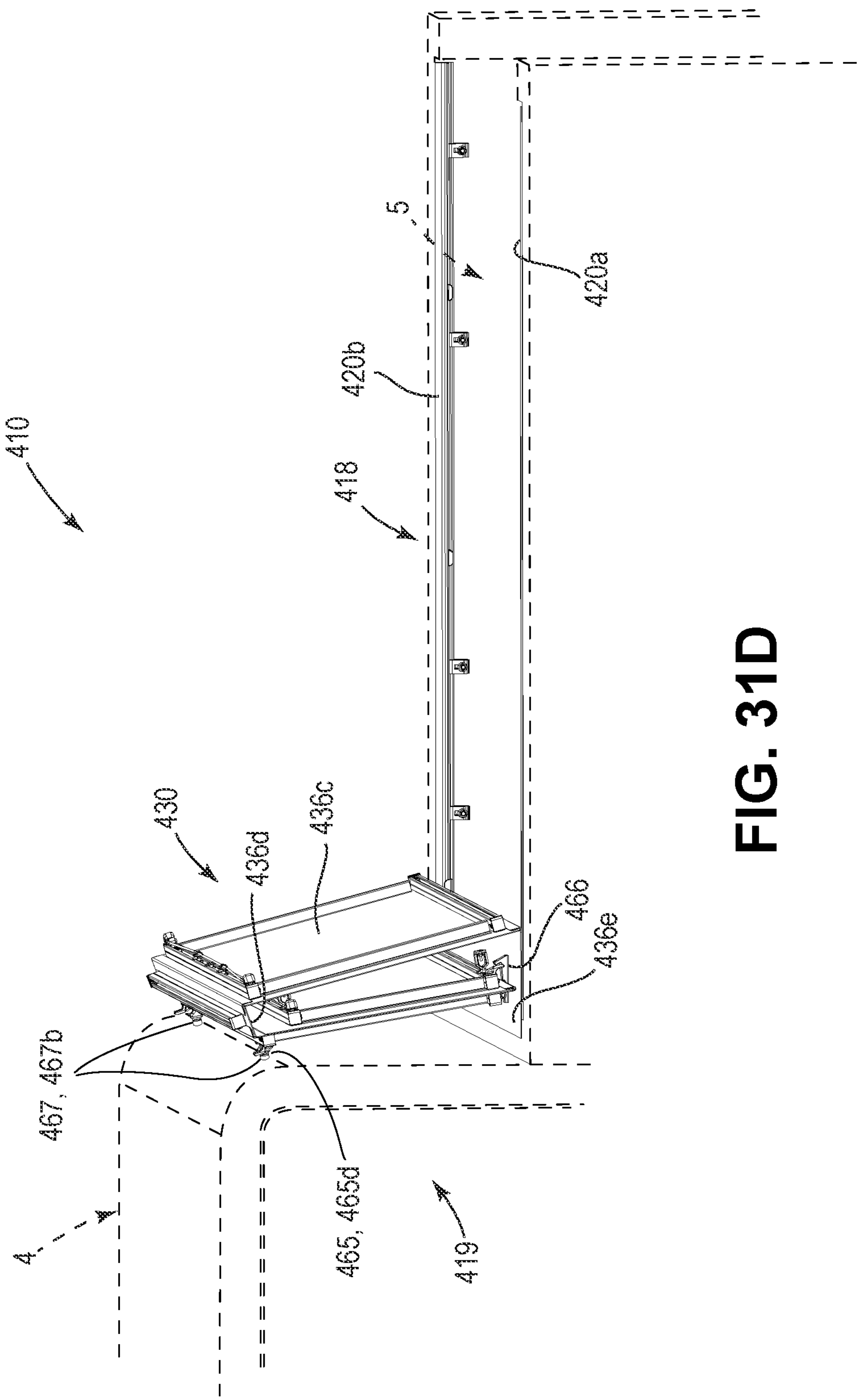
FIG. 31D is a side perspective view similar to that of FIG. 30, but showing a configuration in which the rear, middle, spacer, and front panels are folded onto the cab panel with the rear, middle, and front panels oriented generally vertically and secured to the truck cab with a securing member including a securing magnet, but for clarity of illustration the perimeter seal is not shown.
Figure 31E:
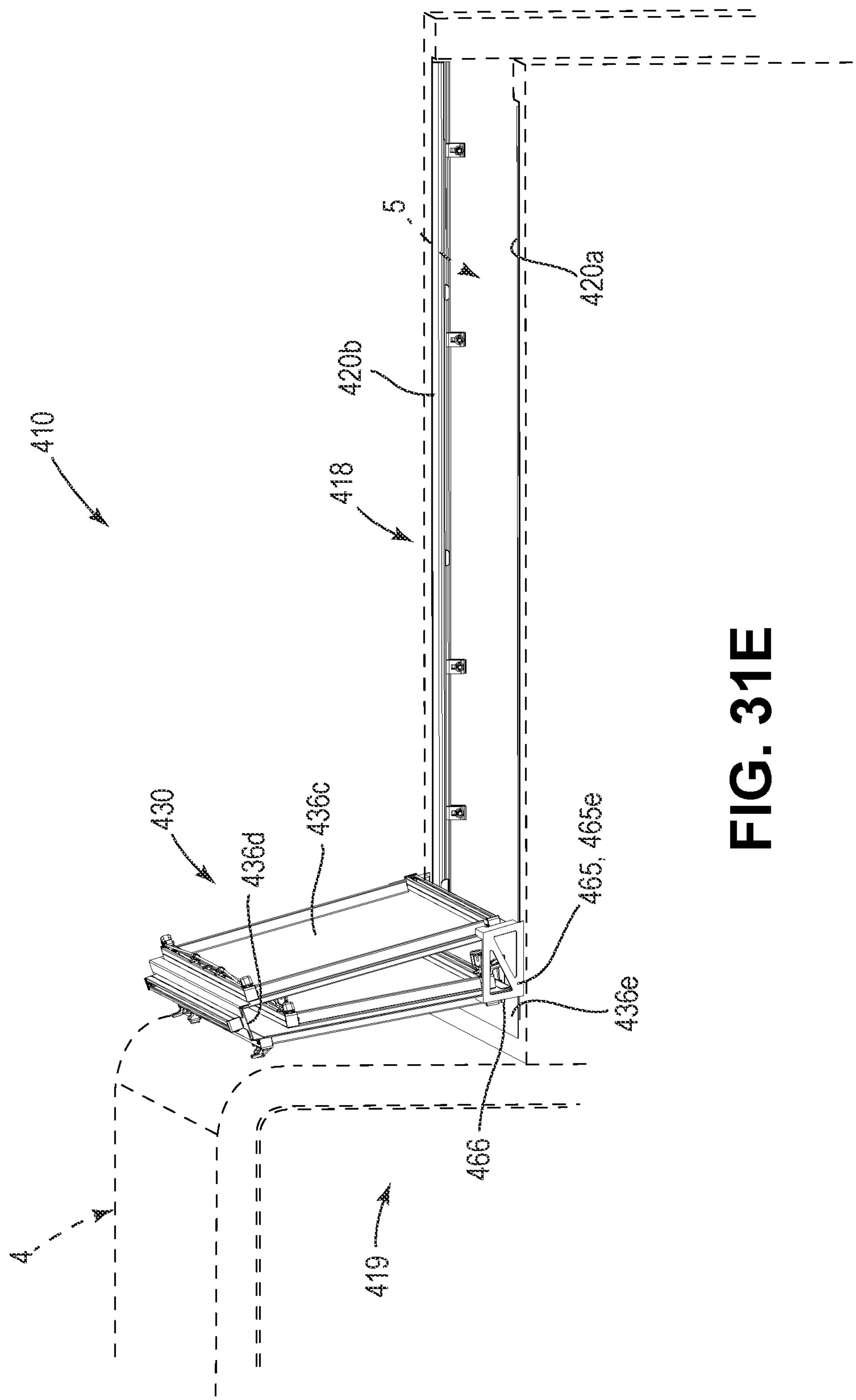
FIG. 31E is a side perspective view similar to that of FIG. 30, but showing a configuration in which the rear, middle, spacer, and front panels are folded onto the cab panel with the rear, middle, and front panels oriented generally vertically and secured to the truck cab with a securing member including a securing bracket, but for clarity of illustration the perimeter seal is not shown.

The folding cover assembly 430 can be secured in the generally vertical position with the with the rear panel 436*a*, the middle panel 436*b*, and the front panel 436*c*, oriented generally vertically, by securing member(s) 465 (such as cab strap 465*a*, side strap 465*b*, cab panel strap 465*c*, securing magnet 465*d*, or securing bracket 465*e*) that are used to secure the folding cover assembly 430 in this configuration, as illustrated in FIGS. 31A-31E. In some of the configurations illustrated in FIGS. 31A-31E, cab securement member(s) 467 (such as cab bracket 467*a* or cab magnet 467*b*) facilitate securement of the folding cover assembly 430 with the securing member(s) 465 as shown. FIG. 31A, for example, illustrates cab straps 465*a* which are secured to cab brackets 467*a* which are preferably secured to the cab 4 by adhesive such as adhesives 70*a*, 470*b*, 471*a*, 471*b*, or other adhesives described herein.

FIG. 31B illustrates a side strap 465*b* which secures the folding cover assembly 430 in position as shown. A side strap 465*b* can be provided on both the driver's side and the passenger side, or on only one side. The side strap 465*b* can form a single long loop which passes through the cab 4 (such as by temporarily opening the doors or the windows of the cab). Alternatively, the side strap 465*b* can attach using a buckle to a separate strap which is secured inside the cab 4.

FIG. 31C illustrates a cab panel strap 465*c* which secures the folding cover assembly 430 in position as shown. A cab panel strap 465*c* can be provided on both the driver's side and the passenger side, or on only one side. The cab panel strap 465*c* can attach to the cab panel 436*e*; alternatively, the cab panel strap 465*c* can attach using a buckle to a separate strap which is secured to the cab panel 436*e*.

FIG. 31D illustrates a securing magnet 465*d* which secures the folding cover assembly 430 in position as shown. A single securing magnet 465*d* can be provided or a plurality of securing magnets 465*d* can be provided. The securing magnet 465*d* can magnetically attach to a cab magnet 467*b* for securement to the cab 4. Alternatively, the securing magnet 465*d* can magnetically attach to a portion of the cab 4.

FIG. 31E illustrates a securing bracket 465*e* which secures the folding cover assembly 430 in position as shown. A securing bracket 465*e* can be provided on both the driver's side and the passenger side, or on only one side. The securing bracket 465*e* can retain the middle panel 436*b* and the front panel 436*c* and the cab panel 436*e* in the illustrated configuration (with the rear panel 436*a* and spacer panel 436*d* also held since they are attached to the other panels 436 by the hinges 444). Alternatively, the securing bracket 465*e* can attach to the respective support bows 450 to secure the folding cover assembly in the illustrated configuration. In some embodiments, the securing bracket 465*e* attaches to the panel bracket 466.

Another preferred embodiment of the folding tonneau cover apparatus of the present invention is illustrated in FIGS. 32-40H. A rear perspective view of a folding tonneau cover apparatus 610 is illustrated in FIG. 32, which includes a support frame assembly 618, a folded cover forward securing assembly 619, and a folding cover assembly 630 incorporating a cab panel 636*e* onto which rear panel 636*a*, middle panel 636*b*, spacer panel 636*d*, and front panel 636*c* can fold, with the folding tonneau cover apparatus 610 attached to a pickup truck 2 which is shown in phantom, with a cab 4, a drivers side 3*a*, a passenger side 3*b*, a front 3*c*, and a rear 3*d*. The folding tonneau cover apparatus 610 is secured to the truck 2 to cover a cargo box 5 having a drivers side sidewall 6*a*, a passenger side sidewall 6*b*, a front wall 6*c* (FIG. 40), and a tailgate 6*d*, which define a top opening 6*f* (FIG. 40), a cargo box length 7*a*, and a cargo box width 7*b*. Preferably, the panels 636 are secured to side rails 620*a*, 620*b* by latches 652, of which latches 652*a* and 652*b* are partially shown on FIG. 32. The folding cover assembly 630 has a top 632*a* and a bottom 632*b*.

Preferably, the folded cover forward securing assembly 619 secures the folded folding cover assembly 630 in an upright folded orientation in which the top or upper surface 637*a*, 637*b*, 637*c* of the rear panel 636*a*, middle panel 636*b*, front panel 636*c*, respectively, are in an upright or generally vertical orientation. The folded cover forward securing assembly 619 preferably includes two cab bracket assemblies 667*c*, two cab braces 668*a*, two storage retainers 643*e*, and two storage straps 643*d*. Alternatively, the folded cover forward securing assembly 619 can include other elements such as the securing members 465 disclosed herein, including the cab strap 465*a*, the side strap 465*b*, the cab panel strap 465*c*, the securing magnet 465*d*, the securing bracket 465*e* the panel bracket 466, the cab securement member 467, the cab bracket 467*a*, the cab magnet 467*b* (FIGS. 29-31E) or combinations of the elements disclosed herein.

Figure 32A:
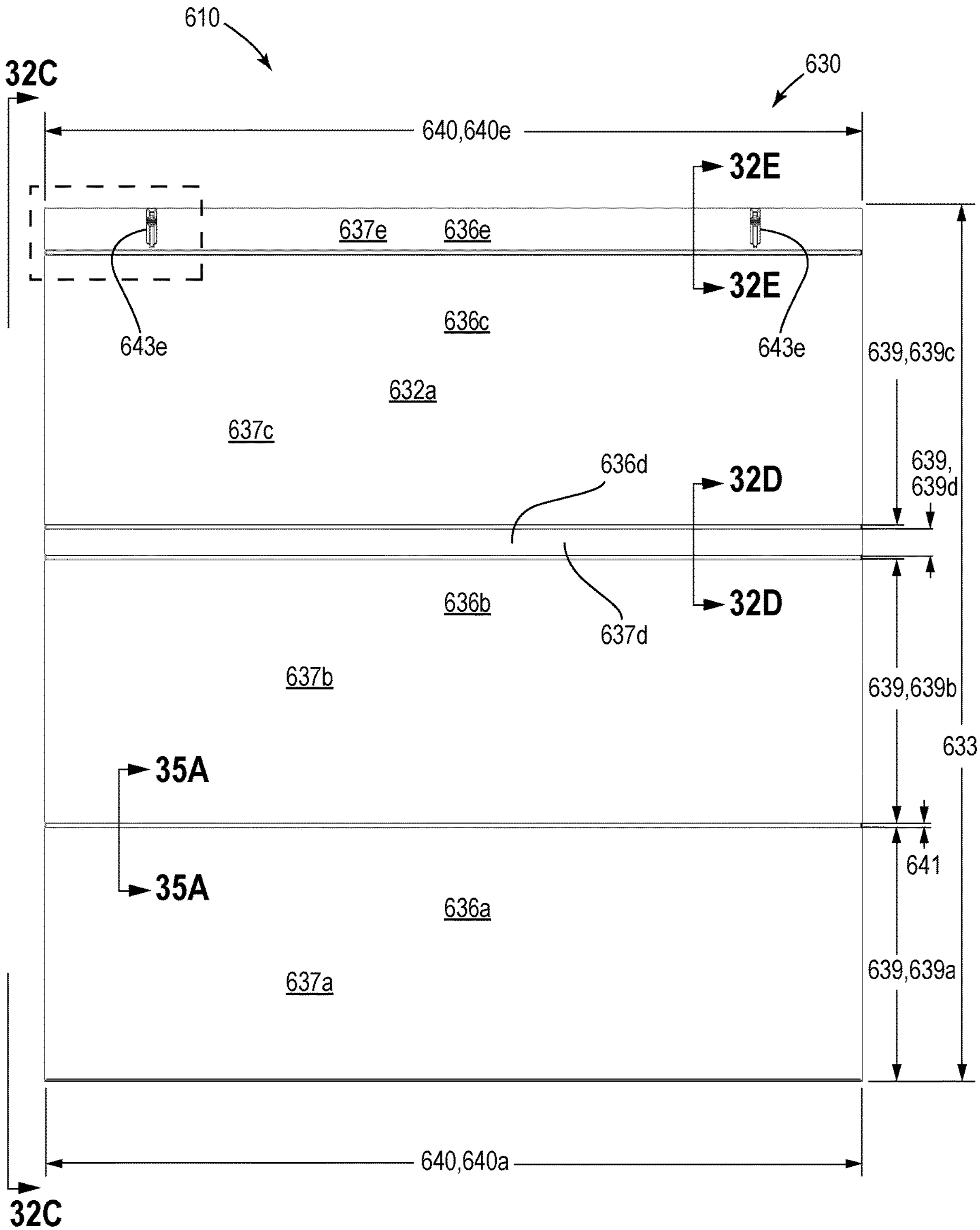
FIG. 32A is a top plan view primarily showing the folding cover assembly shown in FIG. 32.

A top plan view of the folding cover assembly 630 is illustrated in FIG. 32A, which shows the panels 636, namely the rear, middle, front, spacer, and cab panels 636*a*, 636*b*, 636*c*, 636*d*, 636*e*, each having a top surface 637*a*, 637*b*, 637*c*, 637*d*, 637*e*, and a width 640, namely 640*a*, 640*b*, 640*c*, 640*d*, 640*e*, respectively, and a length 639, namely 639*a*, 639*b*, 639*c*, 639*d*, 639*e*, respectively; the folding cover assembly 630 has a length 633, and a gap 641 between adjacent panels 636. The folding cover assembly 630 preferably includes storage retainers 643*e* attached to the cab panel 636*e*.

Figure 32B:
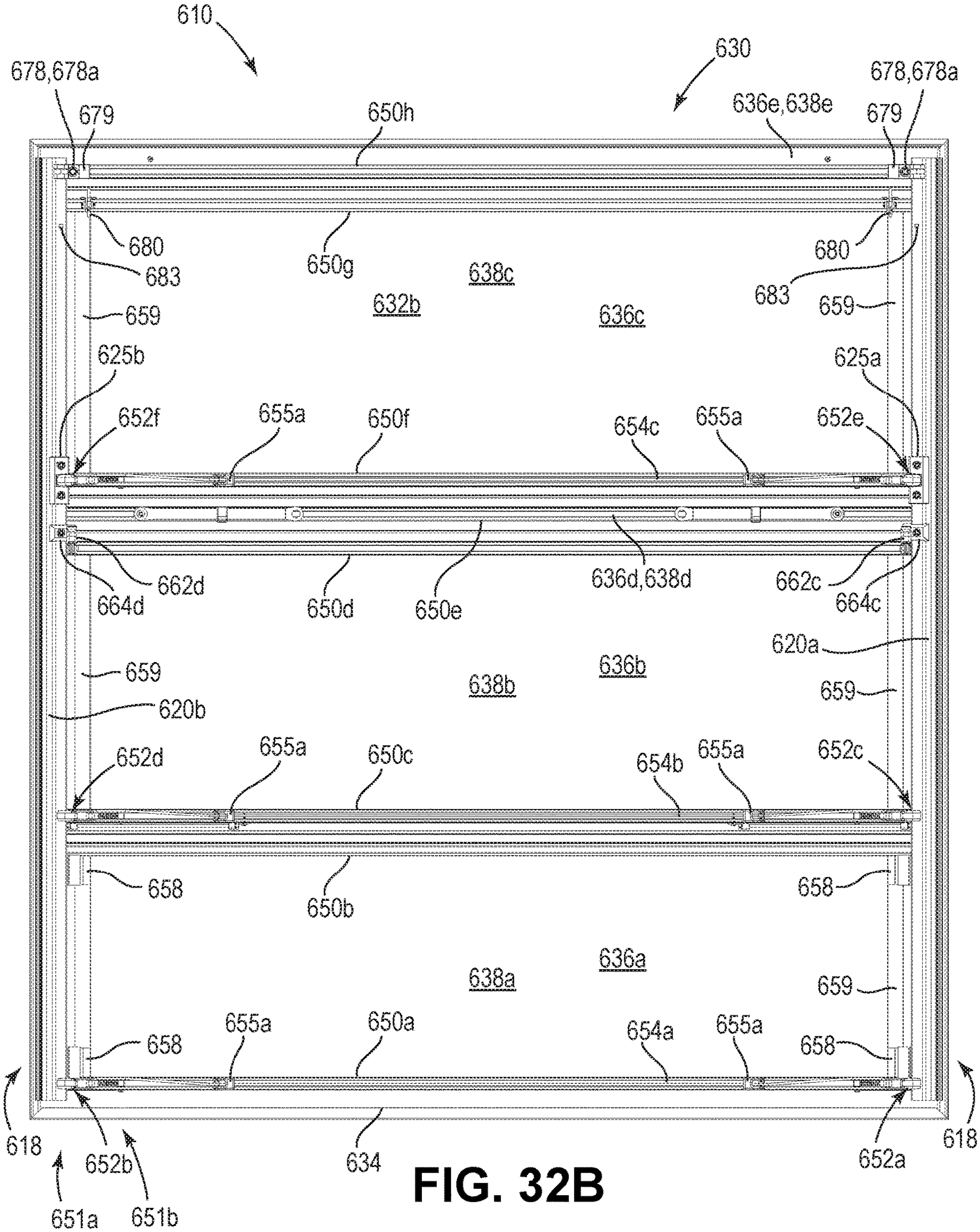
FIG. 32B is a bottom plan view primarily showing the folding cover assembly of FIG. 32.

A bottom plan view of the folding tonneau cover apparatus 610 is illustrated in FIG. 32B, which shows the folding cover assembly 630, the bottom surfaces 638*a*, 638*b*, 638*c*, 638*d*, 638*e* of panels 636*a*, 636*b*, 636*c*, 636*d*, 636*e*, respectively, and support bows 650*a*, 650*b*, 650*c*, 650*d*, 650*e*, 650*f*, 650*g*, 650*h*, latches 652*a*, 652*b*, 652*c*, 652*d*, 652*e*, 652*f* engaged with side rails 620*a*, 620*b*, and with latches 652*e* and 652*f* also engaged with containment brackets 625*a*, 625*b* which aid in maintaining the position of the folding cover assembly 630 with respect to the side rails 620*a*, 620*b* and the cargo box 5. Note that the spacer panel 636*d* and corresponding bottom surface 638*d* are obscured in FIG. 32B but are in the indicated location, behind support bow 650*e*. Handles 659 are attached to the bottom surfaces 638 of panels 636*a*, 636*b*, and 636*c*, preferably by adhesive 670*b*, such as double-sided adhesive tape 671*b* or by other adhesive elements such as are described herein. Standoffs 658 are preferably attached to handles 659 that are attached to the rear panel 636*a* as shown; the standoffs 658 are preferably attached similar to the attachment of standoffs 558 to support bows 550 as illustrated in FIGS. 14A-14C. The folding cover assembly 630 preferably includes perimeter seal 634 located at the perimeter of the folding cover assembly 630; various configurations of perimeter seal are envisioned, such as the perimeter seals 534, 534*a*-534*k* shown in FIGS. 15A-15H. The cab panel 636*e* is secured to the side rails 620*a*, 620*b* by cab panel retainers 679 and retainer bolt 678; two retainer bolts are illustrated as examples, including hex bolt 678*a* and handle bolt 678*b* (FIG. 32K).

Figure 32C:
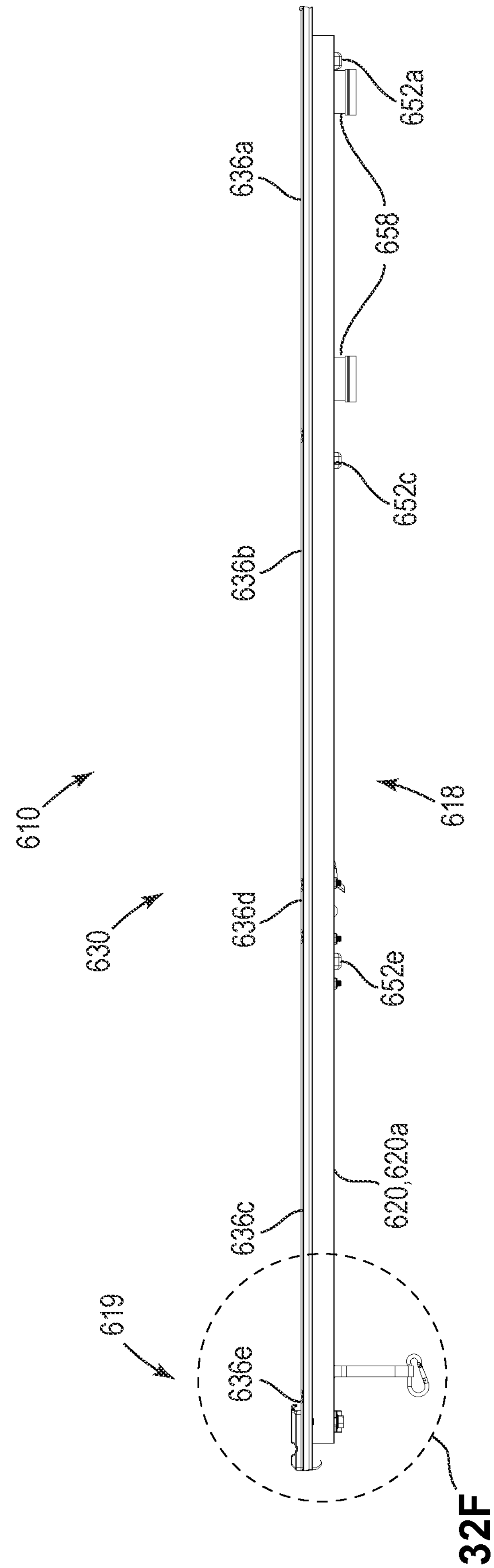
FIG. 32C is a side view of portions of the folding tonneau cover apparatus of FIG. 32 as viewed from line 32C-32C of FIG. 32A.
Figure 32D:
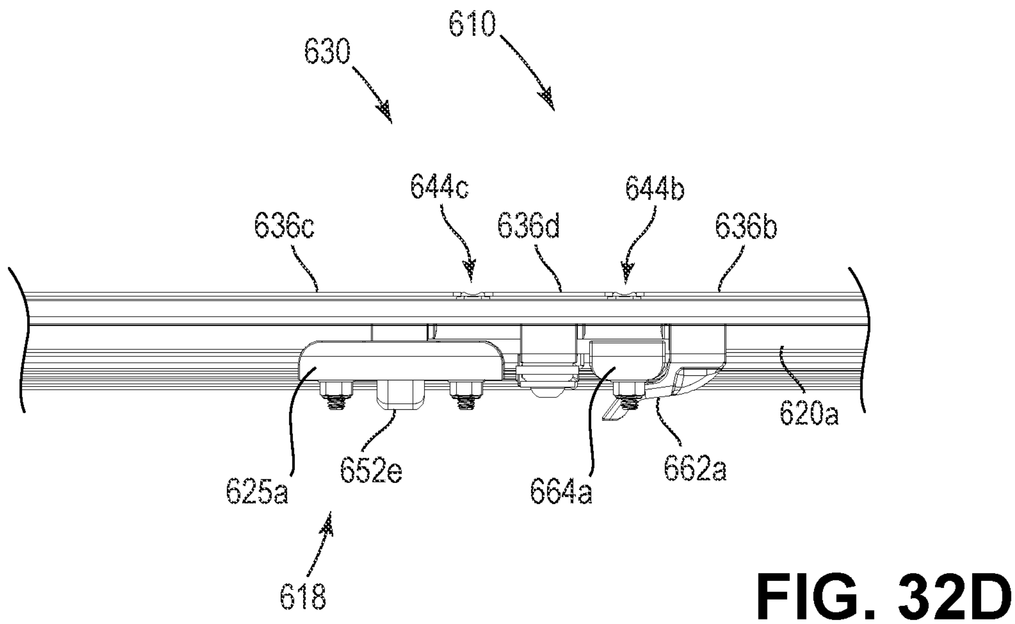
FIG. 32D is a detailed view of a portion of the folding tonneau cover apparatus as viewed from line 32D-32D of FIG. 32A, illustrating the spacer panel and adjacent hinges.
Figure 32E:
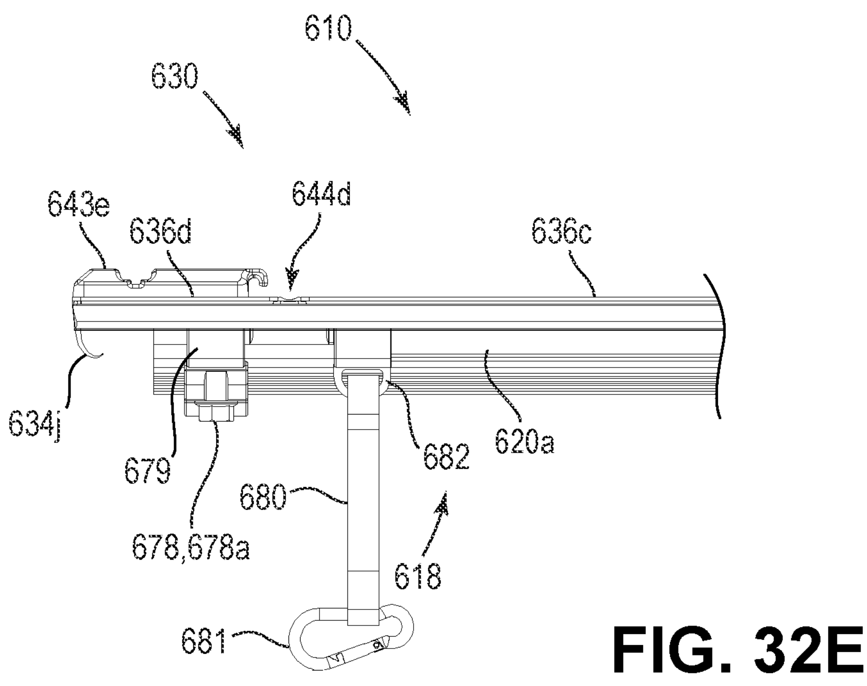
FIG. 32E is a detailed view of a portion of the folding tonneau cover apparatus as viewed from line 32E-32E of FIG. 32A, illustrating the rear hinge.
Figure 32F:
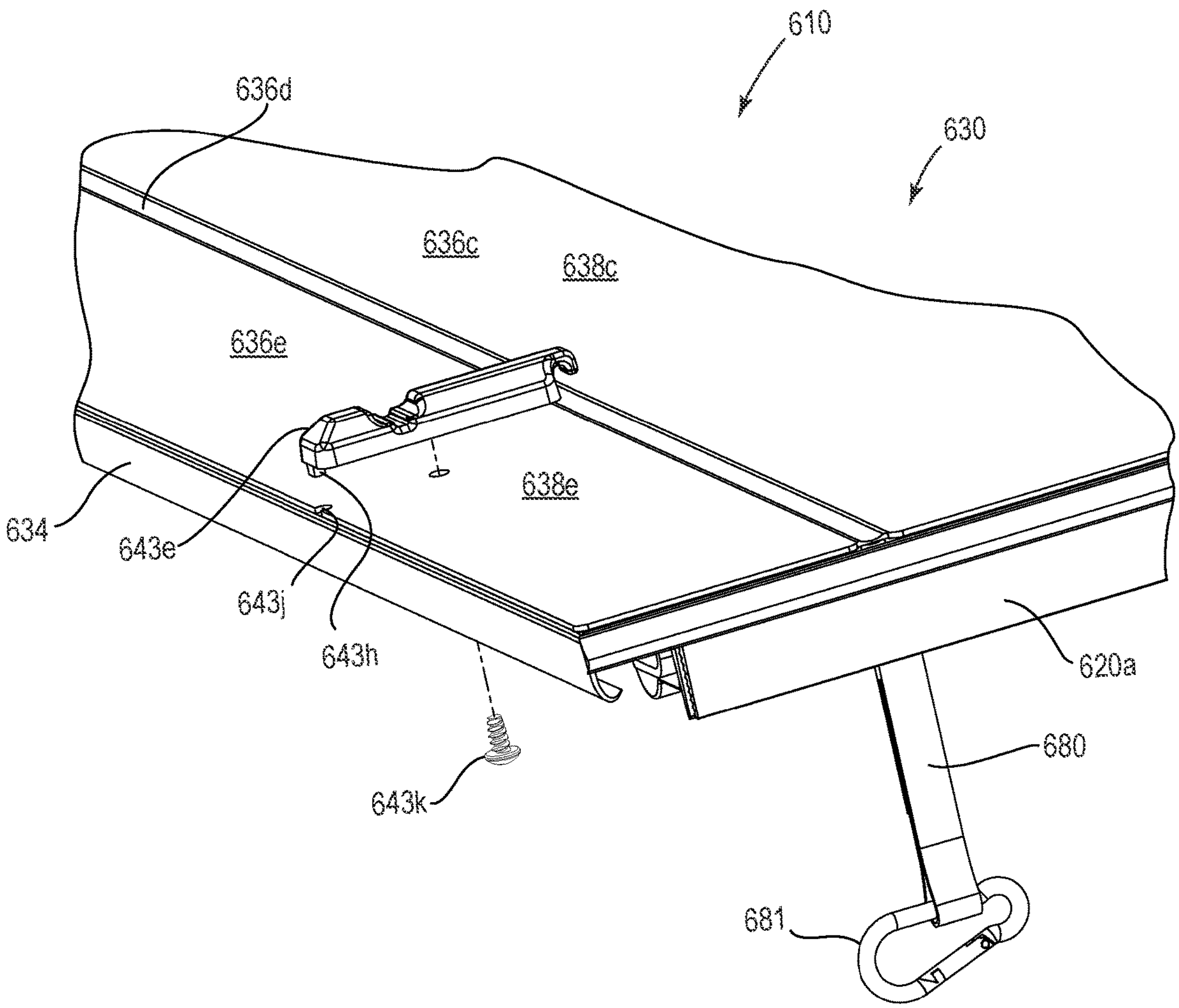
FIG. 32F is an enlarged detailed front perspective view of a portion of the folding tonneau cover apparatus encircled by dashed line 32F-32F of FIG. 32C, showing a storage retainer and a tether and link.

A side view of portions of the folding tonneau cover apparatus 610 is illustrated in FIG. 32C, as viewed from line 32C—32C of FIG. 32A, and give further understanding of the relative positioning of the elements. Further detailed views of the folding tonneau cover apparatus 610 are illustrated in FIGS. 32D-32F. FIG. 32D shows a portion of the folding tonneau cover apparatus 610 as viewed from line 32D-32D of FIG. 32A, illustrating the spacer panel 636*d* and adjacent hinges 644*b*, 644*c*, hook 662*a*, catch 664*a*, and containment bracket 625*a* which keeps latch 652*e* in position when the latch 652*e* is engaged with the side rail lip 624 (FIG. 33B) of side rail 620*a* and helps to maintain the folding cover assembly 630 at the desired location to cover the cargo box 5. Similarly, FIG. 32E shows a portion of the folding tonneau cover apparatus 610 as viewed from line 32E-32E of FIG. 32A, illustrating the front hinge 644*d* and adjacent panels 636*c*, 636*e*. An alternative perimeter seal 634*j*, storage retainer 643*e*, cab panel retainer 679, and hex bolt 678*a*, are illustrated. A tether 680, secured to support bow 650*g* (not visible on FIG. 32E) by ring 682, and link 681 are shown, which provide for an additional safety securement when the link is attached to the side rail 620*a* at aperture 683 (FIG. 32J) as illustrated on FIGS. 39C-E, for example.

Figure 32G:
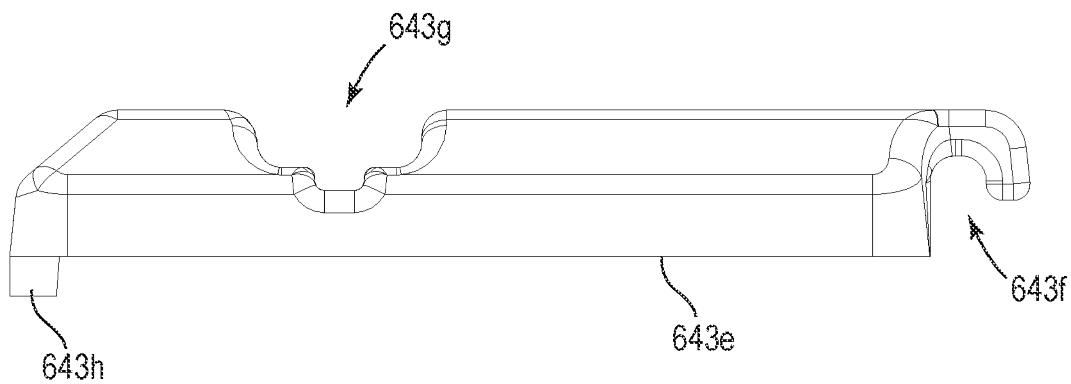
FIG. 32G is a side view of the storage retainer shown in FIG. 32F.

As further illustrated in FIGS. 32F and 32G, the folding tonneau cover apparatus preferably includes the storage retainer 643*e*, which is secured to the cab panel 626*e* by a retainer fastener 643*k*. The storage retainer 643*e* preferably includes a retainer protrusion 643*h* that engages a retainer slot 643*j* in the cab panel 636*e* to aid in maintaining proper position and orientation of the storage retainer 643*e*. The storage retainer 643*e* also preferably includes a retainer hook 643*f* to which a storage strap 643*d* can be secured (FIG. 39E) and a retainer nest 643*g* which is configured and arranged to accommodate the folding cover assembly 630 in a folded-up configuration as illustrated in FIG. 40A, for example. is an enlarged detailed front perspective view of a portion of the folding tonneau cover apparatus encircled by dashed line 32F-32F of FIG. 32C, showing a storage retainer and a tether and link.

Figure 32H:
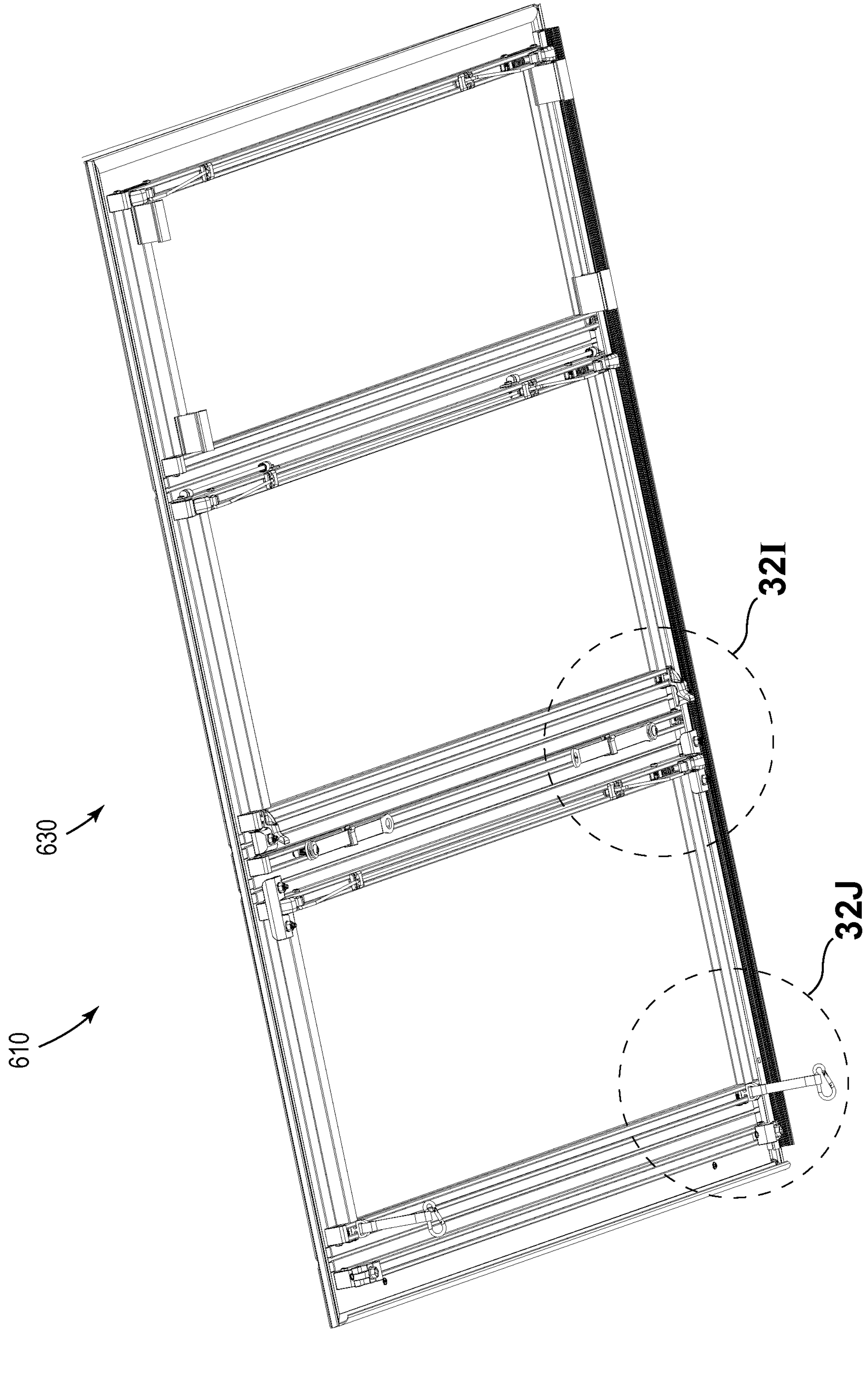
FIG. 32H is a bottom perspective view of a portion of the folding tonneau cover apparatus of FIG. 32.
Figure 32I:
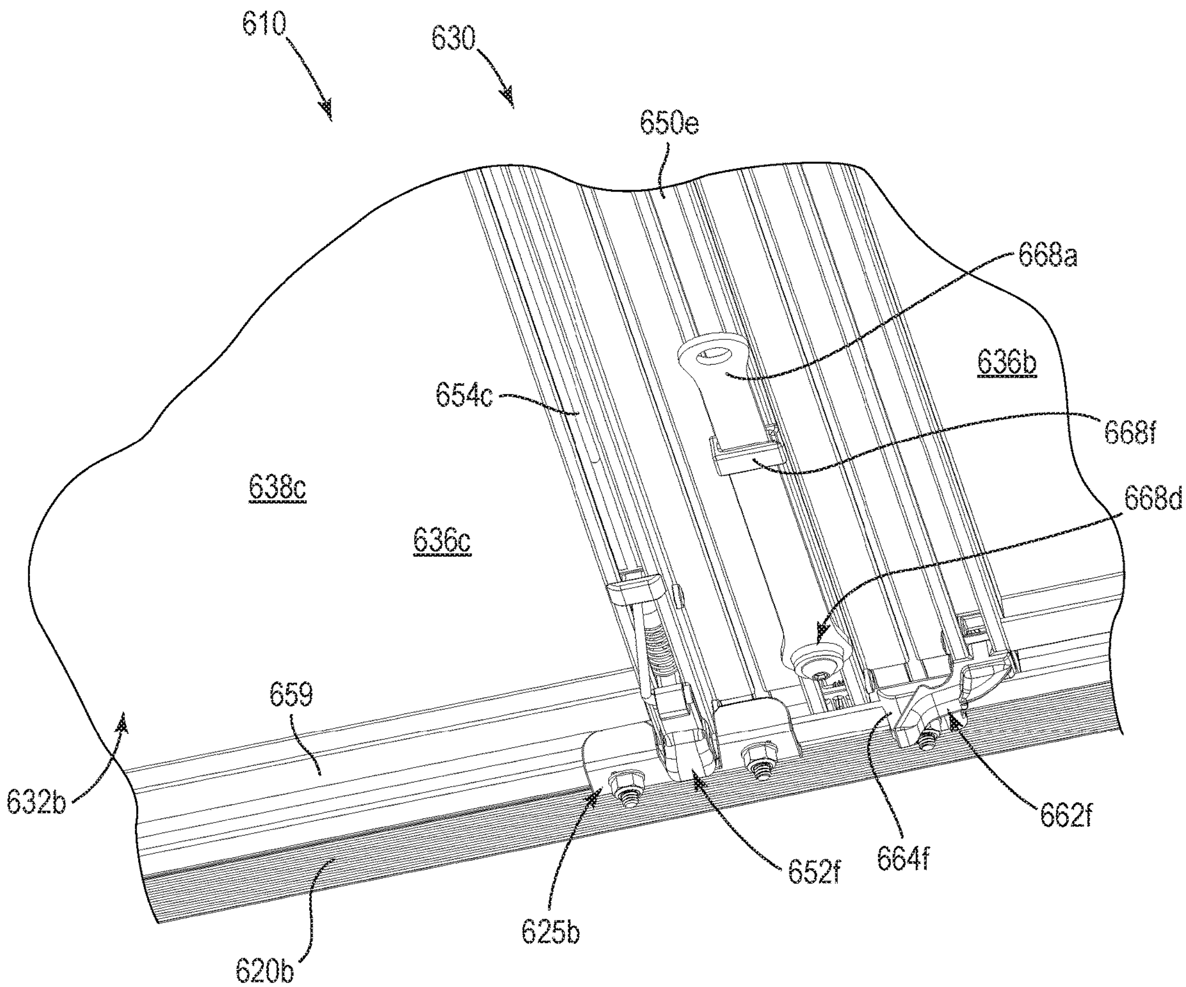
Figure 32J:
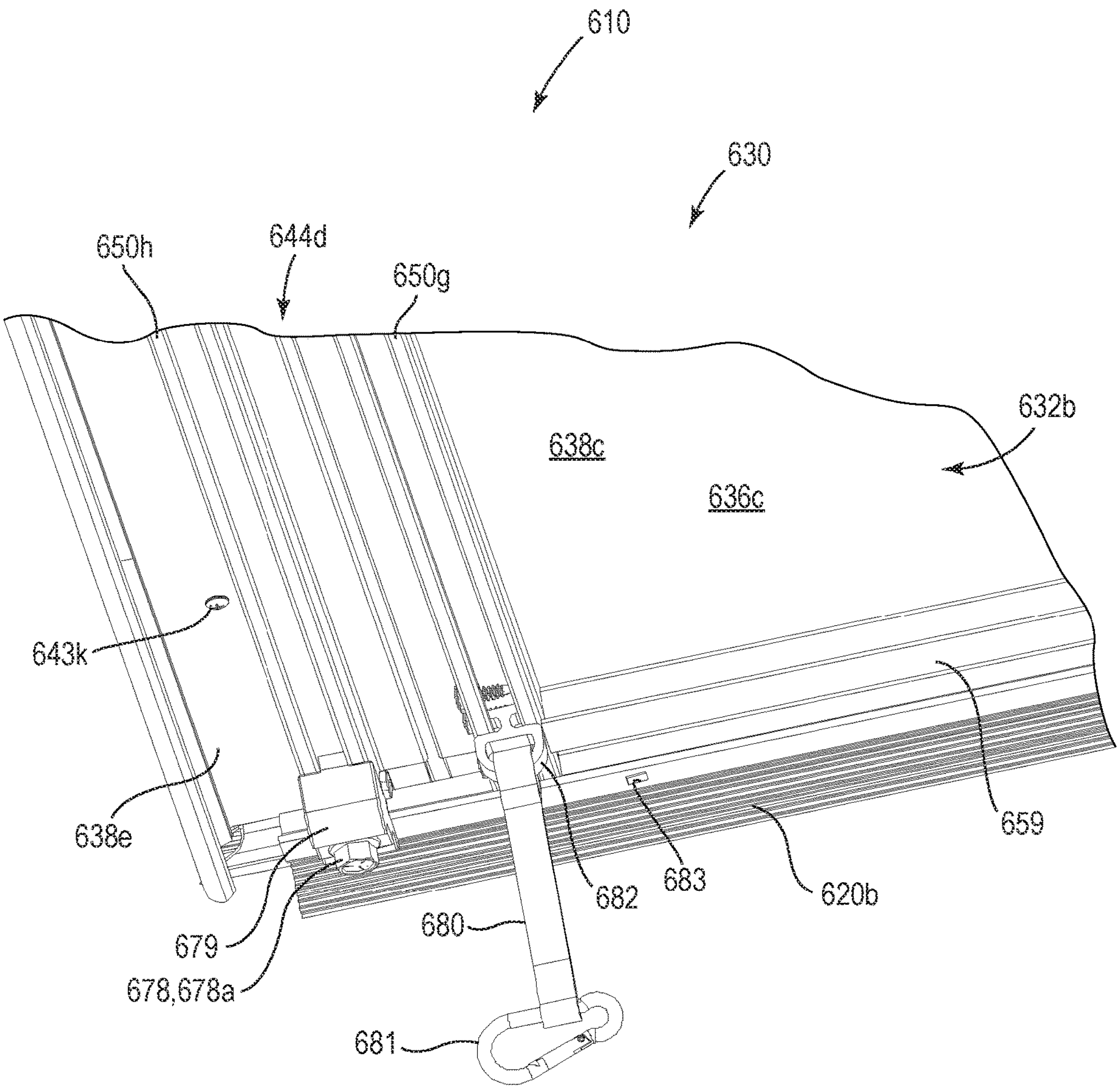
Figure 32K:
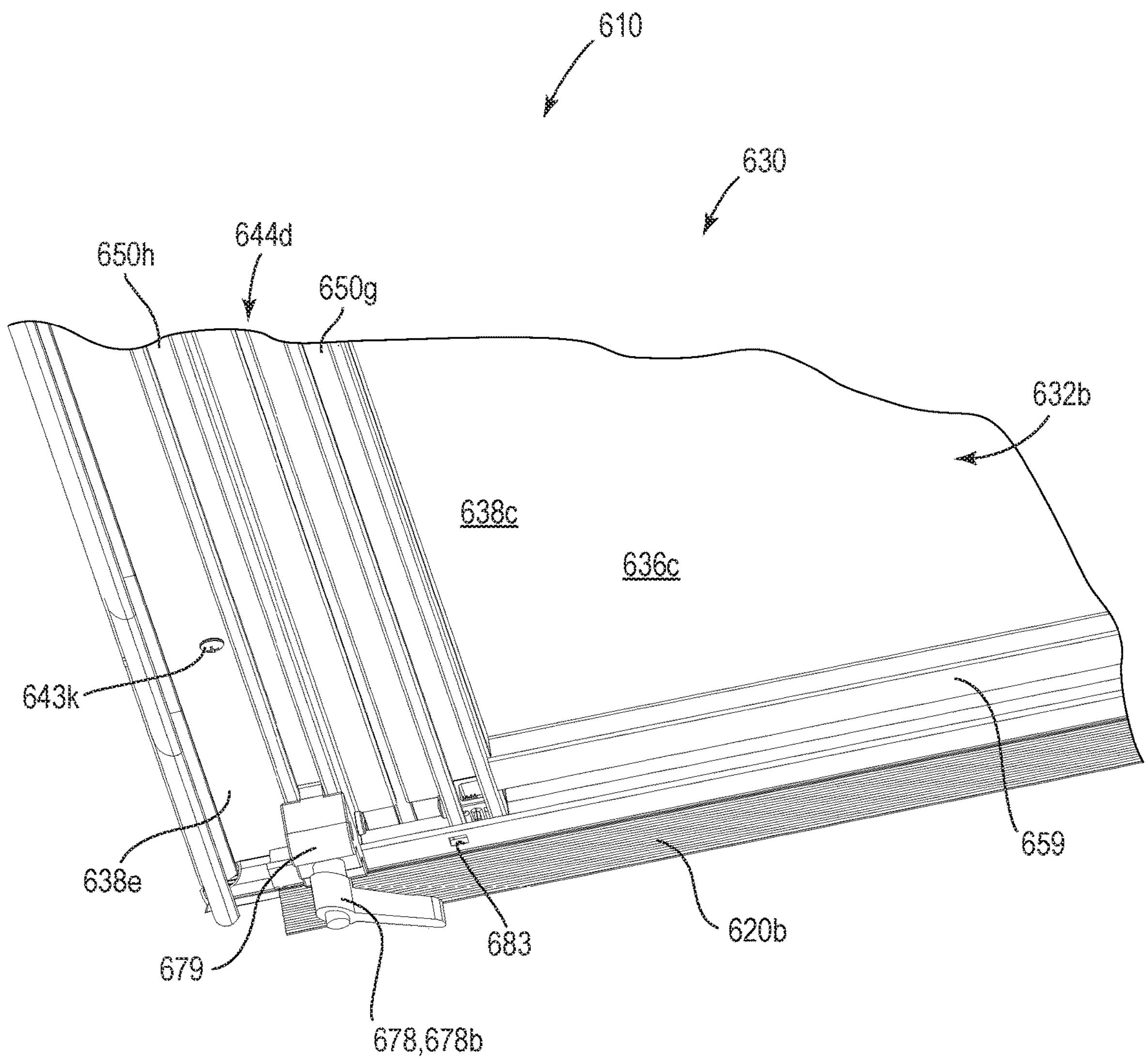

Portions of the folding tonneau cover apparatus of FIG. 32 are illustrated in FIGS. 32H-J to show the structure and elements near passenger side of the spacer panel 636*d* and the cab panel 636*e*. Middle panel 636*b*, front panel 636*c*, and bottom surfaces of the middle panel, front panel, and cab panel, respectively, are shown, with the hook 662*f* engaged with the catch 664*f*, the latch 652*f* engaged with the containment bracket 525*b* and the side rail 620*b*, cab brace 668*a* secured by cab brace fastener assembly 668*d* to the support bow 650*e* and engaged with cab brace retainer 668*f*. The release cord 654*c* and handles 659 are also shown. The tether 680 is secured to support bow 650*g* by ring 682, and is also attached to link 681 which can be attached to side rail 620*b* at aperture 683 for additional securement of the folding cover assembly 630 to the side rail 620*b*; similar elements are located at the drivers side of the folding tonneau cover apparatus 610. The retainer fastener 643*k* can be seen engaged with the cab panel 636*e*. The cab panel retainer 679 is engaged with the support bow 650*h* and is secured to the side rail 620*b* by a retainer bolt 678, such as retainer hex bolt 678*a*, although other fasteners such as retainer handle bolt 678*b* (FIG. 32K) can be utilized.

An alternative retainer handle bolt or lever clamp bolt 678*b* is illustrated in FIG. 32K; also in FIG. 32K; the tether 680 is not shown in this view.

Figure 33A:
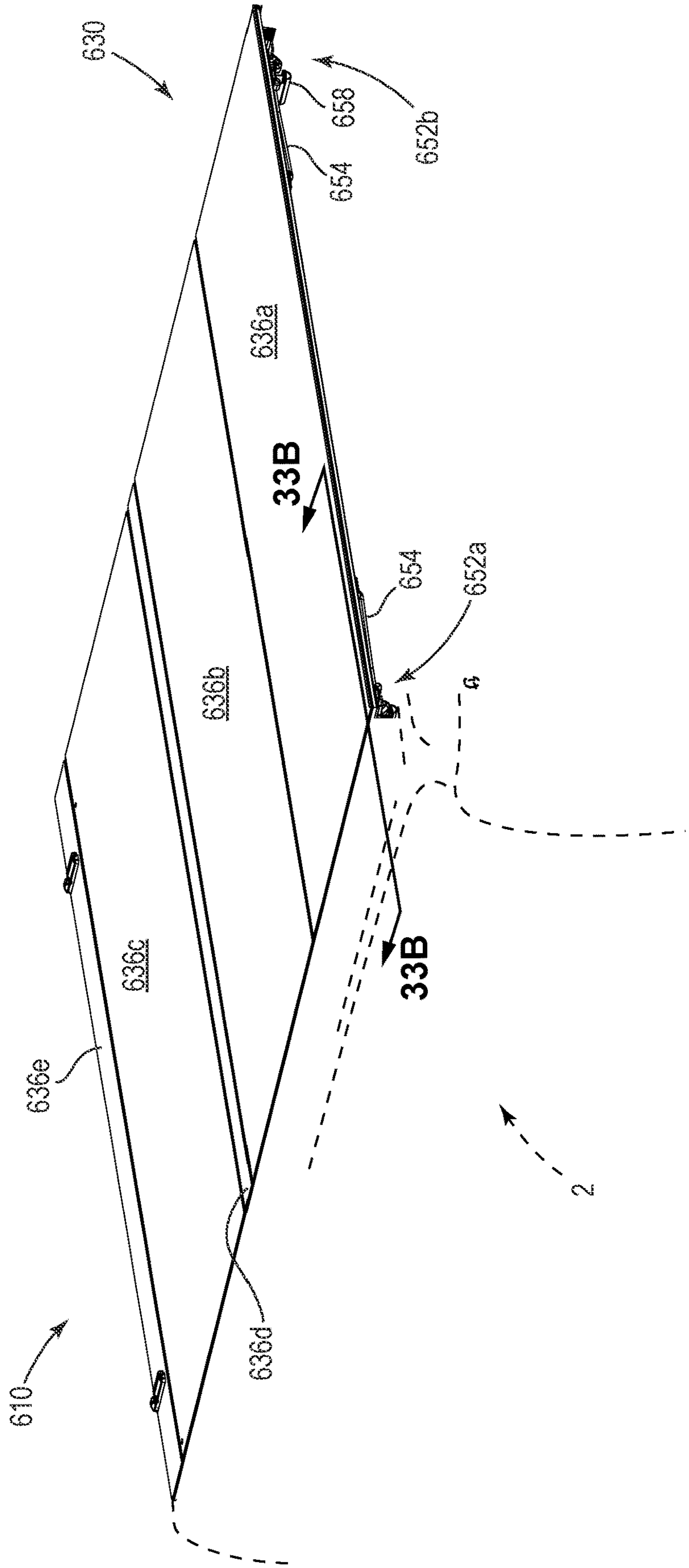
Figure 33B:
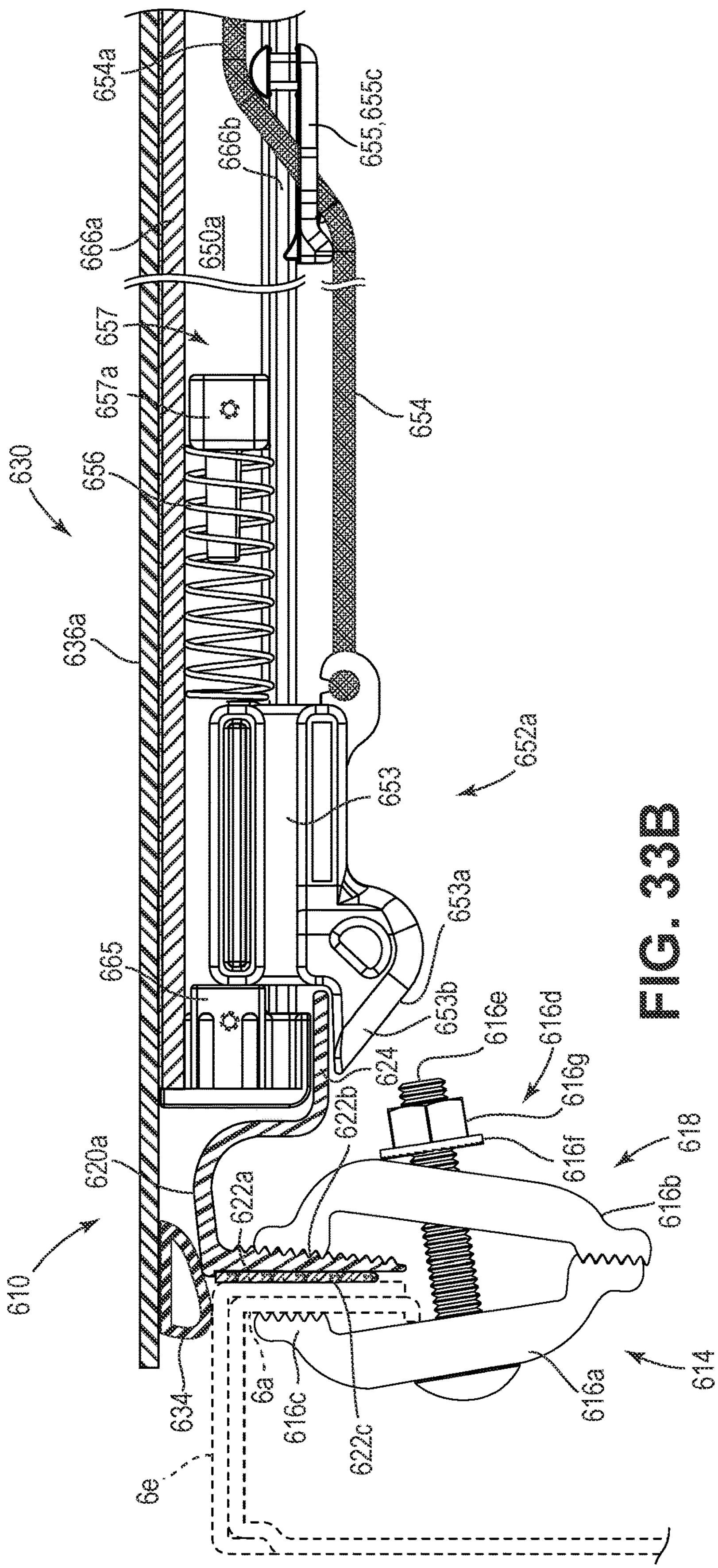

Referring now to FIGS. 33A and 33B, the release cord 654 near the rear end of the rear panel 636*a* passes through cord guides 655, 655*c*. FIG. 33B is an enlarged partial section view of the driver's side end portion of the support bow 650*a* as indicated in FIG. 33A. The cord guides 655, 655*c* are preferably molded and made of a strong polymer such as Nylon, which may be reinforced with fiberglass or other embedded material to strengthen the polymer. In alternate embodiments, the cord guides 655 can made of polymeric, metallic or ceramic materials using three-D printing methods or three-D etching methods or other additive or subtractive machining process.

As seen in FIG. 33B, the latch 652*a* includes latch slide 653 having an engaging portion 653*b* which extends forward to engage the lip 624 of the side rail 620*a*, so as to secure the panel 630*a* to the side rail 620*a*. The latch slide 653 preferably includes a stiff polymer, composite, or metal, although other materials and combinations can be used. Preferably, the latch slide 653 includes fiberglass-reinforced nylon. The latch slide 653 is biased by a biasing member or spring 656 towards the side rail 620*a* so that the engaging portion 653*b* engages the side rail 620*a* to form a secured configuration in which the respective panel 636 is restricted from being lifted up from the cargo box 5; in this example, the spring 656 is a compression spring, but an extension spring, or an elastic element, or other known elements could alternatively be used to bias the latch slide 653 towards the side rail 620*a* so that the engaging portion 653*b* engages the side rail 620*a* so that the latch 652 is in the secured configuration. In this embodiment, the spring 656 is held between the latch slide 653 and a spring retainer assembly 657. The spring retainer assembly 657 is secured in the desired location in the support bow 650*a*. The side rails 620*a* and 620*b* preferably include extruded metal, and have a side rail engagement portion 622*a*, arranged to approximate a portion of the sidewall 6*a*, 6*b* of the pickup truck 2. The clamp 614 is shown in detail in FIG. 33B. The clamps 614 preferably include aluminum, although other metals or alloys or polymers or other composite materials can be used. Clamps 614 preferably have an outer member 616*a* and an inner member 616*b* which are tightened towards each other and held as an assembly on the sidewall 6*a* by a fastener assembly 616*d* which preferably includes a bolt 616*e*, a washer 616*f*, and a nut 616*g*. Preferably, inner member 616*b* has a clamp engagement portion 616*c* which, together with side rail engagement portion 622*a* of side rail 620*a*, aids in securing the clamps 614 in place on the side rail 620*a*. Preferably, the clamps 614 are arranged and tightened to secure the side rail 620*a* to the sidewall 6*a*, with a sidewall gasket 622*c* arranged between the side rail 620*a* and the sidewall 6*a* as illustrated. A bow end cap 665 is located at the end of the support bow 650*a*. A release cord 654 and a cord guide 655 are shown, and will be described in further detail herein. In the present example, the side rail engagement portion 622*a* is a generally vertically-oriented portion which configured to be located adjacent a similarly vertically-oriented portion of the sidewall 6*a*, 6*b*. In the example of FIG. 33B, a portion of the sidewall 6*a* of a cargo box 5 of a Chevrolet Silverado pickup truck is illustrated; however, other sidewalls of other cargo boxes of other pickup trucks and the like can be accommodated, by incorporating a side rail engagement portion 622*a* along the length of the side rails 620*a* and 620*b* that are appropriately configured and oriented. In this example, the cargo box 5 of the pickup truck 2 includes a sidewall cap 6*e*, but other cargo boxes 5 lack a sidewall cap. A sidewall 6*a* and sidewall cap 6*e* are similarly illustrated in subsequent drawings herein. Preferably, the side rail engagement portion 622*a* has a side rail engagement feature 622*b*, such as ridges, knurling, surface patterns or textures, or other features which aid in securing the clamps 614. Preferably, a sidewall gasket 622*c* preferably made of polymeric material is located between the side rail engagement portion 622*a* and the sidewall 6*a*; the sidewall gasket 622*c* can provide protection against damage to the sidewall 6*a* by abrasion against the side rail 620*a*. Other flexible material can also be used. The sidewall gasket 622*c* can provide leak resistance to prevent water, dust, or other debris from passing into the cargo box 5 along the side rail engagement portion 622*a*. The side rail 620*a* has a flange or side rail lip 624 along the length of the side rail 620*a*. The side rail lip 624 provides support for the folding cover assembly 630. In addition, the side rail lip 624 provides a feature for engagement of the engaging portion 653*b* of the latches 652. The driver's side portion of the support bow 650*a* is shown in FIG. 33B; the other end of the support bow 650*a* (toward the passenger side) has a mirror-image configuration, with a latch 652 engaging side rail 620*b*, and side rail 620*b* being attached to sidewall 6*b* in a similar manner.

Figure 34A:
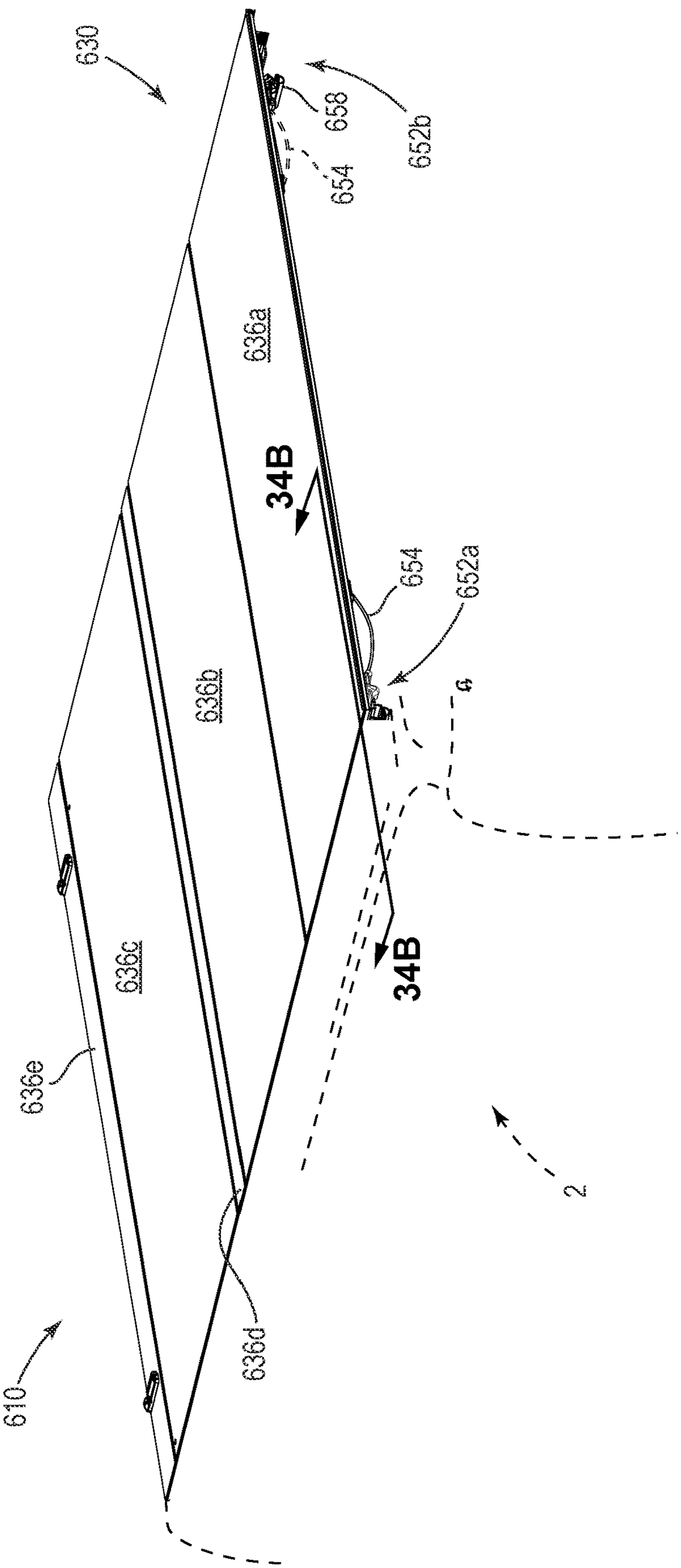
Figure 34B:
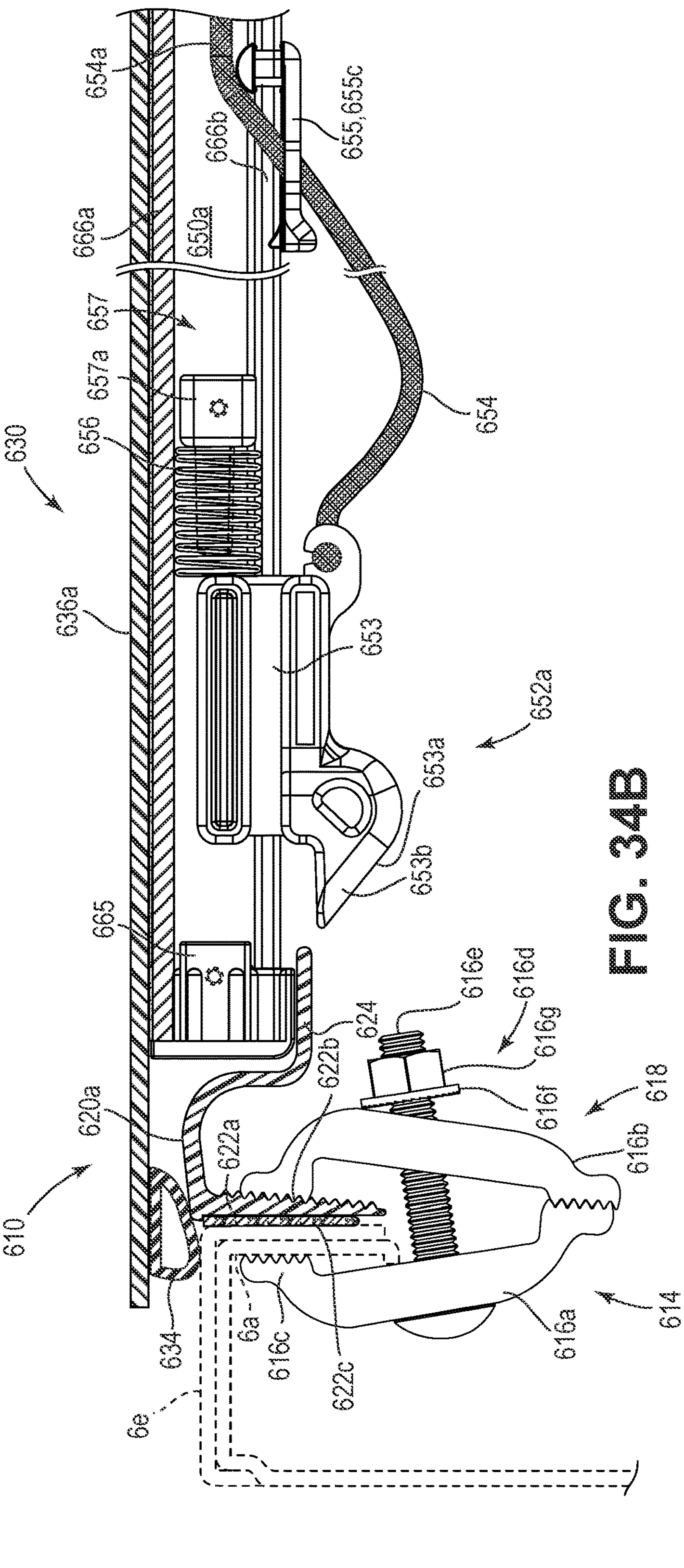

As illustrated in FIGS. 34A and 34B, when it is desired to release the latches 652 at the rear end of the rear panel 636*a*, the release cord 654*a* can be pulled, which will retract each of the latches 652 against the force of the respective biasing member or spring 656. Typically, the release cord 654*a* will be pulled as illustrated in FIG. 34A, by an operator 8 who has walked to the rear of the cargo box 5 and has opened the tailgate 6*d* and reaches in to access and pull the release cord 654*a*. When the release cord 654*a* is pulled, the engaging portion 653*b* of the latch 652 is retracted away from the lip 624 of the side rail 620*a* as shown in FIG. 34B, releasing the latch 652 from the side rail 620*a* and allowing the rear portion of the rear panel 636*a* to be lifted up from the side rail 620*a*. The cord guides 655 adjacent to the latches 652 help to maintain alignment of the ends of the release cord 654*a* so that the latches 652 are retracted in alignment with the support bow 650*a*, to avoid excessive friction, wear and potential binding. The driver's side portion of the support bow 650*a* is shown in FIG. 34B; the other end of the support bow 650*a* (toward the passenger side) has a mirror-image configuration, and when the release cord 654*a* is pulled, the latches 652 at both ends of the support bow 650*a* are retracted, so that the rear end of the rear panel 636*a* can be lifted up from both side rails 620*a* and 620*b*.

Referring now also to FIGS. 35A-35D, which illustrate a portion of the folding cover assembly 630 in schematic cross section views as indicated by the line 35A-35A in FIG. 32A, each of the hinges 644 (644*a*, 644*b*, 644*c*, and 644*d*) preferably includes the flexible hinge body 645*a* which is elongated and extends between the driver's side 3*a* and the passenger side 3*b* of the cargo box 5 when the folding cover assembly 630 is unfolded to cover the cargo box 5. The flexible hinge body 645*a* is similar to the flexible hinge body 545*a* of FIG. 17C, with similar elements and configuration, with a hinge longitudinal axis 645*b* which is oriented along the length of the hinge body 645*a*, and a hinge body profile 645*c*, which is the shape of a transverse vertical cross section taken perpendicular to the hinge longitudinal axis 645*b* (not shown separately; refer to corresponding elements for flexible hinge body 545*a* in FIG. 17C, including the hinge longitudinal axis 545*b* which is oriented along the length of the hinge body 545*a*, and the hinge body profile 545*c*, which is the shape of a transverse vertical cross section taken perpendicular to the hinge longitudinal axis 545*b*). The hinge body profile 645*c* is preferably uniform along the hinge longitudinal axis 645*b* of the hinge body 645*a*. In embodiments having more than one flexible hinge 644, each of the flexible hinges 644 can have a similar hinge body profile 645*c*. Alternatively, the hinge body profile 645*c* of the flexible hinge bodies 645*a* can differ from the profile of at least one other of the flexible hinge bodies 645*a*.

The hinge 644 preferably includes a hinge body 645*a*, which is similar to the hinge body 545*a* described herein; several hinge body embodiments are shown and described in detail elsewhere herein, including hinge body 545*a*, hinge body 545*a*', hinge body 545*a*", and hinge body 545*a*''' (FIGS. 17C-18F).

Figure 35A:
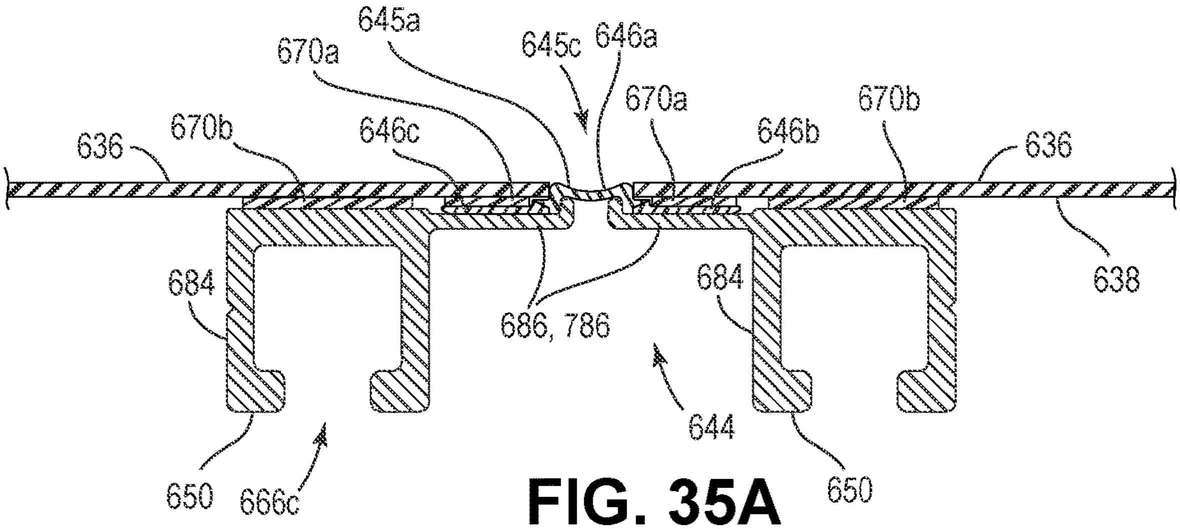
Figure 35B:
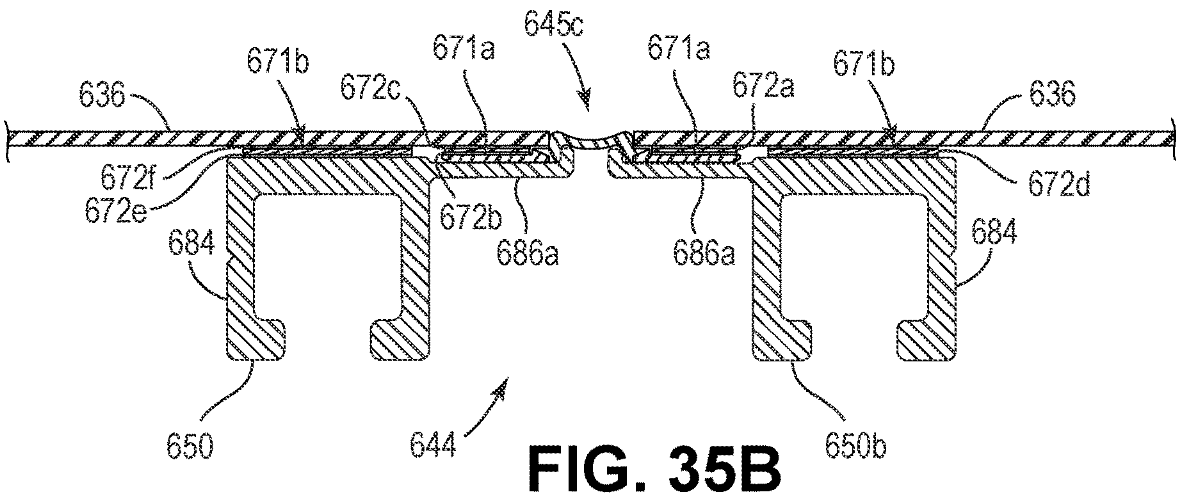
Figure 35C:
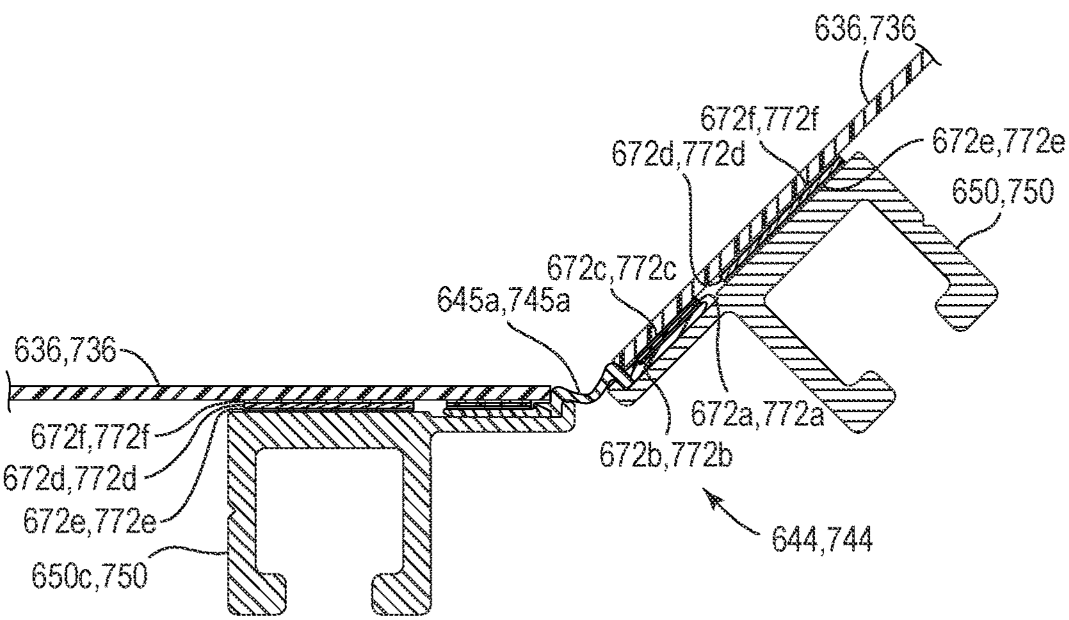

In preferred embodiments illustrated in FIGS. 35A-35C, flexible hinge body 645*a* includes central portion 646*a*, side portion 646*b*, and side portion 646*c*. Adhesive 670*a* is preferably located between each side portion 646*b*, 646*c* and the respective rigid panel 636 as illustrated in FIG. 35A to protect against passage of debris or precipitation into the cargo box 5; the adhesive 670*a* can also aid in securement of the flexible hinge 644 to the respective rigid panel 636. The adhesive 670*a* can include known adhesives and sealant materials which can be used to protect against passage of debris or precipitation between the rigid panel 636 and the respective flexible hinge 644 or to secure the flexible hinge 644 to the respective rigid panel 636. In some preferred embodiments, the adhesive 670*a* includes a double-sided adhesive tape 671*a*, which preferably includes an acrylic foam material 672*a*, with adhesive layer 672*b* arranged on one side of the acrylic foam material 672*a*, and adhesive layer 672*c* arranged on the other side of the acrylic foam material 672*a*, for example. For example, the double-sided adhesive tape 671*a* can be 3M 5933 from 3M, St. Paul, MN ("thermal adhesive tape"), the adhesive layer 672*b* includes heat-activated adhesive and an adhesive layer 672*c* includes pressure-sensitive adhesive which may be protected by a release strip (not shown) until it is desired to activate the pressure-sensitive adhesive layer 672*c*. Preferably, the adhesive layer 672*b* (in this example, heat-activated adhesive) is aligned with the flexible hinge body 645*a* while the heat-activated adhesive is activated to adhere the double-sided adhesive tape 671*a* to the flexible hinge body 645*a*; the flexible hinge body 645*a* together with the attached double-sided adhesive tape 671*a* is subsequently aligned with the rigid panel 636 and the release strip is removed. Preferably, after the adhesive layer 672*c* is aligned with the panel 636, the flexible hinge body 645*a* is attached to the rigid panel 636 by activating the adhesive layer 672*c* (in this example, pressure-sensitive adhesive). The adjacent rigid panel 636 is similarly attached to the flexible hinge body 645*a* with double-sided adhesive tape 671*a* forming the structure of hinge 644 illustrated in FIG. 35B. The flexible hinge body 645*a* allows the hinge 644 to take a flat or open configuration as illustrated in FIGS. 35A and 35B, or to flex or bend as illustrated in FIG. 35C, and other figures herein, providing a flexible hinge 644 that allows the folding cover assembly 630 to fold as illustrated throughout the Figures and described herein, with rigid panels 636 folding up and rotating towards other rigid panels 636 as shown. Preferably, the flexible hinge body 645*a* is adhered to the respective bottom or underside 638 of the rigid panels 636 (specifically, the underside 638*a*-638*e* off respective adjacent panels of 636*a*-636*ed* as described herein) of the folding cover assembly 530 as shown. In the preferred arrangements discussed herein, the hinges 44 are securely attached to the respective rigid panels 636 and are sealed to prevent water or debris from entering the cargo box through the folding cover assembly 630 at the hinges 644, and are generally impervious to environmental factors such as precipitation, wind, and temperatures to which a typical cargo box 5 would be exposed.

The support bows 650 are also schematically illustrated in FIGS. 35A-35C. The support bows 650 are similar to support bows 550 described herein (FIGS. 16A-16K) which preferably include a bow main portion 584 including a generally C-shaped channels with a bow upper portion 585 configured for attachment to the bottom surface 538 of the respective panel 536 and oriented with a channel opening 566*c* at the bottom. The support bows 650 which are located at the flexible hinges 644 preferably include a hinge support flange 686 similar to hinge support flange 586, 586*a*, 586*b*; the support bows which are located at the flexible hinges 644 preferably also include a flange lip similar to flange lip 587, 587*a*, 587*b*.

As stated above, the support bows 650 are secured to the respective panel 636. The support bows 650 are preferably located at the bottom surface 638 of the respective panel 636, and near the front edge 641*b* or rear edge 641*c* of the respective panel 636. The support bows 650 are preferably secured to the bottom surface 638 of the respective panel 636 by an adhesive 670*b*, which may include a layer or coating of adhesive or a double-sided adhesive tape 671*b*, for example. Alternatively, a thermal or hot-melt or chemically activated adhesive, or a mechanical attachment, or a weld, or a combination, can be used to attach the support bows 650, to the respective panels 636. The double-sided adhesive tape 671*b* preferably includes an acrylic foam material 672*d* with adhesive layer 672*e* arranged on one side of the acrylic foam material 672*d* and adhesive layer 672*f* arranged on the other side of the acrylic foam material 672*d*, for example. Preferably, the adhesive 670*b* includes a double-sided adhesive tape 671*b* such as 3M CV62F from 3M, St. Paul, MN ("pressure adhesive tape"), wherein the double-sided adhesive tape 671*b* is an acrylic foam tape having an adhesive layer 672*e* which includes pressure-sensitive adhesive and having an adhesive layer 672*f* which includes pressure-sensitive adhesive which may be protected by a release strip (not shown) until it is desired to activate the pressure-sensitive adhesive, adhesive layer 672*f*. Preferably, the adhesive layer 672*e* (in this example, pressure-sensitive adhesive) is aligned with and adhered to the upper surface 666*d* of the support bow 650 to adhere the double-sided adhesive tape 671*b* to the support bow 650; the support bow 650 together with the attached double-sided adhesive tape 671*b* is subsequently aligned with the panel 636 and the release strip is removed. Preferably, the adhesive layer 672*f* is then aligned with the panel 636 and the support bow 650 is attached to the respective panel 636 by activating the adhesive layer 672*f* (in this example, pressure-sensitive adhesive). While the arrangement just described is a preferred configuration, any of the adhesive layers just described can include heat-activated adhesive or pressure-sensitive adhesive, and the acrylic foam material 672*a*, 672*d* is also preferable but not always required. For example, in alternative configurations, a single layer of adhesive could be used, similar to the arrangement schematically illustrated in FIG. 35A. Other pressure-activated acrylic adhesive foam tape can be used, such as Lamatek 5357 from Lamatek, Inc., West Deptford, NJ The sidebars or handles 659 are preferably also attached to the bottom surface or underside 638 of the respective panels 636, preferably in a similar manner as that just described for the support bow 650. Although adhesive 670*b* can be applied at selected portions of the length of the support bow 650 or the sidebar 659, adhesive 670*b* is preferably applied along substantially the entire length of the support bow 650 and the sidebar 659, to enhance stability and to minimize unwanted vibrations. Alternatively, the sidebars 659 and support bows 650 can be attached to the panels 636 with adhesives such as glue, or with fasteners, or spot welds.

Figure 35D:
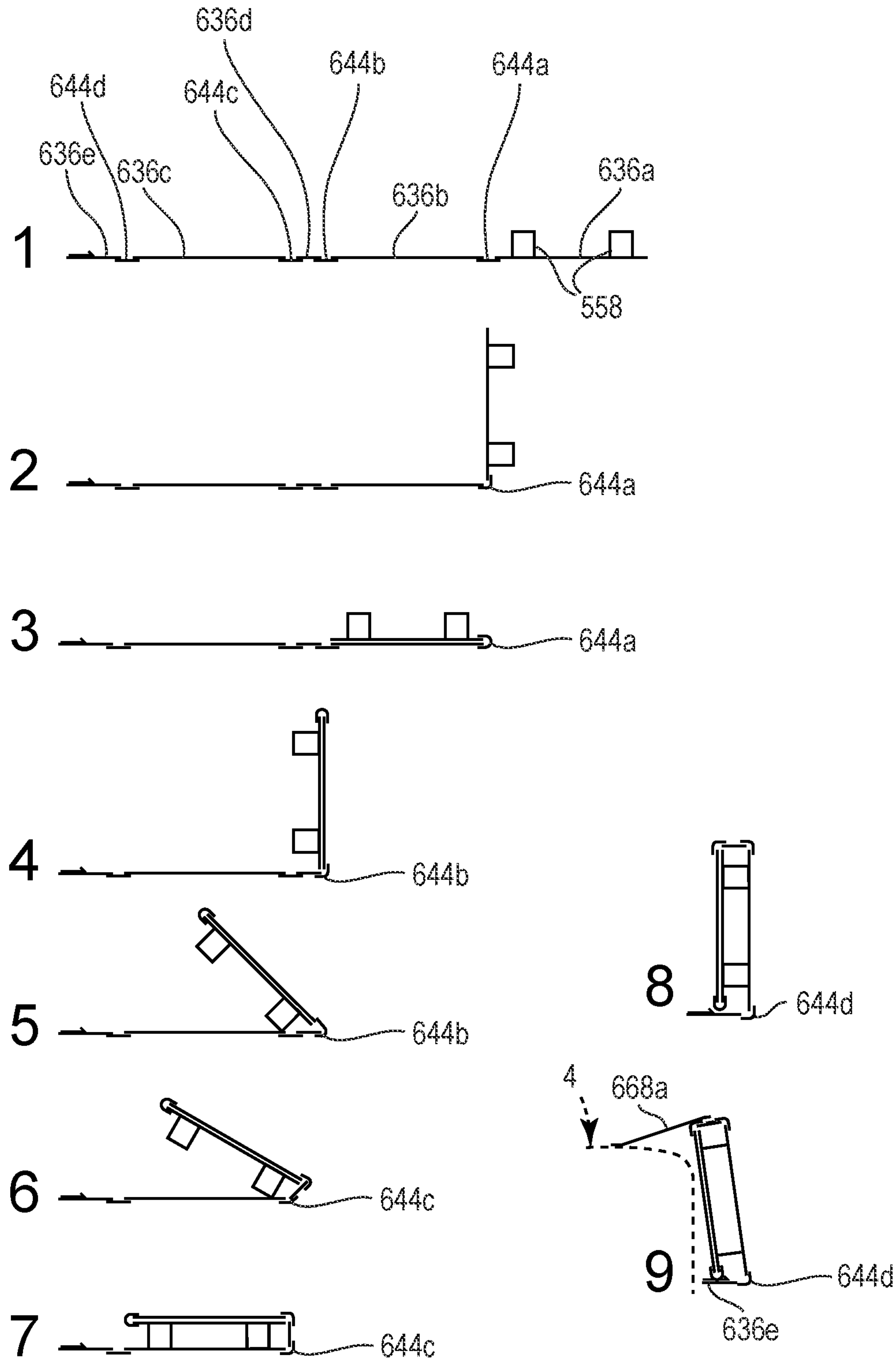

In some apparatus and methods embodiments, the folding cover assembly 630 folds in stages or steps; a preferred embodiment is schematically illustrated in FIG. 35D. In this embodiment, starting from the unfolded or closed configuration of the folding cover assembly 630 (configuration 1), the hinge 544*a* flexes to allow the rear panel 636*a* to fold up, passing through 90 degrees (configuration 2) towards the middle panel 636*b*, and fold over onto the middle panel 636*b* (configuration 3). The hinge 644*b* flexes to allow the middle panel 636*b* (together with the rear panel 636*a* which is folded onto the middle panel 636*b*) to fold up, passing through 90 degrees (configuration 4) towards the spacer panel 636*d*, passing through a point at which standoffs 658 contact the front panel (configuration 5). The hinge 644*b* flexes back towards 90 degrees as the hinge 644*c* flexes to allow the spacer panel 636*d* to fold up, and continue to fold over (together with the rear panel 636*a* which is folded onto the middle panel 636*b*, and the middle panel 636*b*) towards the front panel 636*c* (configuration 6), until the folding cover assembly 30 is folded up onto the front panel 636*c* (configuration 7). The hinge 644*d* flexes to allow the front panel 636*c* (together with the rear panel 636*a*, middle panel 636*b*, and spacer panel 636*d*) to a generally vertical orientation onto the cab panel 636*e* (configuration 8). The cab brace 668*a* secures to the cab bracket assembly 667*c* to secure the folding cover assembly 630 adjacent to the cab 4. Note that FIG. 35D is a schematic overview of the general folding of the folding cover assembly 630; the various configurations are further illustrated and described elsewhere herein in greater detail.

Once the latches 652 at both ends of the support bow 650*a* are retracted as shown in FIGS. 34A and 34B and described above, the rear end of the rear panel 636*a* can be lifted up from both side rails 620*a* and 620*b*, bending the hinge 644*a* as illustrated in FIGS. 36A and 36B. As shown in FIG. 36B, the engaging portion 653*b* of the latch slide 653 of latch 652*c* is engaged with the side rail 620*a* to restrict the middle panel 636*b* from being lifted up from the cargo box 5.

The rear panel 636*a* is rotated further, onto the middle panel 636*b* as illustrated in FIGS. 37A and 37B. At this point, the engaging portion 653*b* of latch slide 653 of the latch 652*c* is engaged with the side rail 620*a* to restrict the middle panel 636*b* from being lifted up from the cargo box 5. When it is desired to release the latches 652 at the rear end of the middle panel 636*b*, the release cord 654*b* can be pulled, which will retract each of the latches 652*c* and 652*d* against the force of the respective biasing member or spring 656, as shown in FIG. 37C, releasing the latches 652 from the side rails 620*a* and 620*b* and allowing the rear portion of the rear panel 636*a* to be lifted up from the side rails 620*a* and 620*b*. The driver's side portion of the support bow 650*c* is shown in FIGS. 37B-37C; the other end of the support bow 650*c* (toward the passenger side) has a mirror-image configuration, and when the release cord 654*b* is pulled, the latches 652 at both ends of the support bow 650*c* are retracted, so that the rear end of the middle panel 636*b*, together with the rear panel 636*a*, can be lifted up from both side rails 620*a* and 620*b*.

Once the latches 652 at both ends of the support bow 650*b* are retracted as shown in FIG. 37C and described above, the rear end of the middle panel 636*b* can be lifted up from both side rails 620*a* and 620*b*, bending the hinge 644*b* as illustrated in FIGS. 38A and 38B. FIG. 38A shows the configuration in which the rear panel 636*a* is folded over onto the middle panel 636*b* and wherein both the rear panel 636*a* and the middle panel 636*b* have been lifted up and pivoted forward generally about 90 degrees with respect to the front panel 636*c* that is resting on the side rails 620*a*, 620*b* and is generally in a horizontal plane with respect to the pickup truck which is shown in part in phantom. The hook 662*d* is disengaged from the catch 664*d* as the middle panel 636*b* is lifted up from the cargo box 5, as shown in FIG. 38B.

With continued lifting and rotating of the middle panel 636*b* frontwards, the middle panel 636*b* together with the rear panel 636*a* rotates frontwards towards the front panel 636*c*. Preferably, the folding cover assembly 630 includes 4 standoffs 658. The standoffs 658 are preferably attached to the handles 659 near the front and back of the panel 636*a* as shown in FIG. 37A and elsewhere herein; alternatively, the standoffs 658 can be attached to the bottom surface 638*a* of the rear panel 636*a* or attached to other structures such as support bows 650*a*, 650*b*. The standoffs 658 are preferably located so that two are proximate the front edge 641*b* of the rear panel 636*a*, and two are proximate the rear edge 641*c* of the rear panel 636*a*. Through the folding and rotating of the middle panel 636*b* together with the rear panel 636*a* as just described, the standoffs 658 proximate the rear edge 641*c* of the rear panel 636*a* contact the top surface 637*c* of the front panel 636*c* and help to maintain a spaced relationship between the rear panel 636*a* and the front panel 636*c*. With continued rotating of the middle panel 636*b* (together with the front panel 636*a*) the hinge 644*c* bends and the spacer panel 636*d* lifts off the side rails 620*a* and 620*b*, and the middle panel 636*b*, the rear panel 636*a*, and the spacer panel 636*d* rotate progressively farther frontwards towards the front panel 636*c* until the standoffs 658 all contact the front panel 636*c* (FIG. 39A). During this folding of the folding cover assembly 630, the hinges 644*b* and 644*c* flex as the middle panel 636*b*, the rear panel 636*a*, and the spacer panel 636*d* rotate towards the front panel 636*c*. The configurations as the folding cover assembly 630 is folded up in this manner are similar to those illustrated for folding up of the folding cover assembly 530 in FIGS. 8A-9A. When the folding cover assembly 630 is folded onto the front panel 636*c*, the rear panel 636*a*, middle panel 636*b*, front panel 636*c*, and cab panel 636*e* are approximately parallel to each other, and preferably oriented about horizontally, provided the cargo box 5 and side rails 620*a*, 620*b* are oriented horizontally; in this configuration, the spacer panel 636*d* is preferably oriented approximately vertically, although it can be somewhat off vertical as illustrated in FIGS. 5E and 5F for alternate folding cover assemblies 530' and 530".

At this point, as illustrated in FIGS. 39A-39E, and 10A, the folding cover assembly 630 is folded up, but is still "flat" on the cargo box 5 and still attached to the side rails 620*a* and 620*b*, with the latches 652*e* and 652*f* (proximate the ends of the support bow 650*f*) engaged with the side rail lip 624 of the side rails 620*a* and 620*b*, respectively, as illustrated in FIGS. 39A-39B. In the view of FIG. 39B, a portion of the driver's side of the partially folded folding cover assembly 630 is illustrated, showing the engaging portion 653 of the latch 652*e* near the driver's-side end portion of the support bow 650*f* engaged with the lip 624 of the driver's side side rail 620*a* and the containment bracket 625*a*. The link 681 attached to tether 680 is shown detached from the side rail 620*a* for illustration.

When it is desired to release the latches 652*e* and 652*f* at the rear end of the front panel 636*c*, the release cord 654*c* can be pulled, which will retract each of the latches 652*e* and 652*f* against the force of the respective biasing member or spring 656, as shown in FIG. 39C, releasing the latches 652 from the side rails 620*a* and 620*b* and allowing the rear portion of the front panel 636*a* to be lifted up from the side rails 620*a* and 620*b*. The link 681 attached to tether 680 is shown attached from the side rail 620*a*.

FIG. 39D shows a portion of the folding tonneau cover apparatus 610 in the configuration illustrated in FIGS. 39A-39B, but seen from the line 39D,E-39D,E of FIG. 39A illustrating the driver's side of the partially folded tonneau cover assembly. In this view, the storage strap 643*d* is seen, not secured to the storage retainer 643*e*. A standoff 658 is also shown. The storage strap 643*d* can be pulled down and secured to the storage retainer 643*e* as shown in FIG. 39D (by engaging the storage strap 643*d* with the retainer hook 643*f* shown in FIG. 32G).

With the rear panel 636*a*, middle panel 636*b*, front panel 636*c* and spacer panel 636*d* secured to the cab panel 636*e*, the operator 8 can lift up the rear panel 636*a*, middle panel 636*b*, front panel 636*c* and spacer panel 636*d* onto the cab panel 636*e*, disengage the two cab braces 668*a* from the cab brace retainers 668*f* (FIG. 40C), pivot the cab braces 668*a* forward and secure the cab braces 668*a* to the cab bracket assemblies 667*c* to secure the folded-up folding cover assembly 630 in a generally vertical orientation adjacent the cab 4 as illustrated in FIG. 40. In this configuration, the operator 8 can attach or detach the cab braces 668*a* from the cab bracket assemblies 667*c*, or actuate the retainer hex bolts 678*a* or retainer handle bolts 678*b* to disengage the folding cover assembly 630 from the side rails 620*a*, 620*b* to remove the folding cover assembly 630 from the support frame assembly 618 or attach the folding cover assembly 630 to the support frame assembly 618 as desired.

The folding cover assembly 630 is further illustrated in a folded-up vertical configuration in FIG. 40A, which shows the rear panel 636*a*, middle panel 636*b*, front panel 636*c* and spacer panel 636*d* rotated onto the cab panel 636*e* and engaged with the retainer nest 643*g* of each of the storage retainers 643*e*, and the standoffs 658 maintaining the separation of the rear panel 636*a* and the front panel 636*c*. The tether 680 is secured by attaching the link 681 to the aperture 683 in the side rail 620*a*. In FIG. 40A, each cab brace 668*a* is secured to the support bow 650*e* by a cab brace retainer 668*f*. A detailed view of a portion of the folding cover assembly 630 is illustrated in FIG. 40C, which shows one of the cab braces 668*a* secured to the support bow 650*e* which is secured to the bottom surface 638*d* of the spacer panel 636*d*. The cab brace 668*a* is secured to the support bow 650*e* by the cab brace fastener assembly 668*d* and by the cab brace retainer 668*f*. The cab brace second end portion 668*c* is also shown.

FIG. 40D is a similar view as FIG. 40C, but shows the cab brace disengaged from the cab brace retainer 668*f*. The cab brace first end portion 668*g* and cab brace first end portion top surface 668*i*, the cab brace body portion 668*b* and cab brace body portion top surface 668*h*, and the cab brace second end portion 668*c* and cab brace second end portion top surface 668*j* are also shown. In most cases, the support bow 650*e* of the folding cover assembly 630, when in a generally vertical configuration such as that illustrated in FIG. 40B, will be at a similar height or somewhat higher than the cab 4. Depending on the relative height of the support bow 650*e* and the cab 4, the cab brace second end portion 668*c* is preferably bent upward at a cab brace angle 668*e* that is preferably between about 1 degree to about 16 degrees, so that the cab brace second portion 668*c* engages the anchor post 667*f* (FIG. 40G) perpendicularly. In one example, the cab brace angle 668*e*' is about 5 degrees; in another example, the cab brace angle 668*e*" is about 15 degrees. The cab brace second end portion 668*c* is preferably adapted to secure to the cab bracket assembly 667*c*. In preferred embodiments, the second end portion 668*c* includes a material which can be attracted by a magnet, such as a steel material, and the cab bracket assembly 667*c* includes a cab bracket magnet 667 to aid in retaining the cab brace 668*a* securely to the cab bracket assembly 667*c*. A preferred material for the cab brace 668*a* is ASTM A36 pickled and oiled hot-rolled steel, preferably about 0.125 inch thick.

If the support bow 650*e* is much higher than the cab 4, so that the cab brace angle 668*e* would be greater than about 16 degrees, the cab brace 668*a* is preferably secured to an auxiliary support bow 650*j* which is secured to the bottom surface 638*b* of the middle panel 636*b*. The auxiliary support bow 650*j* is preferably oriented so that the cab brace is secured below the auxiliary support bow 650*j* as illustrated. The auxiliary support bow 650*j* is preferably secured to the bottom surface 638*b* of the middle panel 636*b* by double-sided adhesive tape 671*b*, although other adhesive 670*b* such as described herein can be utilized. Preferably, the auxiliary support bow 650*j* is secured to the middle panel 636*b* at a desired location so that the cab brace angle 668 is less than about 16 degrees. In this configuration, the cab brace second end portion 668*c* is co-planar with the cab brace body portion 668*b*, and the cab brace angle 668*e* is zero.

The cab bracket assembly 667*c* is further illustrated in FIGS. 40F-40H. The cab bracket assembly 667*c* preferably includes a cab bracket body 667*d*, which includes a cab bracket protrusion or 667*f*. The cab bracket assembly 667*c* preferably includes a cab bracket magnet 667*e* that is secured to the cab bracket body 667*d* by a cab magnet retainer 667*h*. The cab bracket assembly 667*c* is preferably secured to the cab 4 by cab bracket adhesive 667*j*. The cab bracket adhesive 667*j* is preferably an adhesive foam tape such as Tesa 7078 acrylic foam tape. Other adhesive such as double-sided adhesive tape 671*b* or other adhesives such as those described herein can be utilized.

Another preferred embodiment of the folding tonneau cover apparatus of the present invention is illustrated in FIGS. 41-48. A rear perspective view of the folding tonneau cover apparatus or hinged tonneau cover apparatus 710 is illustrated in FIG. 41, which includes a support frame assembly 718, and a folding cover assembly or hinged cover assembly 730 incorporating a cab panel 736*e* from which a rear panel 736*a* can fold, illustrated with the folding or hinged tonneau cover apparatus 710 attached to a pickup truck 2 which is shown in phantom, with a cab 4, a drivers side 3*a*, a passenger side 3*b*, a front 3*c*, and a rear 3*d*. The folding tonneau cover apparatus 710 is secured to the truck 2 to cover a cargo box 5 having a drivers side sidewall 6*a*, a passenger side sidewall 6*b*, a front wall 6*c* (FIG. 48), and a tailgate 6*d*, which define a top opening 6*f* (FIG. 48), a cargo box length 7*a*, and a cargo box width 7*b*. Preferably, the panels 736 are secured to side rails 720*a*, 720*b* by latches

752, latches 752*a* and 752*b* being partially shown on FIG. 41. The folding cover assembly 730 has a top 732*a* and a bottom 732*b*.

A top plan view of the folding cover assembly 730 is illustrated in FIG. 42A, which shows the panels 636, namely the rear panel 736*a* and the cab panel 736*e*, each having a top surface 737*a*, 737*e*, and a width 740, namely 740*a*, 740*e*, and a length 739, namely 739*a*, 739*e*, respectively; the folding cover assembly 730 has a length 733 and a top 732*a*. The folding cover assembly 730 preferably includes storage retainers 743*e* attached to the cab panel 736*e*.

A bottom plan view of the folding tonneau cover apparatus 710 is illustrated in FIG. 42B, which shows the folding cover assembly 730, the bottom surfaces 738*a*, 738*e* of rear panel 736*a* and cab panel 736*e*, respectively, and support bows 750, including support bow 750*a* (rear of rear panel 736*a*), support bow 750*b* (front of rear panel 736*a*), support bow 750*h* (cab panel 736*e*), and intermediate support bow(s) 750 spaced along the rear panel 736*a* between support bow 750*a* and support bow 750*b*. Also shown are latches 752*a*, 752*b* engaged with side rails 720*a*, 720*b*. Handles 759 are attached to the bottom surface 738 of rear panel 736*a*, preferably by adhesive 770*b* (similar to adhesive 670*b* illustrated on FIG. 35A) or other adhesive elements such as are described herein. Preferably, adhesive 770*b* is double-sided adhesive tape 771*b* (FIG. 35C). Handles 759 are preferably attached to the bottom surface 738*a* of the rear panel 736*a* as shown; the standoffs 758 are preferably attached in a similar manner as the attachment of standoffs 558 to support bows 550 as illustrated in FIGS. 14A-14C. The folding tonneau cover apparatus 710 also preferably includes a drivers side support beam 773*a* and a passenger side support beam 773*b* which are secured to the handles 759 to provide additional structural support to the rear panel 736*a*. The folding tonneau cover apparatus 710 also preferably includes two lift supports or gas struts 774, with a gas strut 774 secured by a gas strut support beam fastener assembly 775*a* to the drivers side support beam 773*a* and by a gas strut side rail fastener assembly 775*b* to the drivers side side rail 720*a*, and a gas strut 774 secured by a gas strut support beam fastener assembly 775*a* to the drivers side support beam 773*a* and by a gas strut side rail fastener assembly 775*b* to the drivers side side rail 720. Suitable gas struts are available, for example from SUSPA® Inc., 3970 Roger B. Chaffee Memorial Dr., Grand Rapids, MI 49548. Alternate gas struts are available from various sources. The folding cover assembly 730 preferably includes snap clips 776 for securing the gas struts 774 to the support beams 773*a*, 773*b* when the folding cover assembly 730 is not attached to the truck 2. The folding cover assembly 730 preferably includes perimeter seal 734 located at the perimeter of the folding cover assembly 730; various configurations of perimeter seal are envisioned, such as the perimeter seals 534, 534*a*-534*k* shown in FIGS. 15A-15H. The cab panel 736*e* is secured to the side rails 720*a*, 720*b* by cab panel retainers 779 (FIG. 42D) and retainer bolt 778; two retainer bolts are illustrated as examples, including handle bolt 778*b* and hex bolt 778*a* (FIG. 42I). The cab panel retainers 779 are also engaged with containment brackets or swing containment brackets 725*c*, 725*d* which aid in maintaining the position of the folding cover assembly 730 with respect to the side rails 720*a*, 720*b* and the cargo box 5. In some embodiments, the folding tonneau cover apparatus 730 includes hooks 762*a*, 762*b* which secure to catches 764*a*, 764*b*. In some embodiments, the folding tonneau cover apparatus 730 includes hinge supports or hinge support mechanisms 749 (FIG. 42 I) described herein. The folding cover assembly 730 preferably includes a pull-down strap assembly 729 (FIG. 42H) including a strap retainer 729*b* and a pull-down strap 729*a* (FIG. 48).

A side view of portions of the folding tonneau cover apparatus 710 is illustrated in FIG. 42C, as viewed from line 42C-42C of FIG. 42A, and give further understanding of the relative positioning of the elements. Further detailed views of the folding tonneau cover apparatus 710 are illustrated in FIGS. 42D-42G. FIG. 42D shows a portion of the folding tonneau cover apparatus 710 encircled by line 42D-42D on FIG. 42C, illustrating the cab panel 736*e*, the rear portion of the rear panel 736*a*, the support bow 750*b* mostly obscured by bow end cap 765, the support bow 750*h*, hinge 744*d*, hook 762*e*, catch 764*e* (FIG. 42F), swing containment bracket 725*c* which keeps latch cab panel retainer 779 in position on the side rail 720*a* and helps to maintain the folding cover assembly 730 at the desired location to cover the cargo box 5. The cab panel retainer 779 is secured to the support bow 750*h* by handle bolt 778*b*.

A bottom perspective view of the folding tonneau cover apparatus 710 is illustrated in FIG. 42E, with a detail view of the portion of the folding tonneau cover apparatus 710 encircled by line 42F on FIG. 42E being illustrated in FIG. 42F. The hinge 744*d*, swing containment bracket 725*d*, cab panel retainer 779, handle bolt 778*b*, passenger side support beam 773*b*, and beam end cap 773*c* are also shown.

A portion of the driver's side of the hinged tonneau cover apparatus 710 is illustrated in a partial section view as seen from the line 42G-42G of FIG. 42A in FIG. 42G, which shows the side support beam 773*b* secured to handle 759 by adhesive 770*b*. The support bow 750*b* is in place on the side rail lip 724 of side rail 720*a*, and perimeter seal 734 seals against the side rail 720*a* and the side wall cap 6*e* on the drivers side sidewall 6*a*. The side rail 720*a* is secured to the sidewall 6*a* by a clamp 714, which preferably includes the an outer member 716*a*, an inner member 716*b*, a clamp engagement portion 716*c*, and a fastener assembly 716*d*; the fastener assembly can, for example, include a bolt 716*e*, a washer 716*f* and a nut 716*g* as illustrated. Preferably, inner member 716*b* has a clamp engagement portion 716*c* which, together with side rail engagement portion 722*a* of side rail 720*a*, aids in securing the clamps 714 in place on the side rail 720*a*. Preferably, the clamps 714 are arranged and tightened to secure the side rail 720*a* to the sidewall 6*a*, with a sidewall gasket 722*c* arranged between the side rail 720*a* and the sidewall 6*a* as illustrated. The cab panel retainer 779 and handle bolt are also shown.

An alternate folding tonneau cover apparatus 710 is shown in FIG. 42H. In this embodiment, the folding cover assembly 730 includes retainer bolts 778 which are hex bolts 778*a*. This embodiment also includes hinge supports or hinge support mechanisms 749 (FIG. 42 I) described herein. The folding cover assembly 730 preferably also includes a pull-down strap assembly 729 including a strap retainer 729*b* and a pull-down strap 729*a* (FIG. 48). Further details are illustrated in FIG. 42I, which illustrates the front passenger portion of the folding tonneau cover apparatus 710 of FIG. 42H, similar to the view of FIG. 42F. A hinge support mechanism 749 is shown, as will be more fully described in reference to FIGS. 45-47. Preferably, the folding cover assembly 730 includes a pair of hinge support mechanisms 749 located apart from each other such as illustrated on FIG. 42H.

The hinged or folding cover assembly 740 of FIG. 42H is further illustrated in a rear perspective view in Fig., with the folding tonneau cover apparatus 730 attached to a pickup truck 2 which is shown partially and in phantom. A partial section view as seen from the line 43B-43B of FIG. 43A is shown in FIG. 43B, which shows the engaging portion of one of the latches on the rear support bow or support member of the rear panel engaged with the lip of the side rail, and the side rail clamped to the sidewall of the pickup truck with a portion of the truck sidewall and sidewall cap shown in phantom.

As seen in FIG. 43B, the latch 752*a* includes latch slide 753 having an engaging portion 753*b* which extends forward to engage the lip 724 of the side rail 720*a*, so as to secure the panel 730*a* to the side rail 720*a*. The latch slide 753 preferably includes a stiff polymer, composite, or metal, although other materials and combinations can be used. Preferably, the latch slide 753 includes fiberglass-reinforced nylon. The latch slide 753 is biased by a biasing member or spring 756 towards the side rail 720*a* so that the engaging portion 753*b* engages the side rail 720*a* to form a secured configuration in which the rear panel 736*a* is restricted from being lifted up from the cargo box 5; in this example, the spring 756 is a compression spring, but an extension spring, or an elastic element, or other known elements could alternatively be used to bias the latch slide 753 towards the side rail 720*a* so that the engaging portion 753*b* engages the side rail 720*a* so that the latch 752*a* is in the secured configuration. In this embodiment, the spring 756 is held between the latch slide 753 and a spring retainer assembly 757. The spring retainer assembly 757 is secured in the desired location in the support bow 750*a*. The side rails 720*a* and 720*b* preferably include extruded metal, and have a side rail engagement portion 722*a* (FIG. 44B), arranged to approximate a portion of the sidewall 6*a*, 6*b* of the pickup truck 2. The clamp 714 is shown in detail in FIG. 43B. The clamps 714 preferably include aluminum, although other metals or alloys or polymers or other composite materials can be used. Clamps 714 preferably have an outer member 716*a* and an inner member 716*b* which are tightened towards each other and held as an assembly on the sidewall 6*a* by a fastener assembly 716*d* which preferably includes a bolt 716*e*, a washer 716*f*, and a nut 716*g*. Preferably, inner member 716*b* has a clamp engagement portion 716*c* which, together with side rail engagement portion 722*a* of side rail 720*a*, aids in securing the clamps 714 in place on the side rail 720*a*. Preferably, the clamps 714 are arranged and tightened to secure the side rail 720*a* to the sidewall 6*a*, with a sidewall gasket 722*c* arranged between the side rail 720*a* and the sidewall 6*a* as illustrated. A bow end cap 765 is located at the end of the support bow 750*a*. A release cord 754 and a cord guide 755*a* are shown. The driver's side portion of the support bow 750*a* is shown in FIG. 43B; the other end of the support bow 750*a* (toward the passenger side) has a mirror-image configuration, with latch 752*b* engaging side rail 720*b*, and side rail 720*b* being attached to sidewall 6*b* in a similar manner.

As illustrated in FIGS. 44A and 44B, when it is desired to release the latches 752 at the rear end of the rear panel 736*a*, the release cord 754*a* can be pulled, which will retract each of the latches 752 against the force of the respective biasing member or spring 756. Typically, the release cord 754*a* will be pulled by an operator 8 who has walked to the rear of the cargo box 5 and has opened the tailgate 6*d* and reaches in to access and pull the release cord 754*a*. When the release cord 754*a* is pulled, the engaging portion 753*b* of the latch 752*a* is retracted away from the lip 724 of the side rail 720*a* as shown in FIG. 44B, releasing the latch 752*a* from the side rail 720*a* and allowing the rear portion of the rear panel 736*a* to be lifted up from the side rail 720*a*. The cord guides 755*a* adjacent to the latches 752 help to maintain alignment of the ends of the release cord 754*a* so that the latches 752 are retracted in alignment with the support bow 750*a*, to avoid excessive friction, wear and potential binding. The driver's side portion of the support bow 750*a* is shown in FIG. 44B; the other end of the support bow 750*a* (toward the passenger side) has a mirror-image configuration, and when the release cord 754*a* is pulled, the latches 752 at both ends of the support bow 750*a* are retracted, so that the rear end of the rear panel 736*a* can be lifted up from both side rails 720*a* and 720*b*. In the illustration of FIG. 44A, the release cord 754*a* is depicted as being pulled in two location; typically the operator 8 would pull the release cord 754*a* in only one location, causing both latches to release.

FIG. 45 illustrates a portion of the hinged cover assembly 730 similar to the portion shown in FIG. 42I, except that the cover assembly is flipped upside down and the drivers side of the folding cover assembly 730 is shown (which is a mirror image of the passenger side of the folding cover assembly 730) and some parts have been removed to reveal underlying structures including the hinge support mechanism 749, and the rear panel 736*a* has been lifted up and is shown in a pivoted orientation with respect to the cab panel 736*e*. FIGS. 45-47 further illustrate the hinge support mechanism 749. As shown and described herein (see FIG. 42H), there are preferably two hinge support mechanisms 749 that help to support and stabilize the folding cover assembly 730, and the rear panel 736*a*, and the hinge 744*d* as the rear panel 736*a* is lifted up and the hinge 744*d* is bent, when the rear panel 736*a* pivots with respect to the cab panel 736*e*. When it is desired to access the cargo box 5, and the release cord 754*a* is pulled, retracting the latches 752*a*, 752*b*, the rear panel 736*a* can be lifted up and rotated forward around a pivot arc Dl. The rear panel 736*a* pivots with respect to the cab panel 736*e* and generally rotates around a hinge pivot axis 749*h*.

The structure of the hinge 744*d*, support bows 750*b*, 750*h*, and hinge support mechanisms 749 are generally symmetric with respect to the hinge pivot axis 749*h*. The support bow 750*b* preferably includes a hinge support flange 786 extending to support the hinge body 745*a* and is located adjacent the front edge 741*b* of the rear panel 736*a* in a configuration that is a mirror image of the configuration of support bow 750*h* located adjacent the rear edge 741*c* of the cab panel 736*e* as shown (see also FIGS. 35A-35C). Preferably, each hinge support mechanism 749 includes a hinge bracket 749*a* and a hinge bracket 749*b*, and a bracket guide pin 749*c* which is retained in bracket slots 749*d* in each of the hinge brackets 749*a*, 749*b*. Each hinge bracket 749*a*, 749*b* includes a bracket block 749*e* which protrudes from the respective hinge bracket 749*a*, 749*b* and provides for securement of each hinge bracket 749*a*, 749*b* to the respective support bow 750*b*, 750*h*, by a bracket block nut 749*f* and a bracket block bolt 749*g*. Preferably, the bracket slots 749*d* are each curved in a circular arc, and when the hinge brackets 749*a*, 749*b* and bracket guide pin 749*c* are assembled and the hinge brackets 749*a*, 749*b* are secured to the support bows 750*b*, 750*h*, the bracket slots 749*d* are each curved in a circular arc centered on the hinge pivot axis 749*h*, so that when the rear panel 736*a* is lifted up and the flexible hinge 744*d* bends and the rear panel 736*a* rotates around the hinge pivot axis 749*h*, the hinge brackets 749*a*, 749*b* help to constrain the rotation and restrict the pivoting of the rear panel 736*a* with respect to the cab panel 736*e* and support the rear panel 736*a* so that stress on the hinge 744*d* is reduced.

Preferably, there are two hinge support mechanisms 749 located apart from each other, a first hinge support mechanism 749 located closer to the side support beam 773*a*, and a second hinge support mechanism 749 located closer to the side support beam 773*b*, as illustrated herein. When arranged in this manner and secured as shown, the hinge support mechanisms 749 help to support the front portion of the rear panel 736*a* when the rear portion of the rear panel 736*a* is lifted up off the side rails 720*a*, 720*b*, and help to maintain alignment of the rear panel 736*a* with respect to the cab panel 636*e*, minimizing any relative displacement or skewing, and reducing stress on the hinge 744*d*. The hinge pivot axis 749*h* is generally parallel to the hinge longitudinal axis 745*b* (see hinge longitudinal axis 545*b* on FIG. 17C) and may be within or proximate to the hinge body 745*c*. A perspective view of portions of the hinge support mechanism 749 is shown in FIG. 47 to better show the detailed structure.

As illustrated on FIG. 45, the hinge 744*d* preferably includes adhesive such as double-sided adhesive tape 771*c* to seal the ends of the hinge body 745*a* against the perimeter seal 734 to prevent precipitation or debris entry into the cargo box 5 past the hinge 744*d*. Preferably, a short piece of double-sided adhesive tape 771*c* such as about ¼ inch by ⅝ inch is adhered at each end; suitable material includes an adhesive foam tape such as Tesa 7078 acrylic foam tape. Other hinges disclosed herein, including hinges 444, 544, 644, can incorporate such double-sided adhesive tape to similarly provide a weather seal at each end of the respective hinge.

When the rear panel 736*a* is lifted up as illustrated in the rear perspective view of the folding tonneau cover apparatus 710 shown in FIG. 48, an operator 8 can access the cargo box 5, while the gas struts 774 support the weight of the folding cover assembly 730 as necessary to support the rear panel 736*a* in the raised position. When it is desired to lower the rear panel 736*a* to cover the top opening 6*f* and close the folding cover assembly on the cargo box 5, the operator 8 can grasp the pull-down strap 729*a*, which is secured to the support bow 750*a* by a strap retainer 729*b*. When the rear panel 736*a* is lowered completely onto the side rails 720*a*, 720*b*, the latches 752*a*, 752*b* will engage the side rail lip 724 of each of the side rails 720*a*, 720*b* and secure the folding cover assembly 730 to the side rails 720*a*, 720*b*.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position; the pickup truck further including a cab positioned forward of the cargo box; the tonneau cover apparatus comprising:

a support frame assembly for attachment to the cargo box; and a cover assembly for attachment to the support frame assembly when the support frame assembly is attached to the cargo box; the cover assembly including a plurality of rigid panels that are foldably interconnected with one another in series; wherein each of the respective rigid panels has an upper surface and a lower surface; and wherein the plurality of rigid panels includes first, second and third rigid panels foldably secured to one another in series such that the cover assembly can be folded up when the cover assembly is secured to the support frame such that respective upper surfaces of at least two of the plurality of rigid panels reside in an upright folded orientation in which the upper surfaces of the first and second rigid panels reside in a generally parallel orientation to one another; and wherein the tonneau cover apparatus further includes means for securing the respective upper surfaces of the first and second rigid panels in the upright folded orientation.

2. The tonneau cover apparatus of claim 1, wherein said means for securing includes a cab bracket assembly in combination with a cab brace; wherein the cab brace is secured to the cover assembly and the cab bracket is secured to the cab, and wherein the cab brace is engageable with the cab bracket when the cab bracket is secured to the cab such that the cover assembly is secured to the cab such that at least two of the plurality of rigid panels reside in an upright folded orientation.

3. The tonneau cover apparatus of claim 2, further including a cab panel and a storage retainer secured to the cab panel, the storage retainer including a retainer nest.

4. The tonneau cover apparatus of claim 2, wherein the cab brace and the cab bracket are attracted to one another by magnetic attraction.

5. The tonneau cover apparatus of claim 2, wherein the cab bracket includes a magnet and the cab brace includes a material which can be attracted to the magnet.

6. The tonneau cover apparatus of claim 1, further including a cab panel, wherein said means for securing is selected from the group consisting of a storage strap secured to a support bow and engageable to a storage retainer secured to the cab panel; a panel bracket attached to a top surface of the cab panel and engageable with a storage strap; a cab strap secured to a support bow and engageable with a cab bracket secured to the cab; a side strap secured to a sidebar and securable to the cab; a cab panel strap attached to a support bow and securable to the cab panel; a securing magnet attached to a support bow and engageable with a cab magnet that is secured to the cab; a securing bracket located on at least one of the driver's side and the passenger side and engageable with the folding cover assembly when the folding cover assembly is in an upright folded orientation; and a cab magnet secured to the cab and engageable with a cab brace.

7. The tonneau cover apparatus of claim 1; wherein means for securing the respective upper surfaces of the first and second rigid panels in the upright folded orientation includes an elongated rigid member that has first and second ends and the elongated rigid member is bent in such a way that first and second upper surfaces of the respective first and second ends of the elongated rigid member are oriented at an angle to one another of from about 1 degree to about 16 degrees.

8. The tonneau cover apparatus of claim 1; wherein the first and second rigid panels are foldably secured to one another by a flexible hinge; and wherein the flexible hinge is secured to the lower surface of each of the first and second rigid panels.

9. The tonneau cover apparatus of claim 1; wherein the support frame assembly includes first and second siderails, each of which is attachable to one of the respective opposing sidewalls; wherein at least one of the plurality of rigid panels is secured to both of the respective siderails when the respective siderails are secured to the respective sidewalls and the cover assembly is secured to the support frame.

10. The tonneau cover apparatus of claim 1, wherein the support frame assembly includes two side rails and at least one catch engaged with one of the two side rails, and wherein the cover assembly further includes at least one hook secured to the second rigid panel, wherein the at least one hook is engaged with the at least one catch to limit movement of the second rigid panel when the second rigid panel is secured to the two side rails and the two siderails are secured to the cargo box; and wherein, when the second rigid panel pivots with respect to the first rigid panel and disengages from the respective side rails, the at least one hook will disengage from the at least one catch.

11. The tonneau cover apparatus of claim 10, wherein the support frame includes a plurality of catches, and the cover assembly includes a plurality of hooks, and wherein each of the plurality of hooks is engageable with one of the plurality of catches when the second rigid panel is engaged with each of the respective side rails.

12. The tonneau cover apparatus of claim 11, wherein the plurality of rigid panels includes the first, second and third rigid panels, and wherein the plurality of hooks includes a hook that is secured to the third rigid panel.

13. The tonneau cover apparatus of claim 10, wherein the cover assembly includes at least one locking member secured to one of the plurality of rigid panels; wherein the locking member is engageable with one of the respective side rails, when the respective side rail is secured to the cargo box, so as to engage the cover assembly with the support frame assembly and the cargo box; wherein the locking member is prevented from disengaging from the respective side rail when the locking member is in a first position and the respective side rail is secured to the cargo box; wherein the locking member can be moved from the first position to a second position; wherein the locking member can disengage from the respective side rail when the respective side rail, when the locking member is in the second position.

14. The tonneau cover apparatus of claim 1, wherein the cover assembly includes at least one locking member secured to one of the plurality of rigid panels; wherein the locking member is engageable with one of the respective side rails, when the respective side rail is secured to the cargo box, so as to engage the cover assembly with the support frame assembly and the cargo box; wherein the locking member is prevented from disengaging from the respective side rail when the locking member is in a first position and the respective side rail is secured to the cargo box; wherein the locking member can be moved from the first position to a second position; wherein the locking member can disengage from the respective side rail when the respective side rail is secured to the cargo box and the locking member is in the second position.

15. The tonneau cover apparatus of claim 1, wherein the cover assembly further includes a perimeter seal secured to the an underside of each of the respective rigid panels; wherein the perimeter seal includes a water resistant gasket that forms a border around an underside of the cover assembly so that, when the cover assembly is secured to the side rails of the support frame and the side rails are secured to the cargo box and the tailgate is in the closed position, and the cover assembly is positioned to cover the cargo box, the perimeter seal creates a water resistant barrier between the cover assembly and the top of the perimeter of the cargo box.

16. The tonneau cover apparatus of claim 1, wherein the upper surface of each of the rigid panels is curved downwardly so as to be at least partially downwardly concave along a width of the respective rigid panels when the respective rigid panel is secured to the side rails.

17. The tonneau cover apparatus of claim 16, wherein the upper surface of each of the rigid panels is sufficiently curved downward for water to run off of the upper surface of each of the rigid panels under the force of gravity when the cover assembly is engaged with the support frame assembly and positioned to cover the cargo box.

18. A method of removably securing a tonneau cover apparatus to a perimeter of a cargo box of a pickup truck, the perimeter of a cargo box including a forward end, two opposing sidewalls and a tailgate, the tailgate being positioned rearward of the forward end and having an open position and a closed position; the pickup truck further including a cab positioned forward of the cargo box; said method comprising the steps of:

providing a tonneau cover apparatus including: 1) a support frame assembly for attachment to the cargo box; 2) a cover assembly for attachment to the support frame assembly when the support frame assembly is attached to the cargo box; the cover assembly including a plurality of rigid panels that are foldably interconnected with one another in series; wherein each of the respective rigid panels has an upper surface and a lower surface; and wherein the plurality of rigid panels includes first, second and third rigid panels foldably secured to one another in series such that the cover assembly can be folded up when the cover assembly is secured to the support frame and the support frame is secured to the cargo box, such that respective upper surfaces of the first and second rigid panels reside in an upright folded orientation in which the upper surfaces of the first and second rigid panels reside in a generally parallel orientation to one another;

and 3) means for securing the respective first and second rigid panels in the upright folded orientation;

securing the support frame assembly to the cargo box;

securing the cover assembly to the support frame assembly;

positioning the first and second rigid panels in an upright folded orientation in which the upper surfaces of the first and second rigid panels reside in a generally parallel orientation to one another; and engaging said securing means with the cover assembly so that the first and second rigid panels reside in the upright folded orientation when so secured.

19. The method of claim 18, wherein said means for securing includes a cab bracket assembly in combination with a cab brace; wherein the cab brace is secured to the cover assembly and the cab bracket is secured to the cab, and wherein the cab brace is engageable with the cab bracket when the cab bracket is secured to the cab such that the cover assembly is secured to the cab such that at least two of the plurality of rigid panels reside in an upright folded orientation.

20. The method of claim 19, further including a cab panel and a storage retainer secured to the cab panel, the storage retainer including a retainer nest.

21. The method of claim 19, wherein the cab brace and the cab bracket are attracted to one another by magnetic attraction.

22. The method of claim 19, wherein the cab bracket includes a magnet and the cab brace includes a material which can be attracted to the magnet.

23. The method of claim 18, further including a cab panel, wherein said means for securing is selected from the group consisting of a storage strap secured to a support bow and engageable to a storage retainer secured to the cab panel; a panel bracket attached to a top surface of the cab panel and engageable with a storage strap; a cab strap secured to a support bow and engageable with a cab bracket secured to the cab; a side strap secured to a sidebar and securable to the cab; a cab panel strap attached to a support bow and securable to the cab panel; a securing magnet attached to a support bow and engageable with a cab magnet that is secured to the cab; a securing bracket located on at least one of the driver's side and the passenger side and engageable with the folding cover assembly when the folding cover assembly is in an upright folded orientation; and a cab magnet secured to the cab and engageable with a cab brace.

24. The method of claim 18; wherein said means for securing includes an elongated rigid member that has first and second ends and the elongated rigid member is bent in such a way that first and second upper surfaces of the respective first and second ends of the elongated rigid member are oriented at an angle to one another of from about 1 degree to about 16 degrees.

25. The method of claim 18; wherein the first and second rigid panels are foldably secured to one another by a flexible hinge; and wherein the flexible hinge is secured to the lower surfaces of each of the first and second rigid panels.

26. The method of claim 18; wherein the support frame includes first and second siderails, each of which is attachable to one of the respective opposing sidewalls; wherein one of the plurality of rigid panels is secured to both of the respective siderails when the respective siderails are secured to the respective sidewalls.

27. A tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover apparatus comprising:

a support frame assembly for attachment to the cargo box, the support frame assembly including two siderails and at least one catch secured to one of the two siderails; and a cover assembly for attachment to the support frame assembly when the support frame assembly is attached to the cargo box; the cover assembly having a plurality of rigid panels including first and second rigid panels that are pivotally interconnected with one another by a hinge; wherein each of the respective rigid panels has an upper surface and a lower surface; and wherein the first rigid panel can be secured to the support frame assembly when the support frame assembly is secured to the cargo box;

wherein the cover assembly further includes at least one hook secured to the second rigid panel, the at least one hook being engageable with the at least one catch to limit movement of the second rigid panel when the second rigid panel is positioned to cover at least a portion of the cargo box, and wherein, when the second panel is pivoted with respect to the first panel, the pivoting of the second panel disengages the at least one hook from the at least one catch.

28. The tonneau cover apparatus of claim 27, wherein the at least one catch includes a plurality of catches, and the at least one hook includes a plurality of hooks, and each of the plurality of hooks is engageable with the one of the plurality of catches to limit movement of the respective rigid panel to which the respective hook is secured.

29. The tonneau cover apparatus of claim 28 wherein the plurality of rigid panels includes a third rigid panel, and wherein the at least one hook includes a hook that is secured to the third rigid panel.

30. The tonneau cover apparatus of claim 27, further including a securing apparatus, wherein the securing apparatus includes at least one locking member secured to one of the plurality of rigid panels; wherein the locking member is engageable with one of the respective side rails when the respective side rail is secured to the cargo box, so as to engage the cover assembly with the support frame assembly and the cargo box; wherein the locking member is prevented from disengaging from the respective side rail when the locking member is in a first position and the respective side rail is secured to the cargo box; wherein the locking member can be moved from the first position to a second position; wherein the locking member can disengage from the respective side rail when the respective side rail is secured to the cargo box and the locking member is in the second position.

31. The tonneau cover apparatus of claim 27, further including a perimeter seal secured to the an underside of each of the respective rigid panels; wherein the perimeter seal includes a water resistant gasket that forms a border around an underside of the cover assembly so that, when the cover assembly is secured to the side rails of the support frame and the side rails are secured to the pickup truck and the tailgate is in the closed position, and the cover assembly is positioned to cover the cargo box, the perimeter seal creates a water resistant barrier between the cover assembly and the top of the perimeter of the cargo box.

32. The tonneau cover apparatus of claim 31, wherein the upper surface of each of the rigid panels is curved downwardly so as to be at least partially downwardly concave along a width of the respective rigid panels when the respective rigid panel is secured to the side rails.

33. The tonneau cover apparatus of claim 32, wherein the upper surface of each of the rigid panels is sufficiently curved for water to run off of the upper surface of each of the rigid panels under the force of gravity when the cover assembly is engaged with the support frame assembly positioned to cover the cargo box.

34. The tonneau cover apparatus of claim 27, further comprising a hinge support mechanism that helps to maintain alignment of the second panel with respect to the first panel as the second panel pivots about a hinge pivot axis so as to constrain the rotation of the second panel in a manner that reduces stress on the hinge.

35. A tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position; the tonneau cover apparatus comprising:

a support frame assembly for attachment to the cargo box; and a cover assembly for attachment to the support frame assembly when the support frame assembly is attached to the cargo box; the cover assembly including a plurality of rigid panels that are foldably interconnected with one another in series; wherein each of the respective rigid panels is interconnected to any adjacent rigid panel in the series of rigid panels with a hinge; wherein the support frame assembly includes two siderails and at least one catch engaged with one of the two siderails, wherein the cover assembly further includes at least one hook secured to one of the plurality of rigid panels, wherein the at least one hook will be engaged with the at least one catch to limit movement of the respective rigid panel to which the at least one hook is secured when the rigid panel is engaged with both of the respective siderails and when both of the respective siderails are secured to the cargo box, and wherein, when the rigid panel to which the hook is secured is folded over and pivots with respect to an adjacent rigid panel to which the respective rigid panel is interconnected, the at least one hook will disengage from the at least one catch.

36. The tonneau cover apparatus of claim 35, wherein the support frame includes a plurality of catches, and the cover assembly includes a plurality of hooks, wherein each of the plurality of hooks is engageable with one of the plurality of catches when each of the respective plurality of rigid panels to which any one of the respective plurality of hooks is secured, is secured to one of the two respective side rails when the respective side rails are secured to the cargo box.

37. The tonneau cover apparatus of claim 36, further including securing apparatus, wherein the securing apparatus includes at least one locking member secured to one of the plurality of rigid panels; wherein the locking member is engageable with one of the respective side rails, when the respective side rail is secured to the cargo box, so as to engage the cover assembly with the support frame assembly when the respective side rails are secured to the cargo box; wherein the locking member is prevented from disengaging from the respective side rail when the locking member is in a first position and the respective side rail is secured to the cargo box; wherein the locking member can be moved from the first position to a second position; wherein the locking member can disengage from the respective side rail when the respective side rail is secured to the cargo box and the locking member is in the second position.

38. The tonneau cover apparatus of claim 35, further including a securing apparatus, wherein the securing apparatus includes at least one locking member secured to one of the plurality of rigid panels; wherein the locking member is engageable with one of the respective side rails when the respective side rail is secured to the cargo box, so as to engage the cover assembly with the support frame assembly and the cargo box; wherein the locking member is prevented from disengaging from the respective side rail when the locking member is in a first position and the respective side rail is secured to the cargo box; wherein the locking member can be moved from the first position to a second position; wherein the locking member can disengage from the respective side rail when the respective side rail is secured to the cargo box and the locking member is in the second position.

39. The tonneau cover apparatus of claim 35, further including a perimeter seal secured to an underside of each of the respective rigid panels; wherein the perimeter seal includes a water resistant gasket that forms a border around an underside of the cover assembly so that, when the cover assembly is secured to the side rails of the support frame and the side rails are secured to the pickup truck and the tailgate is in the closed position, and the cover assembly is positioned to cover the cargo box, the perimeter seal creates a water resistant barrier between the cover assembly and the top of the perimeter of the cargo box.

40. The tonneau cover apparatus of claim 35, wherein the upper surface of each of the rigid panels is curved downwardly so as to be at least partially downwardly concave along a width of the respective rigid panels when the respective rigid panel is secured to the side rails.

41. The tonneau cover apparatus of claim 40, wherein the upper surface of each of the rigid panels is sufficiently curved for water to run off of the upper surface of each of the rigid panels under the force of gravity when the cover assembly is engaged with the support frame assembly and the side rails are secured to the cargo box.

* * * * *